US012420851B2

(12) United States Patent
Amouie et al.

(10) Patent No.: US 12,420,851 B2
(45) Date of Patent: Sep. 23, 2025

(54) APPARATUSES, SYSTEMS, AND METHODS FOR MONITORING MOVING VEHICLES

(71) Applicants: Norfolk Southern Corporation, Atlanta, GA (US); Georgia Tech Research Corporation, Atlanta, GA (US)

(72) Inventors: Mabby Nicholas Amouie, Atlanta, GA (US); Evan Thomas Gebhardt, Atlanta, GA (US); Colin Usher, Atlanta, GA (US); Benjamin Quick, Atlanta, GA (US); Trent Black, Atlanta, GA (US); John Rose, Atlanta, GA (US); Emily Strube, Atlanta, GA (US); Priyank Patel, Atlanta, GA (US); Nick Ramsey, Atlanta, GA (US); Ian Strothers, Atlanta, GA (US)

(73) Assignee: Norfolk Southern Corporation & Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 18/829,189

(22) Filed: Sep. 9, 2024

(65) Prior Publication Data
US 2025/0083717 A1   Mar. 13, 2025

Related U.S. Application Data

(60) Provisional application No. 63/582,165, filed on Sep. 12, 2023, provisional application No. 63/581,554, filed on Sep. 8, 2023.

(51) Int. Cl.
*B61L 25/02* (2006.01)
*B61L 25/04* (2006.01)
(Continued)

(52) U.S. Cl.
CPC ........... *B61L 25/021* (2013.01); *B61L 25/025* (2013.01); *B61L 25/04* (2013.01); *B61L 27/53* (2022.01);
(Continued)

(58) Field of Classification Search
CPC ...... B61L 25/025; B61L 25/021; B61L 27/70; B61L 27/57; B61L 23/00; H04N 7/188
See application file for complete search history.

(56) References Cited

U.S. PATENT DOCUMENTS 4,915,504 A * 4/1990 Thurston ................. G06T 7/521
356/604
5,793,492 A    8/1998 Vanaki
(Continued)

FOREIGN PATENT DOCUMENTS

CN    111483496 A *  8/2020  ............. B61L 25/04
CN    111923962 A * 11/2020
(Continued)

OTHER PUBLICATIONS

Non-Final Office Action for U.S. Appl. No. 18/829,200 dated Oct. 29, 2024, 19 pages.
(Continued)

Primary Examiner — Zachary L Kuhfuss
(74) Attorney, Agent, or Firm — Bradley Arant Boult Cummings LLP; Daniel E. Sineway, Esq.

(57) ABSTRACT

Railcar inspection systems, methods, and apparatuses are disclosed, including a railcar inspection portal. The railcar inspection portal includes a physical structure positioned around a railroad track, and through which a railcar can travel. The railcar inspection portal can include wheel detection sensors along the railroad track for detecting the presence of a railcar passing over the sensors. The sensors can transmit signals, corresponding to railcars passing over the
(Continued)

sensors, to computing devices for determining railcar speeds. The railcar inspection portal can include imaging devices configured to capture images and readings of railcars passing through the inspection portal. Based on a determined speed corresponding to a passing railcar, the computing devices can control the imaging devices to capture specific areas or components of the passing railcar, or individual cars thereon. The computing devices can process the captured images to detect defects corresponding to the passing railcar, or individual cars thereon.

20 Claims, 66 Drawing Sheets

(51) Int. Cl.

| | | |
|---|---|---|
| *B61L 27/53* | (2022.01) | |
| *B61L 27/57* | (2022.01) | |
| *B61L 27/70* | (2022.01) | |
| *G01M 17/10* | (2006.01) | |
| *G06T 7/00* | (2017.01) | |
| *G06T 7/55* | (2017.01) | |
| *G06T 7/80* | (2017.01) | |
| *G06V 20/52* | (2022.01) | |
| *G06V 20/54* | (2022.01) | |
| *G06V 20/62* | (2022.01) | |
| *G06V 30/10* | (2022.01) | |
| *H04N 7/18* | (2006.01) | |
| *H04N 23/11* | (2023.01) | |
| *H04N 23/51* | (2023.01) | |
| *H04N 23/52* | (2023.01) | |
| *H04N 23/56* | (2023.01) | |
| *H04N 23/60* | (2023.01) | |
| *H04N 23/90* | (2023.01) | |

(52) U.S. Cl.
CPC ............... *B61L 27/57* (2022.01); *B61L 27/70* (2022.01); *G01M 17/10* (2013.01); *G06T 7/0002* (2013.01); *G06T 7/001* (2013.01); *G06T 7/55* (2017.01); *G06T 7/80* (2017.01); *G06V 20/52* (2022.01); *G06V 20/54* (2022.01); *G06V 20/63* (2022.01); *G06V 30/10* (2022.01); *H04N 7/18* (2013.01); *H04N 7/188* (2013.01); *H04N 23/11* (2023.01); *H04N 23/51* (2023.01); *H04N 23/52* (2023.01); *H04N 23/56* (2023.01); *H04N 23/64* (2023.01); *H04N 23/90* (2023.01); *G06T 2207/10024* (2013.01); *G06T 2207/10048* (2013.01); *G06T 2207/30252* (2013.01); *G06V 2201/08* (2022.01)

(56) References Cited

U.S. PATENT DOCUMENTS

| | | |
|---|---|---|
| 6,813,581 B1 | 11/2004 | Snyder |
| 6,909,514 B2 | 6/2005 | Nayebi |
| 7,681,443 B2 | 3/2010 | Kilian et al. |
| 7,714,886 B2 | 5/2010 | Kilian et al. |
| 7,715,026 B2 | 5/2010 | Nayebi |
| 8,289,526 B2 | 10/2012 | Kilian et al. |
| 8,480,008 B1 | 7/2013 | Arnold |
| 8,668,136 B2 | 3/2014 | Ahern et al. |
| 8,780,189 B2 | 7/2014 | Kilian |
| 8,934,007 B2 | 1/2015 | Snead |
| 9,033,219 B2 | 5/2015 | Schoner et al. |
| 9,073,559 B2 | 7/2015 | Kilian et al. |
| 9,129,248 B2 | 9/2015 | Reynolds et al. |
| 9,438,754 B2 | 9/2016 | Schoner et al. |
| 9,516,199 B2 | 12/2016 | Kilian et al. |
| 9,625,607 B2 | 4/2017 | Tudor et al. |
| 9,671,191 B1 | 6/2017 | Sullivan et al. |
| 9,709,394 B2 | 7/2017 | Schoner et al. |
| 9,836,893 B2 | 12/2017 | Chundru et al. |
| 10,513,279 B2 | 12/2019 | Mulligan |
| 10,523,858 B1 | 12/2019 | Arcaini et al. |
| 10,984,521 B2 | 4/2021 | Kohler et al. |
| 11,107,233 B2 | 8/2021 | Saniei et al. |
| 11,172,107 B1 | 11/2021 | Hoeppner |
| 11,235,788 B2 | 2/2022 | Snyder et al. |
| 11,285,980 B2 | 3/2022 | Popplewell |
| 11,423,559 B2 | 8/2022 | Kohler |
| 11,620,743 B2 | 4/2023 | Kohler et al. |
| 11,688,169 B1 | 6/2023 | Dryer et al. |
| 11,763,480 B2 | 9/2023 | Saniei et al. |
| 11,776,145 B2 | 10/2023 | Kohler |
| 11,861,509 B2 | 1/2024 | Neal, Jr. et al. |
| 11,891,098 B1* | 2/2024 | Smythe ................. B61L 25/021 |
| 11,932,290 B2 | 3/2024 | Davis et al. |
| 11,974,035 B1* | 4/2024 | Buschelman .......... H04N 5/265 |
| 12,033,312 B2 | 7/2024 | Kohler et al. |
| 2004/0263624 A1* | 12/2004 | Nejikovsky ........... B61L 23/042 |
| | | 348/148 |
| 2005/0253926 A1* | 11/2005 | Chung .................. B61L 25/023 |
| | | 348/148 |
| 2006/0276985 A1 | 12/2006 | Xu et al. |
| 2007/0040911 A1 | 2/2007 | Riley |
| 2010/0100275 A1* | 4/2010 | Mian ..................... G01M 17/08 |
| | | 382/284 |
| 2012/0113259 A1 | 5/2012 | Jie et al. |
| 2013/0054158 A1 | 2/2013 | Toms |
| 2016/0096536 A1 | 4/2016 | Toms |
| 2017/0199215 A1 | 7/2017 | Arcaini et al. |
| 2018/0222498 A1 | 8/2018 | Kelley |
| 2018/0237041 A1 | 8/2018 | Mesher |
| 2019/0061791 A1 | 2/2019 | Yaktine et al. |
| 2019/0094154 A1 | 3/2019 | Iler |
| 2019/0260972 A1 | 8/2019 | Behety |
| 2020/0408682 A1 | 12/2020 | Mian et al. |
| 2021/0058588 A1* | 2/2021 | Abreo .................. H04N 23/741 |
| 2021/0403060 A1 | 12/2021 | Pertosa |
| 2022/0377251 A1 | 11/2022 | Grata et al. |
| 2023/0194746 A1 | 6/2023 | Morton |
| 2023/0410342 A1 | 12/2023 | Kohler |
| 2023/0410354 A1 | 12/2023 | Saniei et al. |
| 2024/0004775 A1 | 1/2024 | Liu |
| 2024/0035931 A1 | 2/2024 | Grata |
| 2024/0043043 A1 | 2/2024 | Brooks et al. |
| 2024/0137635 A1* | 4/2024 | Buschelman .......... H04N 5/265 |
| 2024/0236464 A9* | 7/2024 | Buschelman .......... H04N 23/56 |

FOREIGN PATENT DOCUMENTS

| | | | | |
|---|---|---|---|---|
| CN | 111942434 A | * | 11/2020 | |
| WO | WO-9532581 A1 | * | 11/1995 | ............. H04N 1/387 |
| WO | WO-2022192962 A1 | * | 9/2022 | ............. B61L 27/57 |
| WO | 2024050200 A1 | | 3/2023 | |
| WO | 2024050201 A1 | | 3/2024 | |
| WO | 2024196402 A1 | | 9/2024 | |

OTHER PUBLICATIONS

Non-Final Office Action for U.S Appl. No. 18/829,194 dated Nov. 18, 2024, 18 pages.
Chong et al., S.Y. A Review of Health and Operation Monitoring Technologies for Trains, Google Scholar, Smart Structures and Systems, vol. 6, No. 9, 2010, pp. 1079-1105. (Year: 2010).
Gao et al., L. Anomaly Detection of Trackside Equipment Based on GPS and Image Matching, IEEE Access, vol. 6, Jan. 2020, pp. 17346-17355.
Non-Final Office Action for U.S. Appl. No. 18/829,199, mailed Dec. 27, 2024, 12 Pages.
Notice of Allowance for U.S. Appl. No. 18/829,216 dated Dec. 12, 2024, 2 pages.

(56) References Cited

OTHER PUBLICATIONS

Qiushi et al., "M. Composite Railway Health Monitoring System based on Fiber Optic Bragg Grating Sensing Array", IEEE Far East Forum on Nondestructive Evaluation/Testing, Jun. 2014, pp. 259-264.

* cited by examiner

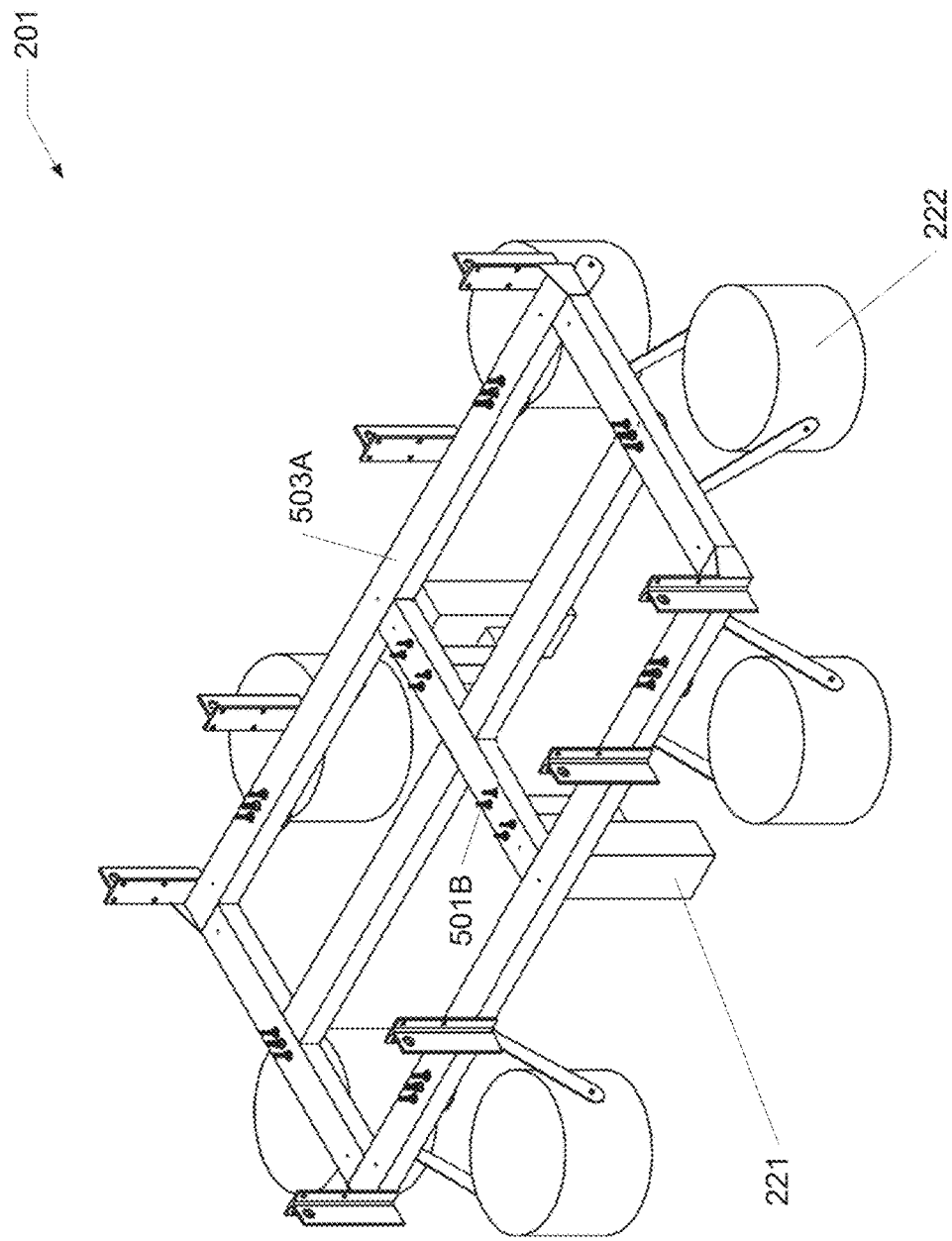

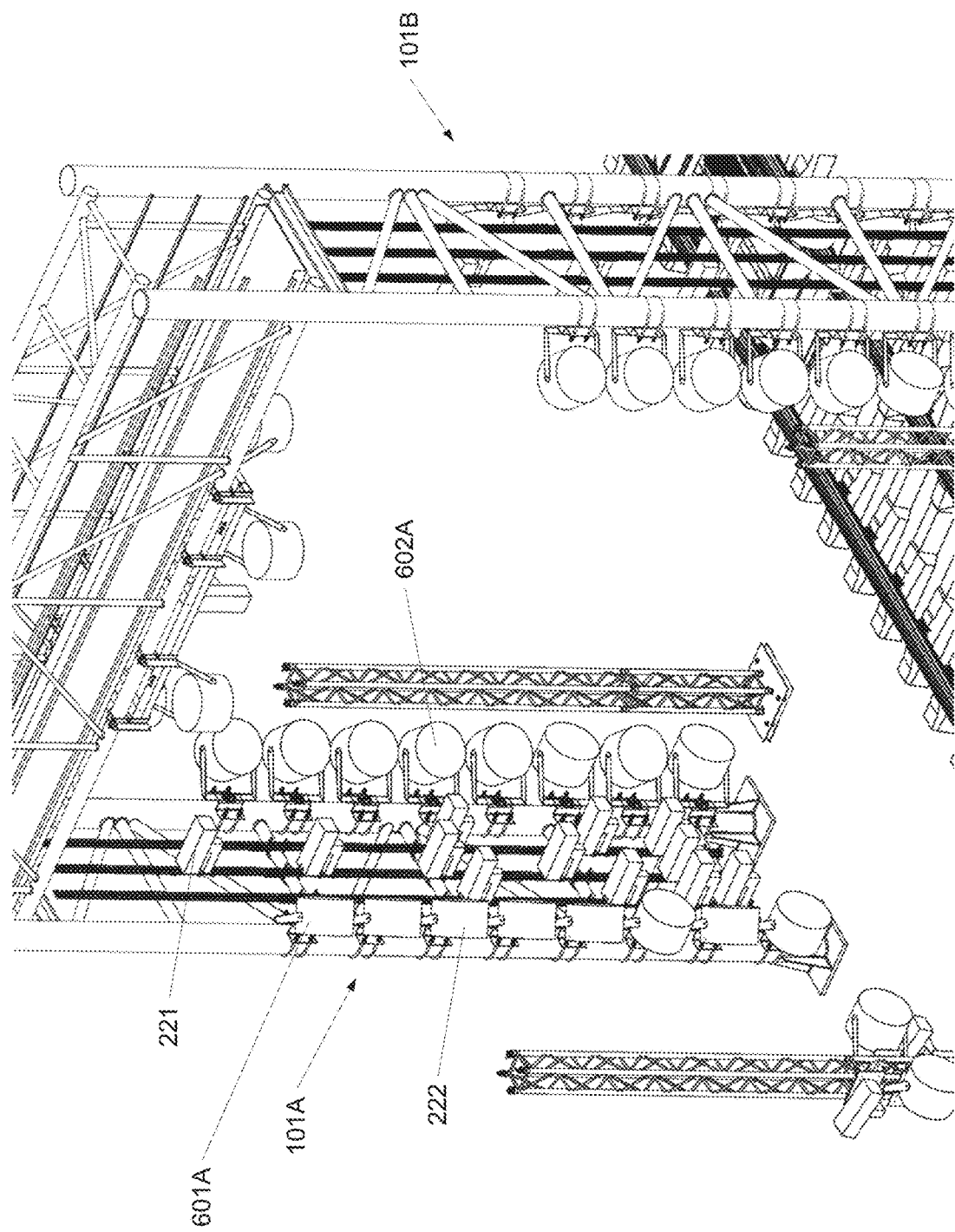

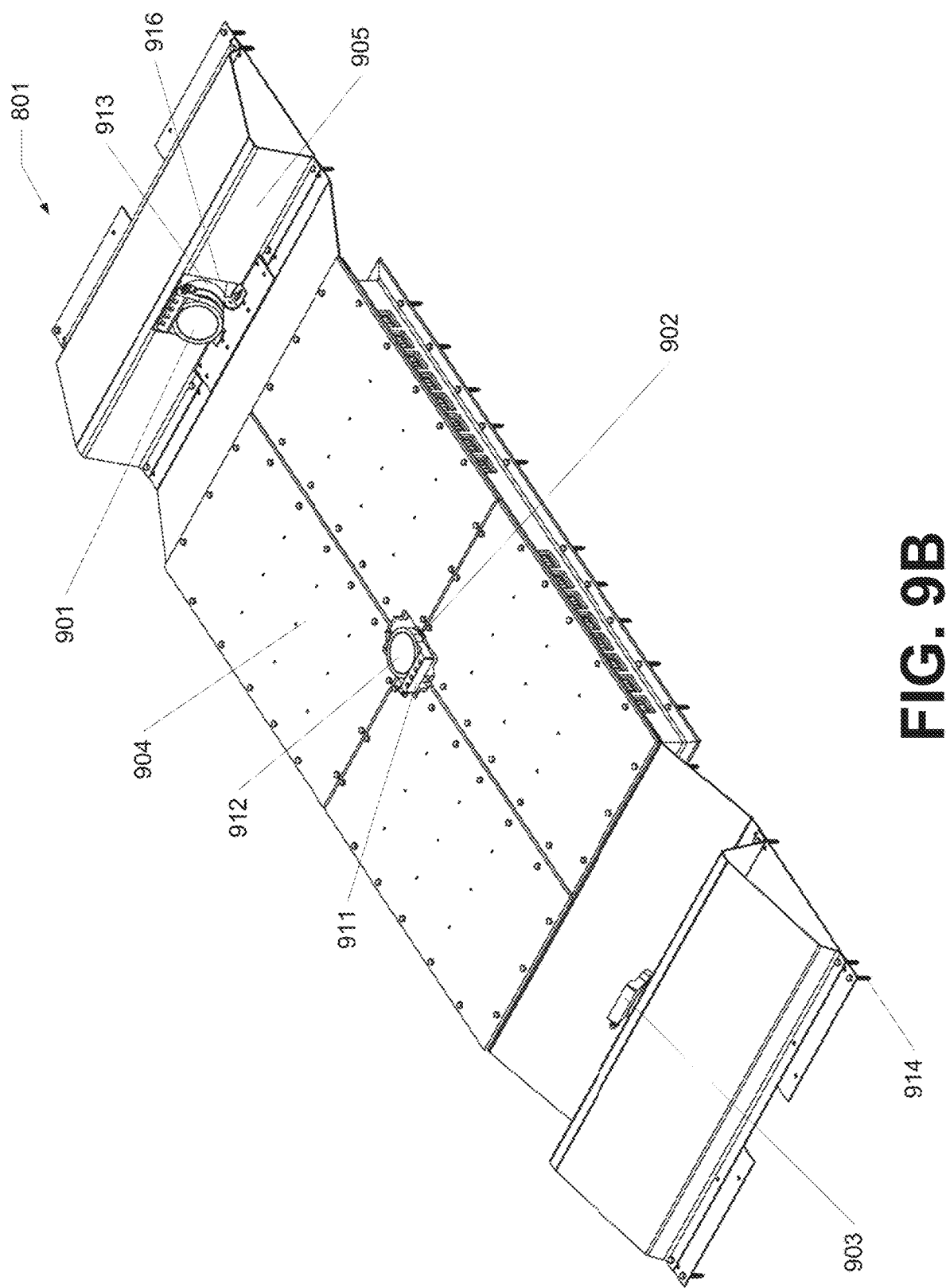

APPARATUSES, SYSTEMS, AND METHODS FOR MONITORING MOVING VEHICLES

CROSS REFERENCE TO RELATED APPLICATIONS

This application claims the benefit of, and priority to, U.S. Provisional Patent Application No. 63/581,554, filed on Sep. 8, 2023, and entitled "APPARATUSES, SYSTEMS, AND METHODS FOR MONITORING TRAIN RAILCARS," and U.S. Provisional Patent Application No. 63/582,165, filed on Sep. 12, 2023, and entitled "APPARATUSES, SYSTEMS, AND METHODS FOR MONITORING TRAIN RAILCARS," the disclosures of which are incorporated by reference in their entireties as if the same were fully set forth herein.

TECHNICAL FIELD

This application generally related to systems, apparatuses, and methods for inspecting moving vehicles and, more specifically, to various components and systems for gathering data on individual sections of moving rail-bound vehicles.

BACKGROUND

Trains are vital transportation mediums used to distribute large quantities of goods around the world. Due to their robust nature and efficiency, trains and their sub-components, such as railcars and locomotives, are commonly used repeatedly throughout their lifetime. Repeated and constant use of a particular train and its sub-components can cause the particular train, and its sub-components, to experience degradation over time. The trains, and train sub-components, are traditionally inspected by individuals at rail yards for any particular issue and to prevent safety and functionality hazards. These inspections can be costly due to the manpower necessary to properly complete the inspections, the amount of time it takes to inspect the trains and train sub-components, and the lost revenue associated with keeping the train in the railyard. Additionally, humans can occasionally overlook or fail to identify issues that can lead to safety hazards and/or functional issues with the train or its sub-components.

Therefore, there is a long-felt but unresolved need for a system or method that monitors trains during use, minimizes or otherwise reduces the man-hours necessary for inspecting railcars, identifies a wide variety of issues associated with the railcars, records data associated with the railcars, and/or generates insights associated with the railcars inspected by the disclosed system.

BRIEF SUMMARY OF THE DISCLOSURE

Briefly described, and according to one example, aspects of the present disclosure generally relate to apparatuses, systems, and methods for monitoring various aspects of railcars. The disclosed system can include an inspection portal system (also referred to herein as a digital train inspection (DTI) portal or an inspection portal). The inspection portal system can include a physical structure, such as a tunnel and/or frame, which can be placed around, adjacent to, physically proximate to, or generally near a set of train tracks. The portal can be large enough such that a train (e.g., a freight train, a commuter train, etc.) can pass through the tunnel. Various sensors can be attached to the portal structure and/or on the ground such that the sensors can completely surround the particular train as it passes through the inspection portal system. One or more cameras or sensors can be installed near the entrance and/or exit of the tunnel (e.g., inside or outside of the tunnel) such that images, scans, readings, etc., of a railcar can be captured as the railcar approaches, enters, and/or exits the tunnel.

The inspection portal system can include various sensors including both digital and analog sensors, for detecting railcars. The inspection portal system can include one or more computing systems for monitoring railcars, recording data associated with railcars, identifying issues associated with railcars, generating reports based on the inspected data associated with the railcars, etc. The inspection portal can be configured to identify an approaching railcar, determine the approaching railcar's speed, and based on the railcar's determined speed, configure one or more cameras, sensors, and data capturing devices for obtaining readings from the railcar. The inspection portal system can include a computing system, one or more sensors, and a portal structure. Herein, the term "railcar" can also mean "train" and/or "locomotive."

The inspection portal system can include a wheel sensor system (also referred to herein as a speed detection system) for estimating the speed of a passing train. The wheel sensor system of the inspection portal system can include several wheel sensors (e.g., 2, 3, 5, 8, 16, etc.). Though third-party wheel sensor systems are available, the wheel sensor system can include substantially more wheel sensors compared to the third-party wheel sensor systems. By including substantially more wheel sensors, the wheel sensor system of the inspection portal system can provide a level of redundancy and accuracy unavailable in existing systems. Because wheel sensors can fail, the inspection portal system can be configured to perform algorithms that can detect faulty wheel sensor information, identify which wheel sensors are associated with inaccurate data, and discard the inaccurate data from the speed estimation calculation. The process of identifying damaged wheel sensors can increase the accuracy and precision of the wheel sensor data, which can provide better speed estimations.

Existing systems can only estimate a single speed for an entire train. However, the speed of a train at a given point, such as a particular point within the inspection portal, can change as different cars of the train pass through the inspection portal system, and any errors in the speed estimation for a given car can lead to erroneous camera timings for that car (and/or subsequent cars), causing the resulting images to be useless because the incorrect portion of the train was imaged. To combat these errors, the inspection portal system can dynamically estimate the train's speed along the entire length of the train (e.g., estimate the speed of individual railcars), and based on the current and/or estimated speed of the train, the inspection portal system can dynamically adjust the capture timing and/or capture rate of the various cameras. Adjusting the capture timing and/or capture rate of the cameras based on the speed of the train can result in improved image quality. For example, based on the improved speed estimation of a given car, the system can synchronize one or more cameras to capture images of the correct components of a particular railcar. The wheel sensor system is directionally agnostic in that it can detect the speed of a train traveling in either direction on a train track.

The various sensors can record, or otherwise capture, data associated with the railcars. For example, the various sensors can include one or more cameras for recording images of the railcars. In another example, the various sensors can include one or more infrared sensors or cameras for recording infrared (IR) images of the railcars, specifical railcar parts, etc. The computing system can process the data associated with the railcars to generate particular insights of the associated railcars. For example, the computing system can process captured IR images to determine whether an abnormal or anomalous heat pattern is present with the captured IR images, such as those that are not yet visible in the optical spectrum. Determining abnormal or anomalous heat patterns for railcars and specific railcar parts can include comparing the IR images to historical images that represent known normal or optimal heat patterns/profiles. Based on the obtained IR images, the inspection portal system can determine various heat profiles, indicating where and to what extent a wheel or other component is experiencing a temperature change. For example, a certain heating profile can be indicative of an applied hand brake scenario in which the hand brake was left engaged while the train was moving.

In another example, the computing system can use data recorded by the various sensors to inspect the health of the railcar, an individual car of the railcar, or railcar subcomponents. Alternatively, or in addition, the computing system can process the data using various machine learning techniques, such as those described in:

U.S. patent application Ser. No. 16/938,102, filed Jul. 24, 2020, now U.S. Pat. No. 11,507,779, entitled "TWO-STAGE DEEP LEARNING FRAMEWORK FOR DETECTING THE CONDITION OF RAIL CAR COUPLER SYSTEMS";

U.S. patent application Ser. No. 17/549,499, filed Dec. 13, 2021, now U.S. Pat. No. 11,468,551, entitled "MACHINE-LEARNING FRAMEWORK FOR DETECTING DEFECTS OR CONDITIONS OF RAILCAR SYSTEMS"; and U.S. patent application Ser. No. 17/962,971, filed Oct. 10, 2022, now U.S. Pat. No. 11,663,771, entitled "MACHINE-LEARNING FRAMEWORK FOR DETECTING DEFECTS OR CONDITIONS OF RAILCAR SYSTEMS,"

the entire contents of which are incorporated by reference as if fully set forth herein.

The inspection portal system can be modular such that the sensors can be moved, replaced, and/or upgraded. For example, the cameras of the inspection portal system can be moved based on the type of train passing through the inspection portal system. In another example, the sensors can be upgraded to include upgraded sensors capable of gathering new types of data. The inspection portal system can include motorized mechanisms connected to each particular sensor. The motorized mechanisms can change the positioning and/or location of the sensors to accommodate any particular data acquisition requirements.

In particular embodiments, the motorized mechanisms can be operatively configured to focus, or otherwise adjust settings for, one or more cameras or sensors based on detected signals corresponding to an approaching railcar. For example, the system can be configured to detect a speed at which a railcar is approaching. In this example, the system can configure a shutter speed, burst rate, lens aperture, field of view, general focus, etc., for one or more cameras that are to capture one or more images (or sensor readings) from a railcar. In another example, the system can detect an abnormal heat profile in a capture IR image, and in response configure one or more cameras to focus on, and capture, a particular railcar component that was detected as exhibiting an abnormal heat profile.

The inspection portal system can include modular and configurable camera controls, infrared imaging systems, train speed estimation systems, railcar identification systems, and real-time health monitoring. Various distinct types of cameras can be added and/or integrated into the inspection portal system. The computing system(s) of the inspection portal system can configure and/or control the capture rate and/or capture timing of each individual camera. For example, the computing system can vary the capture rate and/or capture timing of each camera such that the inspection portal system can compensate for any differences in latency among different makes and/or models of camera, or the connections, mediums, and protocols across which instructions are transmitted. The inspection portal system can, for example, synchronize the capture timing of cameras to within a microsecond of latency, such that all photos can be taken at the same time (i.e., within a microsecond).

The inspection portal system can employ the computing system(s) to control the burst rate of one, some, or all of the cameras based on various inputs. For example, the inspection portal system can cause one or more cameras to obtain images in a burst image capture mode (e.g., for certain regions of a car) and can cause the same camera(s) to obtain one or more images in a normal image capture mode (e.g., for certain other regions of a car). As a more specific example, the inspection portal system can trigger a burst image capture of the space between the trailing wheel of a first car and the leading wheel of a second, subsequent car.

The system can include one or more automatic equipment identification (AEI) scanners to identify train cars. Each railcar (and individual cars of the railcar) can be outfitted with a radio frequency identification (RFID) tag. The AEI scanner can be located next to the track to read the RFID tags as the train passes by. In some situations, AEI scanners can often miss railcars due to obstructed RFID tags or other issues, and if a given railcar cannot be identified, the associated images can be less useful, or completely unusable, for inspections.

To overcome the missed identification of passing railcars, the inspection portal system can include deep learning technology to identify the cars (e.g., as a backup or enhancement of the existing AEI/RFID system). The inspection portal system can analyze the optical stream of images from the cameras to identify specific railcars based on, for example, nameplates, serial numbers, graffiti or images on the cars, etc. A railcar identifier can be located anywhere on a railcar (i.e., there is no standardized or regulated location of the identifier), and a portion of the railcar identifier can be obstructed by graffiti, snow, dirt, or the like. The deep learning technology of the inspection portal system can identify a location of the identified text, isolate the identified text, and interpret the identified text. The deep learning technology of the inspection portal system can include optical character recognition (OCR) systems or other algorithms different from the algorithms used to identify damaged/missing components.

The inspection portal system can evaluate the captured images and speed estimation data and can match them to determine whether the number of images matches the speed estimation and associated camera triggers. If there is a mismatch between the expected number/timing of images and the actual number/timing of images, the inspection portal system can determine there is a system health issue.

The inspection portal system, and more generally the train inspection environment, can include various novel and inventive hardware aspects. For example, the portal structure can include an overhead portion, a first lateral portion, and a second lateral portion. The first lateral portion and the second lateral portion can be opposite to one another separated by the train track. The overhead portion can extend over the train track and connect both the first lateral portion and the second lateral portion.

The overhead portion can include an overhead inspection system. The overhead inspection system can include lights, cameras, infrared sensors, and/or any other particular sensor for gathering data from a birds-eye perspective.

The first lateral portion and the second lateral portion can include cameras, sensors, and/or lights that are directed toward the train track. For example, the first lateral portion can gather data from a first side of a train track while the second lateral portion can gather data on a second side of the train track. The components (e.g., cameras, sensors, lights) of the first lateral portion, the second lateral portion, and the overhead portion can synchronously gather data on any particular passing railcar. The first lateral portion and the second lateral portion can gather data and/or capture images on the couplers, air hoses, trucks, wheels, retainer valves, and/or the full side of the passing railcars.

The base inspection systems can include a first base inspection system on the first side of the train track and a second base inspection system on the second side of the train track. The first base inspection system and the second base inspection system can be opposite to one another separated by the train track. The first base inspection system and the second base inspection system can include cameras, sensors, and lights, each of which is directed toward the train track. The base inspection systems can gather data on the lower portion of the railcar. For example, the base inspection systems can gather data associated with the brake-shoes and/or other lower portion components of the railcar.

The undercarriage inspection system of the train inspection environment can include one or more undercarriage inspection assemblies for gathering data on an undercarriage and/or underside of a passing railcar. A given undercarriage inspection assembly can be or include an undercarriage line-scan inspection assembly and an undercarriage area-scan inspection assembly. The undercarriage line-scan inspection system can include one or more line-scan cameras configured to capture line-scan images of the undercarriage of a particular passing railcar. The undercarriage area-scan camera can include one or more area-scan cameras configured to capture area-scan images of the undercarriage of the particular passing railcar. Regardless of type, each undercarriage inspection assembly can include one or more lights for illuminating the undercarriage of the particular passing railcar for data acquisition.

The rail-side inspection system can include a first rail-side inspection assembly on the first side of the train track and a second rail-side inspection assembly on the second side of the train track. The rail-side inspection assembly can include one or more cameras and/or lights directed towards the train track and used to gather data associated with a cross-key of the passing railcar. The rail-side inspection assembly can be installed on the ground adjacent to the train track or on one or more rail ties at a location outside of the rails. Regardless, the rail-side inspection assembly can be angled in a direction that is upward and toward the rails, which can position to the rail-side inspection assembly to capture images of railcar components that are otherwise difficult or impossible to view from other angles (e.g., while the railcar is in motion), such as the cross-key of a passing railcar, as a non-limiting example.

According to a first aspect, a system comprising: A) one or more imaging devices, each of the one or more imaging devices being configured to capture images of a corresponding target region of a passing railcar traveling along a railway, each target region corresponding to one or more railcar components of the passing railcar; B) one or more wheel detection sensors configured to detect a presence and/or a non-presence of wheels traveling along a railway, the one or more wheel detection sensors being located upstream from the one or more imaging devices such that the passing railcar passes the one or more wheel detection sensors before passing the one or more imaging devices; and C) one or more computing devices in communication with the one or more wheel detection sensors and the one or more imaging devices, the one or more computing devices being configured to: 1) determine a current estimated train speed of the passing railcar based at least in part on detection data received from the one or more wheel detection sensors; 2) determine one or more trigger timings, each trigger timing corresponding to a particular imaging device of the one or more imaging devices, wherein each trigger timing is based at least in part on the current estimated train speed and, for each particular imaging device of the one or more imaging devices, a distance offset and a trigger latency; and 3) output capture instructions for each of the one or more imaging devices to capture images of the passing railcar according to a corresponding trigger timing of the one or more trigger timings.

According to a further aspect, the system of the first aspect or any other aspect, wherein the distance offset is, for each particular imaging device of the one or more imaging devices, a distance between the one or more wheel detection sensors and the particular imaging device.

According to a further aspect, the system of the first aspect or any other aspect, wherein the distance offset comprises a plurality of distances between the particular imaging device and each wheel detection sensor of the one or more wheel detection sensors.

According to a further aspect, the system of the first aspect or any other aspect, wherein the trigger latency comprises, for each particular imaging device of the one or more imaging devices, a timing delay between a transmission time at which the capture instructions are outputted and a receipt time at which the particular imaging device receives the capture instructions.

According to a further aspect, the system of the first aspect or any other aspect, wherein the trigger latency comprises, for each particular imaging device of the one or more imaging devices, a processing time required for the particular imaging device to capture a first image after receiving the capture instructions.

According to a further aspect, the system of the first aspect or any other aspect, wherein the trigger latency comprises, for each particular imaging device of the one or more imaging devices, clock discrepancies between an imaging clock of the particular imaging device capture and a control clock of the one or more computing devices.

According to a further aspect, the system of the first aspect or any other aspect, wherein the capture instructions comprise instructions for capturing images according to a particular image capture rate, wherein the particular image capture rate is based at least in part on the current estimated train speed.

According to a further aspect, the system of the first aspect or any other aspect, wherein the one or more imaging devices comprises a plurality of imaging devices and the capture instructions synchronize image capture timings among the plurality of imaging devices.

According to a further aspect, the system of the first aspect or any other aspect, wherein the capture instructions cause all imaging devices of the plurality of imaging devices to capture images within a microsecond of one another.

According to a second aspect, a method comprising: A) receiving detection data from one or more wheel detection sensors, the detection data indicating detection of a train; B) determining, based at least in part on the detection data, a first estimated speed of a first railcar of the train; C) determining a plurality of first trigger timings, each first trigger timing of the plurality of first trigger timings corresponding to a respective imaging device of a plurality of imaging devices, wherein each first trigger timing is based at least in part on, for each imaging device of the plurality of imaging devices: 1) a distance offset for the imaging device; 2) a trigger latency for the imaging device; and 3) the first estimated speed; D) outputting first capture instructions for each of the plurality of imaging devices to capture images of the first railcar according to a first trigger timing specific to each of the plurality of imaging devices; E) determining, based at least in part on the detection data, a second estimated speed of a second railcar of the train; F) determining a plurality of second trigger timings, each second trigger timing of the plurality of second trigger timings corresponding to a respective imaging device of the plurality of imaging devices, wherein each second trigger timing is based at least in part on, for each imaging device of the plurality of imaging devices: 1) the distance offset for the imaging device; 2) the trigger latency for the imaging device; and 3) the second estimated speed; and F) outputting second capture instructions for each of the plurality of imaging devices to capture images of the second railcar according to a second trigger timing specific to each of the plurality of imaging devices.

According to a further aspect, the method of the second aspect or any other aspect, wherein the second estimated speed is different from the first estimated speed.

According to a further aspect, the method of the second aspect or any other aspect, wherein the trigger latency comprises, for each imaging device of the plurality of imaging devices: A) a timing delay between a transmission time at which capture instructions are outputted and a receipt time at which the imaging device receives the capture instructions; and B) a processing time required for the imaging device to capture a first image after receiving the capture instructions.

According to a further aspect, the method of the second aspect or any other aspect, wherein each of the first capture instructions and the second capture instructions comprise instructions for each of the plurality of imaging devices to capture images according to a corresponding particular image capture rate, wherein the particular image capture rate is based at least in part on the first estimated speed or the second estimated speed, respectively.

According to a further aspect, the method of the second aspect or any other aspect, wherein the first estimated speed or the second estimated speed, respectively, synchronize image capture timings among the plurality of imaging devices.

According to a further aspect, the method of the second aspect or any other aspect, wherein the capture instructions cause all imaging devices of the plurality of imaging devices to capture images within a microsecond of one another.

According to a third aspect, a non-transitory, computer readable medium storing instructions that, when executed by one or processors, causes a computing system to: A) receive detection data from one or more wheel detection sensors, the detection data indicating detection of a train; B) determine, based at least in part on the detection data, a first estimated speed of a first railcar of the train; C) determine a plurality of first trigger timings, each first trigger timing of the plurality of first trigger timings corresponding to a respective imaging device of a plurality of imaging devices, wherein each first trigger timing is based at least in part on, for each imaging device of the one or more imaging devices: 1) a distance offset for the imaging device; 2) a trigger latency for the imaging device; and 3) the first estimated speed; D) output first capture instructions for each of the plurality of imaging devices to capture images of the first passing railcar according to a first trigger timing specific to each of the plurality of imaging devices; E) determine, based at least in part on the detection data, a second estimated speed of a second railcar of the train; F) determine a plurality of second trigger timings, each second trigger timing of the plurality of second trigger timings corresponding to a respective imaging device of a plurality of imaging devices, wherein each second trigger timing is based at least in part on, for each imaging device of the one or more imaging devices: 1) the distance offset for the imaging device; 2) the trigger latency for the imaging device; and 3) the second estimated speed; and G) output second capture instructions for each of the plurality of imaging devices to capture images of the first passing railcar according to a first trigger timing specific to each of the plurality of imaging devices.

According to a further aspect, the non-transitory, computer readable medium of the third aspect or any other aspect, wherein the second estimated speed is different from the first estimated speed.

According to a further aspect, the non-transitory, computer readable medium of the third aspect or any other aspect, wherein the trigger latency comprises, for each imaging device of the one or more imaging devices: A) a timing delay between a transmission time at which capture instructions are outputted and a receipt time at which the imaging device receives the capture instructions; and B) a processing time required for the imaging device to capture a first image after receiving the capture instructions.

According to a further aspect, the non-transitory, computer readable medium of the third aspect or any other aspect, wherein each of the first capture instructions and the second capture instructions comprise instructions for each of the plurality of imaging devices to capture images according to a corresponding image capture rate, wherein the image capture rate is based at least in part on the first estimated speed or the second estimated speed, respectively.

According to a further aspect, the non-transitory, computer readable medium of the third aspect or any other aspect, wherein the first estimated speed or the second estimated speed, respectively, synchronize image capture timings among the plurality of imaging devices.

According to a further aspect, the non-transitory, computer readable medium of the third aspect or any other aspect, wherein the capture instructions cause all imaging devices of the plurality of imaging devices to capture images within a microsecond of one another.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 5B illustrates an example perspective view of an overhead inspection system, in accordance with the disclosed technology;

FIG. 6A illustrates a perspective view of a first lateral portion, in accordance with the disclosed technology;

FIG. 9B illustrates a second example perspective view of an undercarriage area-scan inspection system, in accordance with the disclosed technology;

DETAILED DESCRIPTION

Figure 1:
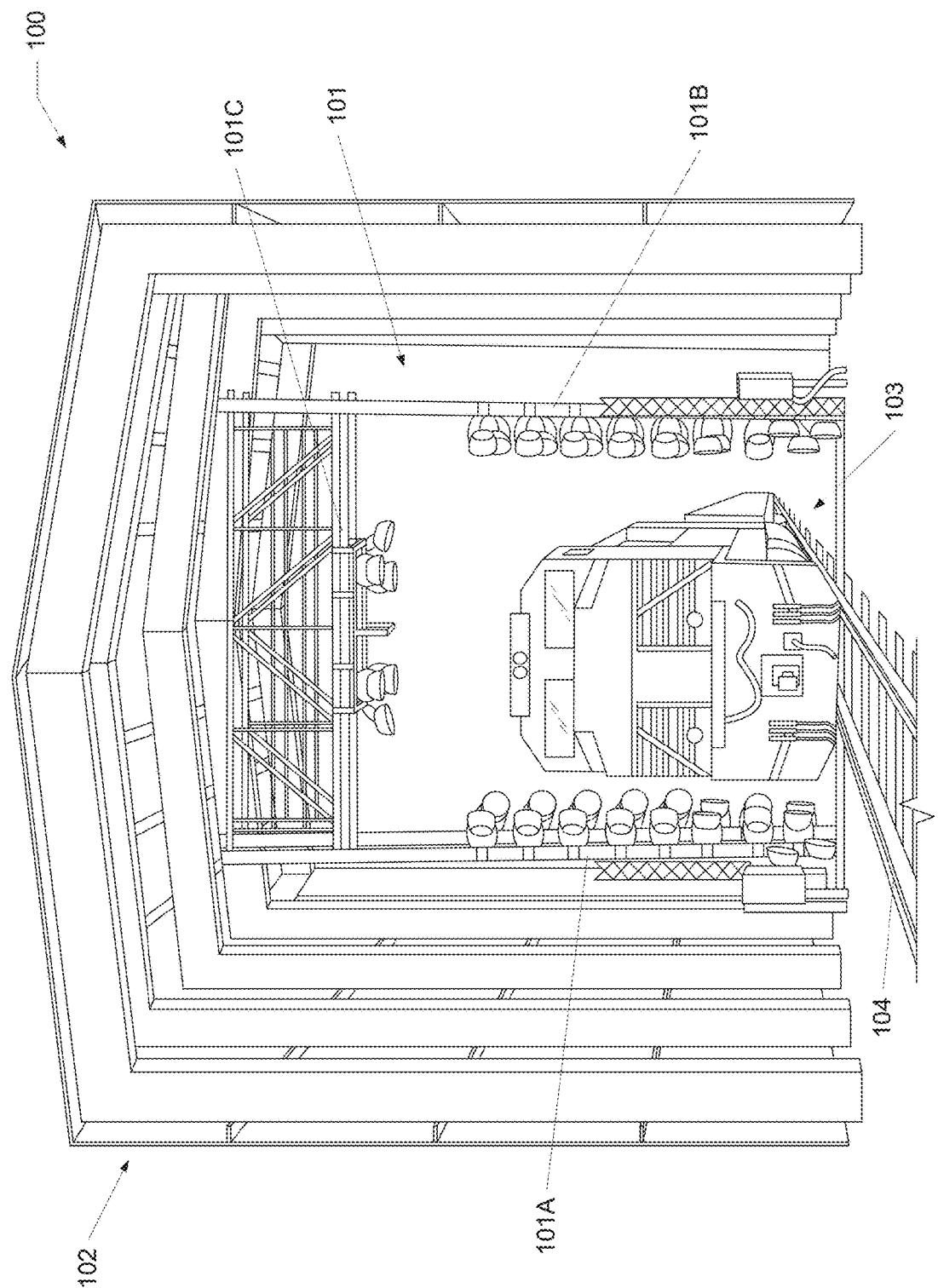
FIG. 1 illustrates a train inspection environment, in accordance with the disclosed technology.

The disclosed technology relates generally to apparatuses, systems, and methods for inspecting moving vehicles and, more specifically, to various components and systems for gathering data on individual sections of moving rail-bound vehicles. Some examples of the disclosed technology will be described more fully with reference to the accompanying drawings. However, this disclosed technology may be embodied in many different forms and should not be construed as limited to the implementations set forth herein. The components described hereinafter as making up various elements of the disclosed technology are intended to be illustrative and not restrictive. Indeed, it is to be understood that other examples are contemplated. Many suitable components that would perform the same or similar functions as components described herein are intended to be embraced within the scope of the disclosed electronic devices and methods. Such other components not described herein may include, but are not limited to, for example, components developed after development of the disclosed technology.

Throughout this disclosure, various aspects of the disclosed technology can be presented in a range of formats (e.g., a range of values). It should be understood that such descriptions are merely for convenience and brevity and should not be construed as an inflexible limitation on the scope of the disclosed technology. Accordingly, the description of a range should be considered to have specifically disclosed all the possible subranges as well as individual rational numerical values within that range. For example, a range described as being "from 1 to 6" or "from approximately 1 to approximately 6" includes the values 1, 6, and all values therebetween. Likewise, a range described as being "between 1 and 6" or "between approximately 1 and approximately 6" includes the values 1, 6, and all values therebetween. The same premise applies to any other language describing a range of values. That is to say, the ranges disclosed herein are inclusive of the respective endpoints, unless otherwise indicated.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

In the following description, numerous specific details are set forth. But it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicates that different instances of like objects are being referred to and are not intended to imply that the objects so described should be in a given sequence, either temporally, spatially, in ranking, or in any other manner.

Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

For the purpose of promoting an understanding of the principles of the present disclosure, reference will now be made to the illustrative examples provided in the drawings, and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

EXAMPLE EMBODIMENTS

Referring now to the figures, for the purposes of example and explanation of the fundamental processes and components of the disclosed apparatuses, systems, and methods, reference is made to FIG. 1, which illustrates a train inspection environment 100, according to one or more examples. As will be understood and appreciated, the train inspection environment 100 shown in FIG. 1 represents merely one approach or example of the present system, and other aspects are used according to various examples of the present system.

The train inspection environment 100 can function as a data acquisition system for monitoring the health of a passing railcar 103. The train inspection environment 100 can include a portal structure 101, a weather housing 102, base inspection systems 202A-202B (see FIG. 2 for further details), undercarriage inspection assemblies (see FIG. 3 for further details), and a rail-side inspection assembly 303 (see FIG. 3 for further details). The train inspection environment 100 can include any particular hardware component capable of gathering data associated with the passing railcar 103. Though discussed in the context of railcars 103, the train inspection environment 100 can be applied to any particular moving vehicle. For example, the train inspection environment 100 can be used to monitor cars, trucks, boats, aircraft, and/or any other particular moving vehicle. The train inspection environment 100 can be installed within an air hanger to monitor airplanes, a weigh station to monitor trucks, a highway to monitor cars, and/or a canal to monitor passing boats.

The train inspection environment 100 can monitor various particular components of the passing railcar 103. The train inspection environment 100 can monitor the trucks of the passing railcar 103, the brake system of the passing railcar 103, the coupler of the passing railcar 103, the cross-key component of the passing railcar 103, the wheel retainer valves of the passing railcar 103, the air hoses of the passing railcar 103, and/or any other particular component of the passing railcar 103. The train inspection environment 100 can include individual systems capable of gathering data on specific components of the passing railcar 103. For example, the rail-side inspection assembly 303 can be configured to gather data and/or capture images of the cross-key component of the passing railcar 103. In another example, the base inspection systems 202A-202B can be configured to gather data and/or capture images of the brake-wheel, the trucks, and/or any other component of the lower half of the passing railcar 103.

The portal structure 101 can function as a tunnel and/or frame placed around the train tracks 104. The portal structure 101 can be large enough such that the passing railcar 103 can pass through the portal structure 101. The portal structure 101 can include cameras, lights, and/or sensors (e.g., light sensors, microphones, heat sensors, motion sensors, etc.) attached directly to the portal structure 101 and/or on the ground near the portal structure 101. The cameras, lights, and/or sensors of the portal structure 101 can completely surround the passing railcar 103 as it passes through the portal structure 101. For example, as the passing railcar 103 progresses along a train track 104, the railcar 103 can pass under and/or through the portal structure 101. As the railcar 103 passes through the portal structure 101, the various cameras, sensors, and/or lights can trigger and gather data associated with the railcar 103. The portal structure 101, the base inspection systems 202A-202B, the undercarriage inspection assemblies 301, 302, and the rail-side inspection assembly 303 can each gather data on distinct portions of the railcar 103. For example, as the railcar 103 passes through the portal structure 101, a first lateral portion 101A and a second lateral portion 101B of the portal structure 101 can include cameras, sensors, and/or lights, to capture data from each lateral side of the railcar 103. Continuing this example, an overhead portion 101C of the portal structure 101 can include cameras, sensors, and/or lights to capture birds-eye data of the top portion of the passing railcar 103. The undercarriage inspection assemblies can gather data of the undercarriage of the passing railcar 103. The rail-side inspection assembly 303 can gather data on the cross-key components of the passing railcar 103.

The train inspection environment 100 can gather data as the passing railcar 103 travels at a high rate of velocity. In a non-limiting example, the passing railcar 103 can move at a velocity of 70 miles per hour, and as the passing railcar 103 travels through the portal structure 101 at 70 miles per hour, the various sensors, cameras, and/or lights of the portal structure 101 can capture data at high rates to accommodate for the speed of the passing railcar 103. For example, the sensors, cameras, and/or lights of the portal structure 101 can gather data in intervals of less than 2 milliseconds.

The weather housing 102 can completely cover the portal structure 101. The weather housing 102 can provide a relatively constant environment for the portal structure 101 to gather data on the passing railcar 103. For example, the weather housing 102 can reduce the amount of wind present in the portal structure 101. In another example, the weather housing 102 can protect the portal structure from debris, rain, strong winds, and other natural hazards. The weather housing 102 can also mitigate the effects of variations in the amount of ambient light and direction or concentration of external light sources, such as the sun, and any shadows or image artifacts that can be caused therefrom, from interfering with the data collection of the sensors and cameras 221. The weather housing 102 can include two walls that straddle the portal structure 101, two openings to allow the passing railcar 103 to move through the weather housing 102, and a roof to cover the portal structure.

Figure 2:
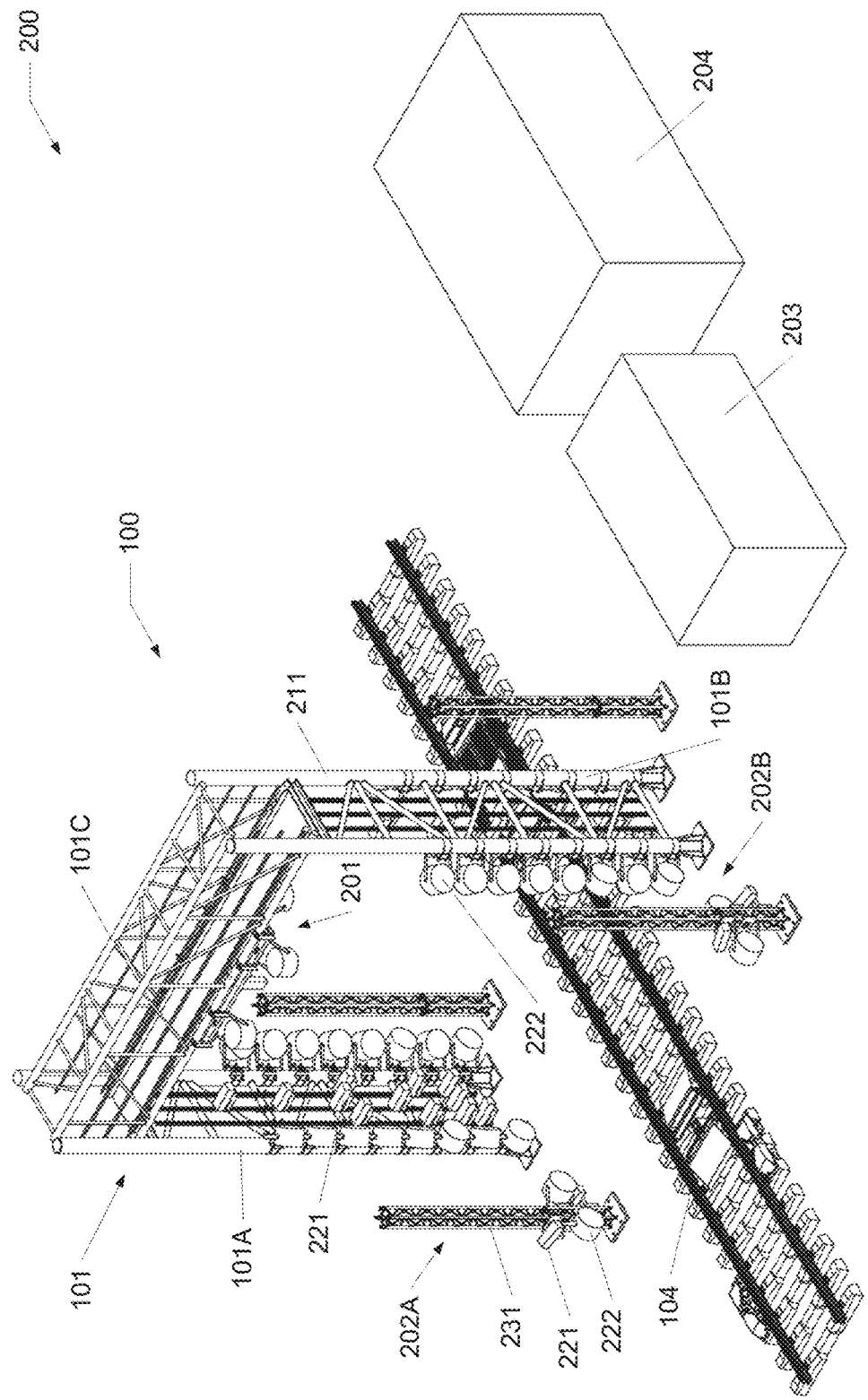
FIG. 2 illustrates an example perspective view of an inspection portal system, in accordance with the disclosed technology.

Referring now to FIG. 2, illustrated is an example perspective view of an inspection portal system 200, in accordance with the disclosed technology. The inspection portal system 200 can include a computing environment 203, the train inspection environment 100 (the weather housing 102 is not shown for purposes of illustrating the portal structure 101 unobstructed and in full view), and a service shed 204. The inspection portal system 200 can include the totality of components used to gather data associated with the passing railcar 103, monitor the data, and determine the health of the passing railcar 103. The inspection portal system 200 can include various sensors and computing systems for monitoring railcars 103, recording data associated with railcars 103, identifying issues associated with railcars 103, and generating reports based on the inspected data associated with the railcars 103.

Figure 3:
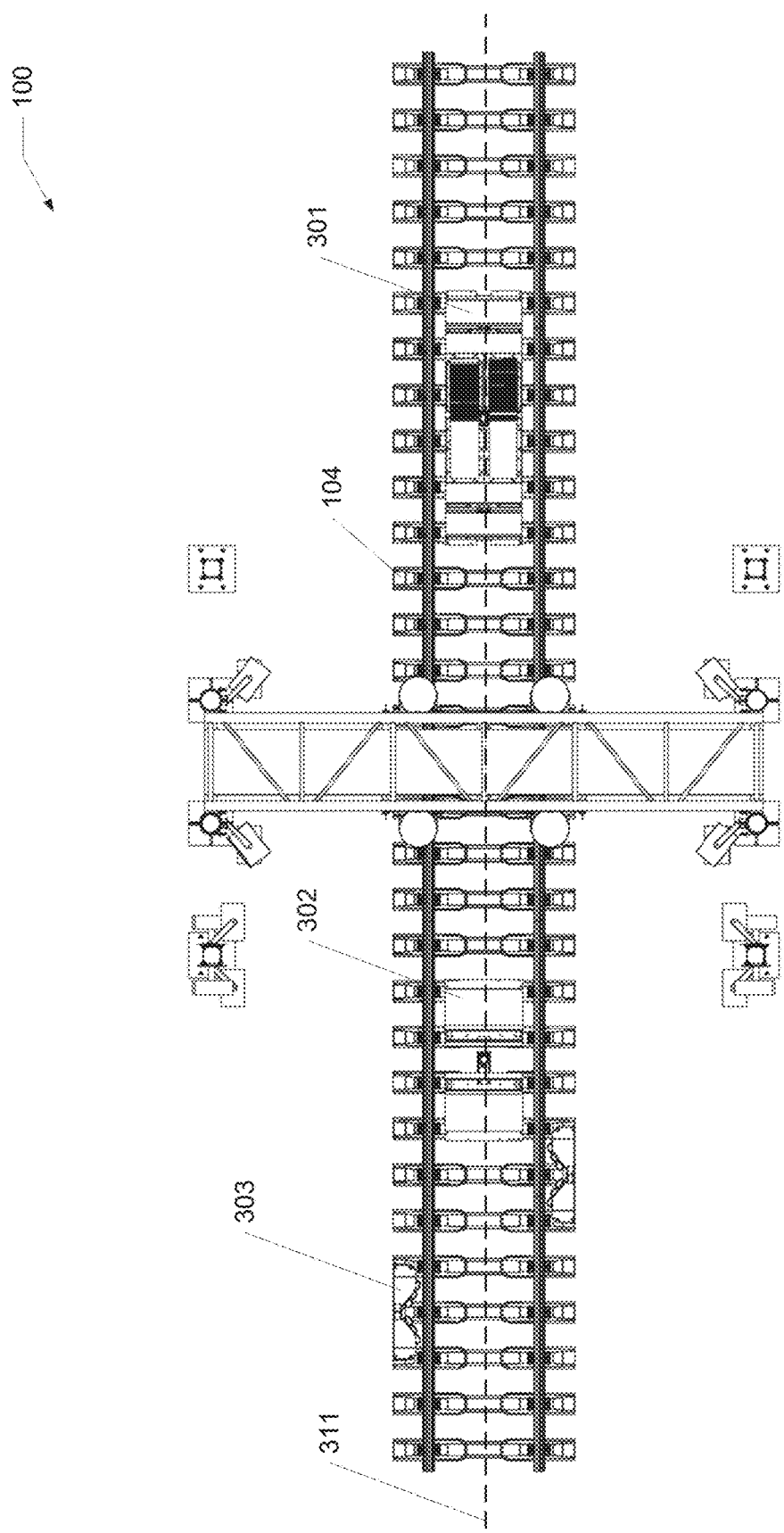
FIG. 3 illustrates an example top view of a train inspection environment, in accordance with the disclosed technology.

The train inspection environment 100 can include the portal structure 101, one or more base inspection systems 202A-202B, one or more undercarriage inspection assemblies 301, 302, and one or more rail-side inspection assemblies 303 (See FIG. 3 for further details).

The portal structure 101 can include the first lateral structure 101A, the second lateral structure 101B, and the overhead portion 101C. The first lateral structure 101A can be located on a first side of the train track 104. The second lateral structure 101B can be located on a second side of the train track 104. The first lateral structure 101A and the second lateral structure 101B can be substantially similar. The first lateral structure 101A and the second lateral structure 101B can include one or more cameras 221 and one or more lights 222. Each camera 221 can be or include any imaging device, which can include visual-spectrum cameras, infrared cameras (e.g., light detection and ranging (LIDAR) systems, each with one or more corresponding emitters or lasers and one or more receivers), and/or any other particular sensor configured to capture, gather, or otherwise obtain data about the passing railcar 103. The first lateral structure 101A and the second lateral structure 101B can be configured to gather data and/or capture images of the lateral sides of the passing railcar 103. For example, the first lateral structure 101A and the second lateral structure 101B can capture images of the couplers, trucks, wheel retainer valves, and/or any other component located on the passing railcar 103.

The lights 222 can include any particular lighting system used to illuminate the railcar 103 as it passes through the portal structure 101. In a non-limiting example, the lights 222 can include 14,000 lumen light emitting diode (LED) lights. The lights 222 can include stadium-grade lights, high-powered lights, and/or any particular light that can generate a sufficient amount of light (e.g., 10,000 lumens or more, 14,000 lumens or more). The cameras 221 and the lights 222 of the first lateral structure 101A and the second lateral structure 101B can face (e.g., be positioned in the general direction of) the train track 104. The cameras 221 of the first lateral structure 101A can be configured to gather data (e.g., capture images) on a first side of the railcar 103 and the cameras 221 of the second lateral structure 101A can be configured to gather data on a second side of the railcar 103. One, some, or all of the cameras 221 and/or lights 222 of the portal structure 101 can be directed to a specific three-dimensional space. Stated differently, one, some, or all cameras 221 of the portal structure 101 and/or one some, or all lights 222 of the portal structure 101 can be targeted at a corresponding specific point or area such that the corresponding camera 221 and/or light 222 are focused on one or more specific components, elements, and/or portions of a passing railcar 103.

The portal structure 101 can include or be in communication with one or more radio frequency identification (RFID) sensors, which can be configured to read railcar identification information from an RFID tag attached to each railcar 103, and the railcar identification information can be used to organize captured images to ensure the captured images are associated with the correct railcar.

The first lateral structure 101A and the second lateral structure 101B can be connected by an overhead portion 101C. The overhead portion 101C can include an overhead inspection system 201. The overhead inspection system 201 can include one or more cameras 221 and one or more lights 222 for gathering data on the top portion of the passing railcar 103. For example, the overhead inspection system 201 can gather images and other data from an overhead perspective, or bird's-eye view, of the railcar 103. The overhead inspection system 201 can include one or more line-scan cameras and/or one or more area-scan cameras. For example, the overhead inspection system 201 can include two cameras, where one camera is a line-scan camera and the other camera is an area-scan camera. The line-scan camera(s) and the area-scan camera(s) of the overhead inspection system 201 can be configured to gather images of the entire width of a passing railcar 103. Each camera and each light of the overhead inspection system 201 can be directed to a specific three-dimensional space. Stated differently, each camera and each light of the overhead inspection system 201 can be targeted at a specific point such that the corresponding camera and/or light are focused on one or more specific components, elements, and/or portions of a passing railcar 103.

Various elements of the portal structure 101 (e.g., the first lateral structure 101A, the second lateral structure 101B, the overhead portion 101C) can include a frame 211. The frame 211 can be or include a truss structure, which can support the various components installed on the first lateral structure 101A, the second lateral structure 101B, and the overhead portion 101C. A given frame 211 can include modular attachment points. The modular attachment points can facilitate the removal, upgrade, and/or replacement of the cameras 221 and/or the lights 222.

The train inspection environment 100 can include the base inspection systems 202A, 202B. The base inspection systems 202A, 202B can gather data (e.g., images) on a lower portion of the passing railcar 103. For example, the base inspection systems 202A, 202B can gather data on the brake-shoes of the passing railcar 103. The base inspection systems 202A, 202B can include one or more cameras 221 and one or more lights 222. Each camera 221 and each light 222 can be directed to a specific three-dimensional space. Stated differently, each camera 221 and/or each light 222 can be targeted at a specific point such that the corresponding camera 221 and/or light 222 are focused on one or more specific components, elements, and/or portions of a passing railcar 103. The base inspection systems 202A, 202B can be located adjacent to the portal structure 101. The base inspection systems 202A, 202B can include a first base inspection system 202A and a second base inspection system 202B. The first base inspection system 202A can be located on the first side of the train track 104, and the second base inspection system 202B can be located on the second side of the train track 104. The cameras 221 and the lights 222 of the base inspection systems 202A, 202B can face the train track 104. The cameras 221 of the first base inspection system 202A can gather data on the first side of the railcar 103. The cameras 221 of the second base inspection system 202B can gather data on the second side of the railcar 103. The base inspection systems 202A, 202B can each include a truss beam 231. The truss beam 231 can function as the attachment point for the cameras 221 and the lights 222. The truss beam 231 can be secured to the ground adjacent to the train track 104 and the portal structure 101.

Each of the components of the train inspection environment 100 can include a modular configuration such that the cameras 221, lights 222, and/or sensors can be moved, replaced, and/or upgraded. For example, the cameras 221 of the portal structure 101 can be moved based on the type of railcar 103 passing through the train inspection environment 100. Alternatively or in addition, the modular configuration can enable easy exchange and/or replacement of the cameras 221. For example, one or more cameras 221 can be upgraded to include upgraded cameras capable of gathering clearer, more accurate, and/or new types of data. The train inspection environment 100 can include motorized mechanisms connected to each particular camera 221 and/or light 222. The motorized mechanisms can change the positioning and/or location of the cameras 221 and/or lights 222 to accommodate any particular data acquisition requirements. The motorized mechanisms can also change various physical configurations of the lens attached to or contained within the cameras 221, such as changing the focus, aperture, or polarization direction, and/or filter of the lens. As a more particular and non-limiting example, the cameras 221 can be automatically moved or refocused based at least in part on the type of railcar 103 passing through the train inspection environment 100 (and/or the type/location of the component being targeted by the cameras 221).

The computing environment 203 can function as the central computing infrastructure of the inspection portal system 200. The computing environment 203 can include one or more computing devices configured to manage the various computational requirements of the computing environment 203. The computing environment 203 can manage the sensors, cameras, and/or lights of the train inspection environment 100 for data acquisition, storage, distribution, and processing, generate reports associated with the particular passing railcar 103, and/or perform any specific computational requirement of the inspection portal system 200. The computing environment 203, though illustrated as located near the train inspection environment 100, can be in any particular location (e.g., remote, local, etc.). In a particular non-limiting example, the computing environment 203 can include a server (e.g., remote or off-site), which can manage the computing requirements of the computing environment 203 (e.g., controlling the cameras 221, lights 222, and/or other components of the inspection portal system 200; receiving, organizing, and/or storing captured images and other data).

The inspection portal system 200 can include the service shed 204. The service shed 204 can store miscellaneous components of the inspection portal system 200. For example, the service shed 204 can include one or more compressed air sources configured to generate compressed air for use by the inspection portal system 200, such as by one or more air curtains, which can protect and/or clean cameras 221, lights 222, or other components of a given assembly or system (e.g., undercarriage inspection assemblies 301, 302; rail-side inspection assemblies 303). For example, each of the cameras of the inspection portal 101, the undercarriage inspection assemblies 301, 302, the base inspection systems 202A, 202B, and/or the rail-side inspection assemblies can include the air curtains that can blow air over the lenses of the cameras 221 and protect the lenses from debris.

The inspection portal system 200 can include a railcar detection system (not pictured). The railcar detection system (also referred to herein as wheel detection sensors) can include one or more sensors in electrical communication with the computing environment 203 and installed on the train track 104 to identify the presence of a passing railcar 103. The railcar detection system can include one or more pressure switches to identify the pressure applied by the wheels of a passing railcar 103, or other sensors such as inductance-based sensors, metal detection sensors, or proximity sensors, some of which may not require the physical contact or interaction of the railcar 103 or wheels thereof to detect a passing wheel.

The railcar detection system (e.g., the computing environment 203) can calculate the speed of the passing railcar 103, as well as the existence of each axle of the passing railcar 103 and the trajectory of each axle as it passes through the inspection portal system 200, based at least in part on data received from the sensor(s) of the railcar detection system. Based on the determined speed of the passing railcar 103, and the trajectory of railcar axles, the computing environment 203 can trigger the various cameras 221 of the inspection portal system 200 to capture images of the passing railcar 103 according to one or more determined timings (e.g., based on the determined speed of the train or trajectory of the axles), can turn on the various lights 222 according to one or more determined timings (e.g., based on the determined speed of the train or trajectory of the axles), and/or can operate any other devices according to one or more determined timings (e.g., based on the determined speed of the train or trajectory of the axles), such as air curtains, as one non-limiting example. Alternatively or in addition, the computing environment 203 can use the determined speed of the passing railcar 103, the different makes and models of the various cameras of the inspection portal system 200 (e.g., known processing latencies, such as the known image capturing speeds (or delays) of the various cameras of the inspection portal system 200), and/or any other pertinent information to properly synchronize the cameras to gather accurate images of the passing railcar 103. The computing environment 203 can determine a capture timing for triggering the cameras 221 based on a known distance between the railcar detection system sensors and the cameras 221 and the calculated speed of the passing railcar 103.

Referring now to FIG. 3, illustrated is an example top view of the train inspection environment 100, in accordance with the disclosed technology. The train inspection environment 100 can be symmetrical about a central axis 311. For example, the train inspection environment 100 can include an equal number of inspection systems or assemblies on either side of the central axis 311 such that the totality of the railcar 103 is analyzed during data capture procedures. Alternatively, one side of the train inspection environment 100 can include a first number of inspection systems or assemblies on a first side of the axis 311 and a second, different number of inspection systems or assemblies on the second side of the axis (e.g., to capture images of one or more given components or portions of a given railcar).

The train inspection environment 100 can include the undercarriage inspection assemblies and the rail-side inspection assembly 303. The undercarriage inspection assemblies 301, 302 can include one or more undercarriage area-scan inspection assemblies 301 and one or more undercarriage line-scan inspection assemblies 302. The undercarriage area-scan inspection system 301 and the undercarriage line-scan inspection system 302 can each gather data and/or images of the undercarriage of the passing railcar 103. For example, the undercarriage area-scan inspection system 301 can include one or more area-scan cameras for gathering data on a particular area of the undercarriage of the passing railcar 103. Alternative or in addition, the undercarriage line-scan inspection system 302 can include one or more line-scan cameras for gathering data on a particular area of the undercarriage of the passing railcar 103. Both the undercarriage area-scan inspection system 301 and the undercarriage line-scan inspection system 302 can be located between the rails of the train tracks 104 (e.g., centered between the train tracks 104). For example, the central axis 311 can symmetrically bisect both the undercarriage area-scan inspection system 301 and the undercarriage line-scan inspection system 302. One or more cameras 221 of the undercarriage inspection assemblies 301, 302 can be oriented in a completely vertical direction (e.g., the sensor of the camera 221 can be oriented to capture images from a space immediately above the sensor). Alternatively or in addition, one or more cameras 221 of the undercarriage inspection assemblies 301, 302 can be oriented in a direction that is partially in the vertical direction and partially in a horizontal direction, such that the camera(s) 221 can capture images from an uprail location or a downrail location. Alternatively or in addition, one or more cameras 221 of the undercarriage inspection assemblies 301, 302 can be oriented in a direction that is partially in the vertical direction and partially in a lateral direction, such that the camera(s) 221 can capture images from a direction that is toward a given side of the train tracks 104 from the location of the corresponding camera(s) 221.

The train inspection environment 100 can include the rail-side inspection assembly 303. The rail-side inspection assembly 303 can include two or more individual systems that can attach to one or more rail ties at a location outside of the rails of the train track 104. The individual systems of the rail-side inspection assembly 303 can face the central axis 311 of the train track 104. The rail-side inspection assembly 303 can gather data on various lower components of the railcar 103. For example, the rail-side inspection assembly 303 can gather data on the cross-keys of the railcar 103. The rail-side inspection assembly 303 can include an array of line-scan and/or area-scan cameras, which can gather data on the various lower components of the railcar 103. One or more cameras 221 of the rail-side inspection assembly 303 can be oriented in a direction that is partially in the vertical direction and partially in a horizontal direction, such that the camera(s) 221 can capture images of a lower portion of the railcar 103. For example, the rail-side inspection assembly 303 can be oriented in a direction that is partially in the vertical direction and partially in a horizontal direction, such that the camera(s) 221 can capture images of the cross-key component of the railcar 103.

Figure 4:
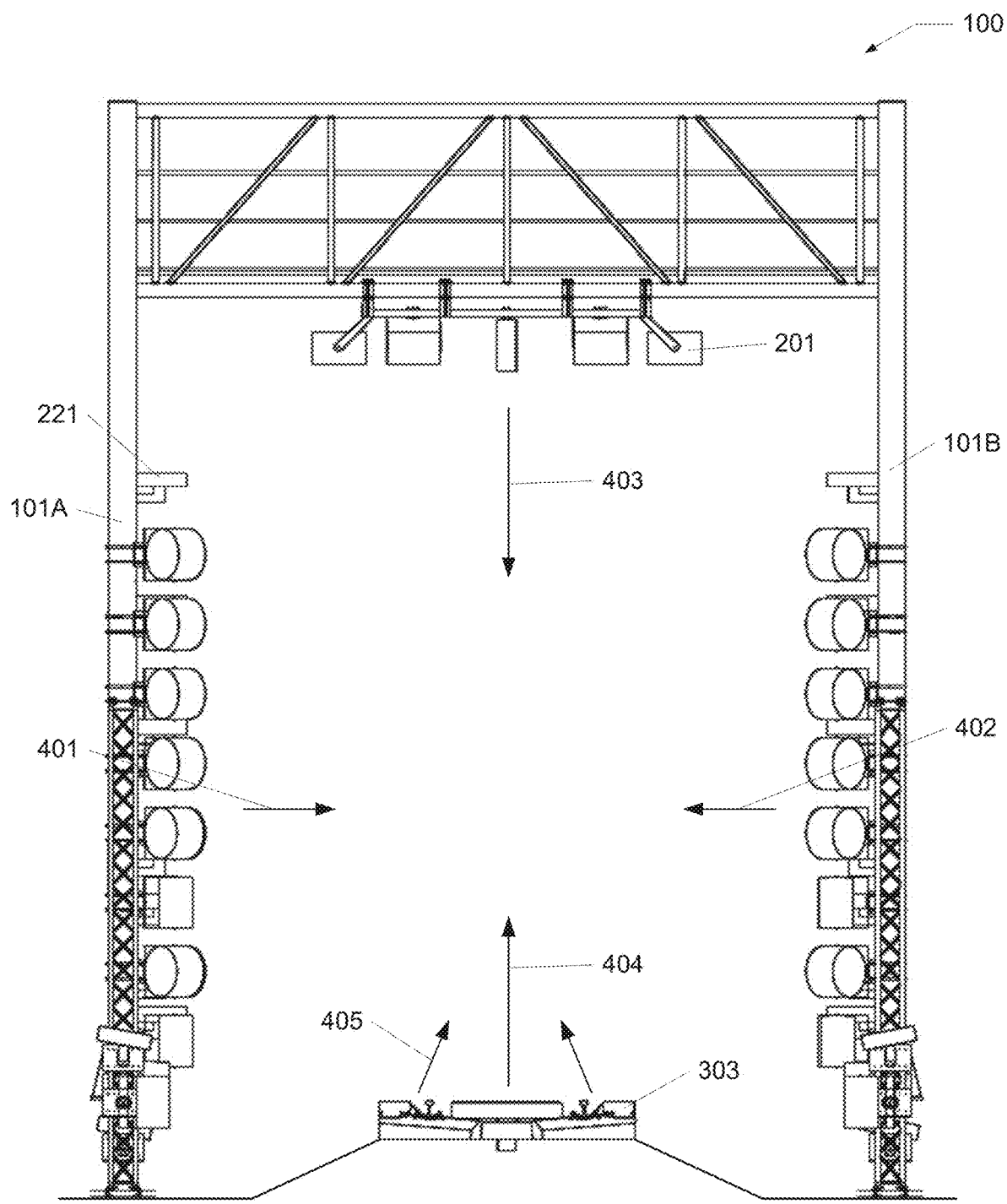
FIG. 4 illustrates an example front view of a train inspection environment, in accordance with the disclosed technology.

Referring now to FIG. 4, illustrated is an example side view of the train inspection environment 100, in accordance with the disclosed technology. The train inspection environment 100 can gather data in a variety of directions including a first direction 401, a second direction 402, a downward direction 403, an upward direction 404, and an angled direction 405, as non-limiting examples. The various directions can have a vertical direction component (e.g., up or down, as illustrated in FIG. 4, a downrail or uprail directional component (e.g., in or out of the page, as illustrated in FIG. 4), and/or a lateral directional component (e.g., left or right, as illustrated in FIG. 4). The cameras 221 of the first lateral portion 101A can gather data from the passing railcar 103 in the first direction 401. The cameras 221 of the second lateral portion 101B can gather data from the passing railcar 103 in the second direction 402. For example, one or more cameras 221 can be configured to capture images of the entire height of the railcar 103. Alternatively or in addition, a given camera 221 can be configured to capture images of only a specific region of the railcar 103, (e.g., a region in which one or more specific components are located). The cameras 221 of the overhead inspection system 201 can gather data on the passing railcar 103 in the downward direction 403. The undercarriage inspection assemblies can gather data from the passing railcar 103 in the upward direction 404. The rail-side inspection assembly 303 can gather data in the angled direction 405. By gathering data in the first direction 401, the second direction 402, the downward direction 403, the upward direction 404, and the angled direction 405, the train inspection environment 100 can gather data on the complete railcar 103 and identify any defects of the railcar 103.

Figure 5A:
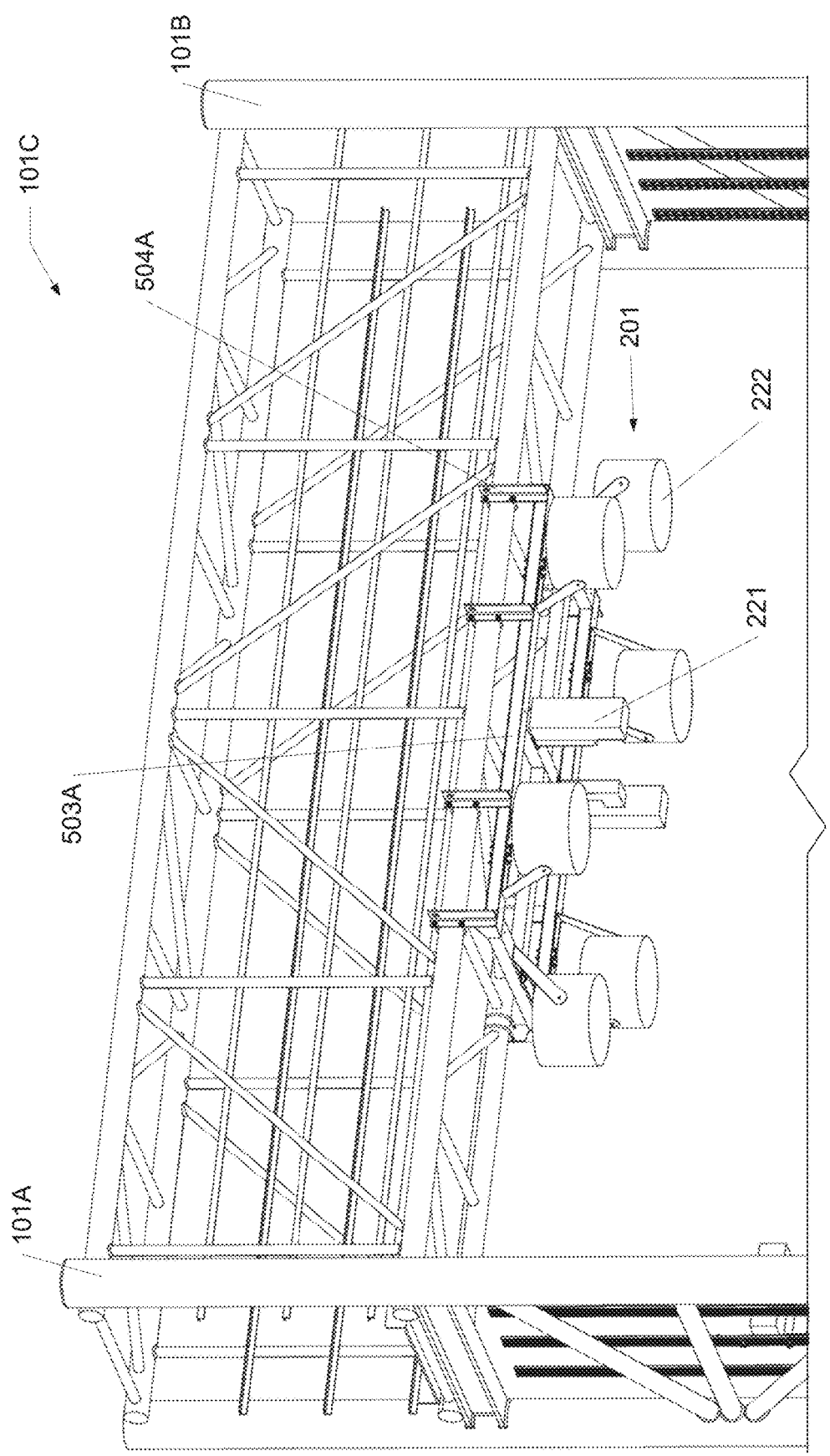
FIG. 5A illustrates an overhead portion, in accordance with the disclosed technology.

Referring now to FIG. 5A, illustrated is the overhead portion 101C, in accordance with the disclosed technology. The overhead portion 101C can connect both the first lateral portion 101A to the second lateral portion 101B. The overhead portion 101C can support the overhead inspection system 201. The overhead inspection system 201 can gather data in the downward direction 403. The overhead inspection system 201 can include the one or more cameras 221 and the one or more lights 222. The one or more cameras 221 can include one or more line-scan cameras and/or one or more area-scan cameras. For example, the overhead inspection system 201 can include two cameras, where a first camera is a line-scan camera, and a second camera is an area-scan camera. The cameras 221 and the lights 222 can connect to an overhead inspection system frame 503A. The overheard inspection system frame 503A can connect to the overhead portion 101C through one or more support connections 504A. For example, the support connections 504A can be fastened, bolted, and/or otherwise secured to the overhead portion 101C. The cameras 221 can be placed on the overhead inspection system frame 503A such that the cameras 221 are centered about the train track 104. The lights 222 can be arranged on the overhead inspection system frame 503A such that the cameras 221 are centered about a particular combination of lights 222. For example, the overheard inspection system 503A can include two cameras, both of which are centered about an oval configuration of six lights 222 (e.g., a set of three lights 222 to one side of the cameras 221 and a second set of three lights 222 to a second side of the camera 221, the second set of three lights 222 opposite the first set of three lights 222). Alternatively, one or both of the cameras can be off centered from the track.

Referring now to FIG. 5B, illustrated is an example perspective view of the overhead inspection system 201, in accordance with the disclosed technology. The overhead inspection system 201 can include the overhead inspection system frame 503A. The overhead inspection system frame 503A can function as the attachment point for the cameras 221 and the lights 222. For example, one or more bolts 501B can extend through the cameras 221 and/or lights 222 and into the overhead inspection system frame 503A to attach the camera 221 and/or the lights 222 to the overhead inspection system frame 503A.

Figure 5C:
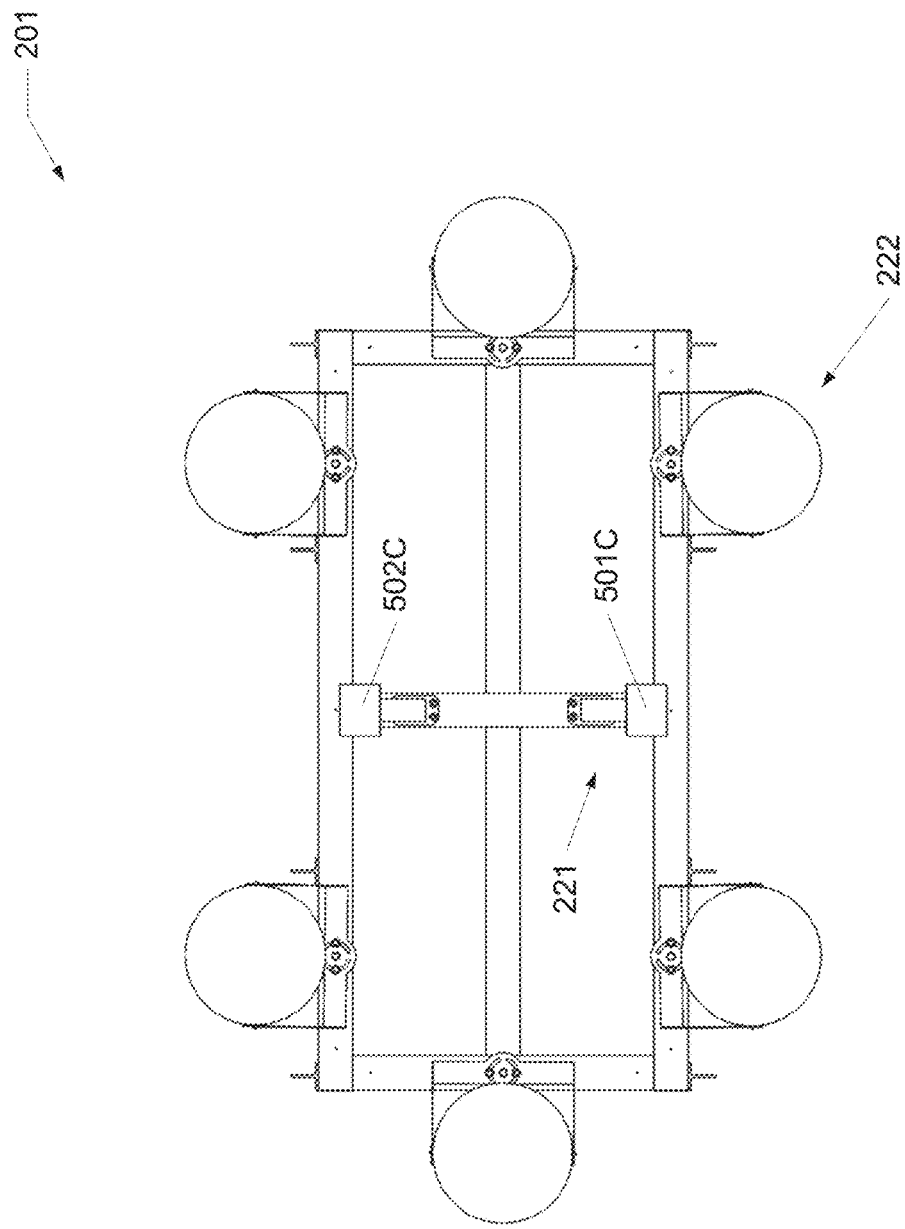
FIG. 5C illustrates an example bottom view of an overhead inspection system, in accordance with the disclosed technology.

Referring now to FIG. 5C, illustrated is a bottom view of the overhead inspection system 201, in accordance with the disclosed technology. The overhead inspection system 201 can include one or more cameras 221 and one or more lights 222. The overhead inspection system 201 can include a line-scan camera 501C and an area-scan camera 502C. The area-scan camera 502C can take area-scan images of particular regions of the top portion of the passing railcar 103.

For example, the area-scan camera 502C can take pictures of one or more coupler components on the passing railcar 103. The line-scan camera 501C can take line-scan images of particular regions of the top portion of the passing railcar 103. For example, the line-scan camera 501C can take images of the entire length of the passing railcar 103. The cameras 221 can include any particular machine vision camera for capturing high-resolution images at increased rates of speed. The lights 222 can illuminate the region of image capture such that the cameras 221 can take clear images with less than 2 mm of blur on the passing railcar 103 that is moving at up to 70 miles per hour (mph). The cameras 221 and the lights 222 can include motorized components such that the cameras 221 and the lights 222 can be adjusted automatically and/or remotely. For example, if the cameras 221 are intended to capture a particular region of the passing railcar 103, the computing environment 203 can control the motorized components of the cameras 221 and adjust their pointing direction, as well as the focus or aperture of the lens of the cameras 221.

Referring now to FIG. 6A, illustrated is a perspective view of the first lateral portion 101A, in accordance with the disclosed technology. The first lateral portion 101A and the second lateral portion 101B can be substantially similar. The first lateral portion 101A can include one or more cameras 221 and one or more lights 222. For example, the first lateral portion 101A can include twelve cameras 221 and sixteen lights 222. Similar to the cameras 221 and lights 222, the cameras 221 and the lights 222 can include motorized components such that the cameras 221 and the lights 222 can be adjusted automatically and/or remotely to point at particular regions of the railcar 103. The cameras 221 and lights 222 of the first lateral portion 101A can capture data from the first side of the railcar 103. The cameras 221 can include area-scan cameras and/or line-scan cameras. The lights 222 can be distributed in two arrays, where a first array 601A is at a first side of the first lateral portion 101A and the second array 602A is at a second side of the first lateral portion 101A. The first array 601A and the second array 602A can be divided by a gap, where one or more of the cameras 222 can be located. The first array 601A and the second array 602A can be in a generally vertical orientation.

The cameras 221 and/or any particular camera of the inspection portal system 200 can include a burst capture mode such that, for example, area-scan cameras can capture a specific piece of hardware or region of the railcar 103. For example, the cameras 221 of the first lateral portion 101A can capture a component, such as a particular nut, bolt, and/or pin located on the first side of the railcar 103. Continuing this example, there can be an optimal angle and/or vantage point from which to capture the particular component. Further continuing this example, it can be beneficial to capture an image right before that component, or the region in which it may be contained on the passing railcar 103, passes (capture #1), capture an image at the time that component, or the region in which it may be contained on the passing railcar 103, is approximately in the center of the frame of the camera 221 (capture #2), and capture an image soon after that that component, or the region in which it may be contained on the passing railcar 103, passes the center of the frame (capture #3), for a total of 3 "burst" captures. In capturing multiple images from slightly different vantage points, the computing environment 203 of the inspection portal system 200 can process those images (e.g., using a consensus, aggregation, or voting scheme) to generate better measurements and/or alerts and estimate a confidence value in those measurements or alerts. The timing and spacing of such burst captures can be a function of the speed of the passing railcar 103 or the trajectory of one or more axles of the passing railcar 103.

The cameras 221 and/or any particular camera of the inspection portal system 200 can include a continuous capture mode for the area-scan cameras. The continuous capture mode can be defined as a mode in which a particular camera 221 is continuously triggered (one image acquisition after another) for a particular duration (e.g., the duration of the passing of the railcar 103), with the rate of capture changing due to any speed changes of the train throughout its passing. The continuous capture mode can allow the camera 221 to capture at a rate that provides the desired "overlap" between images. Here, "overlap" can define how much of the same region of the railcar 103 is captured from one image to the next. For example, the first lateral portion 101A can include a particular camera 221 with a field of view of 60 inches of the railcar 103. Continuing this example, when a high degree of overlap occurs (e.g., 6 inches of train movement), the particular camera 221 can identify the high degree of overlap in a specific portion of the train from one frame to the next. Further continuing this example, the particular camera 221 of the inspection portal system 200 can capture approximately ten images of the specific portion of the train as the train passes.

The cameras 221 and/or any particular camera of the inspection portal system 200 can include a continuous capture mode for the line-scan cameras. Line-scan cameras can traditionally capture images continuously. For the line-scan cameras, the computing environment 203 of the inspection portal system 200 can dictate a rate of a trigger of each line of pixels and/or an exposure based on the speed of the railcar 103 at a time of capture. The line-scan cameras can perform burst image captures substantially similarly to the area-scan cameras.

Figure 6B:
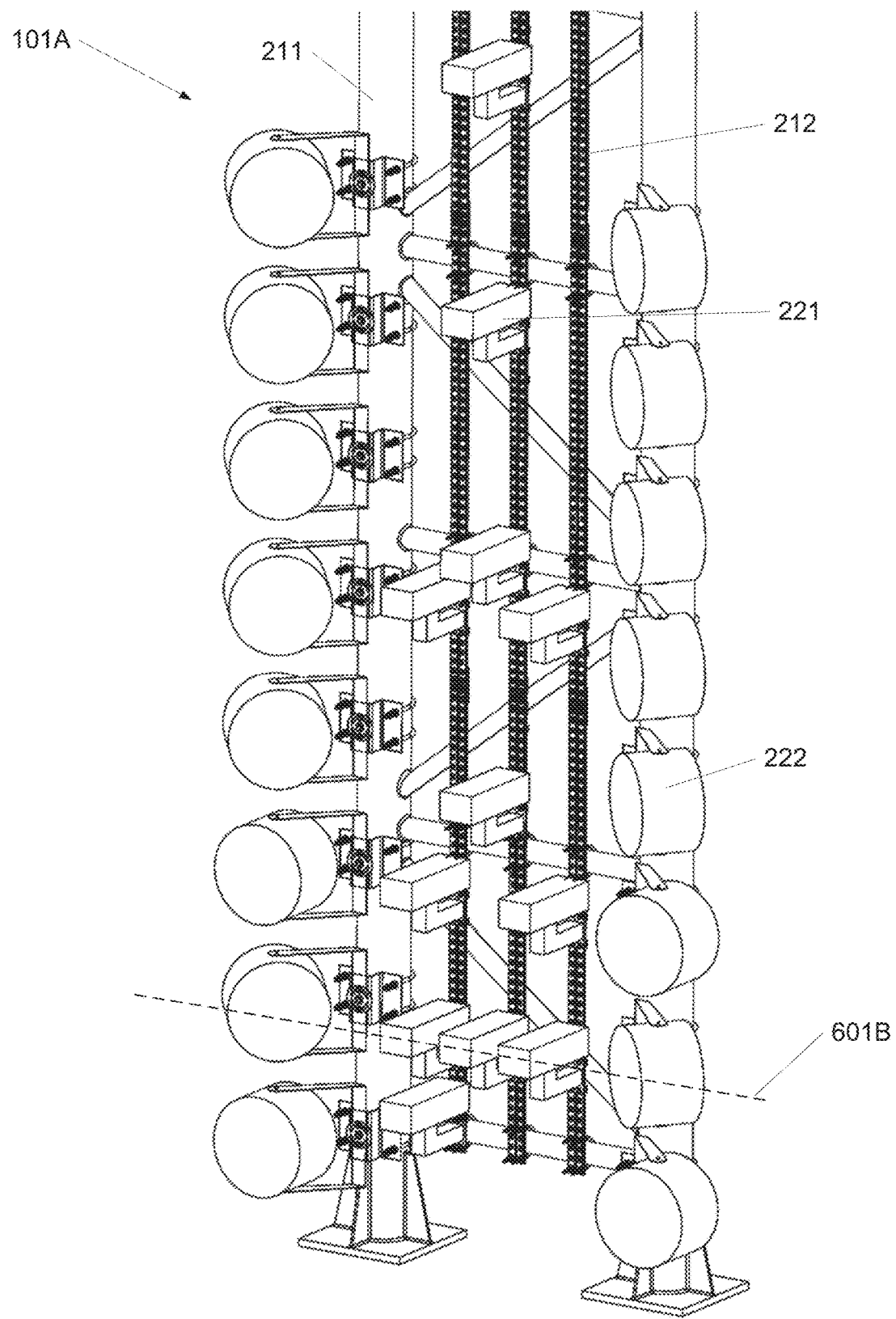
FIG. 6B illustrates a second perspective view of a first lateral portion, in accordance with the disclosed technology.

Referring now to FIG. 6B, illustrated is an example perspective view of the first lateral portion 101A, in accordance with the disclosed technology. The first lateral portion 101A can include the attachment points 212. The attachment points 212 can extend through the first lateral portion 101A and can function as a point of attachment for the cameras 221. The attachment points 212 can allow the first lateral portion 101A to function as a lateral system. For example, cameras 221, lights 222, and/or sensors can be removed, replaced, upgraded, and/or repaired by removing the particular component from the attachment points 212 and/or the frame 211 of the lateral portions 101A-B.

The cameras 221 can be arranged in any particular configuration. For example, two or more cameras 221 can be placed adjacently on a camera axis 601B parallel to the ground. In another example, the cameras 221 can be configured in a V configuration. The cameras 221 can be arranged in any particular configuration on the lateral portions 101A-B to perform specific image captures of particular regions, continuous captures, and/or burst captures depending on the needs of the inspection portal system 200. The cameras 221 and/or the lights 222 can include coolant systems such that their electrical components stay below a threshold temperature of operation. The cameras 221 and/or the lights 222 can be mounted with vibration absorbing materials or dampeners to mitigate mechanical vibration from passing trains which may otherwise affect the orientation of cameras 221, lighting 222, or other sensors and introduce artifacts to acquired images or data. The properties of those vibration absorbing materials can be selected such that they're well matched for the particular types of vibrations, and frequencies thereof, and have maximum damping effect.

Figure 7A:
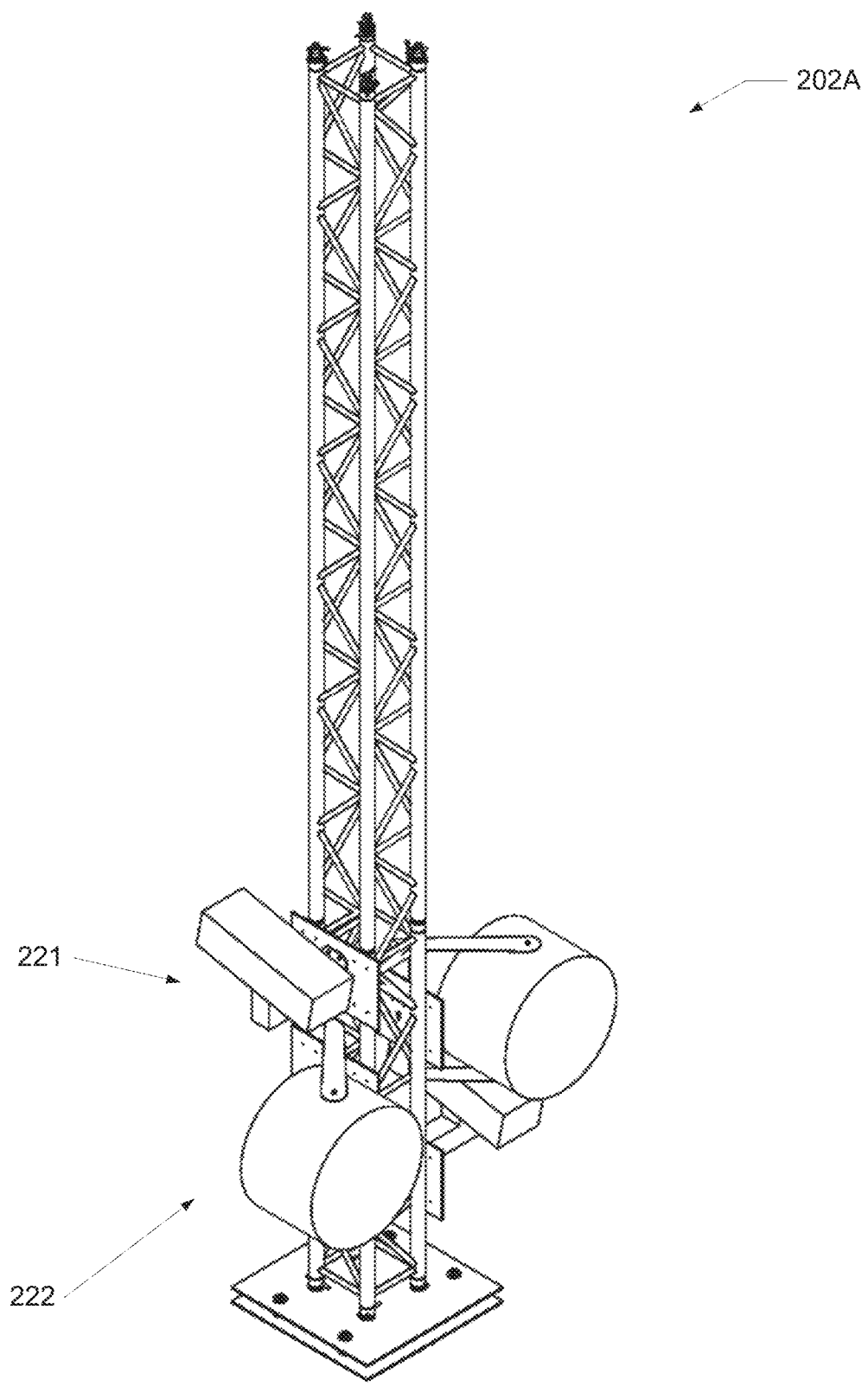
FIG. 7A illustrates an example perspective view of a first base inspection system, in accordance with the disclosed technology.

Referring now to FIG. 7A, illustrated is a perspective view of the first base inspection system 202A, in accordance with the disclosed technology. The first base inspection system 202A can be substantially similar to the second base inspection system 202B. The base inspection systems 202A, 202B can be independent structures from the portal structure 101 (not shown). For example, the base inspection systems 202A, 202B can be bolted to the ground on both sides of the train track 104. The base inspection systems 202A, 202B can include one or more cameras 221 and/or lights 222 to image one or more brake components of the passing railcar 103. The camera 221 can be configured to capture images of only a specific region of the railcar 103, (e.g., a region in which one or more specific components are located). The cameras 221 of the base inspection systems 202A, 202B can gather data on the brake shoe of the passing railcar 103.

Figure 7B:
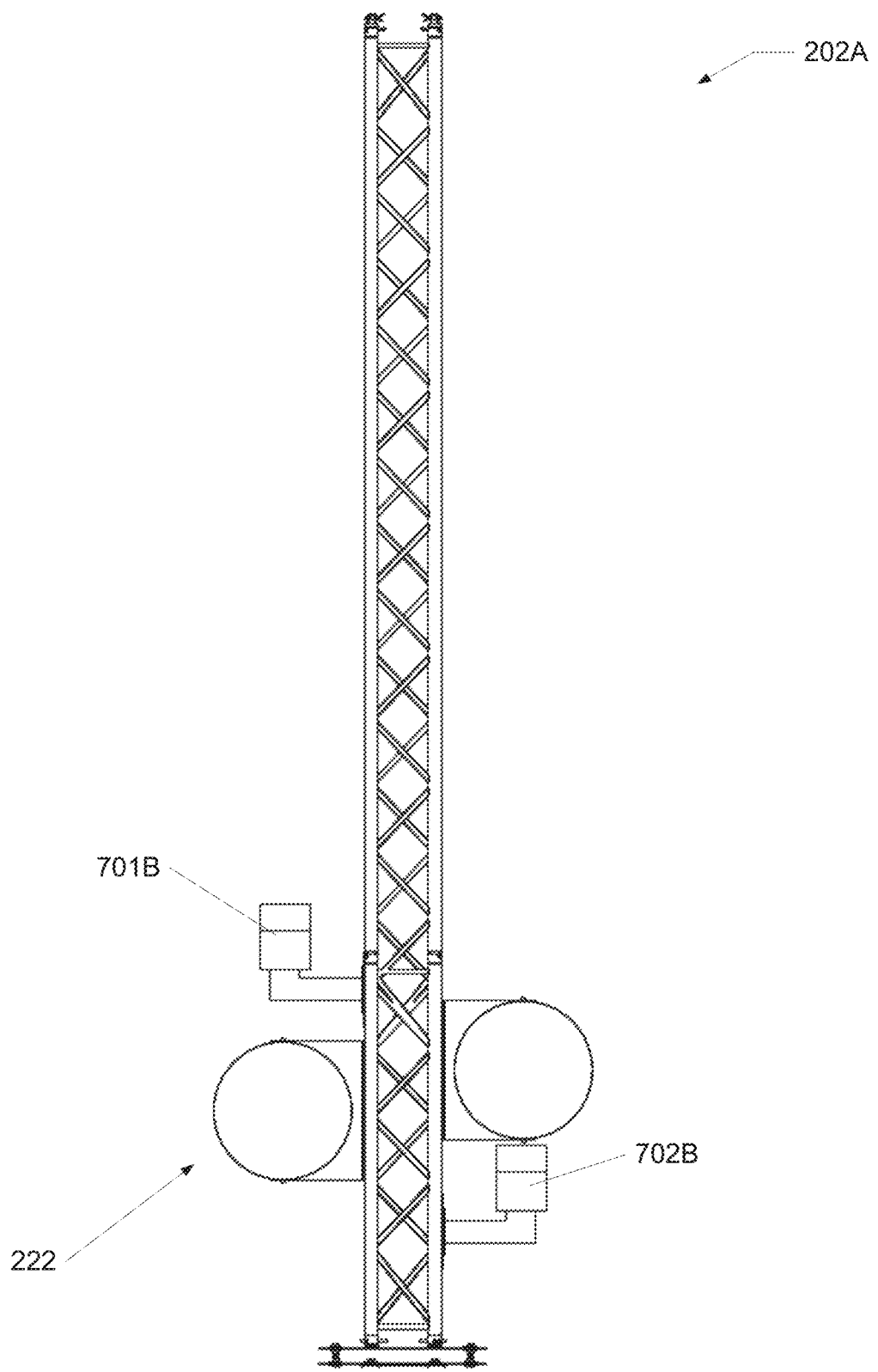
FIG. 7B illustrates an example front view of a first base inspection system, in accordance with the disclosed technology.

Referring now to FIG. 7B, illustrated is a front view of the first base inspection system 202A, in accordance with the disclosed technology. The first base inspection system 202A can include a first camera 701B and a second camera 702B. The first camera 701B can be positioned at a position higher than the second camera 702B. Though illustrated as attached to the first base inspection system 202A, the second camera 702B can optionally be secured to the ground and angled upwards towards the brake-shoes of the passing railcar 103. The first camera 701B can image the upper brake through a viewing porthole on the train car trucks of the railcar 103. The second camera 702B can point upward to image the bottom half of the brake shoe of the railcar 103. The lights 222 can illuminate the brake-shoe of the passing railcar 103 such that the first camera 701B and the second camera 702B can capture images with less than 2 mm of blur of a particular railcar 103 traveling at speeds of at least 70 mph, 70 mph, or less than 70 mph. The first camera 701B and the second camera 702B can include coolant systems such that their electrical components stay below a threshold temperature of operation. The first camera 701B and the second camera 702B can include line-scan cameras and/or area-scan cameras.

Figure 7C:
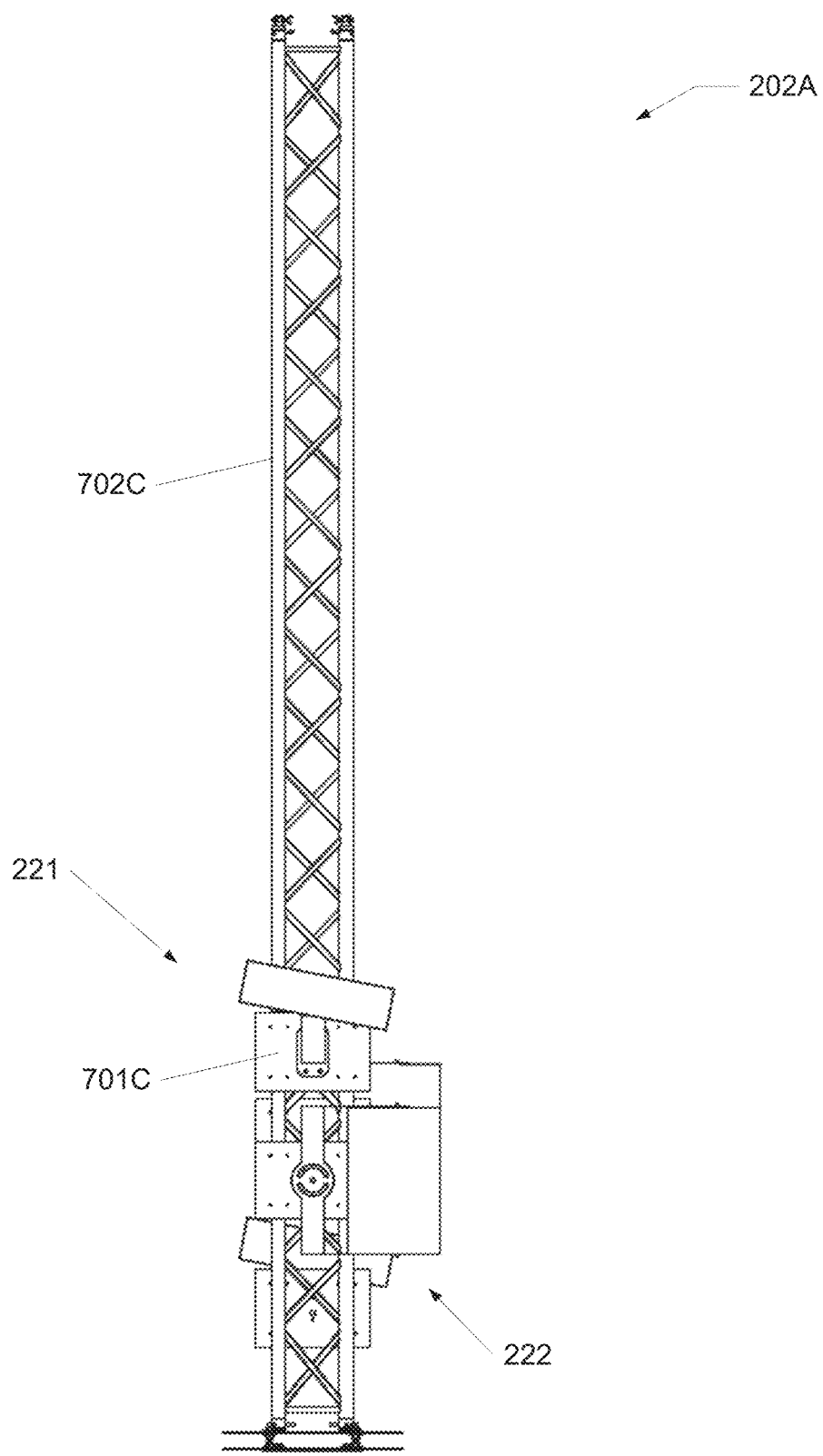
FIG. 7C illustrates an example side view of a first base inspection system, in accordance with the disclosed technology.

Referring now to FIG. 7C, illustrated is an example side view of the first base inspection system 202A, in accordance with the disclosed technology. The cameras 221 and the lights 222 of the first base inspection system 202A can attach to the first base inspection system 202A along a base truss structure 702C. For example, the cameras 221 and the lights 222 can include attachment plates 701C. The attachment plates can secure the cameras 221 and the lights 222 to the base truss structure 702C. The cameras 221 and the lights 222 can include motorized systems such that the computing environment 203 and/or any other particular resource can automatically and/or remotely reposition the cameras 221 and/or lights 222.

Figure 8:
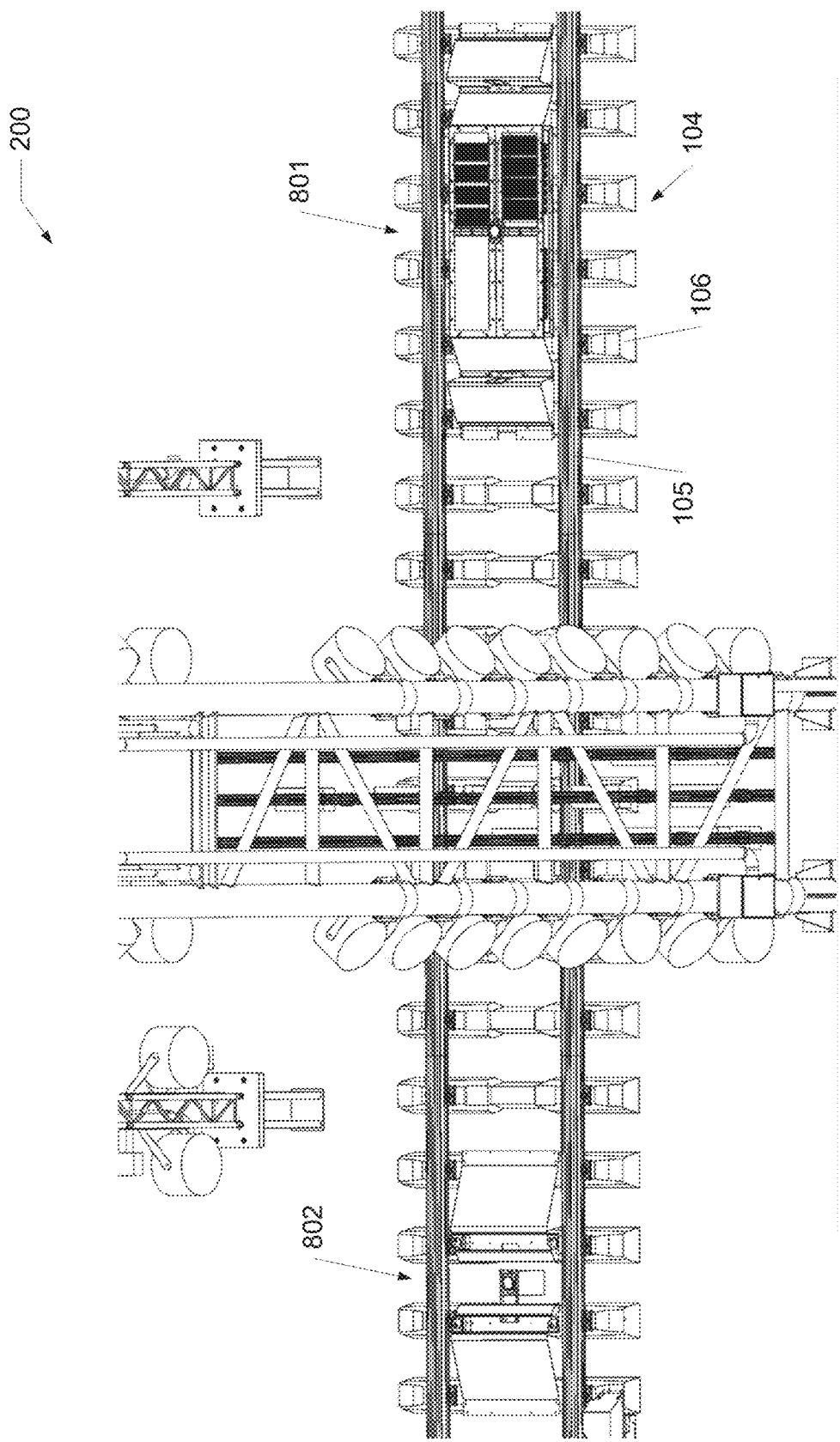
FIG. 8 illustrates an example perspective view of an inspection portal system, in accordance with the disclosed technology.

Referring now to FIG. 8, an example inspection portal system 200 is discussed. As will be understood and appreciated, the inspection portal system 200 shown in FIG. 8 represents merely one approach or example of the disclosed technology, and other aspects can be used according to various examples of the disclosed technology.

The inspection portal system 200 can include one or more systems used to capture data on a passing railcar. For example, the inspection portal system 200 can include one or more individual systems that can collect images of the various components of the passing railcar. The various components of the passing railcar can include but are not limited to both lateral sides of the passing railcar, the undercarriage of the passing railcar, the roof of the passing railcar, the brakes of the passing railcar, the cross-key components of the passing railcar, and/or any other component or area of the passing railcar. The inspection portal system 200 can include one or more cameras, sensors, and/or lights used to capture data on the passing railcar.

The inspection portal system 200 can include two or more assemblies or systems configured to capture data on the undercarriage of the passing railcar. The inspection portal system 200 can include an undercarriage area-scan inspection assembly 801 and/or an undercarriage line-scan inspection assembly 802. The undercarriage area-scan inspection assembly 801 and the undercarriage line-scan inspection assembly 802 can each be located within two rails 105 of a train track 104. The undercarriage area-scan inspection assembly 801 and the undercarriage line-scan inspection assembly 802 can each be fixed to one or more rail ties 106. For example, the undercarriage area-scan inspection assembly 801 and the undercarriage line-scan inspection assembly 802 can each be secured to an existing train track 104. Continuing this example, the undercarriage area-scan inspection assembly 801 and the undercarriage line-scan inspection assembly 802 can each have adjustable securing mechanisms (e.g., lag bolts, screws, ties, bolts, etc.) that can fix to the rail ties 106 of distinct train tracks 104, where the train tracks 104 can include unique configurations, unique geometry, distinct spacing between rail ties 106 (e.g., in a range between approximately 12 inches and approximately 16 inches), and/or distinct curves in the train track 104.

The undercarriage area-scan inspection assembly 801 can include one or more cameras, lights, and/or sensors used to capture area-scan images of the undercarriage of the passing railcar. The undercarriage area-scan inspection assembly 801 can include a first angled camera 901901, a vertical camera 902902, and a second angled camera 903903 (see, e.g., FIG. 9A and related discussion for further details). The first angled camera 901901, the vertical camera 902902, and the second angled camera 903903 can include any particular high speed, high resolution, and/or high-sensitivity camera sensor able to capture high resolution area-scan images of the passing railcar. An area-scan image can be defined as an image that captures light from a complete area of a particular region of interest.

The first angled camera 901901, the vertical camera 902902, and the second angled camera 903903 can capture area-scan images of the undercarriage of the passing railcar. For example, the first angled camera 901901, the vertical camera 902, and the second angled camera 903 can be configured to capture area-scan images of a three-dimensional region of the undercarriage of the passing railcar. The first angled camera 901, the vertical camera 902, and the second angled camera 903 can capture area-scan images of specific regions of the undercarriage and/or specific components of the undercarriage. For example, the undercarriage area-scan inspection assembly 801 can capture area-scan images of the undercarriage of the passing railcar with a blur of less than 2 mm and of passing railcars moving at speeds up to 70 miles per hour (or faster). Though discussed as having three cameras, the undercarriage area-scan inspection assembly 801 can include more than three cameras or less than three cameras. For example, the undercarriage area-scan inspection assembly 801 can include various angled cameras and various vertical cameras, each placed at a different location of the undercarriage area-scan inspection assembly 801. Continuing this example, the various angled cameras can each be angled at different degrees to focus on different components of the undercarriage of the passing railcar.

The undercarriage line-scan inspection assembly 802 can include one or more cameras, lights, and/or sensors used to capture line-scan images of the undercarriage of the passing railcar. The undercarriage line-scan inspection assembly 802 can include a line-scan camera 1001 (see, e.g., FIG. 10A and related discussion for further details). The line-scan camera 1001 can include any particular high speed, high resolution, and/or high-sensitivity camera sensor able to capture high resolution line-scan images of the passing railcar. The line-scan camera 1001 can capture line-scan images of the undercarriage of the passing railcar. A line-scan image can be defined as an image generated by a particular line-scan camera that captures a line of pixels and reconstructs the image by concatenating the various lines of pixels gathered of the passing railcar. For example, the line-scan camera 1001 can be configured to capture line-scan images of a three-dimensional region of the undercarriage of the passing railcar. The line-scan camera 1001 can capture line-scan images of specific regions of the undercarriage and/or specific components of the undercarriage. For example, the undercarriage line-scan inspection assembly 802 can capture line-scan images of the undercarriage of the passing railcar with a blur of less than 2 mm and of passing railcars moving at speeds up to 70 miles per hour (or faster).

Figure 9A:
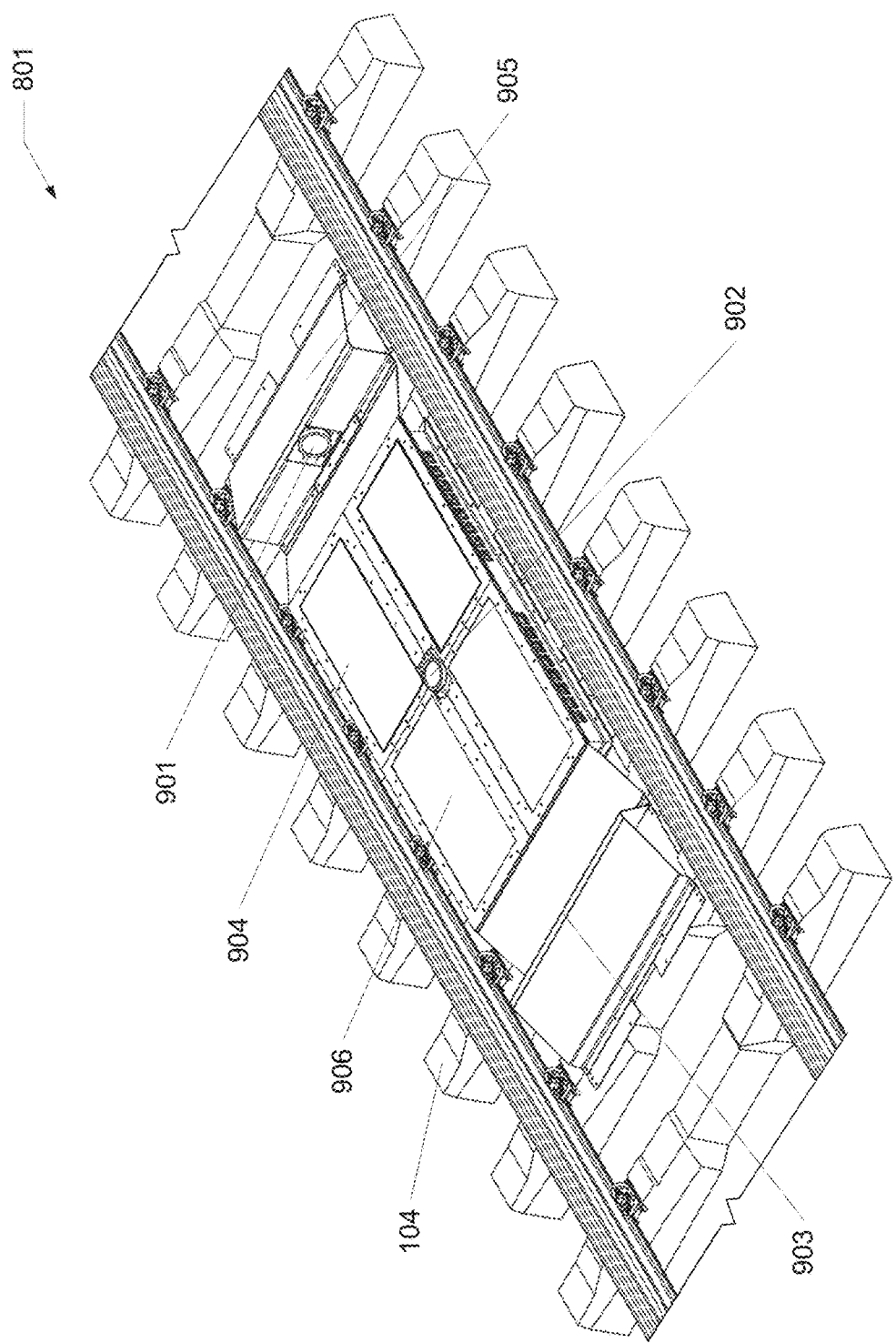
FIG. 9A illustrates an example perspective view of an installed undercarriage area-scan inspection system, in accordance with the disclosed technology.

Referring now to FIG. 9A, illustrated is a perspective view of the undercarriage area-scan inspection assembly 801 shown in use in a railroad track 104, in accordance with the disclosed technology. The undercarriage area-scan inspection assembly 801 can include the first angled camera 901, the vertical camera 902, and the second angled camera 903. The first angled camera 901, the vertical camera 902, and the second angled camera 903 can be directed to a specific three-dimensional space. Stated differently, the first angled camera 901, the vertical camera 902, and the second angled camera 903 can be targeted at a specific point such that the first angled camera 901, the vertical camera 902, and the second angled camera 903 are focused on one or more specific components, elements, and/or portions of a passing railcar.

The first angled camera 901 and/or the second angled camera 903 can be spaced apart from the vertical camera 902 a predetermined distance. For example, the first angled camera 901 and/or the second angled camera 903 can be spaced apart from the vertical camera 902 approximately 1 tie spacing, 1.5 tie spacings, 2 tie spacings, 2.5 tie spacings, 3 time spacings or any other distance (e.g., assuming the railway has 3000 ties per mile, the tie spacing can be approximately 21" middle-to-middle of adjacent ties, as a non-limiting example).

The first angled camera 901 and/or the second angled camera 903 can be configured to obtain images from first and second viewpoints, respectively. For example, first angled camera 901 and/or the second angled camera 903 can have an angle with respect to horizontal that is approximately 20 degrees, approximately 25 degrees, approximately 30 degrees, approximately 35 degrees, approximately 40 degrees, approximately 45 degrees, approximately 50 degrees, in a range between approximately 20 degrees and approximately 40 degrees, or in a range between approximately 40 degrees and approximately 60 degrees, as non-limiting examples.

Further, while the first angled camera 901 and the second angled camera 903 are shown as being angled upwardly, the disclosed technology is not so limited. For example, the first angled camera 901 and/or the second angled camera 903 can be positioned horizontally (e.g., parallel to ground) or substantially horizontally and can be directed at a mirror or other reflective surface (not pictured) to nonetheless obtain images from the first and second viewpoints, respectively.

Each of the cameras of the undercarriage area-scan inspection assembly 801 can include a housing 913 and an air curtain apparatus 911 (see, e.g., FIG. 9B and related discussion for further details). The housings 913 of the cameras of the undercarriage area-scan inspection assembly 801 can protect the cameras during use as a passing railcar passes over the undercarriage area-scan inspection assembly 801. The air curtain apparatus 911 can generate air curtains over one or more lenses 912 (see, e.g., FIG. 9B and related discussion for further details) of each of the cameras such that debris does not obstruct or damage the lenses 912 of the cameras of the undercarriage area-scan inspection assembly 801. The first angled camera 901 and the second angled camera 903 can each include a protective cover 905 to protect the cameras during use. The undercarriage area-scan inspection assembly 801 cameras can generate area-scan images of the undercarriage of the passing railcar. The undercarriage area-scan inspection assembly 801 can include one or more lighting arrays 904. The lighting arrays 904 can be covered by lighting covers 27906 to protect the lighting arrays 904 from debris during use. The lighting arrays 904 can illuminate the particular area of interest for data acquisition. The undercarriage area-scan inspection assembly 801 can be centered on the train track 104. Though illustrated as an array of LEDs, the lighting arrays 904 can have any particular configuration (e.g., a non array configuration).

Referring now to FIG. 9B, illustrated is an example perspective view of the undercarriage area-scan inspection assembly 801, in accordance with the disclosed technology. The undercarriage area-scan inspection assembly 801 can include the first angled camera 901, the vertical camera 902, the second angled camera 903, and the lighting arrays 904. The first angled camera 901, the vertical camera 902, the second angled camera 903, and the lighting array 904 can work in combination to capture area-scan images of the undercarriage of the passing railcar. For example, the lighting array 904 can trigger and illuminate the undercarriage of the passing railcar as the passing railcar travels above the undercarriage area-scan inspection assembly 801. On illuminating the undercarriage of the passing railcar as the passing railcar travels above the undercarriage area-scan inspection assembly 801, the first angled camera 901, the vertical camera 902, and the second angled camera 903 can each capture respective area-scan images of the undercarriage of the passing railcar. The illumination generated by the lighting array 904 can help reduce the blur generated when capturing area-scan images of the moving railcar.

As discussed in further detail herein, the first angled camera 901, the vertical camera 902, and the second angled camera 903 can each include the air curtain apparatus 911. The air curtain apparatus 911 can connect to a compressed air system (not pictured). The compressed air system can feed compressed air to the air curtain apparatus 911 to generate an air curtain. The air curtain can blow over the lenses 912 of the first angled camera 901, the vertical camera 902, and the second angled camera 903. The air curtain can blow any debris off the lenses 912 of the first angled camera 901, the vertical camera 902, and the second angled camera 903. The air curtain apparatus 911 can generate air within the housings 913 of the first angled camera 901, the vertical camera 902, and the second angled camera 903. By generating air within the housings 913 of the first angled camera 901, the vertical camera 902, the second angled camera 903, the air curtain apparatus 911 can help cool the internal components of the first angled camera 901, the vertical camera 902, the second angled camera 903.

Figure 9C:
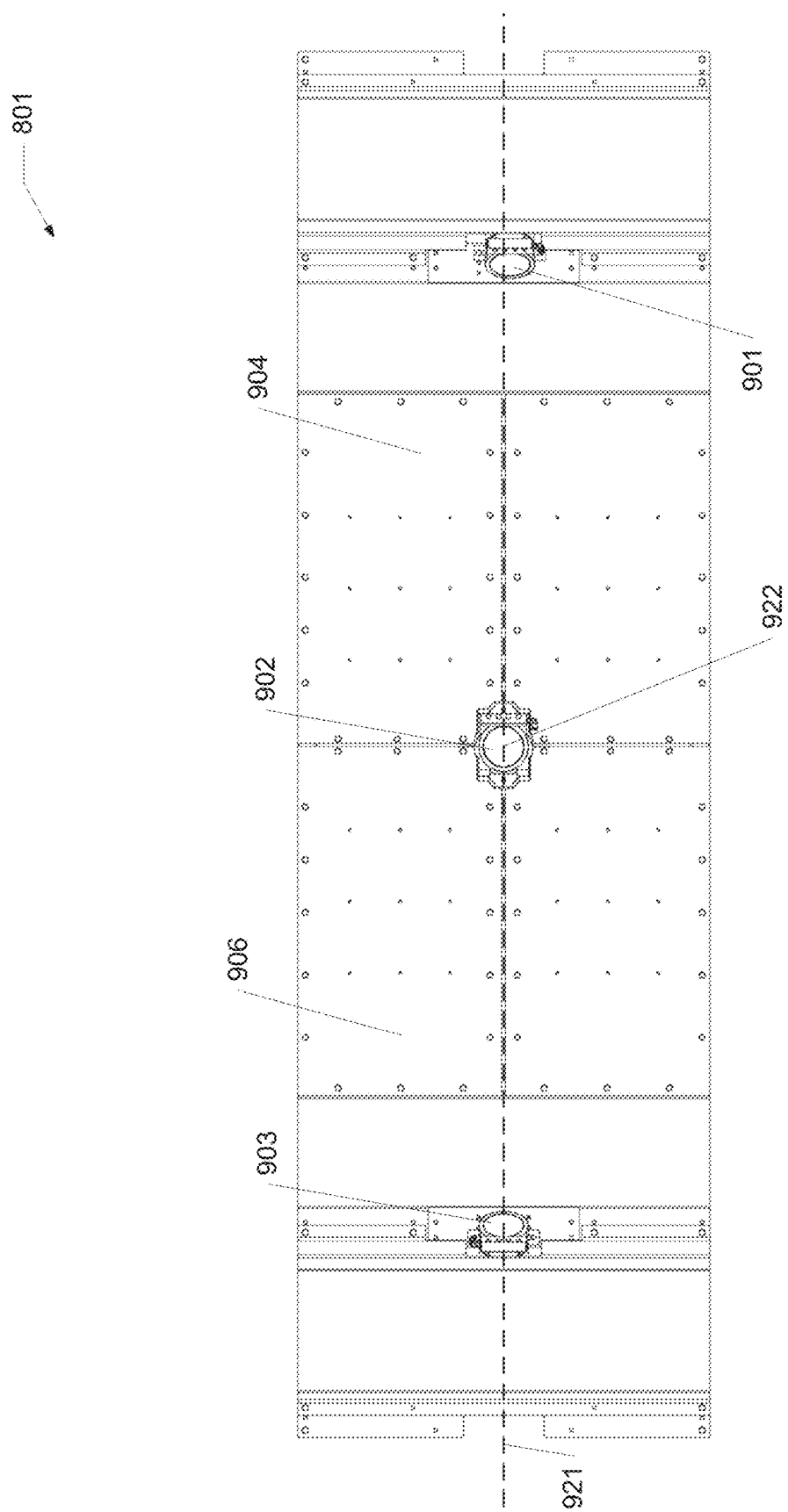
FIG. 9C illustrates a top view of an undercarriage area-scan inspection system, in accordance with the disclosed technology.
Figure 9D:
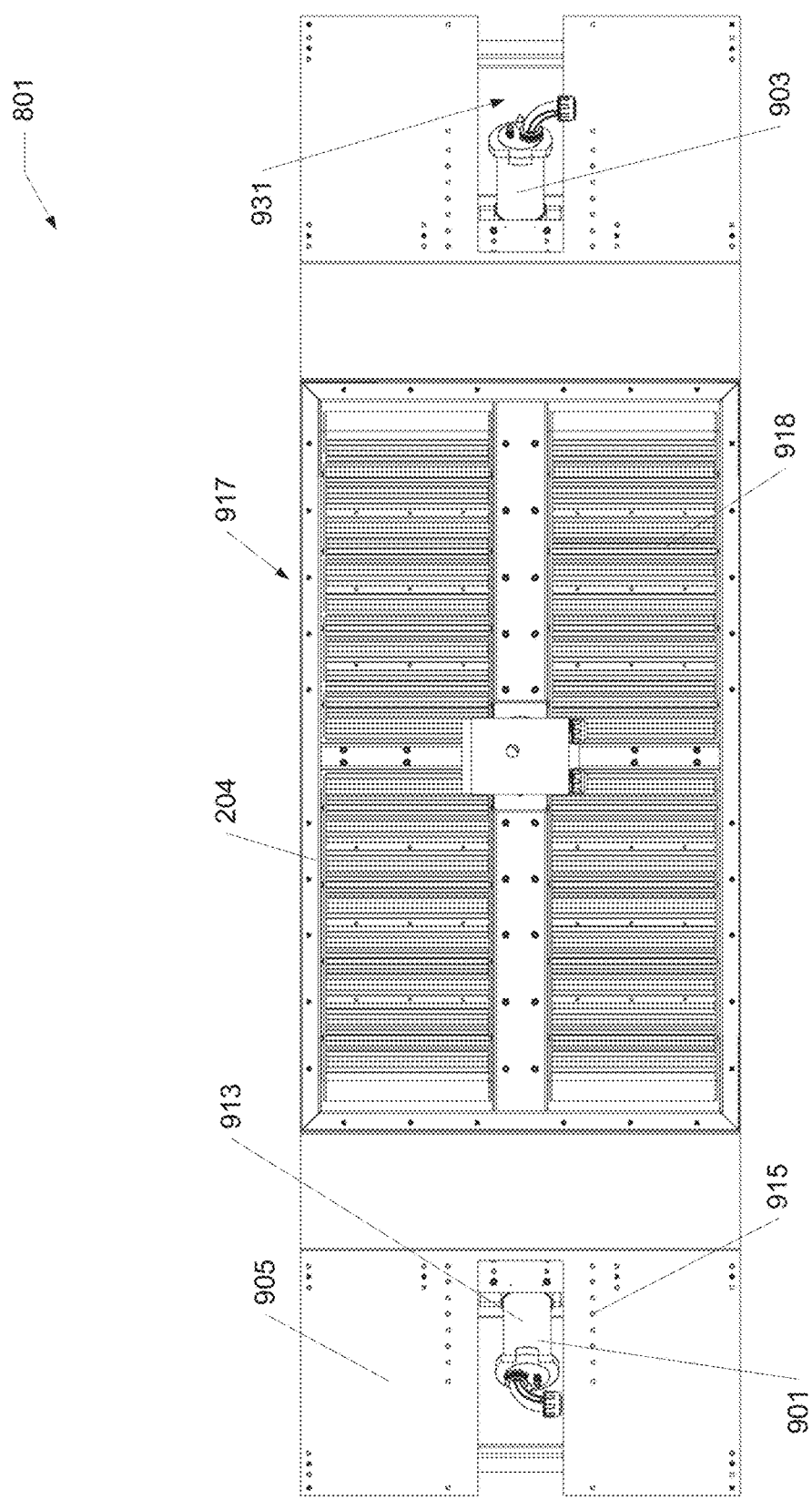
FIG. 9D illustrates a bottom view of an undercarriage area-scan inspection system, in accordance with the disclosed technology.
Figure 9E:
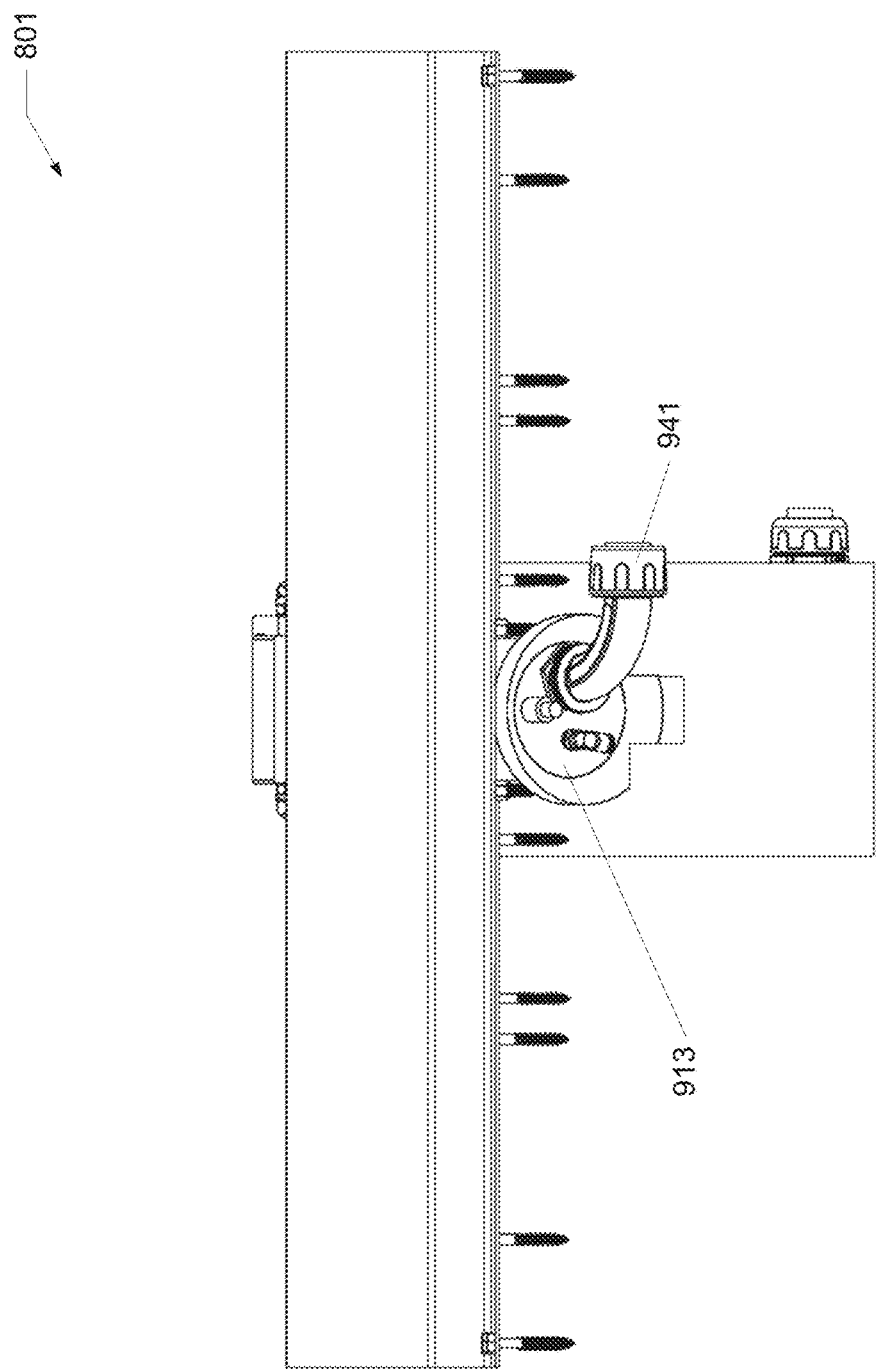
FIG. 9E illustrates a first side view of an undercarriage area-scan inspection system, in accordance with the disclosed technology.
Figure 9F:
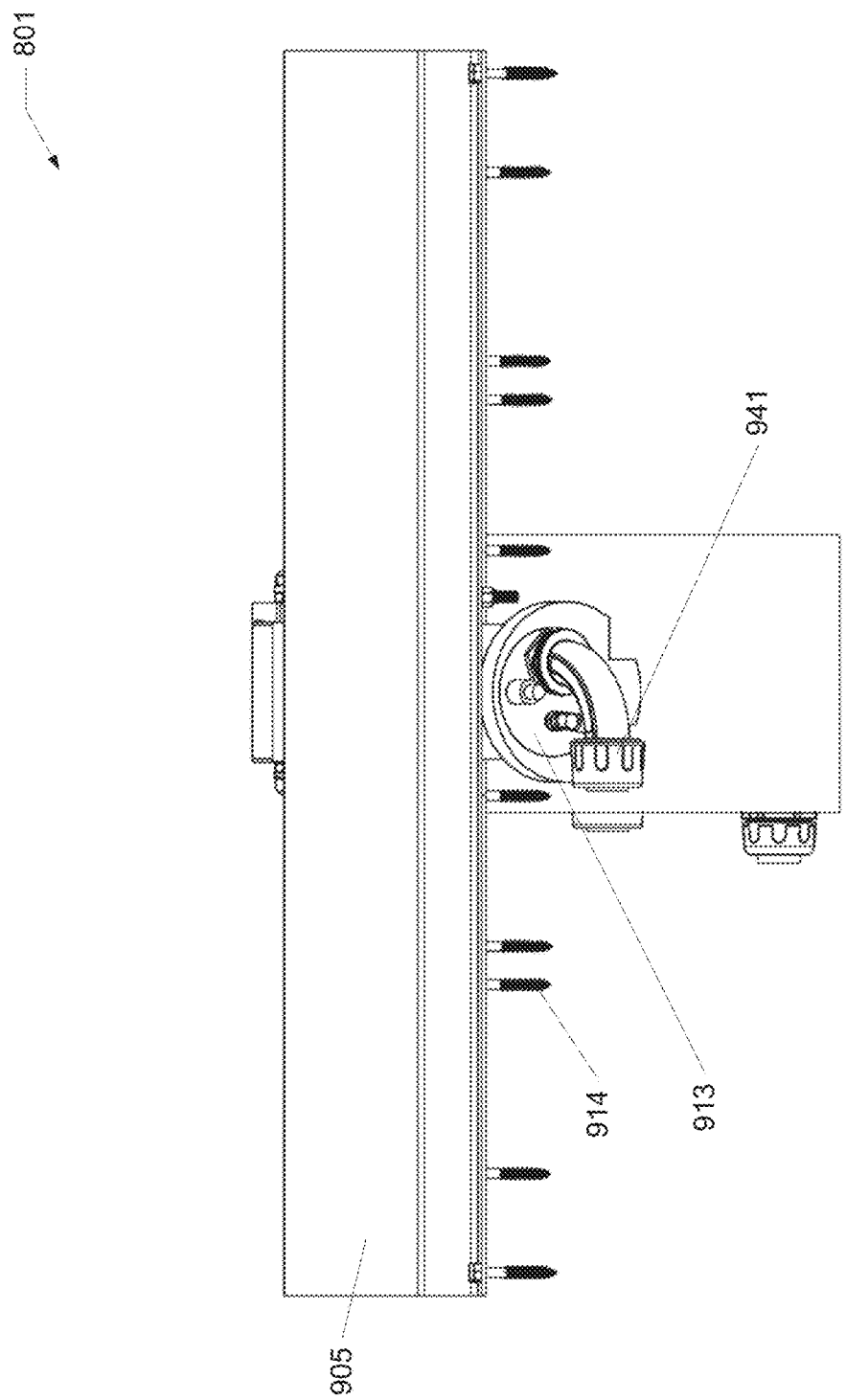
FIG. 9F illustrates a second side view of an undercarriage area-scan inspection system, in accordance with the disclosed technology.
Figure 9G:
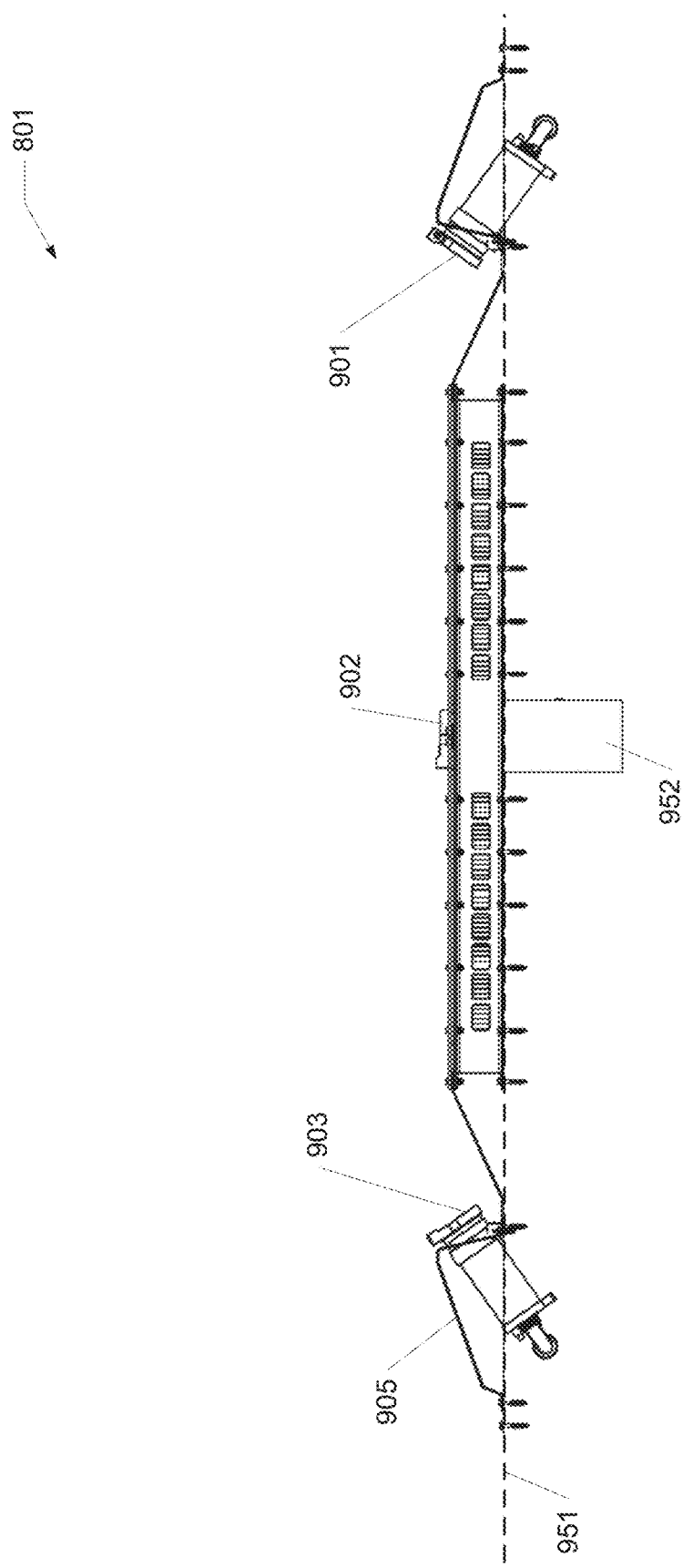
FIG. 9G illustrates a third side view of an undercarriage area-scan inspection system; in accordance with the disclosed technology.
Figure 9H:
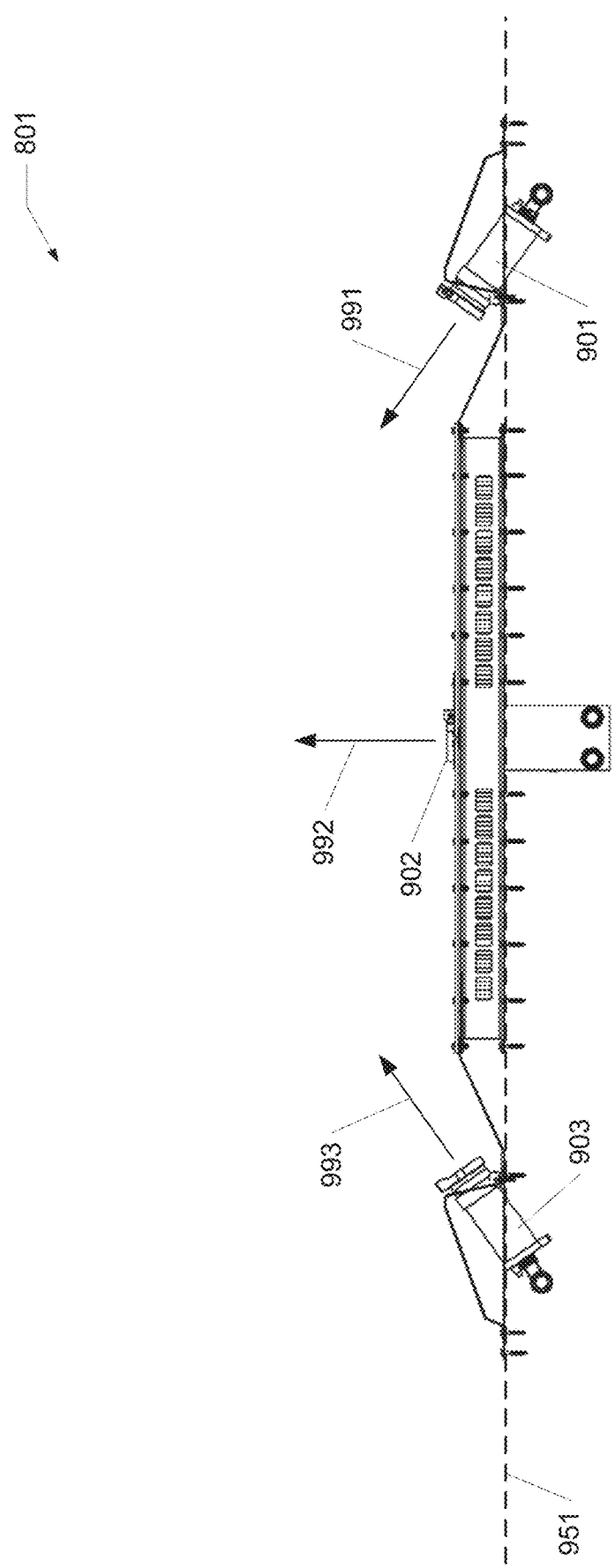
FIG. 9H illustrates a fourth side view of an undercarriage area-scan inspection system, in accordance with the disclosed technology.
Figure 9I:
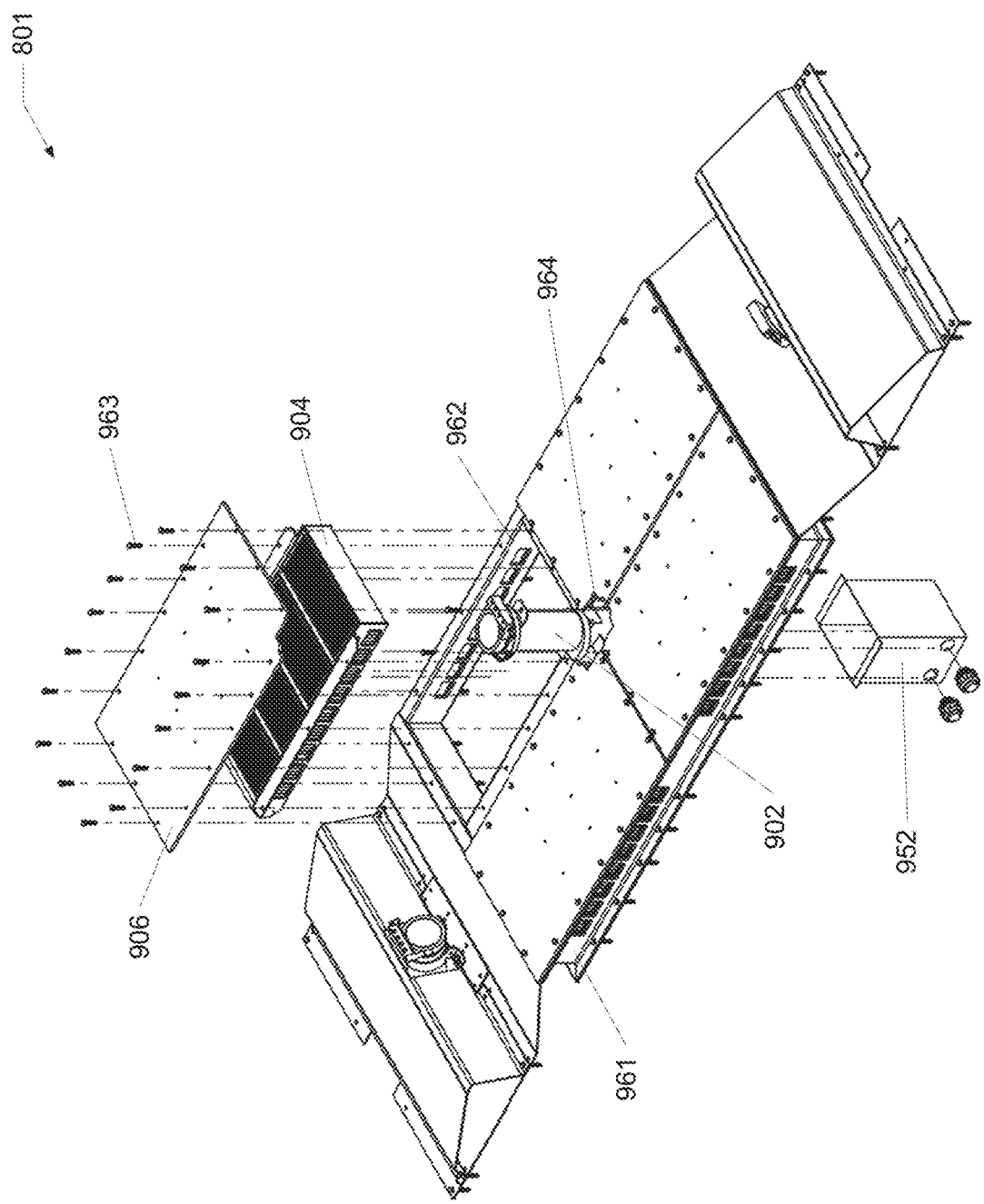
FIG. 9I, illustrates an exploded view of an undercarriage area-scan inspection system, in accordance with the disclosed technology.
Figure 9J:
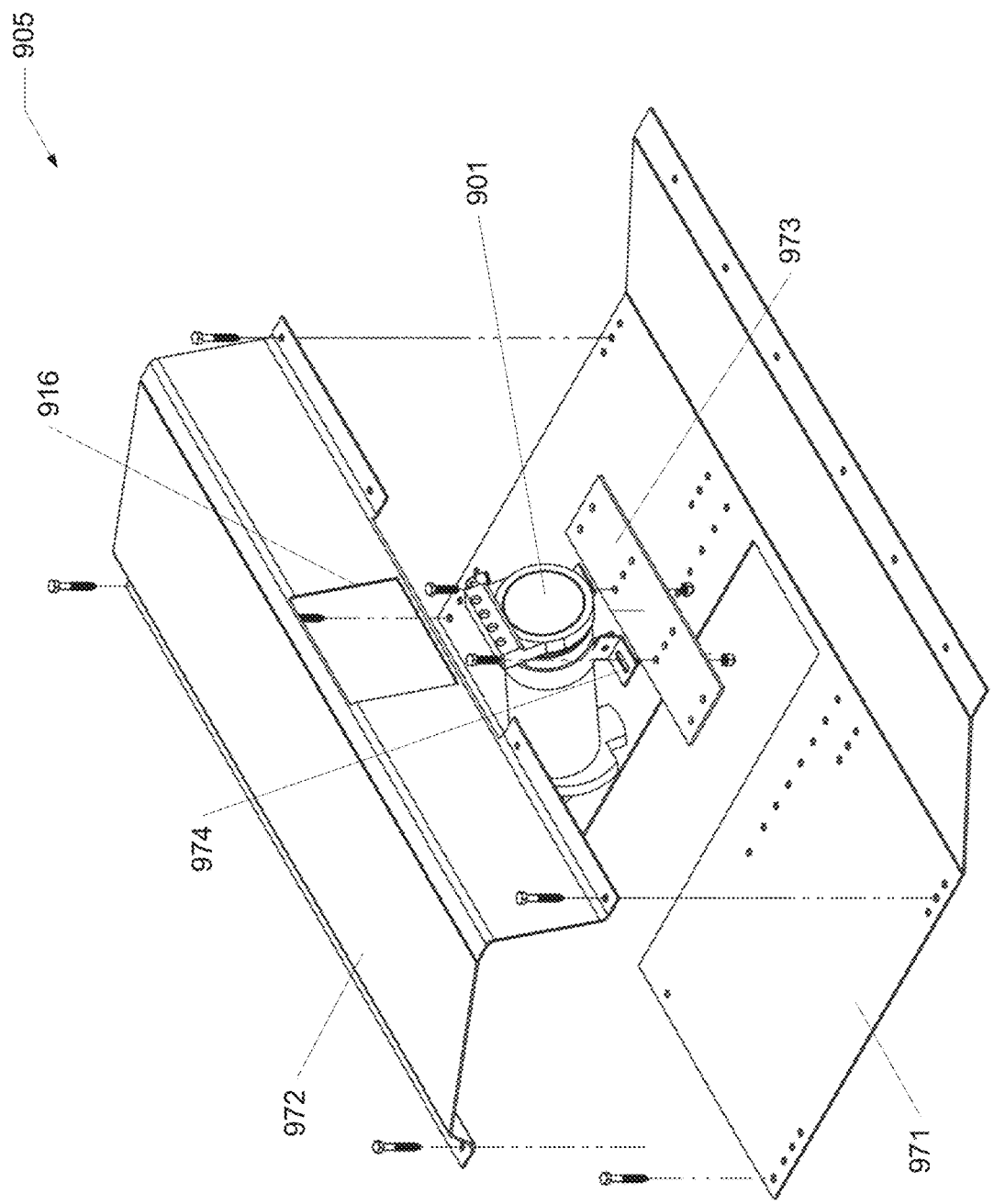
FIG. 9J, illustrates an exploded view of a protective cover, in accordance with the disclosed technology.
Figure 9K:
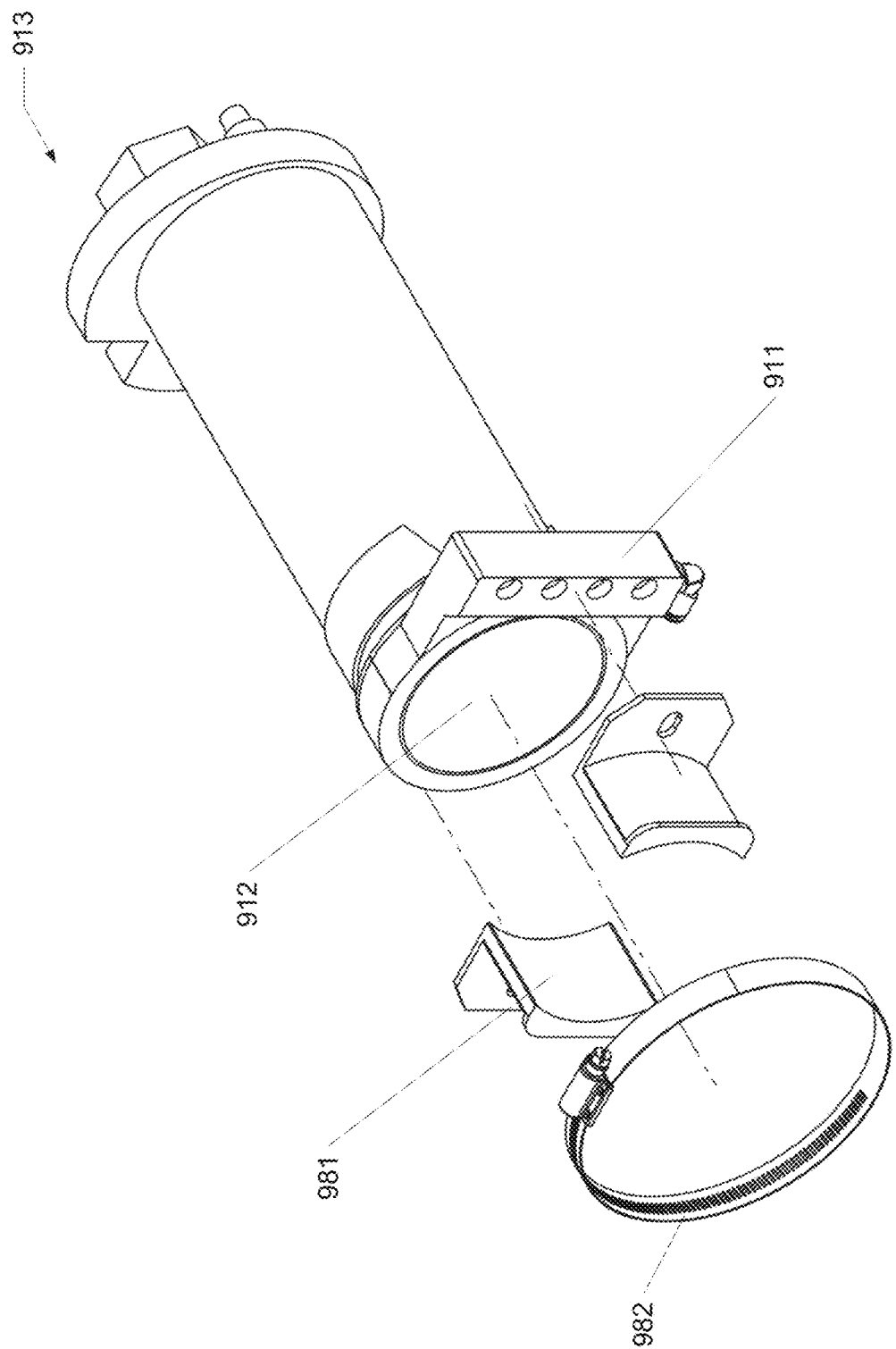
FIG. 9K, illustrates an exploded view of a housing, in accordance with the disclosed technology.

The housings 913 can function as a protective housing for the camera sensors of the first angled camera 901, the vertical camera 902, and the second angled camera 903 (see FIG. 9K for further details). The housings 913 can include any particular material that can protect the camera sensors of the first angled camera 901, the vertical camera 902, and the second angled camera 903 during use. For example, the housings 913 can be constructed from steel, stainless steel, iron, polymer, plastic, and/or any particular type of material.

The protective cover 905 can include a camera opening 916. The camera opening 916 can include a cutout portion of the protective cover 905. The first angled camera 901 and the second angled camera 903 can partially and/or fully extend through the camera opening 916. The first angled camera 901 and the second angled camera 903, alternatively, can be fully contained within the protective cover 905. The camera opening 916 can allow the first angled camera 901 and the second angled camera 903 to capture images of the passing railcar while still being partially or fully confined by the protective cover 905 for protection from debris. The protective cover 905 can be manufactured from steel, carbon fiber, and/or any particular material that can withstand the impact of debris generated by the passing railcar.

The undercarriage area-scan inspection assembly 801 can include one or more attachment means (e.g., screws) 914. The attachment means 914 can secure the undercarriage area-scan inspection assembly 801 to the rail ties 106. Though illustrated as screws 914, any particular similar fixing mechanism can be used to secure the undercarriage area-scan inspection assembly 801 to the rail ties 106. For example, the screws 914 can be replaced and/or supplemented with lag bolts, bolts, ties, pins, and/or any other applicable appending system.

Referring now to FIG. 9C, illustrated is a top view of the undercarriage area-scan inspection assembly 801, in accordance with the disclosed technology. The undercarriage area-scan inspection assembly 801 can include a central axis 921. The central axis 921 can symmetrically bisect the undercarriage area-scan inspection assembly 801. For example, the central axis 921 can pass through the center of the first angled camera 901, the vertical camera 902, and the second angled camera 903. The first angled camera 901, the vertical camera 902, and the second angled camera 903 can each have distinct alignments relative to the central axis 921 such that each of the cameras can capture distinct features of the undercarriage of the passing railcar.

The undercarriage area-scan inspection assembly 801 can include four or more lighting arrays 904 and respective lighting covers 906. As currently illustrated, the lighting arrays 904 can be found beneath the lighting covers 906 (see FIG. 9I for an exploded view of the undercarriage area-scan inspection assembly 801 and the corresponding lighting arrays 904). The lighting arrays 904 can include 140,000-lumen LED lights and/or any other similar lighting system capable of illuminating the undercarriage of the passing railcar. Though illustrated as having four lighting arrays 904, any particular combination of lighting arrays 904 can be employed to illuminate the undercarriage of the passing railcar. The lighting arrays 904 can each be configured adjacently such that a respective corner of each of the lighting arrays 904 can converge to a central vertex 922. The vertical camera 902 can be centered on the central vertex 922. The vertical camera 902 can be placed at any location of the undercarriage area-scan inspection assembly 801. The vertical camera 902 can include more than one camera positioned at different locations of the undercarriage area-scan inspection system (e.g., one at each corner of the lighting arrays 904).

Referring now to FIG. 9D, illustrated is a bottom view of the undercarriage area-scan inspection assembly 801, in accordance with the disclosed technology. The protective cover 905 of the undercarriage area-scan inspection assembly 801 can include a recess 931. The recess 931 can allow for the housing 913 of the first angled camera 901 and the second angled camera 903 to extend through the protective cover 905. The protective cover 905 can include one or more fixing apertures 915. The fixing apertures 915 can receive one or more screws, bolts, and/or other fixing mechanisms to fix the undercarriage area-scan inspection assembly 801 to the rial ties 106. The protective cover 905 can have more fixing apertures 915 than necessary such that one or more screws 914 can be inserted in various locations depending on the geometric configuration of the train track 104. The underside 917 of the undercarriage area-scan inspection assembly 801 can be substantially flat. By being completely flat, the underside 917 of the undercarriage area-scan inspection assembly 801 can sit flush to a top surface of each of the rail ties 106. The lighting arrays 904 can include one or more back plates 918 that can protect the underside of the undercarriage area-scan inspection assembly 801.

Referring now to FIG. 9E, illustrated is a first side view of the undercarriage area-scan inspection assembly 801, in accordance with the disclosed technology. The undercarriage area-scan inspection assembly 801 can include one or more conduit adapters 941. The conduit adapter 941 can allow for one or more wires and/or compressed air lines to extend into the housing 913 while maintaining a watertight configuration. For example, the housing 913 of the second angled camera 903 can include a conduit adapter 941.

Referring now to FIG. 9F, illustrated is a second side view of the undercarriage area-scan inspection assembly 801, in accordance with the disclosed technology. The undercarriage area-scan inspection assembly 801 can include the one or more conduit adapters 941. The conduit adapter 941 can allow for one or more wires and/or compressed air lines to extend into the housing 913 while maintaining a watertight configuration. For example, the housing 913 of the first angled camera 901 can include a conduit adapter 941. The one or more screws 914 can extend through the protective cover 905 to attach to the one or more rail ties 106.

Referring now to FIG. 9G, illustrated is a third side view of the undercarriage area-scan inspection assembly 801, in accordance with the disclosed technology. The undercarriage area-scan inspection assembly 801 can include a vertical camera enclosure 952. The vertical camera enclosure 952 can contain the vertical camera 902 and its associated housing 913. The undercarriage area-scan inspection assembly 801 can include a horizontal plane 951. The horizontal plane 951 can represent the top surface of one or more rail ties 106 that support the undercarriage area-scan inspection assembly 801. The vertical camera enclosure 952 of the undercarriage area-scan inspection assembly 801 can extend through the horizontal plane 951. For example, the vertical camera enclosure 952 can be positioned between two rail ties 106 and can partially extend below the horizontal plane 951. The first angled camera 901 and the second angled camera 903 can partially extend below the horizontal plane 951. For example, the first angled camera 901 and the second angled camera 903 can partially extend below the horizontal plane 951 into a particular cavity between two particular rail ties 106.

Referring now to FIG. 9H, illustrated is a fourth side view of the undercarriage area-scan inspection assembly 801, in accordance with the disclosed technology. The vertical camera 902 can capture area-scan images in a vertical direction 992. For example, the vertical camera 902 can capture area-scan images in the vertical direction 992 of a particular area and/or component of the undercarriage of the passing railcar. The first angled camera 901 and the second angled camera 903 can capture isometric area-scan images in a first direction 991 and the second direction 993, respectively. For example, the first angled camera 901 and the second angled camera 903 can capture isometric area-scan images in the first direction 991 and the second direction 993 of the undercarriage of the passing railcar.

The first direction 991 and the second direction 993 can form a first angle and a second angle relative to the horizontal plane 951. The first angle can define the angulation of the first angled camera 901 relative to the horizontal plane 951 and the second angle can define the angulation of the second angled camera 903 relative to the horizontal plane 951. The angle between the first angled camera 901 and the horizontal plane 951 and/or between the second angled camera 903 and the horizontal plane 951 can be at least 15 degrees, between approximately 0 and approximately 15 degrees, between approximately 15 and approximately 25 degrees, between approximately 25 and approximately 35 degrees, between approximately 35 and approximately 45 degrees, between approximately 45 and approximately 60 degrees, approximately 15 degrees, approximately 30 degrees, approximately 45 degrees, or any other desired angle.

Referring now to FIG. 9I, illustrated is a partially exploded view of the undercarriage area-scan inspection assembly 801, in accordance with the disclosed technology. The undercarriage area-scan inspection assembly 801 can include four or more lighting arrays 904 configured in an adjacent structure. The lighting arrays 904 can be inserted into an undercarriage area-scan inspection system frame 961. For example, the undercarriage area-scan inspection system frame 961 can include one or more lighting array recesses 962. For example, the undercarriage area-scan inspection assembly 801 can include a two lighting array configuration, where the vertical camera 902 is positioned in the middle of the two lighting arrays. In another example, the undercarriage area-scan inspection assembly 801 can include a single lighting configuration, where the vertical camera 902 is positioned in the center of a single lighting device. The lighting array recesses 962 can receive the lighting arrays 904. Once inserted, the lighting covers 906 can cover the lighting arrays 904. One or more screws 963, bolts, lag bolts, welding points, and/or any other appending mechanism can secure the lighting covers 906 to the undercarriage area-scan inspection system frame 961, thus securing the lighting array 904 within the undercarriage area-scan inspection system frame 961.

The undercarriage area-scan inspection system frame 961 can include a vertical camera opening 964. The vertical camera opening 964 can allow the vertical camera 902 to extend through the undercarriage area-scan inspection system frame 961 into the vertical camera enclosure 952. The vertical camera enclosure 952 and the vertical camera 902 can fix the undercarriage area-scan inspection system frame 961 using one or more screws, bolts, lag bolts, and/or any other appropriate fixing mechanism.

Referring now to FIG. 9J, illustrated is an exploded view of the protective cover 905, in accordance with the disclosed technology. The protective cover 905 can protect the first angled camera 901 and the second angled camera 903 from debris generated by the passing railcar. The protective cover 905 can include a bottom portion 971 and a top portion 972. The bottom portion 971 and the top portion 972 can attach together to form the protective cover 905. The first angled camera 901 and/or the second angled camera 903 can attach to a camera attachment point 973 through one or more camera ties 974. For example, the camera ties 974 can encircle the first angled camera 901 and/or the second angled camera 903. One or more screws can secure the first angled camera 901 and/or the second angled camera 903 to the camera attachment point 973 by extending through the camera ties 974 and the camera attachment point 973. Once secured to the camera attachment point 973, the first angled camera 901 and/or the second angled camera 903 can attach to the bottom portion 971 of the protective cover 905. The top portion 972 can attach to the bottom portion 971 such that the first angled camera 901 and/or the second angled camera 903 is aligned with the camera opening 916.

Referring now to FIG. 9K, illustrated is an exploded view of the camera housing 913, in accordance with the disclosed technology. The housing 913 can function as a protective environment for the camera sensor of the first angled camera 901, the second angled camera 903, and the vertical camera 902. The housing 913 can be manufactured from steel and/or any other material that provides adequate protection to the camera sensors from debris generated from the passing railcar. The housing 913 can include the air curtain apparatus 911 and the lens 912. The lens 912 can cover the camera sensor of the first angled camera 901, the second angled camera 903, and/or the vertical camera 902. The air curtain apparatus 911 can generate an air curtain over the lens 912 to clean the lens 912 from any debris collected from the passing railcar. The housing 913 can include one or more attachment elements 981. The attachment elements 981 can be integrated into the housing 913 (e.g., welded, molded, etc.) and/or attached to the housing using a tie 982. The attachment elements 981 can function to attach the vertical camera 902 to the undercarriage area-scan inspection system frame 961.

Figure 10A:
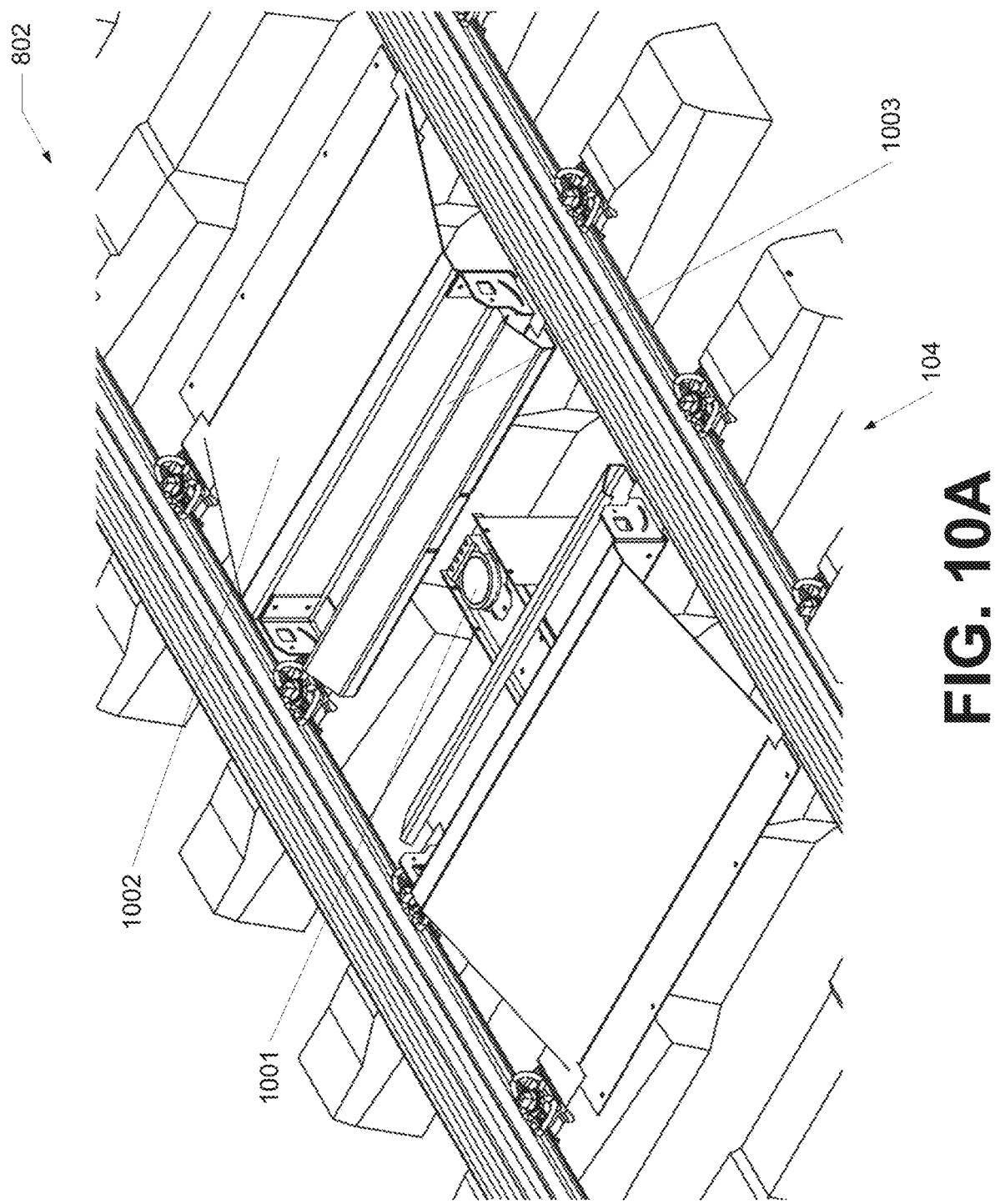
FIG. 10A illustrates an example perspective view of an installed undercarriage line-scan inspection system, in accordance with the disclosed technology.

Referring now to FIG. 10A, illustrated is a perspective view of the undercarriage line-scan inspection assembly 802, in accordance with the disclosed technology. The undercarriage line-scan inspection assembly 802 can generate line-scan images of the undercarriage of the passing railcar. A line scan image can differ from an area-scan image in that the sensor of a line-scan camera captures light in a single line and reconstructs the image by combining consecutive captures (e.g., lines) into one image, while an area-scan camera captures particular light from a target area. The undercarriage line-scan inspection assembly 802 can include the line-scan camera 1001. The line-scan camera 1001 can be directed to a specific three-dimensional space. Stated differently, the line-scan camera 1001 can be targeted at a specific point such that the corresponding line-scan camera 1001 is focused on one or more specific components, elements, and/or portions of a passing railcar. The line-scan camera 1001 can be positioned below the level of the train track 104 and can be perpendicular to the ground. The line-scan camera 1001 can aim directly upwards and record line-scan images of the undercarriage of the passing railcar. The undercarriage line-scan inspection assembly 802 can include one or more shields 1002. The one or more shields 1002 can protect the line-scan camera 1001 from debris while a particular railcar passes over the undercarriage line-scan inspection assembly 802. The one or more shields 1002 can include an angled lighting strip 1003. The angled lighting strip 1003 can illuminate the undercarriage of the passing railcar vertically and/or at a particular angle as it passes over the undercarriage line-scan inspection assembly 802. The angled lighting strip 1003 can illuminate a region of the undercarriage of the passing railcar as the line-scan camera 1001 captures line-scan images of the particular railcar.

Figure 10B:
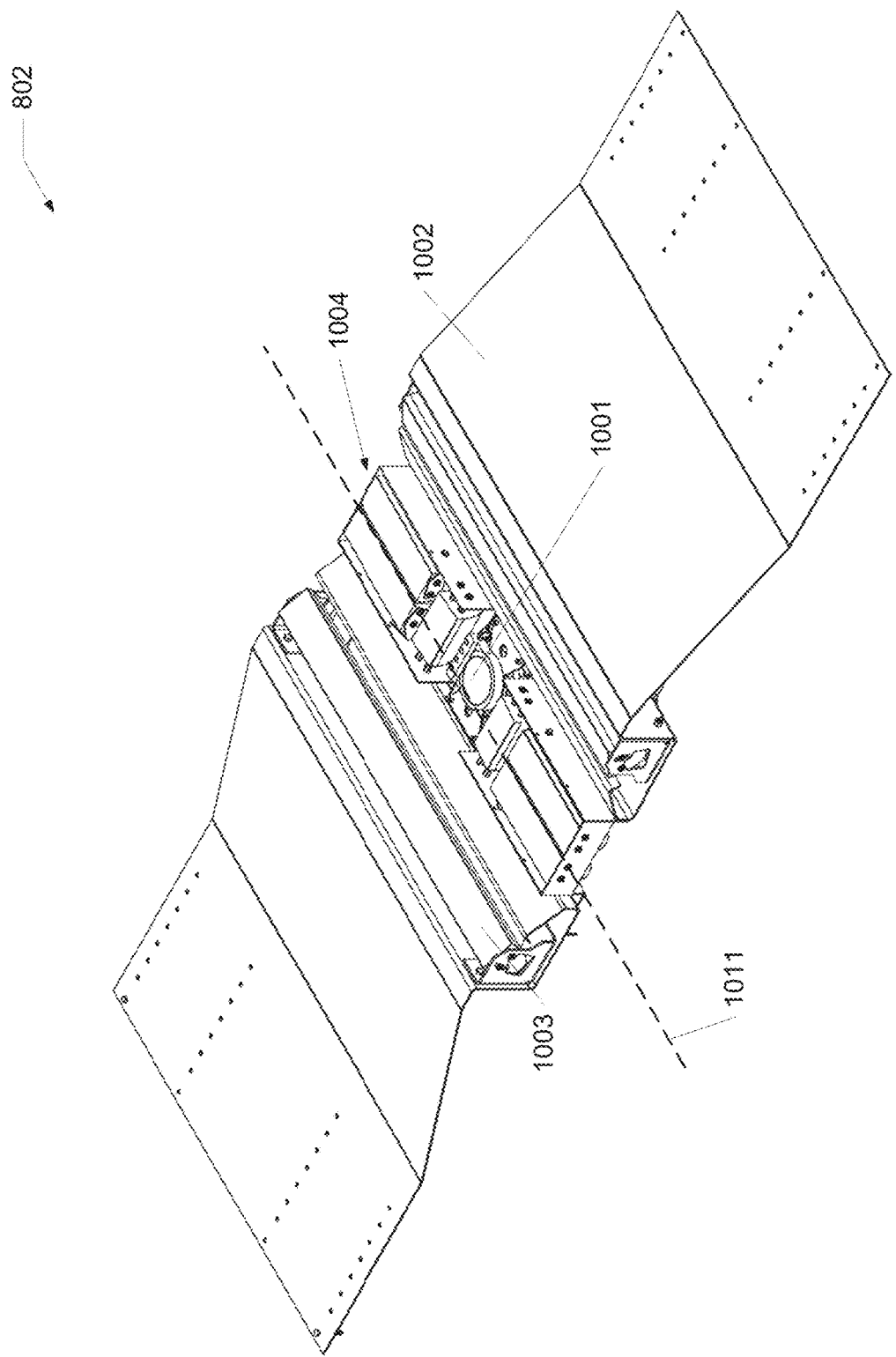
FIG. 10B illustrates an example perspective view of an undercarriage line-scan inspection system, in accordance with the disclosed technology.

Referring now to FIG. 10B, illustrated is an example perspective view of the undercarriage line-scan inspection assembly 802, in accordance with the disclosed technology. The undercarriage line-scan inspection assembly 802 can include the line-scan camera 1001, one or more angled lighting strips 1003, and one or more vertical lighting assemblies 1004. The line-scan camera 1001 can point vertically and collect line-scan images of the undercarriage of the passing railcar. The angled lighting strips 1003 can illuminate the undercarriage of the passing railcar at a specific angle. The vertical lighting assemblies 1004 can illuminate vertically towards the undercarriage of the passing railcar. The angled lighting strips 1003 and the vertical lighting assemblies 1004 can simultaneously trigger on the detection of the passing railcar. The angled lighting strips 1003 and the vertical lighting assemblies 1004 can illuminate the undercarriage of the passing railcar while the line-scan camera 1001 gathers line-scan images of the undercarriage of the passing railcar. For example, the angled lighting strips 1003 and the vertical lighting assemblies 1004 can generate 140,000 lumens of light to illuminate the undercarriage of the passing railcar. Continuing this example, the line-scan camera 1001 can include a high-speed, high resolution, and high sensitivity camera sensor able to capture line-scan images of the undercarriage of the passing railcar as the angled lighting strips 1003 and the vertical lighting assemblies 1004 illuminate the desired area of capture. The line-scan camera can gather line-scan images with less than 2 mm of blur of trains moving at speeds of up to 70 miles per hour, or faster (though the line-scan camera can capture line-scan images of the particular railcar passing at any speed).

The undercarriage line-scan inspection assembly 802 can include a first axis 311. The first axis 311 can bisect the undercarriage line-scan inspection assembly 802 such that the undercarriage line-scan inspection assembly 802 is symmetrically divided. For example, the undercarriage line-scan inspection assembly 802 can include two vertical lighting assemblies 1004, two angled lighting strips 1003, and two shields on both sides of the vertical axis. The line-scan camera 1001 can be centered about the undercarriage line-scan inspection assembly 802 and the first axis 311.

Figure 10C:
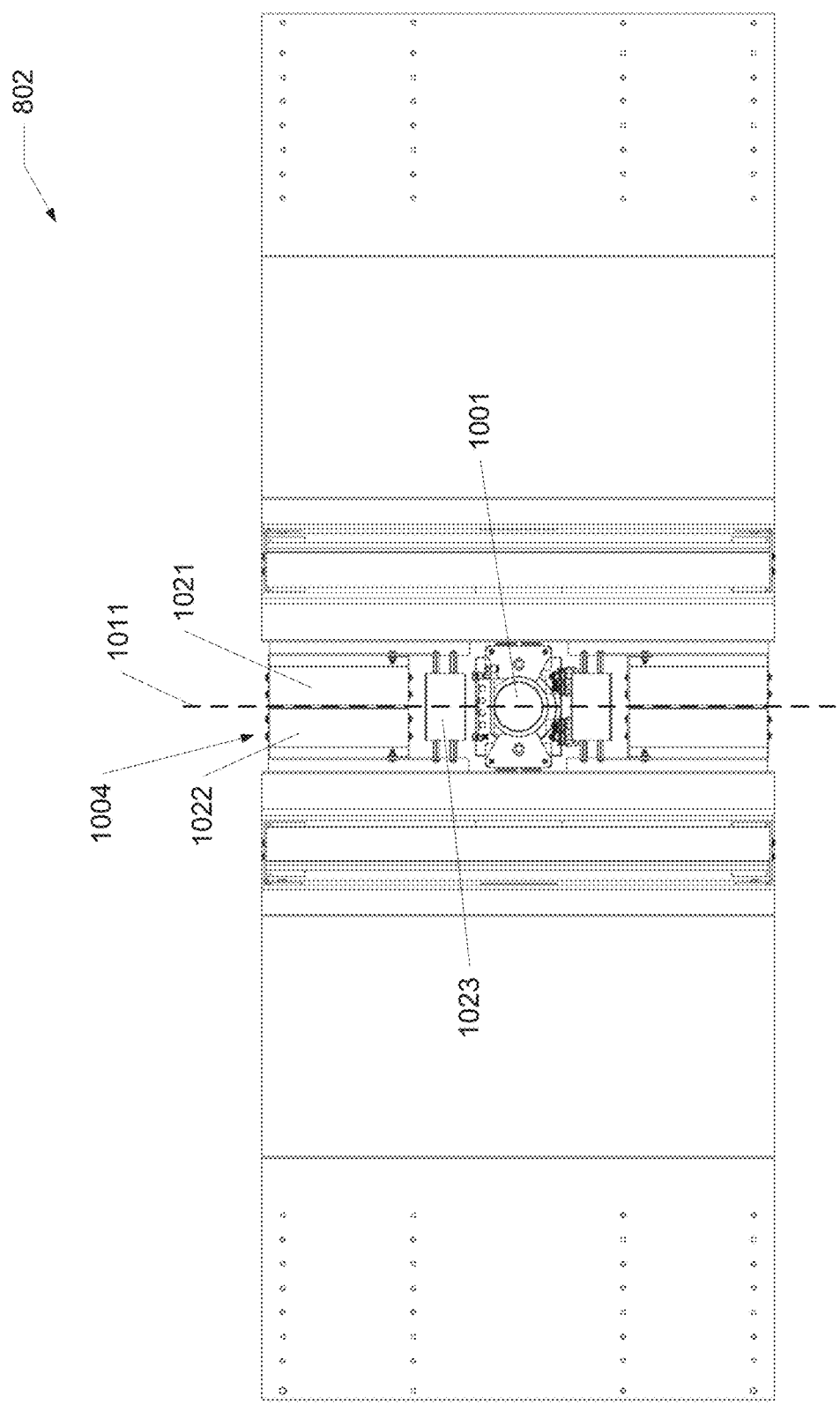
FIG. 10C illustrates an example top view of an undercarriage line-scan inspection system, in accordance with the disclosed technology.

Referring now to FIG. 10C, illustrated is an example top view of the undercarriage line-scan inspection assembly 802, in accordance with the disclosed technology. The line-scan camera 1001 can be centered about the undercarriage line-scan inspection assembly 802. The vertical lighting assemblies 1004 can include a first light 1021, a second light 1022, and a third light 1023. The first light 1021 and the second light 1022 can be arranged parallel to the first axis 311. The third light 1023 can be arranged perpendicularly to the first axis 311. The first light 1021 and the second light 1022 can be angled vertically (e.g., vertically relative to the ground) towards the undercarriage of the passing railcar. The third light 1023 can be angled inwards towards the line-scan camera 1001 such that a particular region above the line-scan camera 1001 is adequately illuminated.

Figure 10D:
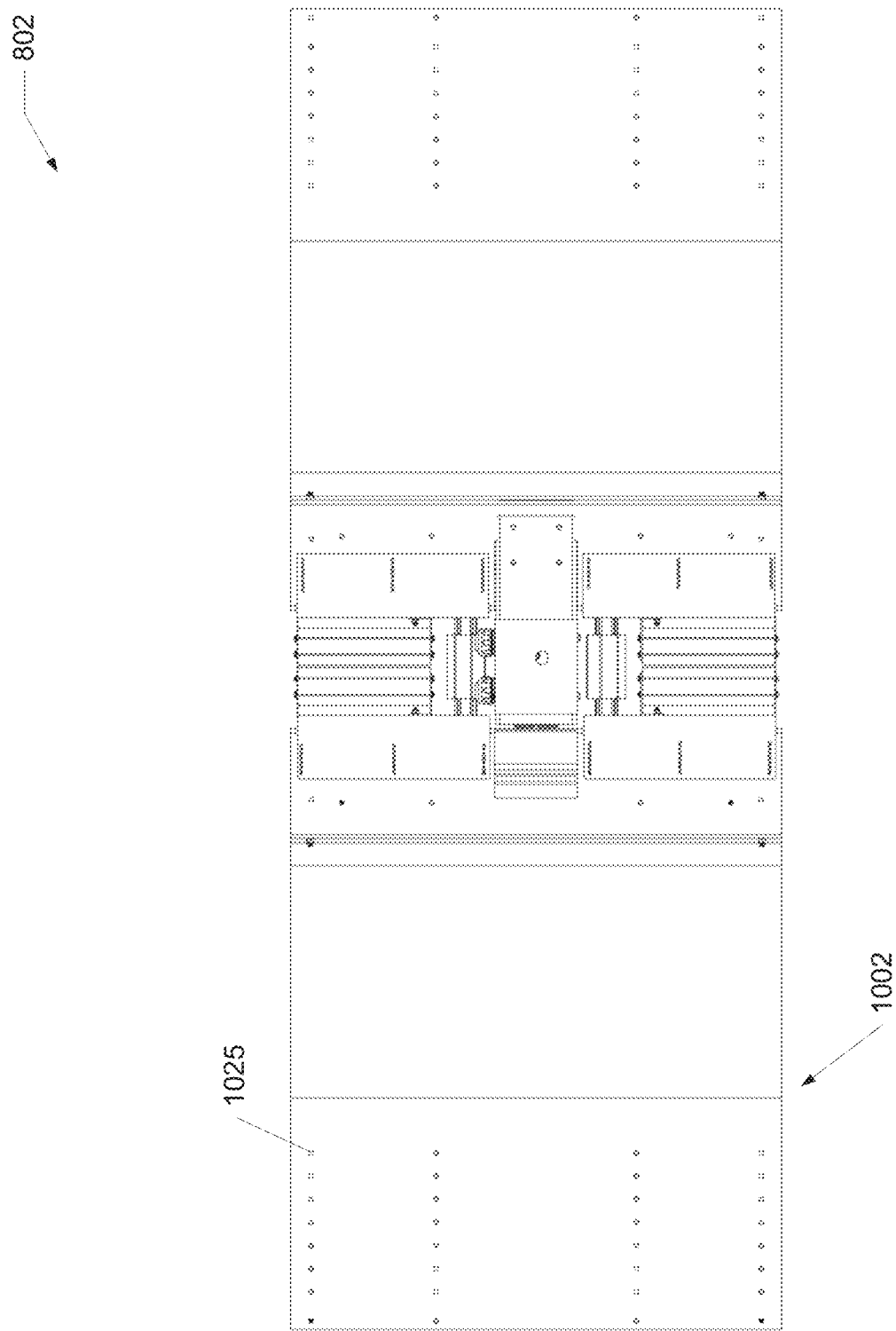
FIG. 10D illustrates an example bottom view of an undercarriage line-scan inspection system, in accordance with the disclosed technology.

Referring now to FIG. 10D, illustrated is an example bottom view of the undercarriage line-scan inspection assembly 802, in accordance with the disclosed technology. The one or more shields 1002 can include one or more attachment apertures 1025. The attachment apertures 1025 can receive one or more screws, bolts, lag bolts, and/or any other adequate attachment mechanism for securing the undercarriage line-scan inspection assembly 802 to the rail ties 106. The attachment apertures 1025 can be arranged such that any particular attachment aperture 1025 can be used to secure the undercarriage line-scan inspection assembly 802 to the rail ties 106. For example, to accommodate for a distinct train track 104 geometry, any particular combination of attachment apertures 1025 can be used to secure the undercarriage line-scan inspection assembly 802 to the train track 104.

Figure 10E:
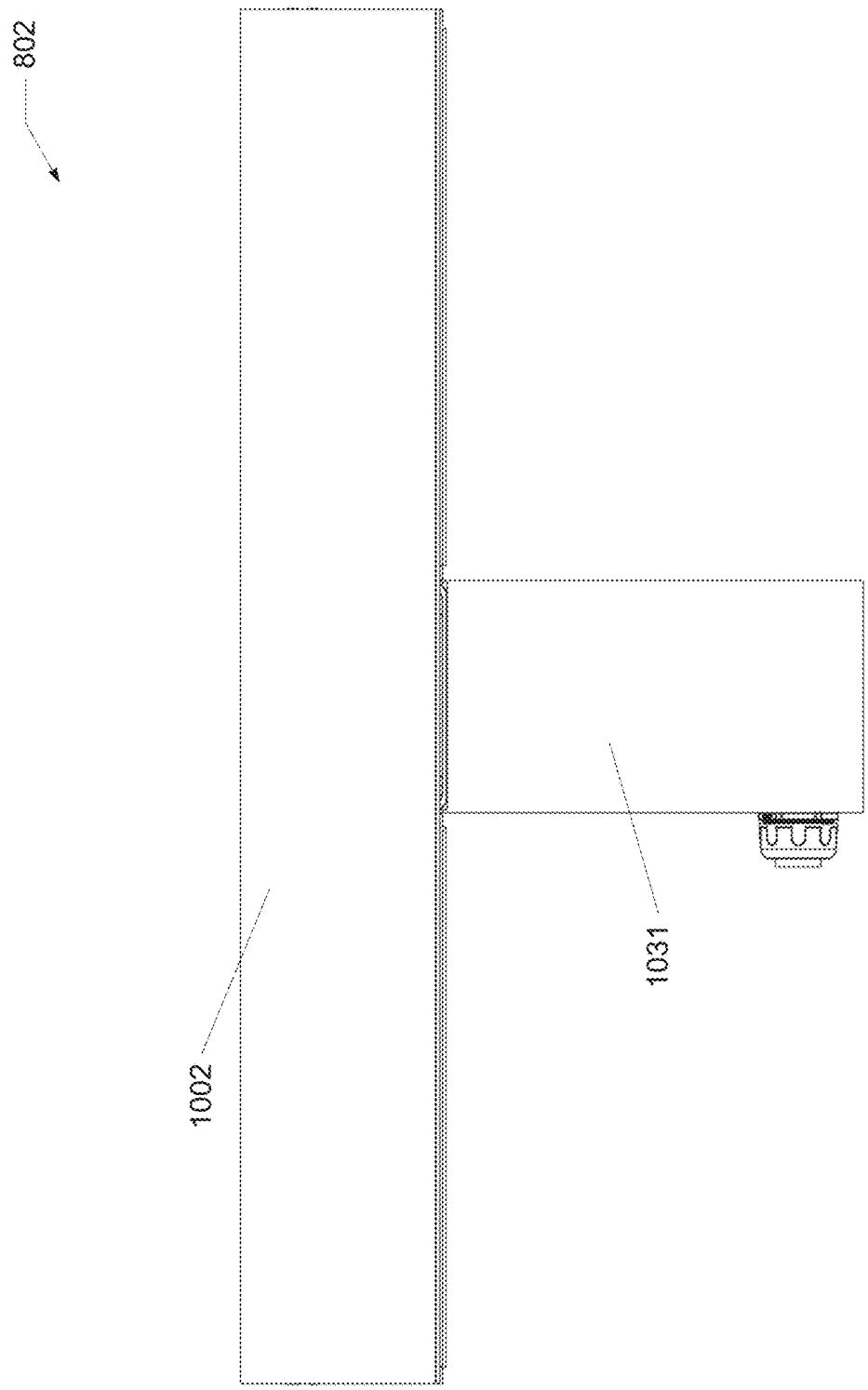
FIG. 10E illustrates an example first side view of an undercarriage line-scan inspection system, in accordance with the disclosed technology.

Referring now to FIG. 10E, illustrated is an example first side view of the undercarriage line-scan inspection assembly 802, in accordance with the disclosed technology. The undercarriage line-scan inspection assembly 802 can include a line-scan camera enclosure 1031. The line-scan camera enclosure 1031 can include a steel casing that can encapsulate the line-scan camera 1001. The line-scan camera 1001 can extend perpendicularly downwards to the train track 104 from the shields 1002. For example, the line-scan camera enclosure 1031 can store the line-scan camera 1001. Continuing this example, the line-scan camera enclosure 1031 can attach to the two shields 1002 of the undercarriage line-scan inspection assembly 802.

Figure 10F:
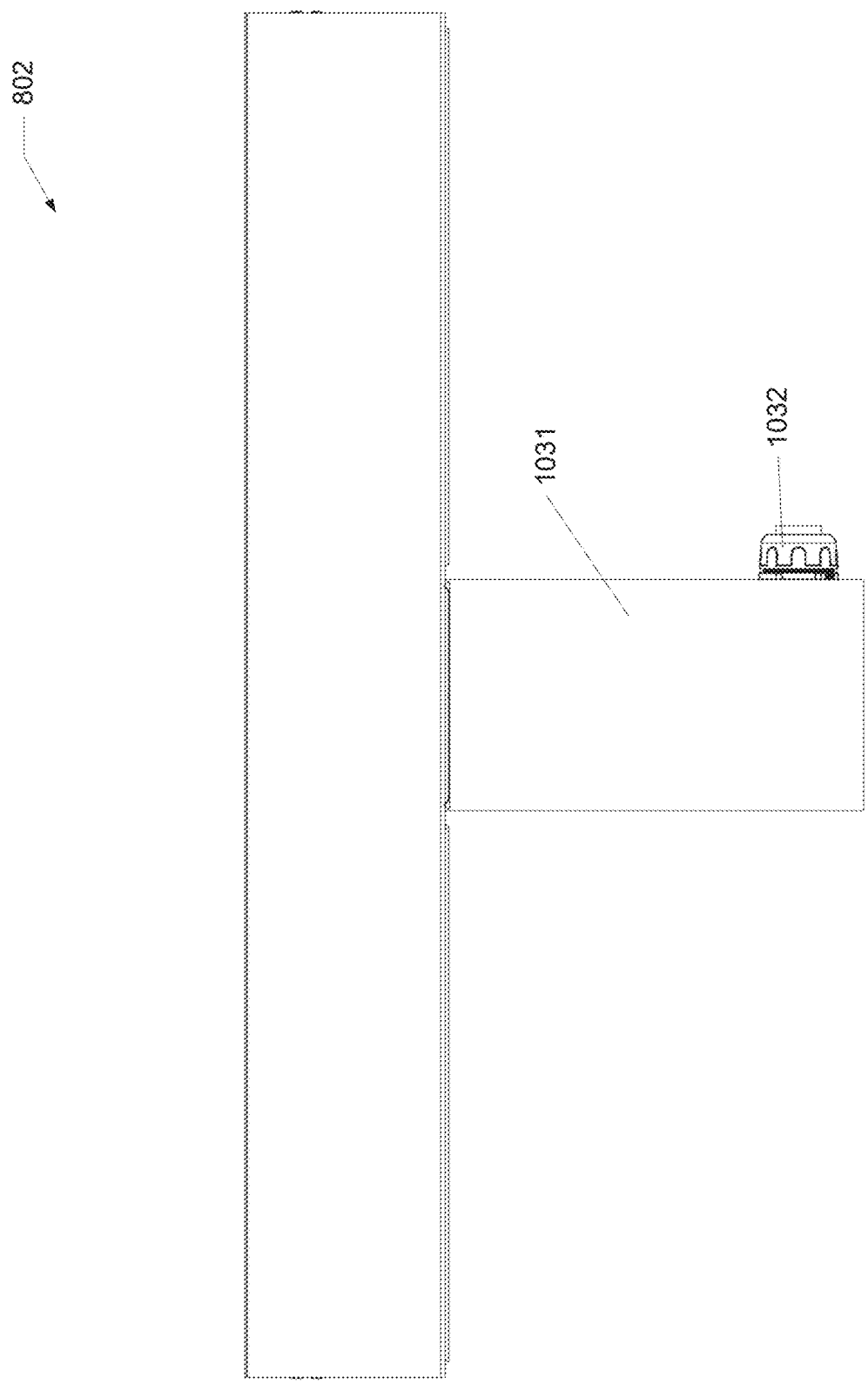
FIG. 10F illustrates an example second side view of an undercarriage line-scan inspection system, in accordance with the disclosed technology.

Referring now to FIG. 10F, illustrated is an example second side view of the undercarriage line-scan inspection assembly 802, in accordance with the disclosed technology. The undercarriage line-scan inspection assembly 802 can include one or more conduit adapters 1032. The conduit adapters 1032 can function as water-tight entries into the line-scan camera enclosure 1031. For example, one or more wires and/or compressed air lines can travel through the conduit adapters 1032 into the line-scan camera enclosure 1031.

Figure 10G:
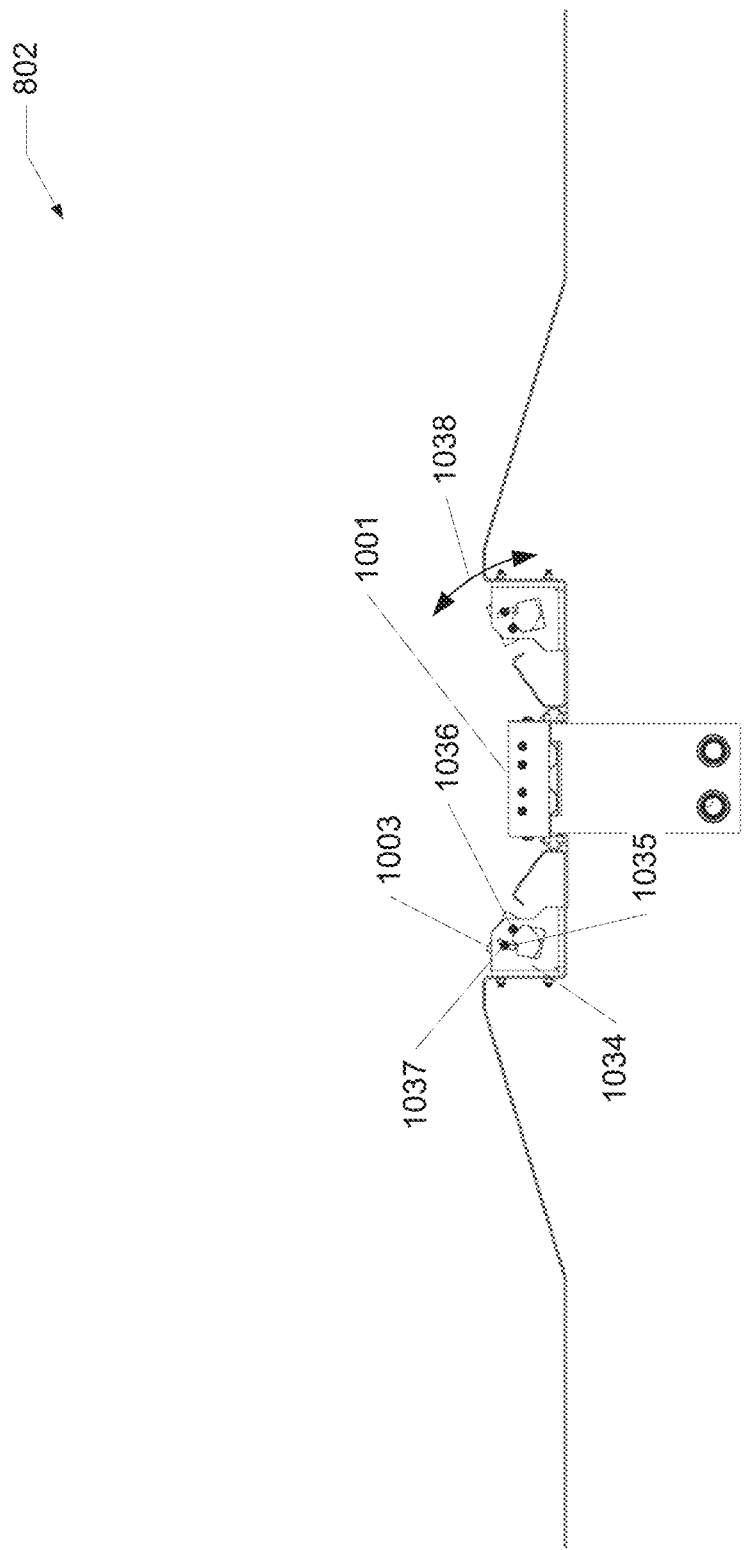
FIG. 10G illustrates an example third side view of an undercarriage line-scan inspection system, in accordance with the disclosed technology.

Referring now to FIG. 10G, illustrated is an example third side view of the undercarriage line-scan inspection assembly 802, in accordance with the disclosed technology. The undercarriage line-scan inspection assembly 802 can include the angled lighting strips 1003. The angled lighting strips 1003 can be angled towards the line-scan camera 1001 such as to illuminate a particular region above the line-scan camera 1001. The angled lighting strips 1003 can attach to an angled lighting frame 1034. The angled lighting frame 1034 can include a pivot point 1036 and an angle adjustment point 1037. The angled lighting frame 1034 can exist at both ends of the angled lighting strips 1003. The angled lighting strips 1003 can fix to the pivot point 1036 through a screw, lag bolt, and/or any other applicable fixing mechanism such that the angled lighting strips 1003 can rotate about the pivot point 1036. For example, the angled lighting strips 1003 can rotate in a first direction 1038. The angled lighting strips 1003 can be secured in a particular angled configuration based on the location of the adjustment point within an adjustment aperture 1051035. For example, the angled lighting strips 1003 can include a screw that is located at the adjustment point 1037 and moves freely within the adjustment aperture 1051035. On determining the angled configuration of the angled lighting strip 1003, the screw at the adjustment point 1037 can be tightened and secured within the adjustment aperture 1051035, thus securing the angled lighting strips 1003 to the angled lighting frame 1034.

Figure 10H:
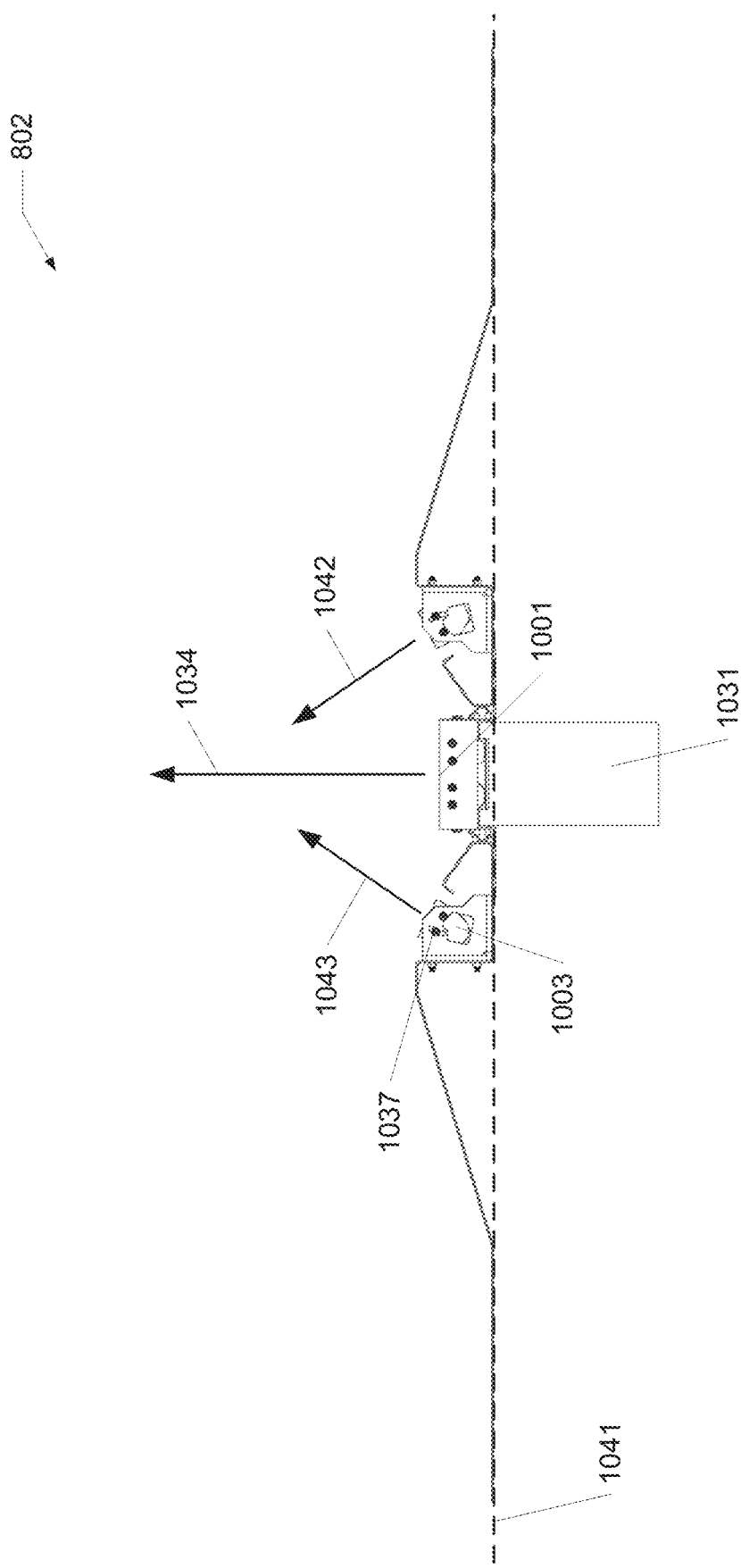
FIG. 10H illustrates an example fourth side view of an undercarriage line-scan inspection system, in accordance with the disclosed technology.

Referring now to FIG. 10H, illustrated is an example fourth side view of the undercarriage line-scan inspection assembly 802, in accordance with the disclosed technology. The line-scan camera enclosure 1031 can extend below a horizontal plane 1041. The horizontal plane 1041 can represent the surface of the rail ties 106 where the undercarriage line-scan inspection assembly 802 is attached. The line-scan camera enclosure 1031 can extend below the horizontal plane 1041 between two rail ties 106 (not illustrated).

The angled lighting strips 1003 can illuminate in a first direction 1042 and a second direction 1043. The angled lighting strips 1003 can illuminate the third direction 1034. The third direction 1034 can define the direction in which the line-scan camera captures line-scan images of the undercarriage of the passing railcar. The angle between the first direction 1042 and the horizontal plane 1041 and the second direction 1043 and the horizontal plane 1041 can be varied through the adjustment point 1037. For example the angle between the first direction 1042 and the horizontal plane 1041 and the second direction 1043 and the horizontal plane 1041 can measure at least 0 degrees, 0 to 90 degrees, 45 degrees, 45 to 90 degrees, or less than 90 degrees.

Figure 10I:
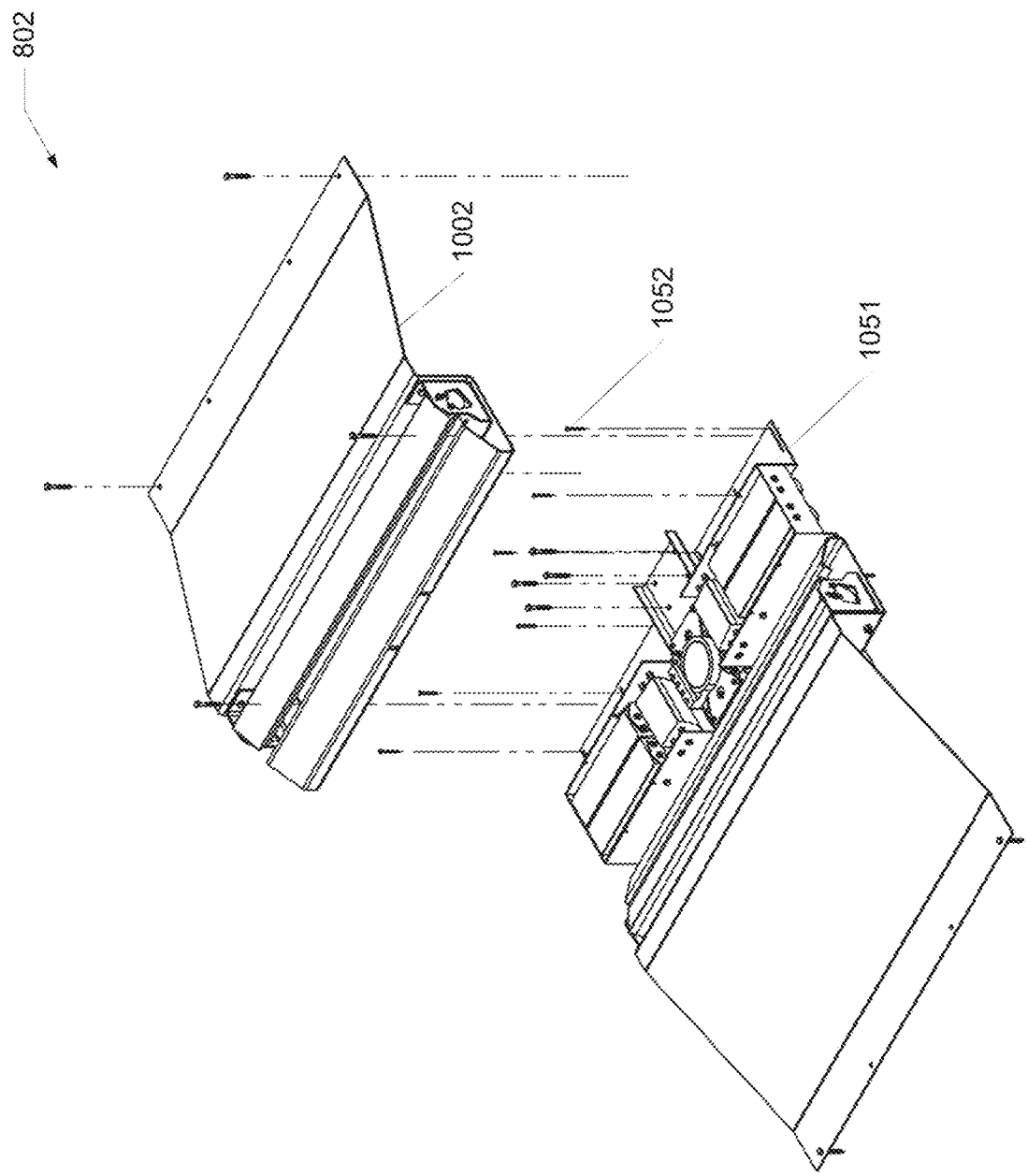
FIG. 10I illustrates an exploded view of the undercarriage line-scan inspection system, in accordance with the disclosed technology.

Referring now to FIG. 10I, illustrated is a partially exploded view of the undercarriage line-scan inspection assembly 802, in accordance with the disclosed technology. The one or more shields 1002 can attach to a line-scan system frame 1051 through one or more screws 1052. The one or more shields 1002 can be removed in case there is excessive damage during use. For example, if one shield 1002 is damaged while the other shield 1002 is functional, the damaged shield 1002 can be removed and replaced while keeping the other shield 1002 intact.

Figure 10J:
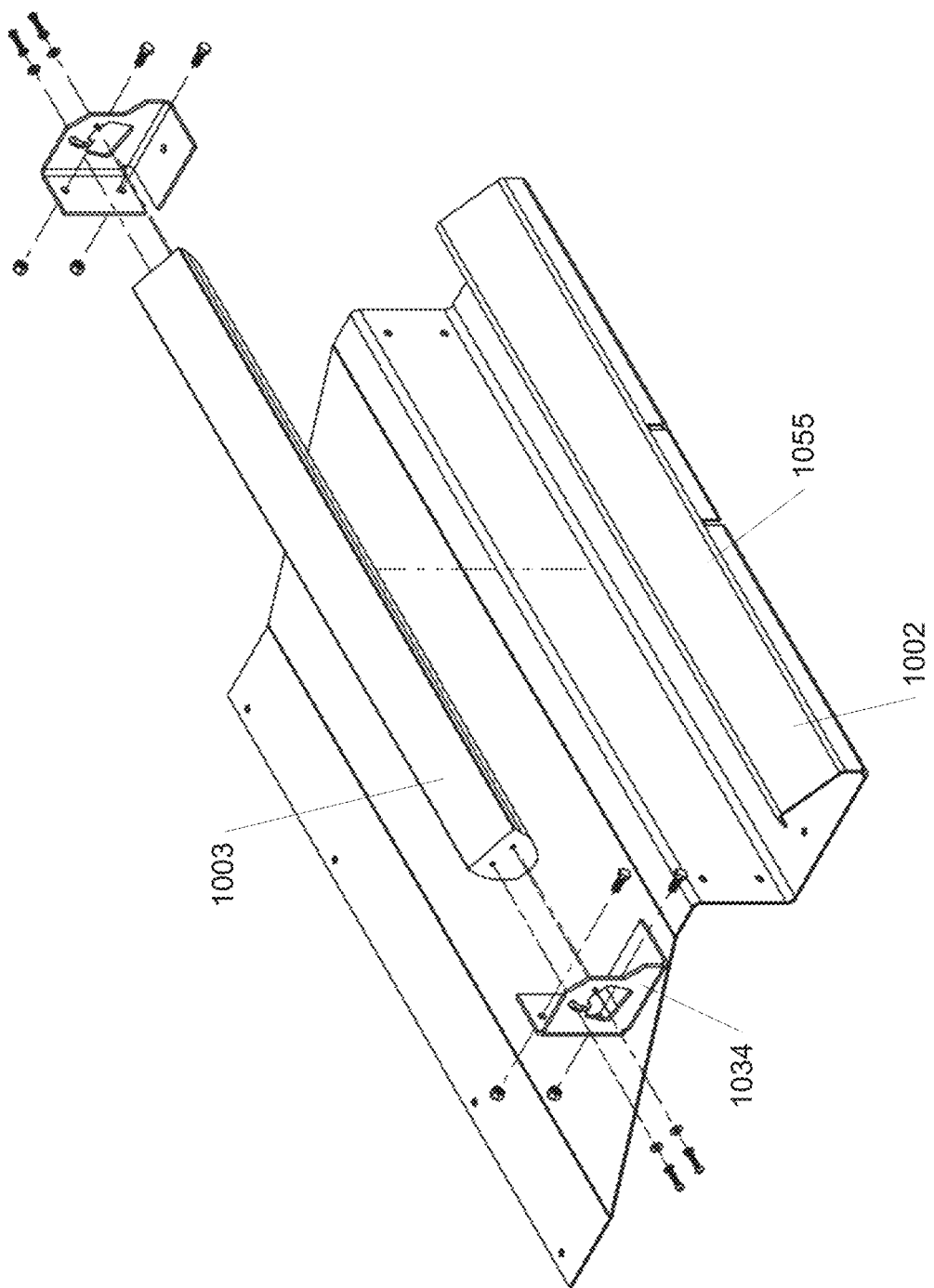
FIG. 10J illustrates an exploded view of an angled lighting strip, in accordance with the disclosed technology.

Referring now to FIG. 10J, illustrated is a partially exploded view of the angled lighting strip 1003, in accordance with the disclosed technology. The angled lighting strip 1003 can attach to the two angled lighting frames 1034. The angled lighting frames 1034 can secure the angled lighting strip 1003 to the shield 1002. For example, the angled lighting frames 1034 can fix to the shield using one or more screws, bolts, lag bolts, and/or any other applicable fixing mechanism. The shield 1002 can include a front lip 1055 to protect the angled lighting strips 1003 from debris.

Figure 10K:
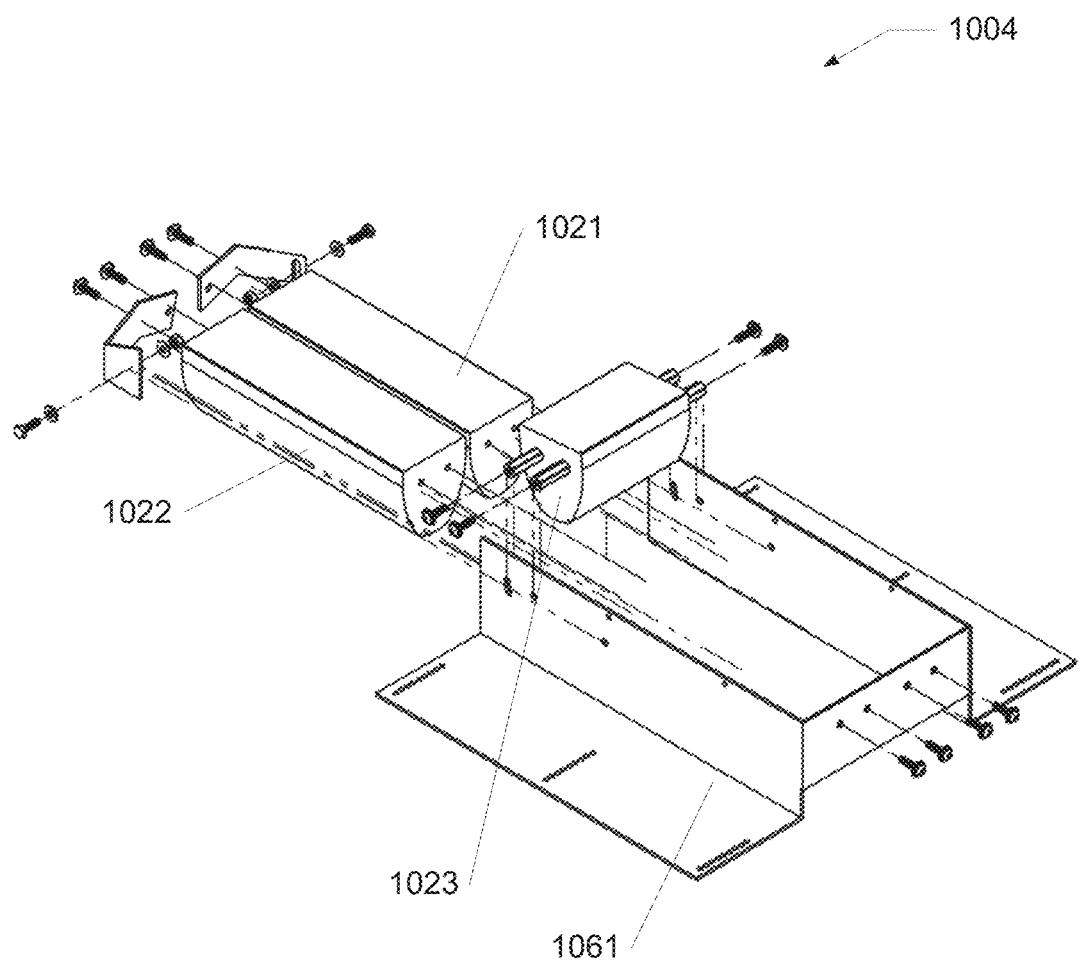
FIG. 10K illustrates an exploded view of a vertical lighting assembly, in accordance with the disclosed technology.

Referring now to FIG. 10K, illustrated is an exploded view of the vertical lighting assembly 1004, in accordance with the disclosed technology. The first light 1021, the second light 1022, and the third light 1023 can each attach to a vertical lighting frame 1061. The first light 1021, the second light 1022 and the third light 1023 can each attach to the vertical lighting frame 1061 through one or more screws, bolts, lag bolts, and/or any other particular fixing mechanism. The vertical lighting frame 1061 can be fixed to the shields 1002 and/or the line-scan system frame 1051.

Figure 10L:
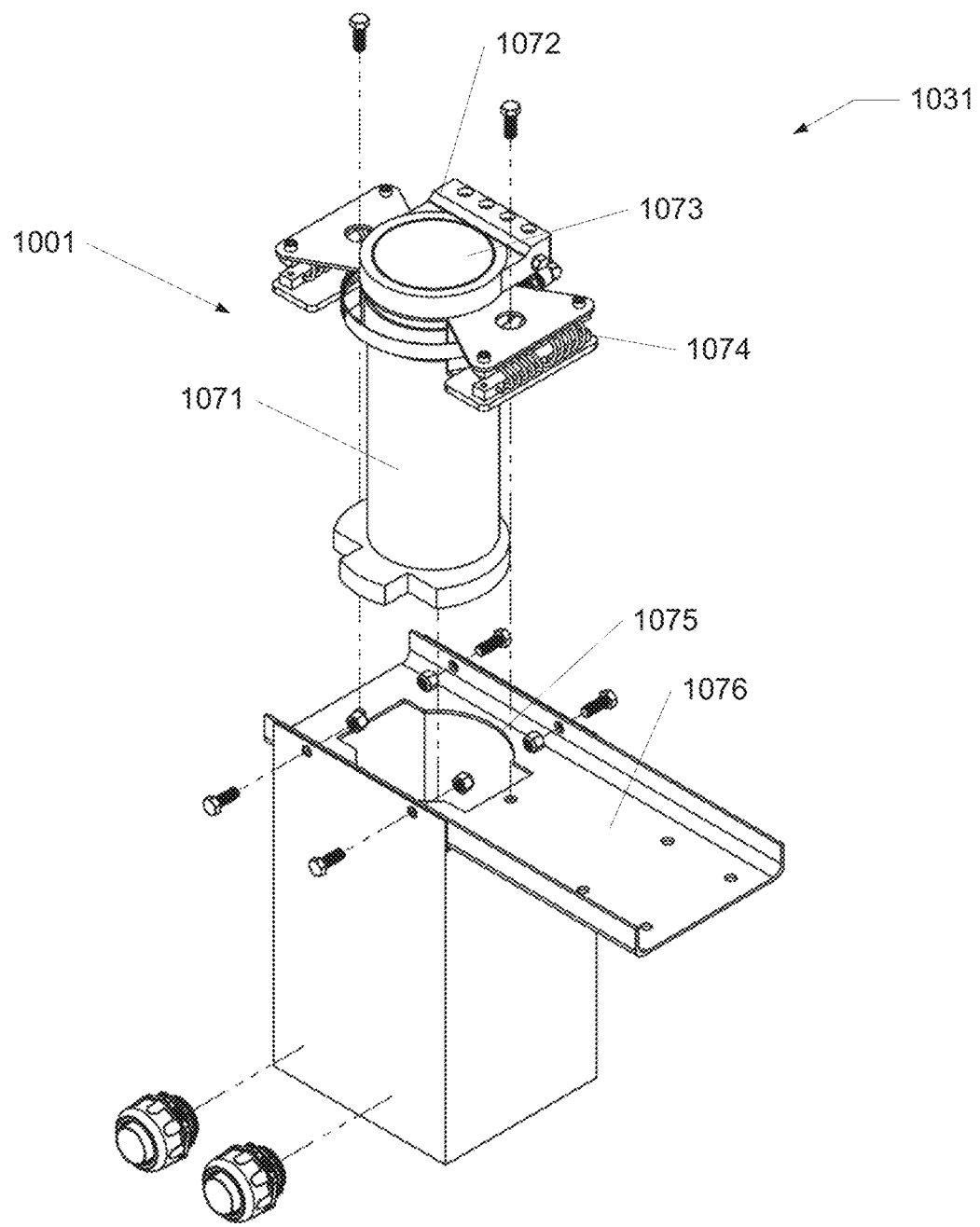
FIG. 10L illustrates an exploded view of a line-scan camera enclosure, in accordance with the disclosed technology.

Referring now to FIG. 10L, illustrated is an exploded view of the line-scan camera enclosure 1031, in accordance with the disclosed technology. The line-scan camera 1001 can include a housing 1071, an air curtain apparatus 1072, a lens 1073, and one or more dampeners 1074. The housing can include a hardened steel structure that can protect the internal components of the line-scan camera 1001. The air curtain apparatus 1072 can connect to a compressed air source to generate an air curtain. The air curtain can blow air over the lens 1073 to clean debris of the lens 1073. The dampeners 1074 can be or include one or more spring-based dampeners or other dampening devices used to reduce the mechanical vibrations exhibited onto the line-scan camera 1001 as the railcar passes over the undercarriage line-scan inspection assembly 802. The dampeners 1074 can be configured to adjustably set the spring tension and/or dampening effect, e.g., to compensate for different ranges of expected vibrations. The line-scan camera 1001 can partially extend through an enclosure aperture 1075 and fix to a top surface 1076 of the line-scan camera enclosure 1031.

Figure 11A:
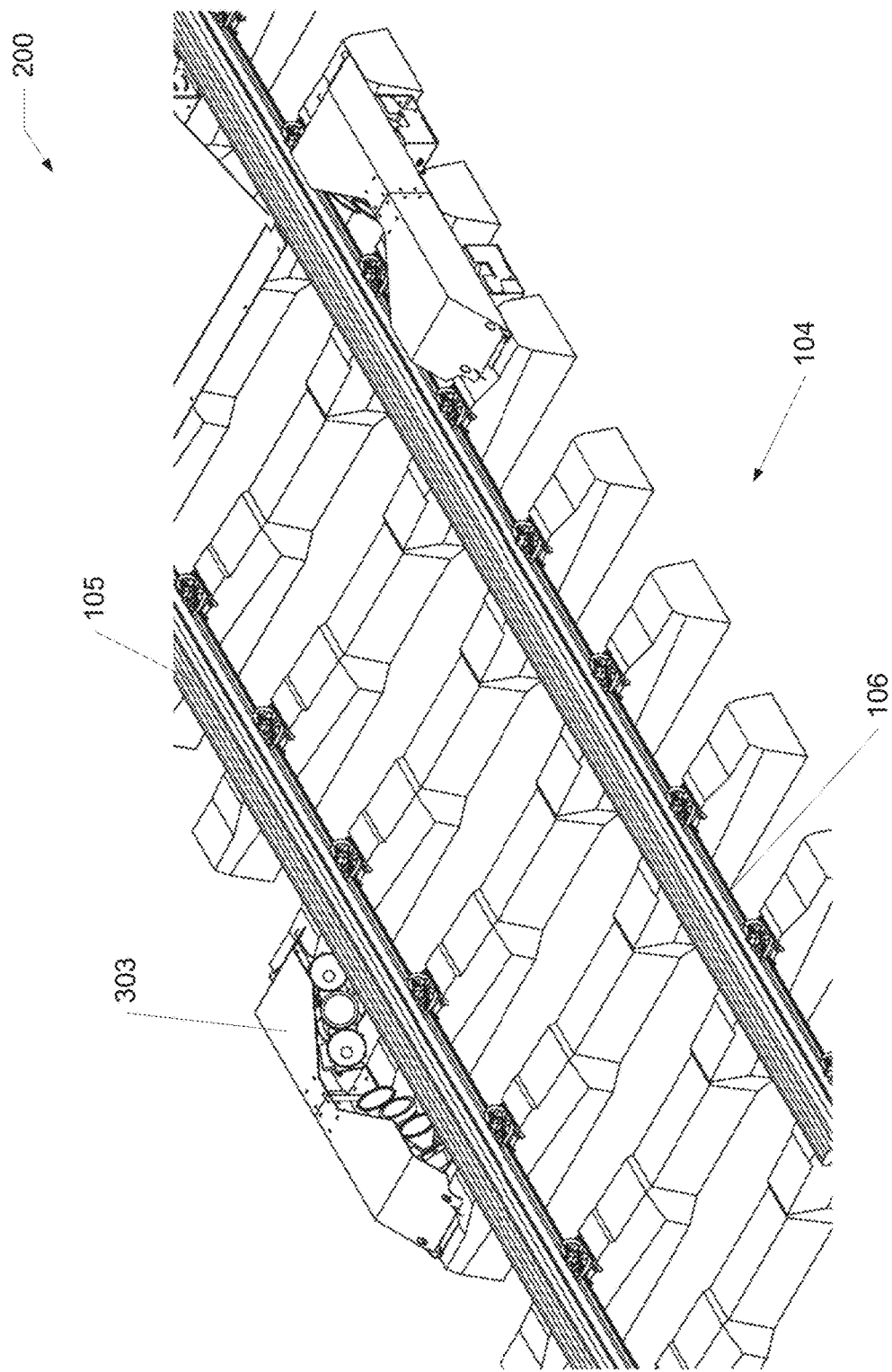
FIG. 11A illustrates a perspective view of an example installed rail-side inspection assembly, in accordance with the disclosed technology.

Referring now to FIG. 11A, an example inspection portal system 200 is discussed. As will be understood and appreciated, the inspection portal system 200 shown in FIG. 8 represents merely one approach or example of the disclosed technology, and other aspects can be used according to various examples of the disclosed technology.

The disclosed technology includes one or more rail-side inspection assemblies 303, which can capture images of one or more components of a moving object, such as a passing railcar. For example, the rail-side inspection assembly 303 can be configured to capture images of a target assembly, target sub-assembly, and/or target component (referenced herein as "target component" for clarity and/or brevity). The rail-side inspection assembly 303 can be configured to capture images of the target component when the target component passes the rail-side inspection assembly 303, and as such, the rail-side inspection assembly 303 can be configured to capture images from a target region, which can refer to a specific three-dimensional point, space, area, and/or region, such that the rail-side inspection assembly 303 can capture images of the target component as is passes the rail-side inspection assembly 303. For example, the rail-side inspection assembly 303 can be configured to capture images of a railcar's cross-key component, which can be located on the railcar's coupler. The rail-side inspection assembly 303 can include one or more cameras, example sensors, and/or example lights aimed at the target region, which can correspond to a lower region or portion of a given passing railcar. The various cameras, sensors, and/or lights of the rail-side inspection assembly 303 can be used to capture images and/or gather data on the target component (e.g., cross-key component of the railcar coupler).

For example, the rail-side inspection assembly 303 can capture images of the cross-key component of the railcar and/or other target components of a railcar. Continuing this example, a computing system in communication with the rail-side inspection assembly 303 can be configured to process the images generated by the rail-side inspection assembly 303 to detect any defects associated with the cross-key component or the target component.

The inspection system 200 can include two or more rail-side inspection assemblies 303, which can be positioned to capture images and/or other data on both sides of a passing railcar, as a non-limiting example. For, example, a first rail-side inspection assembly can be positioned on a first side of a train track 104, and a second rail-side inspection assembly can be positioned on a second side of the train track 104. Alternatively or in addition, two or more assemblies can be positioned on the same side of the tracks. One or more of the rail-side inspection assemblies 303 can be positioned adjacent to one or more rails 105 of the train track 104 (e.g., at or near the end of the rail ties 106). For example, the first rail-side inspection assembly can be located outside the rails on a first side of the train track 104, and the second rail-side inspection assembly can be located outside the rails on a second side of the train track 104. The term "outside" can refer to the region that is not between both the first and second rails 105. Alternatively or in addition, one or more rail-side inspection assembly 303 can be located between the rails 105. As discussed in more detail herein, the rail-side inspection assembly 303 can be attached to (and/or attachable to) one or more rail ties of the train track 104.

Alternatively or in addition, the rail-side inspection assembly 303 can be attached to (and/or attachable to) other locations, such as the ground, the ballast, another structure located proximate train tracks 104, as non-limiting examples. The rail-side inspection assembly 303 can be attached to (or attachable to) a top side of one or more rail ties. Alternatively or in addition, the rail-side inspection assembly 303 can be attached to (or attachable to) the side of one or more rail ties (e.g., such that some or all of the rail-side inspection assembly 303 is located between adjacent rail ties).

The rail-side inspection assembly 303 can include one or more cameras and/or one or more lights. As a non-limiting example, the rail-side inspection assembly 303 can include one or more arrays, and the arrays can each include one or more cameras and one or more lights. For example, a given array can be a linear array and can include a single camera bookended by a pair of lights, as a non-limiting example.

The cameras of the rail-side inspection assembly 303 can be or include line-scan cameras, area-scan cameras, and/or any other cameras capable of capturing images of target components of passing railcars. For example, the cameras and lights of the rail-side inspection assembly 303 can include particular machine vision cameras with high sensitivity. Alternatively or in addition, the cameras and lights of the rail-side inspection assembly 303 can capture clear images of railcars moving at high speeds. The cameras and lights of the rail-side inspection assembly 303 can include one or more cameras and one or more lights. For example, the rail-side inspection assembly 303 can include a camera positioned in between two lights. The lights can illuminate the location of the cross-key component such that the camera can gather images of the cross-key component with less than 2 mm of blur. The rail-side inspection assembly 303 can gather images and other data from railcars moving at speeds of up to 70 mph.

Figure 11B:
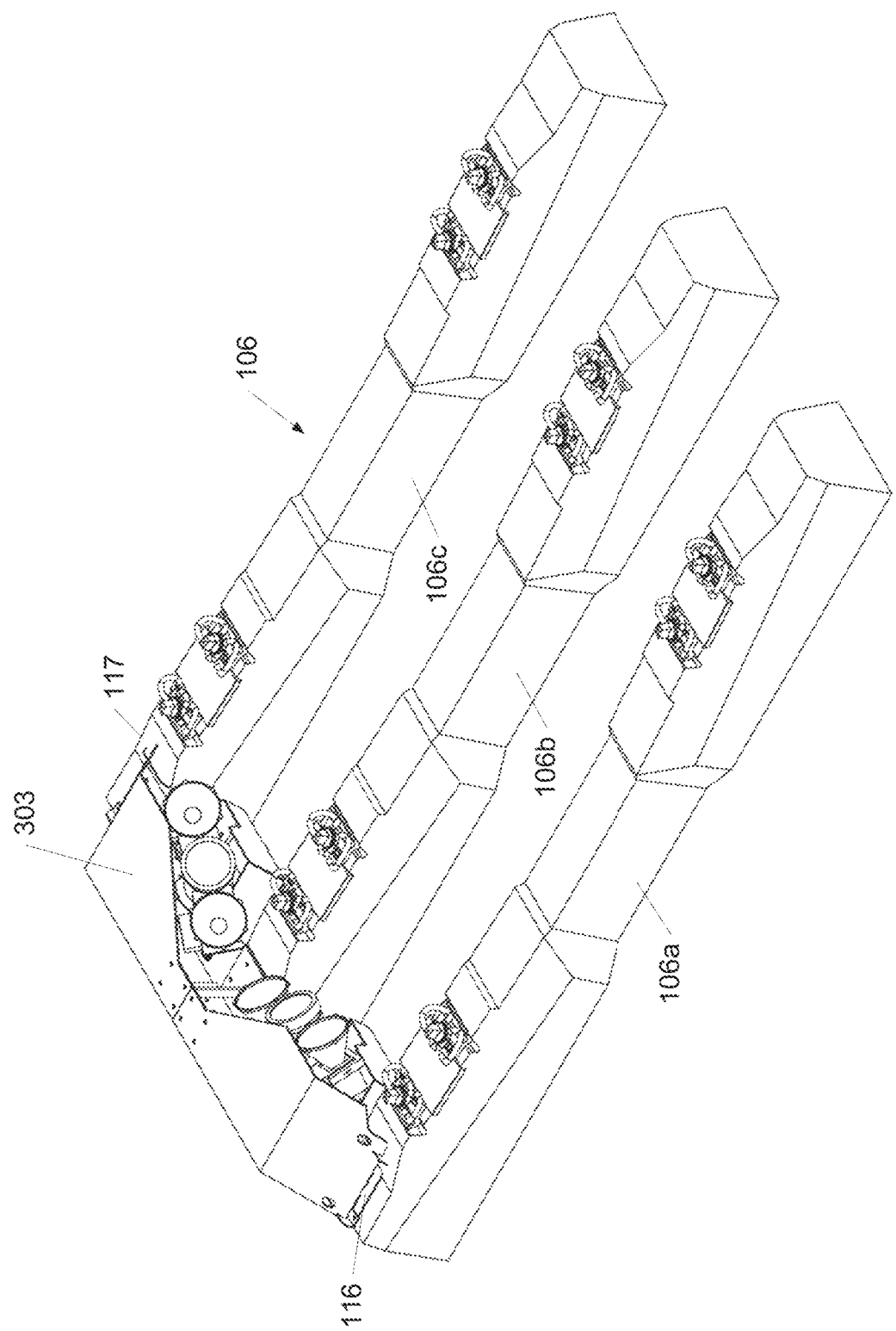
FIG. 11B illustrates a perspective view of an example installed rail-side inspection assembly, in accordance with the disclosed technology.

Referring now to FIG. 11B, illustrated is a perspective view of an example rail-side inspection assembly 303, in accordance with the disclosed technology. As disclosed herein, the rail-side inspection assembly 303 can be attached to rail ties 106. The rail-side inspection assembly 303 can be fixed to the rail ties 106 via one or more fasteners (e.g., screws, bolts, lag bolts, ties), one or more welding joints or other welds, and/or any other fixing mechanism capable of securing the rail-side inspection assembly 303 to the train tracks 104. For example and as illustrated, the rail-side inspection assembly 303 can be fixed to three adjacent rail ties 106. Continuing this example, the rail-side inspection assembly 303 can straddle a second rail tie 106b, where a first end 116 of the rail-side inspection assembly 303 can attach to a first rail tie 106a and a second end 117 of the rail-side inspection assembly 303 can attach to a third rail tie 106c.

The rail-side inspection assembly 303 can be configured to mount directly onto existing rail ties 106. For example, the rail-side inspection assembly 303 can include one or more mounting holes to account for variations in the train track 104 geometry and the spacings between the rail ties 106.

Figure 11C:
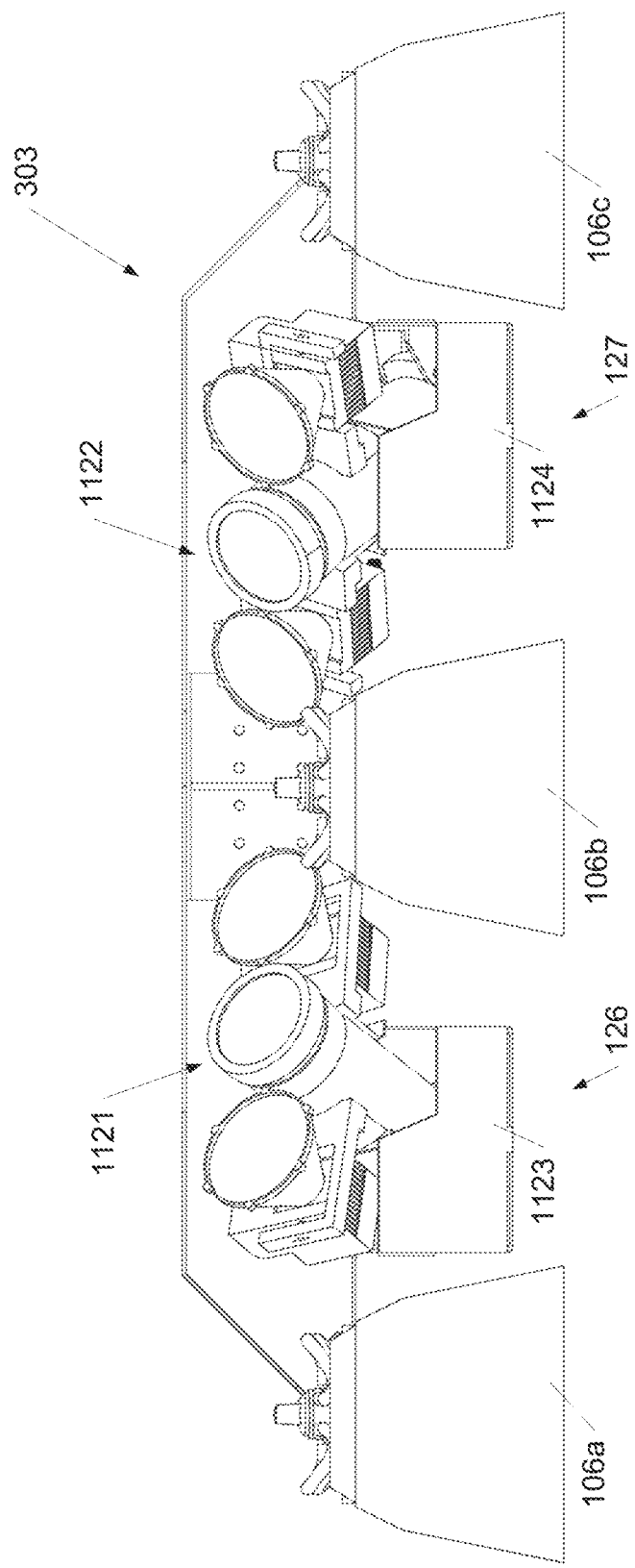
FIG. 11C illustrates a front-side view of an example installed rail-side inspection assembly, in accordance with the disclosed technology.

Referring now to FIG. 11C, illustrated is an example front-side view of the installed rail-side inspection assembly 303, in accordance with the disclosed technology. As illustrated, the rail-side inspection assembly 303 can include a first camera and light array 1121 and a second camera and light array 1122. However, the disclosed technology is not so limited and can include one, three, four, or more camera and light arrays. Alternatively or in addition, the rail-side inspection assembly 303 can include one or more cameras and/or one or more lights arranged in other (e.g., non-linear, non-array) configurations. For example, the rail-side inspection assembly 303 can include a camera positioned between a group of three, four, or more lights (e.g., arranged around or about the camera, such as in an equidistantly disposed arrangement).

Turning back to the rail-side inspection assembly illustrated in FIG. 11C, the rail-side inspection assembly 303 can include a base. The base can include a first base portion 1123 configured to support the first camera and light array 1121 and a second base portion 1124 configured to support the second camera and light array 1122. The first base portion 1123 can extend through a first gap 126 between the first rail tie 112 and the second rail tie 106b. The second base portion 1123 can extend through a second gap 127 between the second rial tie 106b and the third rail tie 106c. The first camera and light array 1121 and the second camera and light array 1122 can straddle the second rail tie 106b. The rail-side inspection assembly 303 can attach to the first rail tie 112, the second rail tie 106b, and/or the third rail tie 106c via one or more screws, bolts, and/or any other fixing mechanism.

Figure 11D:
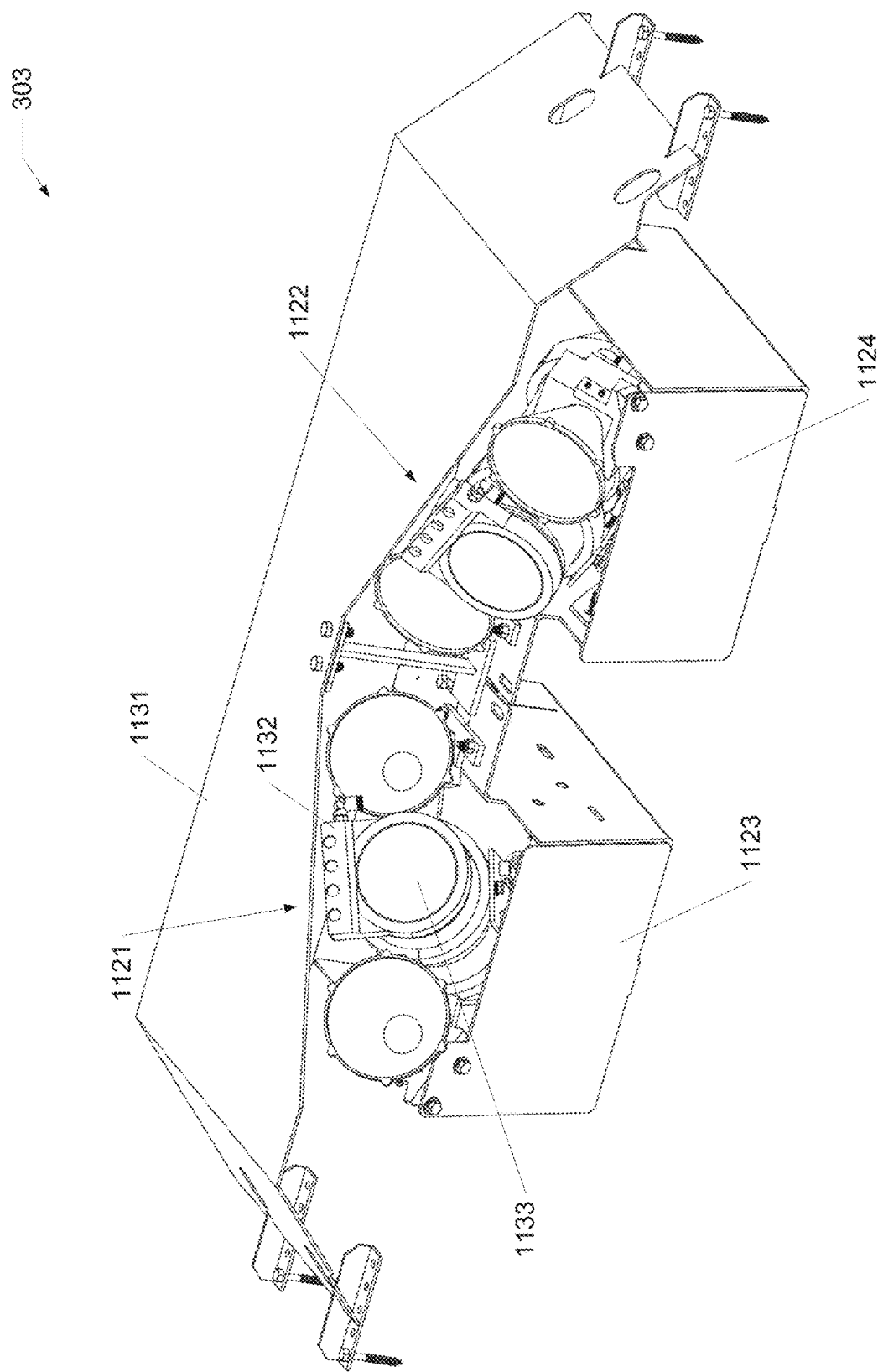
FIG. 11D illustrates a perspective view of an example rail-side inspection assembly, in accordance with the disclosed technology.

Referring now to FIG. 11D, illustrated is another perspective view of the rail-side inspection assembly 303, in accordance with the disclosed technology. The rail-side inspection assembly 303 can include one or more air curtains 1132. A given air curtain 1132 can be installed on, near, and/or adjacent to one or more cameras. For example, a first air curtain 1132 can be installed at or on the camera of the first camera and light array 1121, and a second air curtain 1132 can be installed at or on the camera of the second camera and light array 1122. The air curtain 1132 can be in fluid communication with a compressed air source to provide compressed air at the camera(s) that flows over the lenses of the camera 1133. The air curtains 1132 can clean the lenses of the cameras 1133 during use from debris.

The rail side inspection assembly 303 can include a first camera and light array 1121 and a second camera and light array 1122. The first camera and light array 1121 and the second camera and light array 1122 can each be angled to a corresponding target region (e.g., a point or region in a three-dimensional space). Alternatively or in addition, the first camera and light array 1121 and the second camera and light array 1122 can be directed to a single, common target region, such that images of the target region (e.g., of a target component when it is located in the target region) can be captured. For example, the first camera and light array 1121 can be angled at least partially in a vertical direction and at least partially in a horizontal direction to point at the expected location of the cross-key component or other component of a railcar. Continuing this example, the second camera and light array 1122 can be partially angled in an at least partially vertical direction and an at least partially horizontal direction to point at the expected location of the cross-key component or other component of a railcar. The first camera and light array 1121 and the second camera and light array 1122 can be differently and/or oppositely angled such that the camera and light arrays point to the same location but from different angles and/or viewpoints. Accordingly, the rail-side inspection assembly can be configured to contemporaneously and/or simultaneously capture images of a single target region (e.g., point and/or region) and/or a single target component from different angles, which can be useful in detecting defects associated with the target component, as a non-limiting example.

The camera and light arrays 1121, 1122 can include the cameras 1133 and the lights 1151. The cameras 1133 can include specialized machine vision cameras with high sensitivity to generate images of the cross-key component of the passing railcar. For example, the cameras 1133 can include high-speed, high resolution, and a highly sensitive sensor. The lights 1151 can include any particular light that is capable of illuminating the three-dimensional space in which the cross-key component is present. For example, the lights 1151 can include 150 W lights capable of illuminating the area in which the cross-key component is present.

The camera and light arrays 1121, 1122 can include similar configurations. For example, the camera and light arrays 1121, 1122 can each include one camera 1133 and two lights 1151. The camera 1133 can be positioned between the two lights 1151. The two lights can equally illuminate an area such that the camera 1133 can generate a low blur and high-quality image of the cross-key component.

The rail-side inspection assembly 303 can include a shroud 10631, the first base portion 1123, and the second base portion 1124. The first base portion 1123 and the second base portion 1123 can support the first camera and light array 1121 and the second camera and light array 1122, respectively. The first base portion 1123 and the second base portion 1123 can protect the first camera and light array 1121 and the second camera light array 1122 from debris as a railcar passes the rail-side inspection assembly 303. Alternatively or in addition, the shroud 10631 can protect the first camera and light array 1121 and the second camera and light array 1122 from debris as a railcar passes the rail-side inspection assembly 303.

The first base portion 1123 and the second base portion 1124 can rest on a ballast (e.g., the ground) between the rail ties 106. For example, the first base portion 1123 and the second base portion 1124 can have a height less than the rail ties 106 such that the first base portion 1123 and the second base portion 1124 are suspended off the ballast. The first camera and light array 1121 and the second camera and light array 1122 can be configured to partially extend into the ballast and capture images from a viewpoint that is approximately at least 1 inch above the rail ties 106, 1 to 6 inches above the rail ties 106, or less than 6 inches above the rail ties 106, as non-limiting examples.

Figure 11E:
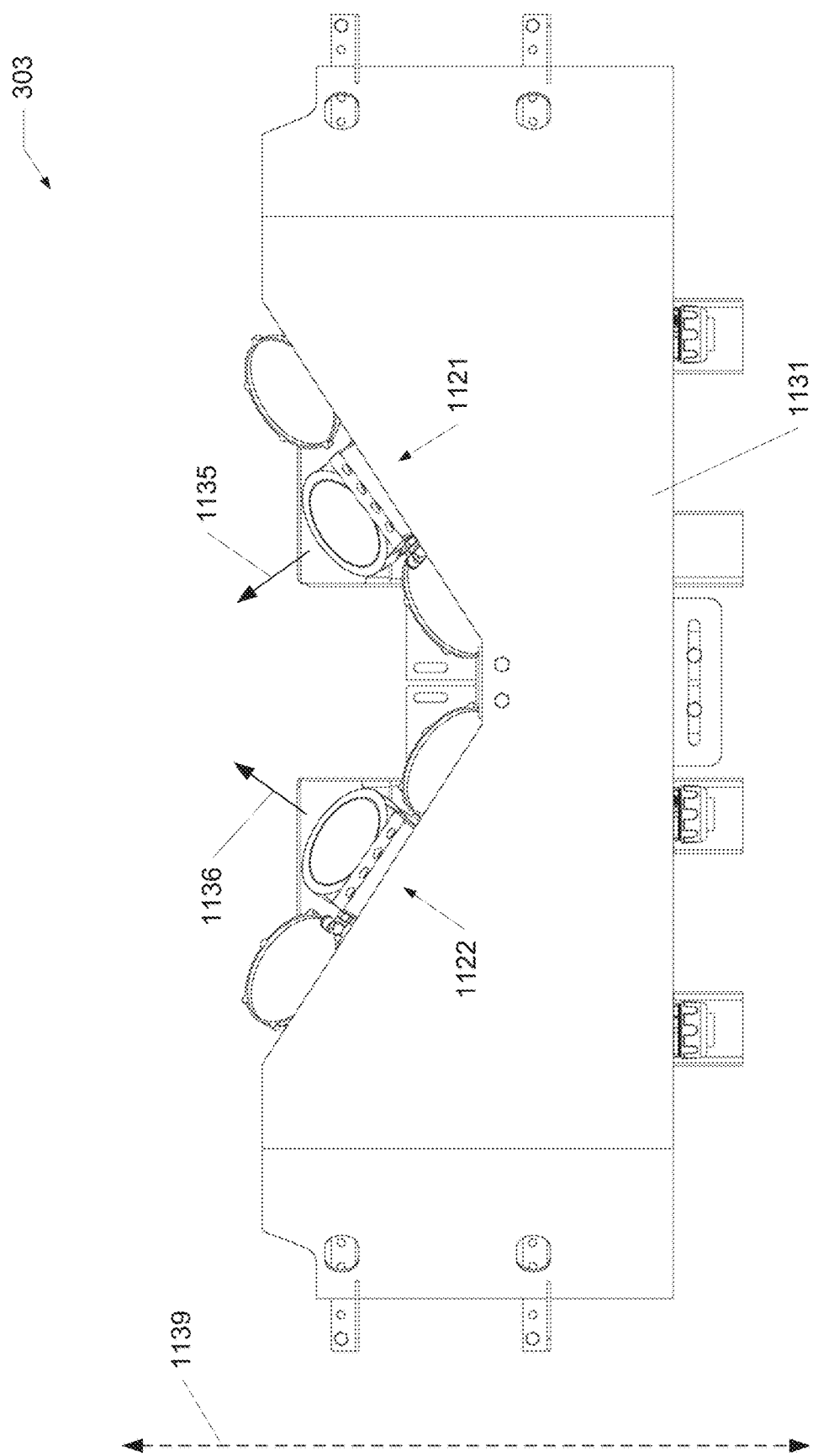
FIG. 11E illustrates a top view of an example rail-side inspection assembly, in accordance with the disclosed technology.

Referring now to FIG. 11E, illustrated is an example top view of the rail-side inspection assembly 303, in accordance with the disclosed technology. The first camera and light array 1121 and the second camera and light array 1122 can point in a first direction 1135 and a second direction 1136, respectively. The first direction 1135 and the second direction 1136 can indicate the angle at which the first camera and light array 1121 and the second camera and light array 1122 are positioned relative to a first axis 1139. The angle between the first direction 1135 and the second direction 1136 can be approximately 40 degrees, approximately 45 degrees, approximately 50 degrees, in a range between approximately 40 degrees and approximately 50 degrees, in a range between approximately 40 degrees and approximately 60 degrees, in a range between approximately 30 degrees and approximately 50 degrees, and/or in a range between approximately 30 degrees and approximately 60 degrees, as non-limiting examples. The angles between the first direction 1135 and the first axis 1139 and between the second direction 1136 and the first axis 1139, respectively, can be the same. Alternatively, the angles between the first direction 1135 and the first axis 1139 and the second direction 1136 can be different. For example, the angle between the first direction 1135 and the first axis 1139 can be in a range between approximately 0 degrees and approximately 60 degrees, in a range between approximately 15 degrees and approximately 45 degrees, or in a range between approximately 30 degrees and 50 degrees, as non-limiting examples, and the angle between the second direction 1136 and the and the first axis 1139 can be (i) different the angle between the first direction 1135 and the first axis 1139 and (ii) in a range between approximately 0 degrees and approximately 60 degrees, in a range between approximately 15 degrees and approximately 45 degrees, or in a range between approximately 30 degrees and 50 degrees, as non-limiting examples.

The shroud 10631 can partially expose the first camera and light array 1121 and the second camera and light array 1122. The shroud 10631 can protect the first camera and light array 1121 and the second camera and light array 1122 while allowing the first camera and light array 1121 and the second camera and light array 1122 to gather data on the cross-key component of the passing railcar. The shroud 10631 can be constructed out of hardened steel, stainless steel, aluminum, and/or any other material capable of protecting the components of the rail-side inspection assembly 303.

Figure 11F:
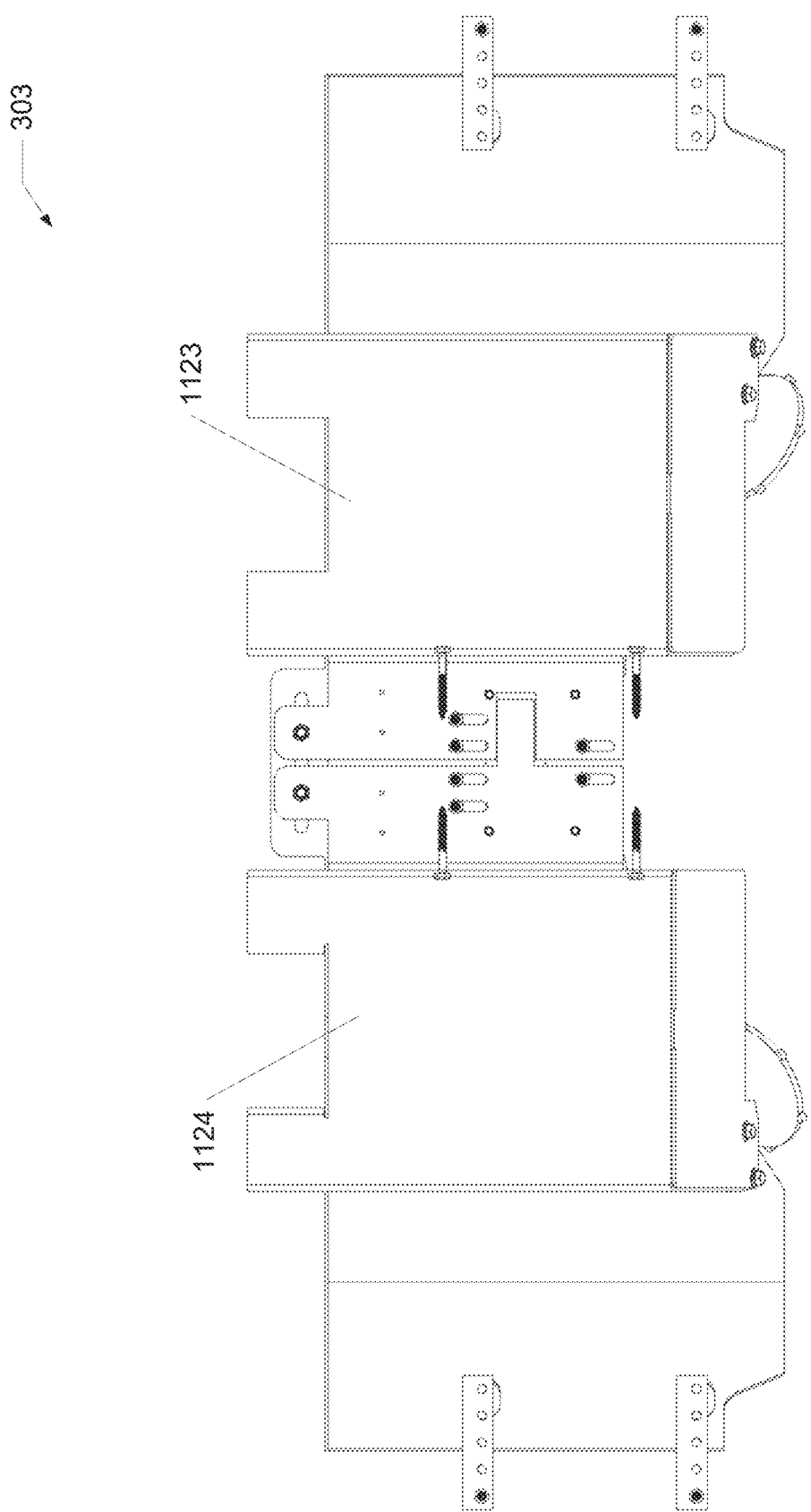
FIG. 11F illustrates a bottom view of an example rail-side inspection assembly, in accordance with the disclosed technology.

Referring now to FIG. 11F, illustrated is an example bottom view of the rail-side inspection assembly 303, in accordance with the disclosed technology. The rail-side inspection assembly 303 can include the first base portion 1123 and the second base portion 1123. The first base portion 1123 and the second base portion 1123 can protect the bottom portion of the first camera and light assembly 1121 and the second camera and light assembly 1122. For example, as the railcar passes the rail-side inspection assembly 303, the first base portion 1123 and the second base portion 1123 can protect the first camera and light array 1121 and the second camera and light array 1122. The first base portion 1123 and the second base portion 1123 can be constructed out of hardened steel, stainless steel, aluminum, and/or any other material capable of protecting the components of the rail-side inspection assembly 303.

Figure 11G:
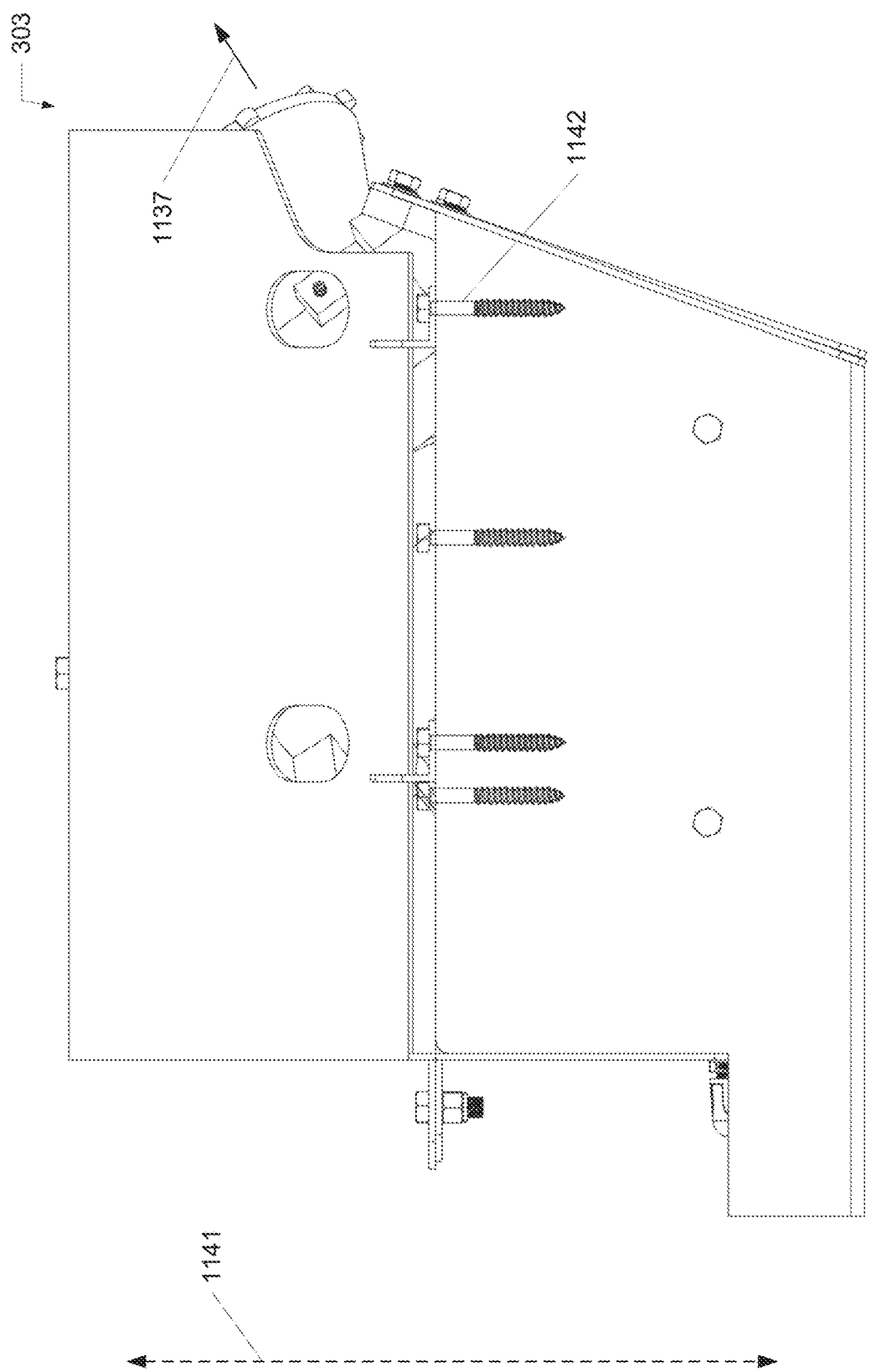
FIG. 11G illustrates a right-side view of an example rail-side inspection assembly, in accordance with the disclosed technology.

Referring now to FIG. 11G, illustrated is an example left-side view of the rail-side inspection assembly 303, in accordance with the disclosed technology. The rail-side inspection assembly 303 can include one or more screws 1142 at the first end 116 of the rail-side inspection assembly 303. The one or more screws 1142 can fix the rail-side inspection assembly 303 to the one or more rail ties 106.

The rail-side inspection assembly 303 can include a third direction 1137. The third direction 1137 can indicate the direction in which the first camera and light array 1121 and the second camera and light array 1122 are pointed. The third direction 1137 can be angled relative to the second axis 10641. The angle between the third direction 1137 and the second axis 10641 can be in a range between approximately 15 degrees and approximately 60 degrees, between approximately 20 degrees and approximately 30 degrees, between approximately 30 degrees and approximately 40 degrees, and/or between approximately 50 degrees and approximately 60 degrees, as non-limiting examples.

Figure 11H:
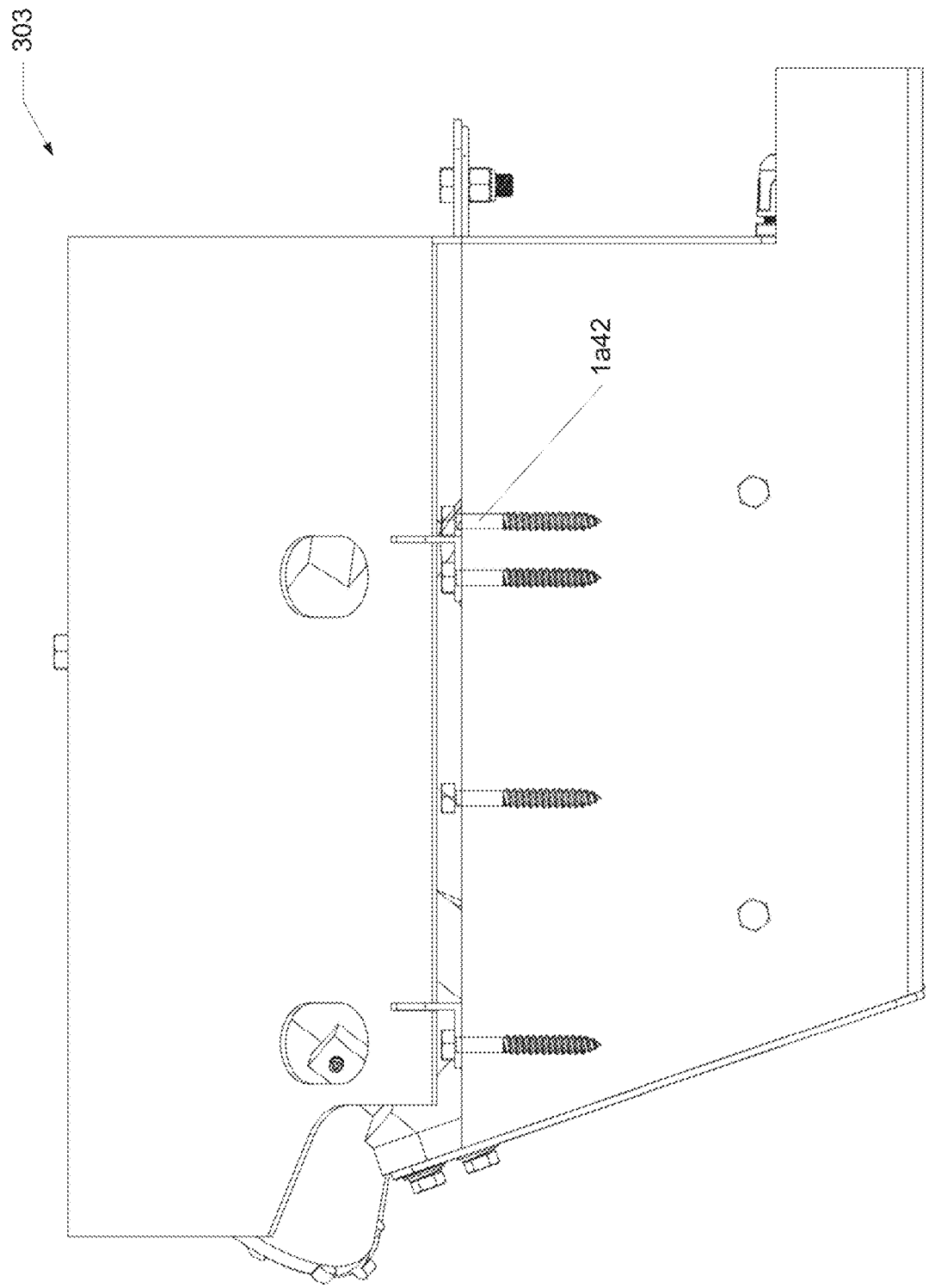
FIG. 11H illustrates a left-side view of an example rail-side inspection assembly, in accordance with the disclosed technology.

Referring now to FIG. 11H, illustrated is a right-side view of the rail-side inspection assembly 303, in accordance with the disclosed technology. The rail-side inspection assembly 303 can include one or more screws 1142 at the second end 117 of the rail-side inspection assembly 303. The one or more screws 1142 can fix the rail-side inspection assembly 303 to the one or more rail ties 106. For example, the one or more screws 1142 can fix the rail-side inspection assembly 303 to the third rail tie 106c.

Figure 11I:
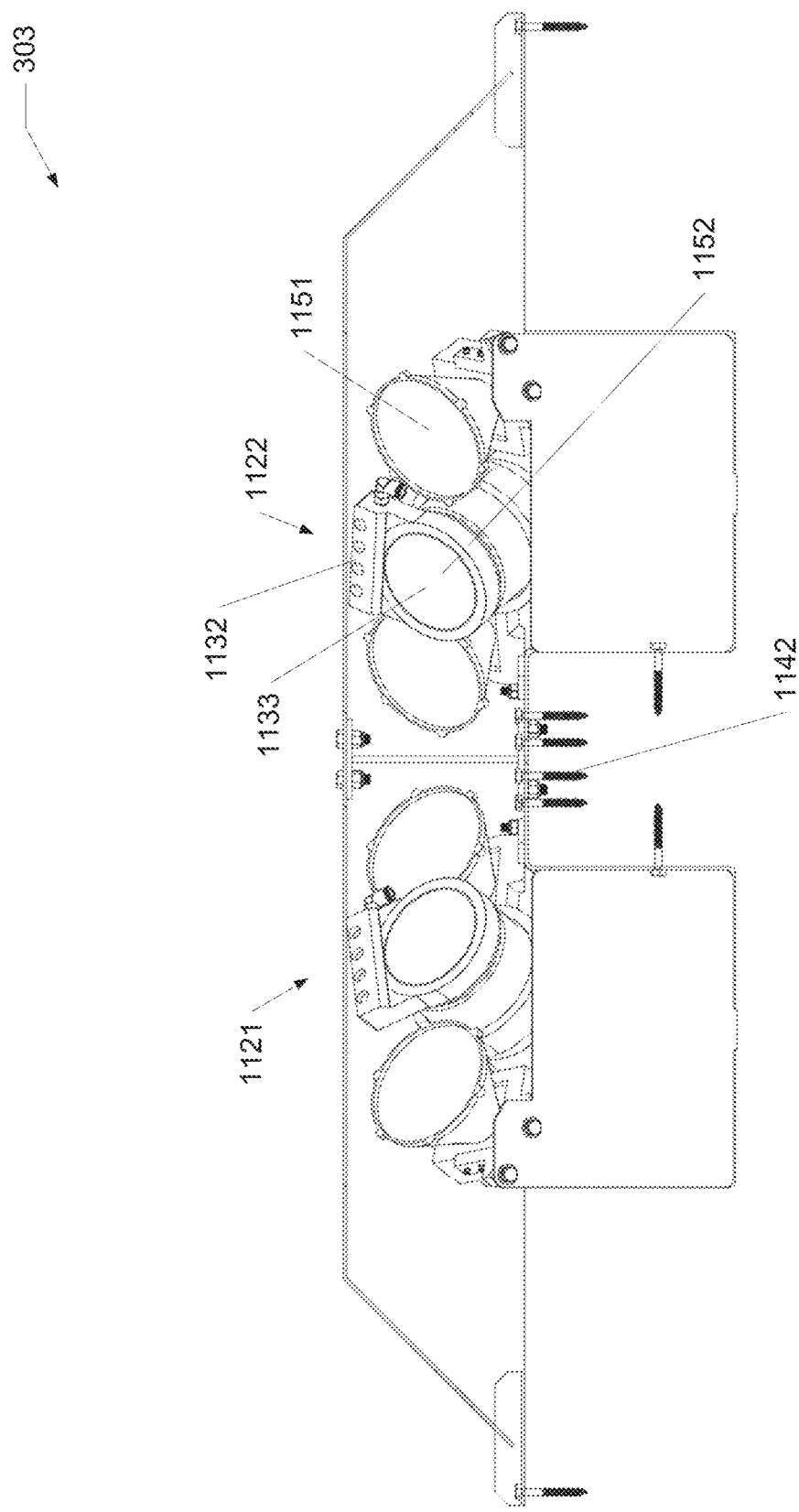
FIG. 11I illustrates a front-side view of an example rail-side inspection assembly, in accordance with the disclosed technology.

Referring now to FIG. 11I, illustrated is an example front side view of the rail-side inspection assembly 303, in accordance with the disclosed technology. The camera and light arrays 1121, 1122 of the rail-side inspection assembly 303 can include the one or more cameras 1133 and one or more lights 1121. The one or more cameras 1133 can each include the air curtain 1132. The air curtain 1132 can connect to a compressed air source. The compressed air source can feed the air curtain 1132 with air. The air curtain 1132 can employ the air to generate an air curtain over a lens 1152 of the camera 1133. The air curtain can blow air over the lens 1152 such that any debris that accumulates on the lens 1152 is blown off and removed from the lens 1152. The air curtain 1132 can generate air used to cool the components of the rail-side inspection assembly 303.

The rail-side inspection assembly 303 can include one or more screws 1142. The one or more screws 1142 can fix the rail-side inspection assembly 303 to the one or more rail ties 106. For example, the screws 1142 can attach to the second rail tie 106b. Though illustrated as screws, any particular similar fixing mechanism can be used to secure the rail-side inspection assembly 303 to the rail ties 106 (e.g., bolts, welding points, ties, etc.).

Figure 11J:
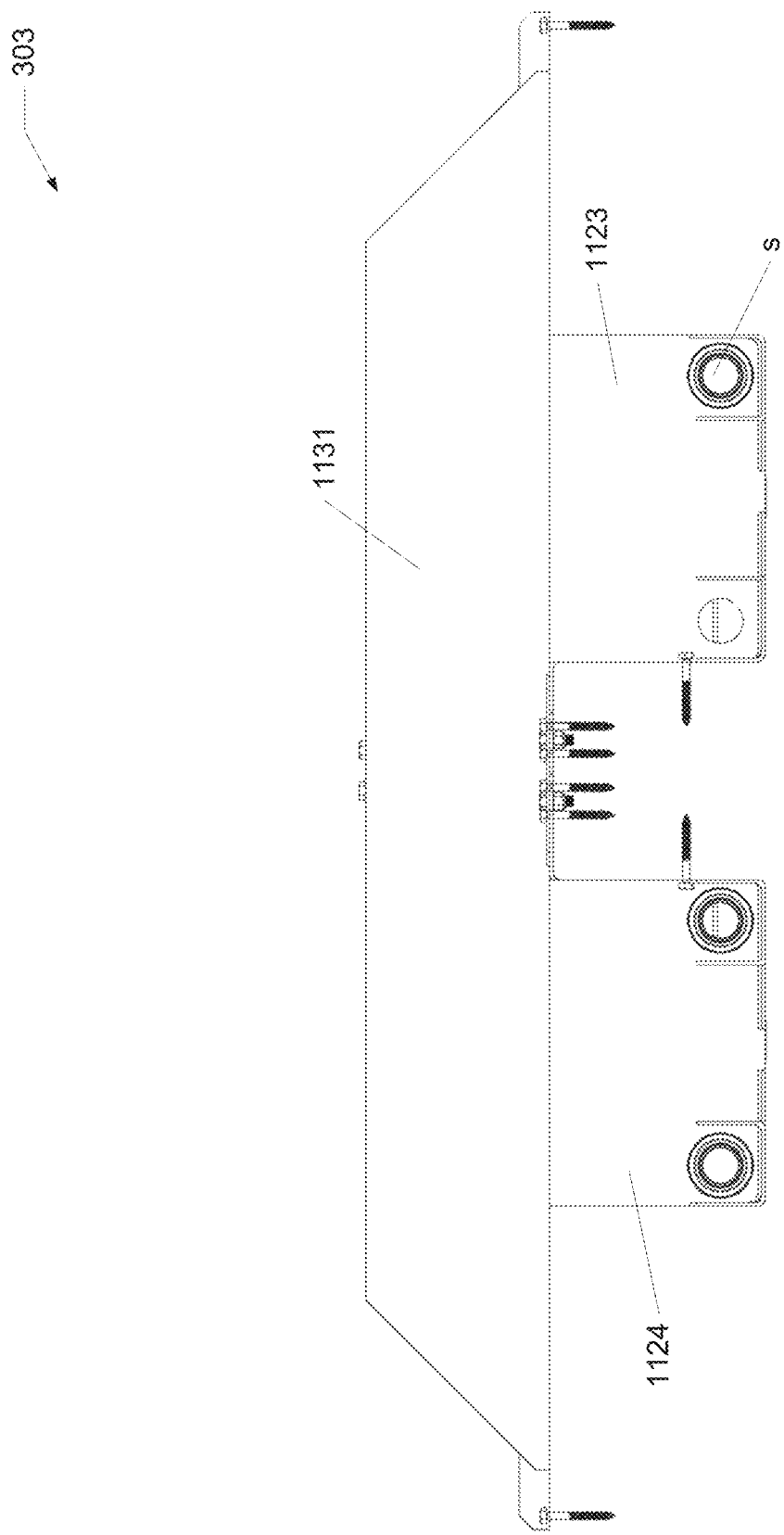
FIG. 11J illustrates a back-side view of an example rail-side inspection assembly, in accordance with the disclosed technology.

Referring now to FIG. 11J, illustrated is a backside view of the rail-side inspection assembly 303, in accordance with the disclosed technology. The shroud 10631 of the rail-side inspection assembly 303 can extend around the camera and light arrays 1121, 1122. The shroud 10631 can protect the rear of the camera and light arrays 1121, 1122 such that the camera and light arrays 1121, 1122 are not damaged by debris during use. The rail-side inspection assembly 303 can include one or more conduit adapters such that various wires and/or compressed air cables can run through the rail-side inspection assembly 303. The rail-side inspection assembly 303 can include one or more conduit adapter 1153. The conduit adapter 1153 can allow one or more wires and/or one or more hoses to pass into the first base portion 1123 and the second base portion 1124 while maintaining a watertight configuration.

Figure 11K:
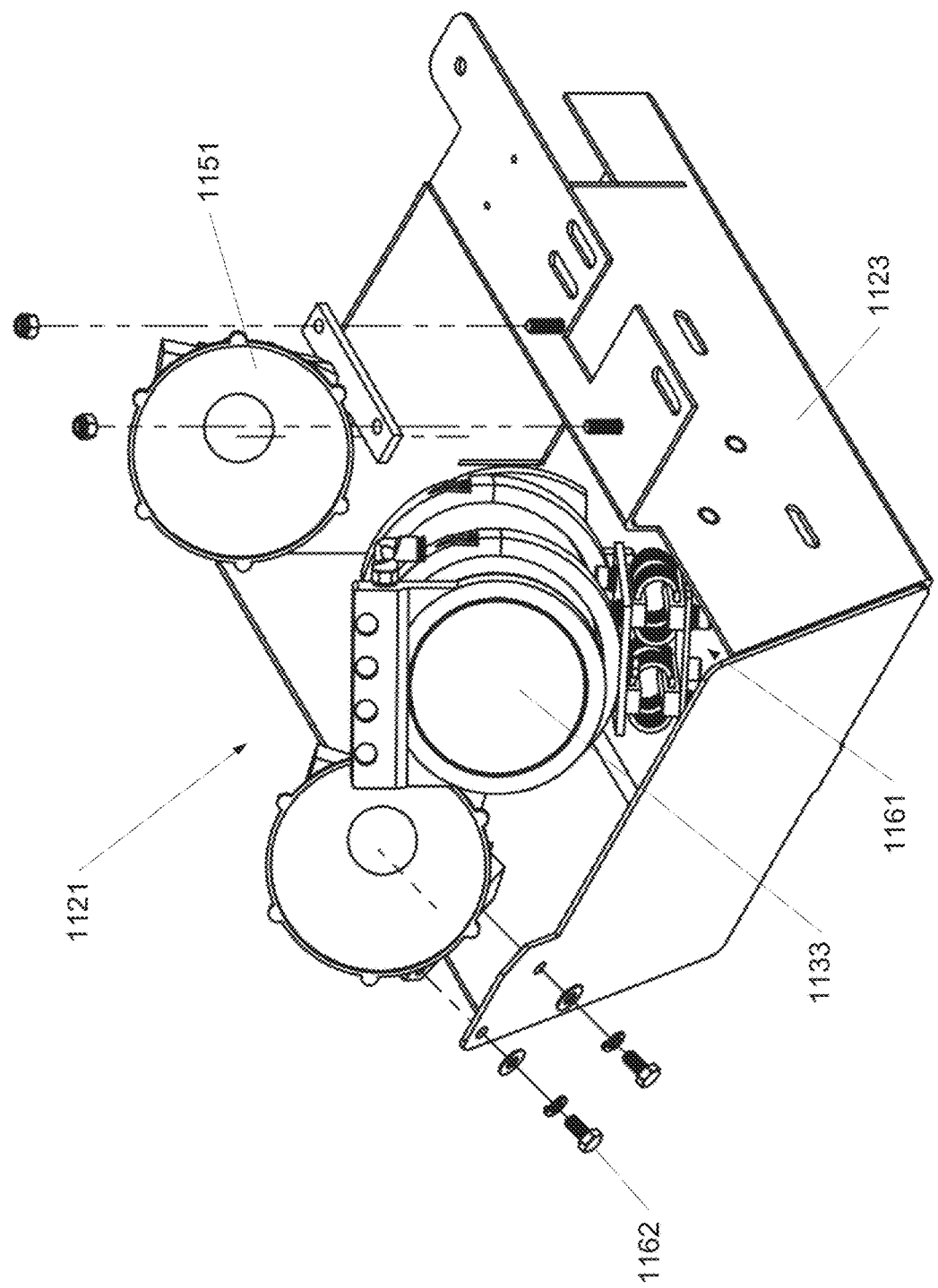
FIG. 11K illustrates a partial exploded perspective view of an example camera enclosure, in accordance with the disclosed technology.

Referring now to FIG. 11K, illustrated is an example partially exploded view of the first camera and light array 1121 and the first base portion 1123, in accordance with the disclosed technology. However, the various components and/or configurations discussed herein can apply to other aspects of the disclosed technology, such as the second camera and light array 1122 and the first base portion 1123, as a non-limiting example. The first camera and light array 1121 can be attached to the first base portion 1123. The lights 1151 can be fixed to the first base portion 1123. For example, the lights 1151 can include one or more screws 1162 that fix or attach the lights 1151 to the first base portion 1123. The camera 1133 can be attached to the first base portion 1123. Alternatively or in addition, and as discussed in further detail herein, first camera and light array 1121 and or the camera 1133 alone can be fixed or attached to the first base portion 1123 via a dampening system 10661. The dampening system 10661 can reduce the mechanical vibrations exhibited by the camera 1133 as a train passes the rail-side inspection assembly 303.

Figure 11L:
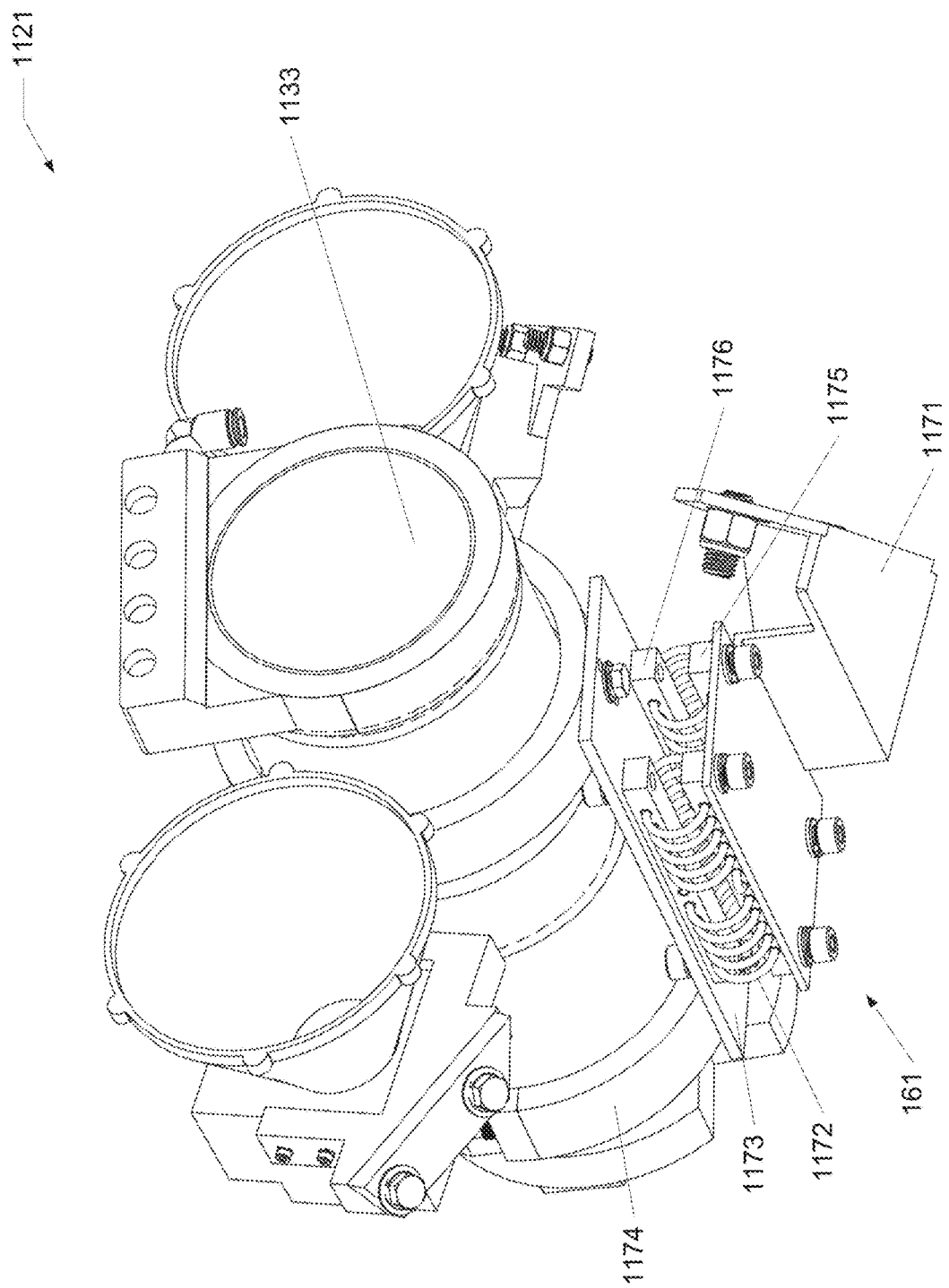
FIG. 11L illustrates a perspective view of an example camera and light array, in accordance with the disclosed technology.

Referring now to FIG. 11L, illustrated is an example perspective view of the first camera and light assembly 1121, in accordance with the disclosed technology. The various components discussed herein can apply to both the first camera and light assembly 1121 and the second camera and light assembly 1122, though only the first camera and light assembly 1121 is illustrated for the sake of brevity. The first camera and light assembly 1121 can include the dampening system 10661. The dampening system 10661 can reduce the mechanical vibrations exerted on the camera 1133 generated from a particular passing railcar. The dampening system 10661 can include a lower plate 10671, one or more springs 1172 (or other dampening devices), an upper plate 1173, and one or more ties 1174 (e.g., mounting rings). The lower plate 10671 can attach to the first base portion 1123 (e.g., as shown in further details in FIG. 11M). The one or more springs 1172 can extend through a first attachment point 1175 of the lower plate 10671. The one or more springs 1172 can extend through a second attachment point 1176 of the upper plate 1173, operatively connecting the upper plate 1173 to the lower plate 10671. The upper plate 1173 can attach to the camera 1133 through one or more ties 1174. By connecting through the one or more ties 1174, the camera 1133 can be fixed to the first base portion 1123 through the upper plate 1173, the one or more springs 1172, and the lower plate 10671. The one or more springs 1172 can dampen for the camera 1133 any mechanical vibrations generated by the passing railcar.

Figure 11M:
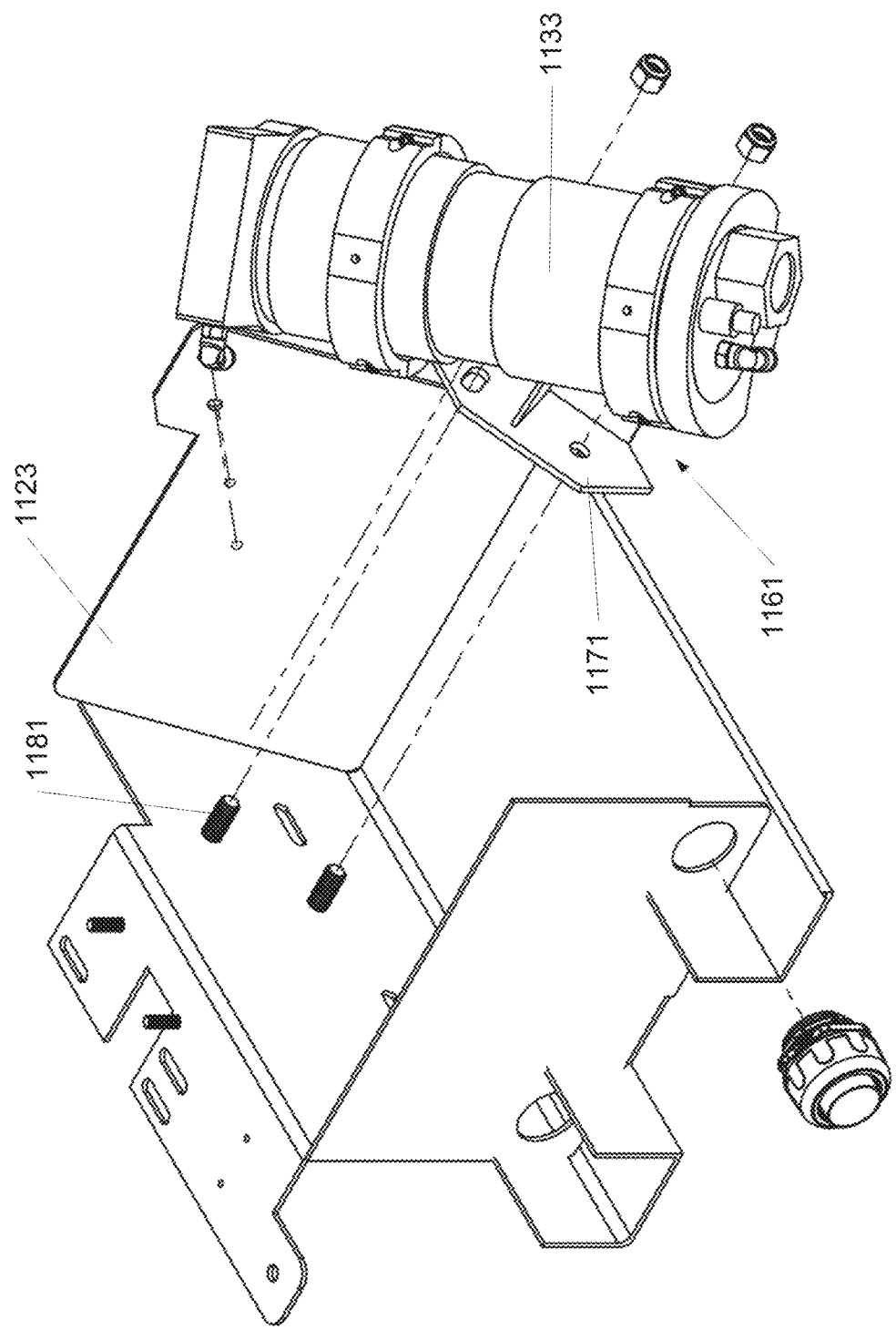
FIG. 11M illustrates a partial exploded perspective view of an example camera enclosure, in accordance with the disclosed technology.

Referring now to FIG. 11M, illustrated is an example partially exploded view of the first base portion 1123, in accordance with the disclosed technology. The various components discussed herein can apply to both the first base portion 1123 and the second base portion 1123, though only the first base portion 1123 is illustrated for the sake of brevity. The camera 1133 can be attached to the first base portion 1123 through the dampening system 10661. The dampening system 10661 can include the lower plate 10671. The lower plate 10671 can attach to the first base portion 1123 through the one or more screws 10681. The lower plate 10671 can fix the camera 1133 to the first base portion 1123.

Example Railcar Detection and Speed Estimation Systems

Figure 12:
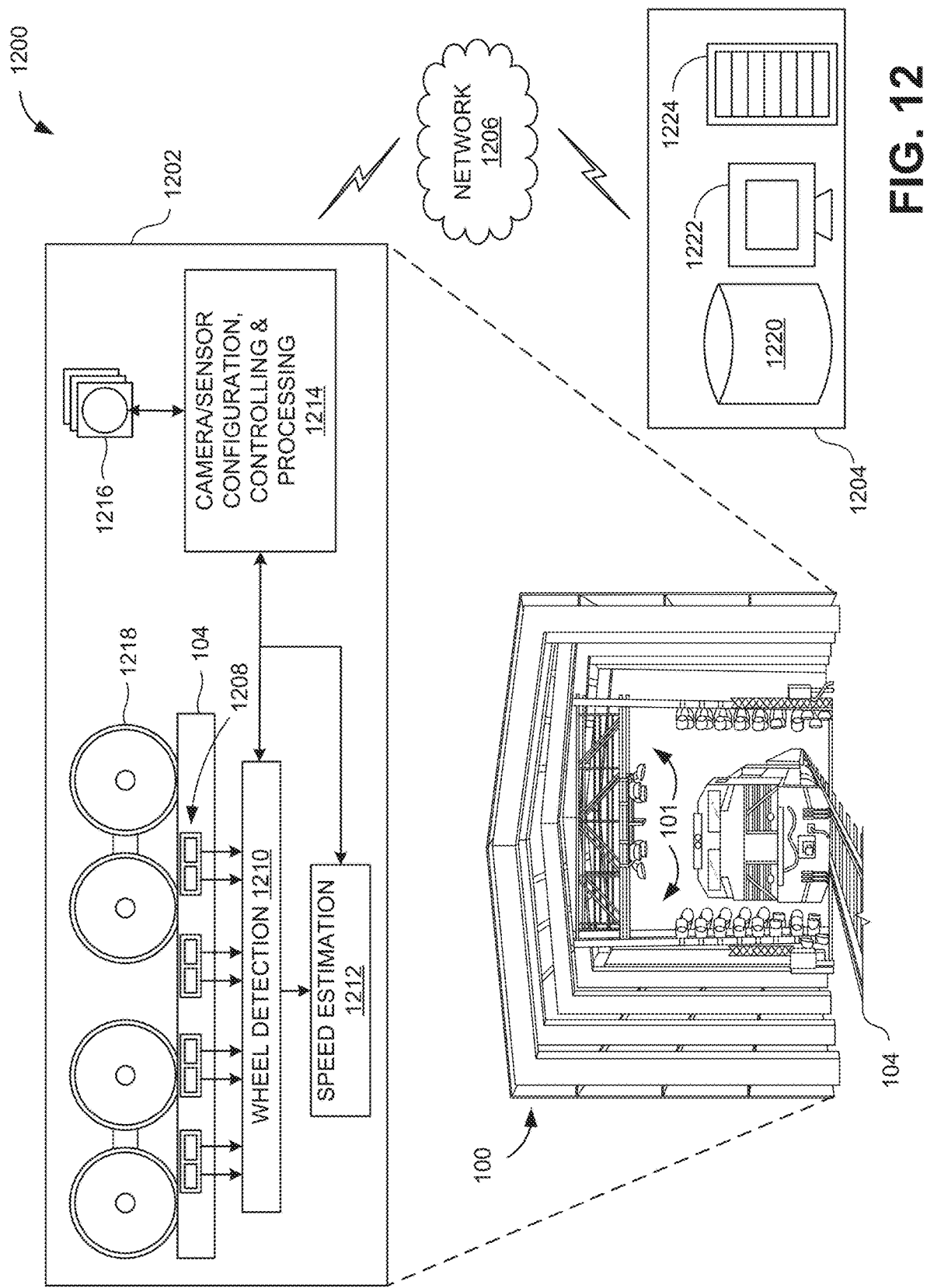
FIG. 12 is a diagram illustrating an example operational environment of the train inspection system, inspection portal, and accompanying computing systems, in accordance with the disclosed technology.

FIG. 12 is a diagram illustrating a general overview and operational environment 1200 of the train inspection system 100 and inspection portal structure 101 (as introduced above in connection with the description of FIG. 1), and the computing system(s) operatively connected thereto. As is described throughout the present disclosure, the inspection portal can include a physical structure, such as a tunnel or the like, installed over, around, adjacent to, physically proximate to, etc., a railroad track. Accordingly, the inspection portal and accompanying system can be configured to detect railcars (also referred to herein as trains) as they approach the inspection portal. The inspection portal and system can configure and instruct one or more cameras, sensors, and the like, to capture data from railcars as the railcars approach and travel through the inspection portal. Moreover, the inspection portal and system can process the captured data to identify defects and/or anomalies in connection with railcars, specific railcar components, etc. Further, the system can be configured to perform self-assessed health checks corresponding to the system's ability to capture and process images and readings in connection with railcars. Notwithstanding the example discussion herein in connection with a railroad setting, it should be understood that a railroad setting is just one example setting in which the system can be used, and such example setting is not intended to be limiting. In particular, the disclosed system can be used in other vehicle settings. For example, the system can be used in roadway settings, such as in toll booths, truck weigh stations, freight truck loading stations or docks, security checkpoints, airplane hangars or gates, etc., and generally any scenario in which it would be useful for having a vehicle inspected. To the extent that any specific components are configured to accommodate a railroad environment, those components can be modified to accommodate other settings contemplated herein, or similar components more suitable to the other settings can be used without departing from the inventive aspects of the system as discussed herein.

As shown in the operational environment 1200, the train inspection system 100 and the inspection portal 101 can include at least a railcar detection system 1202 and a processing system 1204. The railcar detection system 1202 and the processing system 1204 can be operatively connected by a network 1206. The network can include one or more wireless or wired connections. For example, the network can be a wired or wireless network (e.g., ethernet, USB, LAN, WLAN, etc.). As will be understood from the present disclosure, the railcar detection system 1202 and the processing system 1204 can together perform the processes discussed herein. Accordingly, in various examples throughout the present disclosure, the railcar detection system 1202 and the processing system 1204 can be referred to jointly as the inspection portal system, or the system.

The railcar detection system 1202 can include a plurality of wheel and axle detection devices 1208 (also referred to herein as wheel detection sensors 1208, axle detection sensors 1208, railcar detection sensors 1208, and simply the detection sensors 1208). Moreover, the railcar detection system 1202 can include supporting hardware and/or software (e.g., modules) for wheel detection 1210, train speed estimation 1212, and configuration, controlling, and processing 1214. Accordingly, and in response to the railcar detection system 1202 identifying an approaching railcar, the detection system 1202 can generate instructions for a plurality of data capturing devices 1216, such as cameras, lights, and other sensors, to trigger at specific times for capturing targeted aspects of the railcar as it passes through the inspection portal 101. Generating instructions for the plurality of data capturing devices 1216 to trigger at specific times (and with specific settings/configurations) reduces the overall amount of data captured by the system given the data capturing devices 1216 need not be constantly capturing images and readings as a railcar as it passes through the inspection portal 101 (thereby capturing unnecessarily large amounts of data). Reducing the overall amount of data captured by generating triggering instructions not only results in improved data storage capabilities due to a smaller data overhead, but reducing the amount of data captured via triggering instructions also results in improvements to data processing due to smaller amounts of data to process. Reducing the overall amount of data captured by generating triggering instructions for specific areas of interest can also increase the performance of detection and alerting processes as discussed herein. For example, reducing the overall amount of data captured by generating triggering instructions for specific areas of interest can result in a reduced number of false positive detections and alerts generated in connection with images captured of other railcar regions that are not in an area of interest. Moreover, due to generally long lapses in time between when railcars may pass through the inspection portal 101 (e.g., every 1 minute, 5 minutes, 10 minutes, 30 minutes, 60 minutes, etc.), generating triggers for determining when the plurality of data capturing devices should be active (for example, when a railcar is approaching and pass though the inspection portal 101) results not only in reduced power consumption, but also increased lifespans of the inspection portal 101 components and devices, thus resulting in the added benefit of lower operating and maintenance costs.

Cameras, as discussed herein, may refer to any signal acquisition devices sensitive to, or operating in, the visible, infrared, near-infrared (NIR), shortwave infrared (SWIR), or other spectrums of light or electromagnetic radiation. In some cases, such cameras may be "thermal cameras" capable of producing images indicative of the heat or temperature of the components in their field of view. The system can be configured to include thermal cameras such as the FLIR A500F/A700F, the A50/A70, the FLIR A35, the FLIR A65, each of which are manufactured by Teledyne FLIR in Wilsonville, OR. However, it should be understood that any other appropriate thermal or infrared cameras can be used in the system as disclosed herein. Cameras may also be of the "area scan" type or "line scan" type, among other possible types and configurations. In general, area scan cameras, are configured to capture images of a particular scene, where the particular scene is represented according to a matrix of pixels. Line scan cameras are configured to capture a plurality of individual rows, lines, or "slices" of pixels (rather than a matrix of pixels) as the image subject moves across a scan area, and the plurality of rows can be combined to produce a two-dimensional image.

The system can include area scan cameras and line scan cameras manufactured by Omron, Teledyne, and other appropriate cameras of similar make. For example, the system can include one or more area scan cameras, such as the STC Series cameras manufactured by Omron Corporation, headquartered in Kyoto, Japan. The FS Series line scan cameras, also manufactured by Omron, can similarly be included in the inspection portal system. The Omron STC Series cameras can be configured with gigabit ethernet (GigE) communication protocol technologies and interfaces (such as GigE Vision), thus allowing for fast image transfers (e.g., for example, 1000 MB/s transfer speeds, or more) over long distances (for example, about 100 meters) using CAT-4 or CAT-5 ethernet wires (or other appropriate wired connections). The system can also include Omron STC Series cameras configured with USB 3.0 capabilities. The system can be configured to integrate with the Spinnaker software development kit (SDK), provided by Teledyne, which includes machine vision software tools for processing images captured by the plurality of cameras. Integrating with the Spinnaker SDK allows for the system to include one or more cameras equipped with technologies such as Dalsa USB3, 5GigE, 10GigE, etc. which further allows for modular camera configurations within the system. In one example, the Spinnaker SDK can include software tools for triggering and/or synchronizing the cameras within the inspection portal.

The railcar detection sensors 1208 can be inductive sensors, such as the wheel sensor RSR110 manufactured by Frauscher Sensor Technology USA Inc., headquartered in Princeton, New Jersey. The RSR180 wheel sensor (also manufactured by Frauscher), or other appropriate wheel and axle detectors from other manufacturers can also be used in the system. For example, the system can be configured to implement mechanical sensors, magnetic sensors, etc. The railcar detection sensors 1208 can be physically attached to the rails of the railway or train track 104, such that the railcar detection sensors 1208 can detect train wheels 1218 as the wheel pass over (or by) the sensors 1208. As will be discussed in greater detail herein, the railcar detection sensors 1208, and other sensors, can be configured to generate signals indicative of a railcar's presence.

The wheel detection module 1210 included in the railcar detection system 1202 can include hardware and software systems, such as wheel sensor signal converters, or the like, for receiving and handling signals generated by the railcar detection sensors 1208. For example, the wheel detection module 1210 can be configured to include wheel signal converters, such as the WSC-003 signal converter supplied by Frauscher.

The detection system 1202 can include hardware and software that is operatively configured for railcar speed estimation. As will be discussed in greater detail herein, the system can be configured to calculate current speeds, as well as speed trajectories, and axle path trajectories, for railcars that are approaching and passing through the inspection portal 101. In response to the railcar detection sensors 1208 generating signals indicative of a railcar's presence, and furthermore in response to the wheel detection module 1210 receiving the generated signals, the speed estimation module 1212 can calculate or estimate railcar speeds based on a difference in timestamps between recorded wheel detection events, as well as based on physical distances between the railcar detection sensors 1208. Determining a railcar speed via the speed estimation module 1212 can allow for the system to perform various additional operations, such as configuring one or more cameras to capture images (or readings) of the railcar, synchronizing the triggering of a plurality of cameras, conducting system performance evaluations, etc.

To achieve the functionalities of the system discussed herein, the train speed estimation module 1212 can accurately and continuously measure the speed (and any changes thereto) of the train as it approaches and passes through the inspection portal 101. Further, the speed estimation module 1212 can transmit (or otherwise communicate) the determined speed to other system components, such as the camera/sensor configuration, controlling and processing module 1214 (also referred to herein simply as the controller 1214), in real-time. The train speed estimation module 1212 can determine the number of unique axles traveling through the inspection portal system and extrapolate or otherwise determine the time at which the axles will then pass the field of view of various cameras, or other data acquisition devices, such that those cameras and devices can be triggered appropriately.

The train speed estimation module 1212 can identify false negative and/or false positive wheel crossing detection events using one or more algorithms executed by the computing system (e.g., the system 1202, the system 1204, or both). The computing system can identify false negative and/or false positive wheel crossing detection events at sufficiently low latency such that the speed and axle trajectory estimation system can achieve real-time, or near-real time, analyses. The system can also be configured to perform computing and data processing in offline settings and/or during off-peak hours.

In response to receiving an estimated speed from the train speed estimation module 1212, the camera/sensor configuration, controlling and processing module 1214 can perform signal processing techniques to initiate the proper triggering of cameras and data acquisition devices, as well as synchronizing the captured data to various sources of metadata. For example, the controller 1214 can generate instructions for controlling one or more cameras, such as determining trigger bursts and associated timing. In another example, the controller 1214 can use the output from the train speed estimation module 1212 and associated algorithms of the computing system to synchronize recorded data from the various sensors with appropriate metadata (image timestamps, scanned AEI data, etc.).

The controller 1214 can be configured to enable the proper triggering of continuous image acquisition devices, such as line scan or area scan cameras, such that the desired overlap (e.g., in the case of area scan cameras) of successive images can be achieved. In the case of line scan cameras, the controller 1214 can minimize the geometric distortion (e.g., "stretch" or "squeeze") of particular images, even while the speed of the passing train changes, such as during train acceleration or deceleration (braking) events. As another example, the controller 1214 can be configured to enable the proper triggering of "burst" image acquisition devices, where it is desirable to capture images about a predetermined region or structures of a train, railcar, or locomotive. For example, the system can be configured to trigger the cameras to capture specific regions of the brakes, wheels, or air hose region in a repeatable and reliable fashion. As yet another example, the controller 1214 can be configured to determine the number of axles and/or clusters of axles (e.g., proper assignment of axles to their respective trucks and/or railcars), to enable the computing system to properly match images to metadata about the train, railcar, or locomotive. Example metadata can include information derived from Automatic Equipment Identification (AEI) tags that are scanned for each railcar or locomotive, data derived from cameras, such as optical character recognition (OCR), as the train passes through the inspection portal system, or other metadata.

The system can include a data store configured to receive and store high volumes of data produced from the one or more sensors. The inspection portal system can manage the data such that no data is lost and such that it is processed and stored with reasonable or limited computation and storage resources. As shown in the operational environment 1200 of FIG. 12, the railcar detection system 1202 can be operatively connected to a processing system 1204. The processing system 1204 can be local to the inspection portal 101; however, the processing system 1204 can also be a remote system. The processing system 1204 can include various computer memory and processing components specifically designed for receiving data (e.g., images, readings, timestamps, etc.) from the inspection portal devices, processing the received data, storing the data, generating alerts regarding the data, etc. In particular, the processing system 1204 can include at least a database or storage 1220, one or more computers 1222, servers 1224, etc. In at least one example, the processing system 1204 can also include microcontrollers, printed circuit boards (PCB's), processors, central processing units (CPU's), graphics processing units (GPU's), relays, etc., for receiving readings from the system sensors, detecting railcars, generating instructions for capturing images of railcars, etc.

Figure 13:
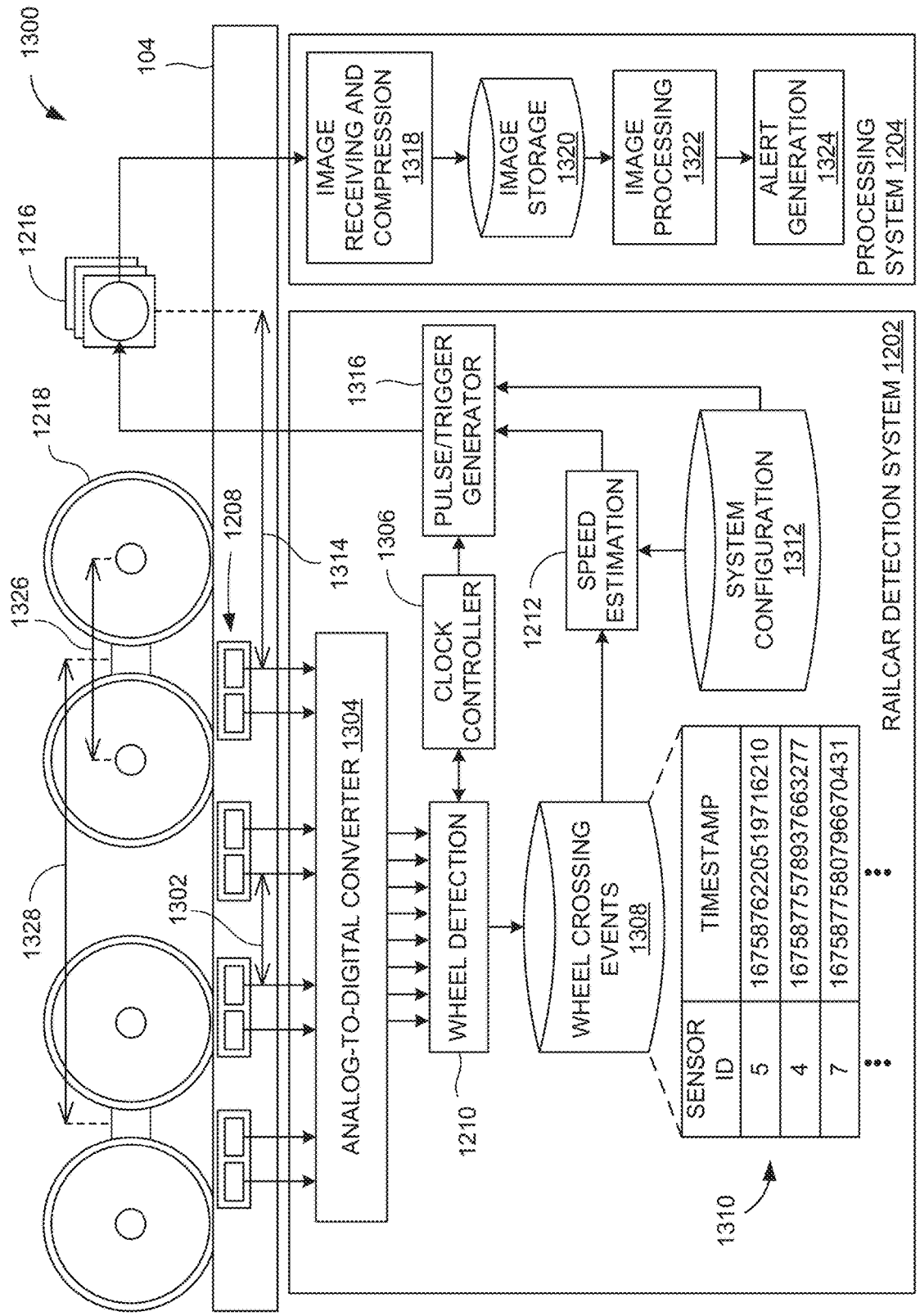
FIG. 13 is a diagram illustrating a railcar detection system and processing architecture, in accordance with the disclosed technology.

FIG. 13 is a diagram illustrating a railcar detection and processing architecture 1300. In particular, the railcar architecture 1300 illustrates the railcar detection system 1202 and the processing system 1204 in operative connection with a plurality of detection sensors 1208 and data capturing devices 1216 (e.g., cameras, infrared/thermal sensors, lights, etc.).

As discussed above in connection with the description of FIG. 12, a plurality of railcar detection sensors 1208 can be installed on, near, under, within, etc., rails of a railroad track 104. In one example, the railcar detection sensors 1208 can be clamped onto the rail sides, such that the upper surface of the rails is between a railcar wheel and the sensors 1208 as the railcar wheel passes over the sensors 1208. The railcar detection sensors 1208 can be physically proximate to the wheels of the railcar or locomotive as they pass while not making physical contact with the wheels themselves. Each of the railcar detection sensors 1208 can be a unit including two individual and independent detection sensors. In one example, the railcar detection sensors 1208 can include an inductance or eddy current electromagnetic sensor that can produce an analog pulse output in response to a wheel passing over the sensor. Continuing with this example, the railcar detection sensors 1208 can include coil systems that generate electromagnetic currents, and the presence of a railcar wheel (a conductor) can result in an eddy current that dampens the electromagnetic currents within the sensors 1208 as the railcar wheel passes over the sensor. The detected dampening of the electromagnetic currents can indicate a railcar wheel passing event. As shown in the architecture 1300, a plurality (or array) of railcar detection sensors 1208 can be installed on the railroad track 104, and the railcar detection sensors 1208 can be separated by a predetermined distance 1302. For example, each sensor of the plurality of railcar sensors 1208 can be separated by a distance of 1 meter, 2 meters, 3 meters, 5 meters, 10 meters, etc. However, it should be understood from the discussion herein that each sensor of the plurality of railcar sensors can be separated by any appropriate distance.

In response to a railcar wheel passing over a particular railcar detection sensor of the sensors 1208, the particular railcar detection sensor can generate a signal that is received at an analog-to-digital converter (ADC) 1304. The ADC 1304 can convert the analog pulses generated by each railcar detection sensor 1208 to a digital signal (such as a rising edge signal). In signal processing and in electronics more generally, rising edges can represent a transition from a low (off/inactive) state, to a high (on/active) state. The rising edge can be a digital signal representation of an analog signal as detected on a physical line. For purposes of example, and as it relates to the railcar detection sensors 1208, a rising edge can be the digital signal representation of the moment in time when a wheel detection sensors 1208 transitions from not detecting a railcar, to detecting a railcar. After a rising edge is detected, the corresponding digital signal can remain high while the ADC 1304 continues to receive an analog signal from the railcar detection sensors 1208. The rising edge can be followed by a trailing edge, or back edge, which corresponds to a detected return to a baseline state on the physical line. While any appropriate signal converter can be used, the system can be configured to implement the Frauscher WSC-003 signal converter.

The railcar detection system 1202, via the wheel detection module 1210, can detect a rising edge of the digital signal generated by the ADC 1304 and can generate a timestamp for the particular event according to a clock controller 1306 (a master clock). The clock controller 1306 can be synchronized according to a protocol such as precision time protocol (PTP) or network time protocol (NTP). The clock controller 1306, in connection with the plurality of imaging capturing devices 1216, can be synchronized according to synchronization standards such as the IEEE 1588-2008 standard. As will be discussed in greater detail herein, the clock controller 1306 can be operatively configured to synchronize a plurality of devices, such as the plurality of image capturing devices 1216, for capturing images or readings of railcars at specific points in time as a railcar passes through the inspection portal.

Each detected rising edge of the digital signal generated by the ADC 1304, also referred to herein as a detected wheel crossing event, can cause the wheel detection module 1210 to generate and store data associated with the event in a wheel crossing events database 1308. As illustrated by the database contents 1310, the associated data can include at least a timestamp. For example, the timestamp can be stored as a Unix formatted timestamp denominated in Coordinated Universal Time (UTC). The timestamp can be measured with nanosecond precision corresponding to, for example, the time at which the wheel detection module 1210 detected a rising edge from the ADC 1304, or the time at which the ADC 1304 received a signal from a railcar detection sensor 1208. The timestamp information can be stored along with a sensor identifier ("sensor ID") corresponding to each of the railcar detection sensors 1208.

The wheel crossing events database 1308 can take many forms, such as a SQL or NoSQL database, or the database 1308 can be in the form of data structures such as a stack or queue. The wheel crossing events database 1308 can be a module of data associated with a larger data store. The data store can be a component of the railcar detection system 1202, the processing system 1204, or both, and the data store can be contained on a storage medium, such as a hard disk or memory. In one example, the wheel crossing events database 1308 can be a queue held within volatile, high-speed memory (e.g., RAM).

During the passing of a train, the speed estimation module 1212 can be configured to continuously execute one or more algorithms to estimate the current speed and speed trajectory for each wheel/axle of the train, also referred to herein as the axle path trajectory. The speed estimation module 1212 can receive one or more of the events stored in the wheel crossing events database 1308 as inputs. The speed estimation module 1212 can also receive, as inputs, some or all of the system configuration information stored in a system configuration database 1312. The system configuration information can include information such as the distance between each railcar detection sensor (such as the distance 1302), the distance between a particular railcar detection sensor and various cameras and data acquisition devices within the inspection portal (the distance 1314), as well as other distance information. For example, the system configuration database 1312 and the information stored therein can include one or more distances between axles on a single car (referred to as an inter-wheel distance 1326), one or more distances between trucks on railcars (referred to as an inter-truck distance 1328), etc. The configuration database 1312 can include the physical offset locations (in inches, centimeters, millimeters, etc.) of each of the imaging cameras from the wheel detection sensors (the distance 1314) and the locations of particular components on train cars to be imaged. Based on the calculated speed of the trains and these configured offsets, the system can modulate the triggers for the respective cameras to capture only the images of cars and components of interest for each individual camera/view.

The speed estimation module 1212 can generate outputs that include the current train speed, estimated speed, and predicted times for which certain axles will be at particular locations within the inspection portal. The system can further use the outputs of the speed estimation module 1212 as inputs into a camera trigger pulse generator 1316. The camera trigger pulse generator 1316 can output pulses, or rising edge signals, to trigger the cameras 1216 and/or other data acquisition devices at predetermined times, rates, and durations.

Images generated from cameras 1216 after being triggered by the camera trigger pulse generator 1316 can be transmitted to and received by the processing system 1204. The processing system 1204 can include a high-speed image receiving and compression processor 1318. The high-speed image receiving and compression processor 1318 can receive large amounts of image data at high speeds without experiencing information loss. For example, the system can maintain data integrity by optimizing various networking and data transmission components as well as low-level hardware configurations, data caching techniques, high speed I/O devices, and parallel processing (e.g., multi-threaded operations). Further, the processing system 1204 can compress the images generated by the sensors and cameras 1216 for efficient storage. The images can be compressed into JPEG format using, for example, Nvidia's GPU-accelerated JPEG codec library called nvJPEG. The processing system 1204 can compress the images generated by the sensors and cameras 1216 for subsequent transferring and processing in an image storage device 1320. The processing system 1204 can accelerate the compression of data to conform to particular timing constraints by using hardware accelerated encoding, such as JPEG compression performed on a GPU device. In one example, GPU transfers can be executed using (compute unified device architecture) CUDA streams to allow for overlap between the GPU operations initiated by different acquisition threads running on the central processing unit (CPU—also commonly referred to as a processor). In response to receiving and aggregating all captured images via the CPU acquisition threads, the images can be compressed into the JPEG format. The system conserves memory usage during image acquisition and compression by using the same pinned buffer for transferring the compressed JPEG to the CPU that was used for initially storing the received streams of raw image data at the CPU.

In response to images being stored in the image storage device 1320, the processing system 1204 can access the images using various image processing algorithms. Image processing, for example via an image processing module 1322, can include providing the received images and readings to one or more machine learning models. The image processing algorithms can perform operations via an alert generation module 1324 for generating alerts and notifications in connection with the processed images.

Figure 14:
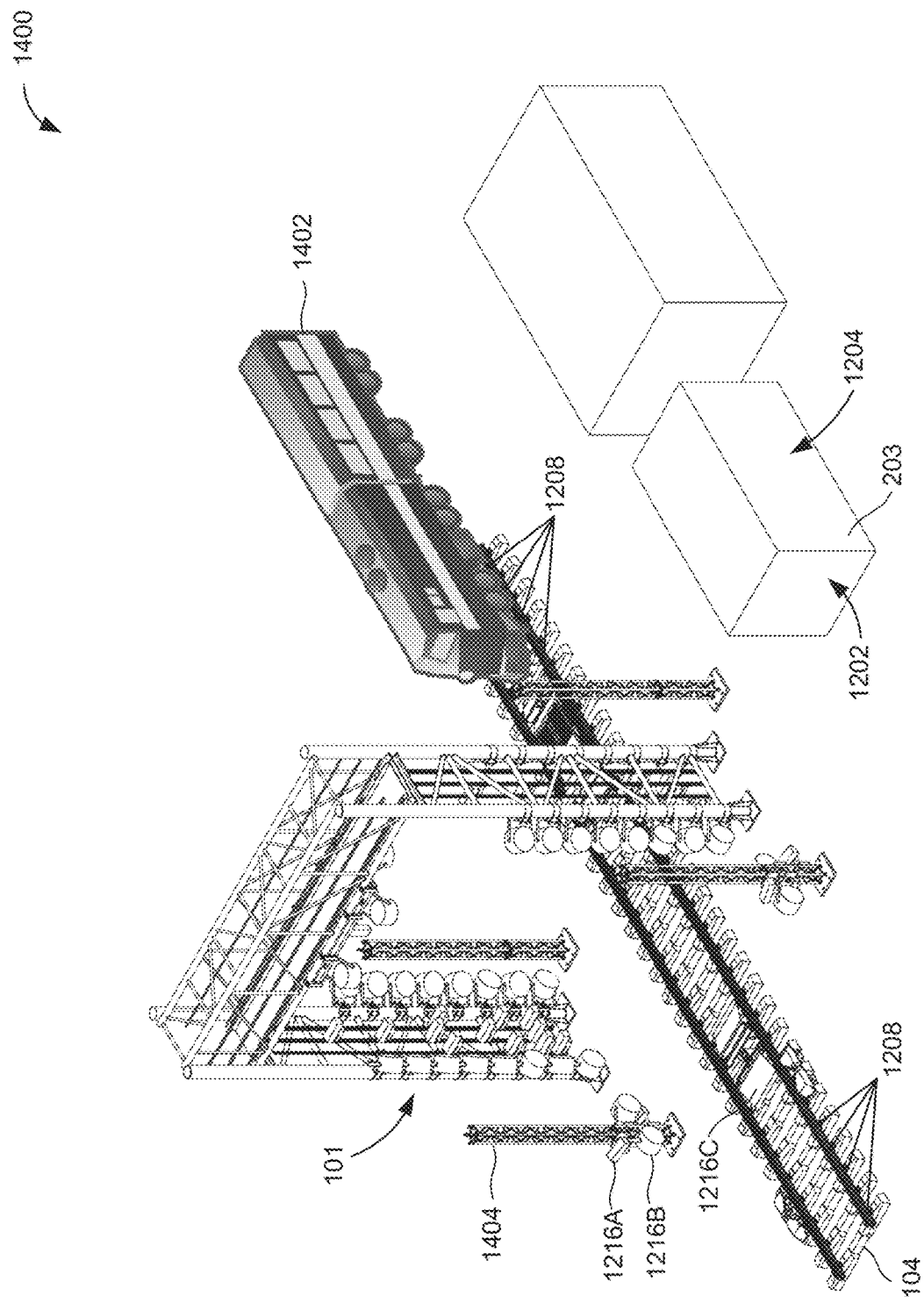
FIG. 14 is a diagram illustrating an example environment of the inspection portal system, in accordance with the disclosed technology.

FIG. 14 is a diagram illustrating an example environment 1400 of the inspection portal system as introduced above in connection with the description of FIG. 2. In particular, the example environment of the inspection portal system, as shown, includes a railcar 1402 approaching an inspection portal structure 101, or portal bridge, of the train inspection environment (as introduced in connection with the description of FIG. 1). The inspection portal structure 101 (or simply the inspection portal 101) can structurally support a plurality of data capturing devices 1216, such as one or more cameras, lights/flashes, scanners, detectors, or other data reading devices. As shown in the operational environment 1400, the inspection portal 101 can include one or more standalone pillars (or beams) which can also structurally support a plurality of data capturing devices 1216. The pillar 1404 (also referred to herein as a truss beam 231) is shown structurally supporting at least a camera 1216A (also referred to herein as a camera 221) and a lighting device 1216B (also referred to herein as a light 222). The pillar 1404 can also structurally support other devices, such as the scanning device 1216C; however, the scanning device 1216C is shown as being positioned between the rails of the train track 104.

Consider a scenario in which the railcar 1402 is approaching the inspection portal 101 and pillar 1404 (which are generally enclosed within the train inspection environment, which is not shown for purposes of example). As the railcar 1402 nears the inspection portal 101, the railcar 1402 can travel over one or more railcar detection sensors 1208, which are illustrated in FIG. 14 as being installed onto, or generally integrated with the rail. The railcar detection sensors 1208 can generate one or more signals or pulses received by the railcar detection system 1202, which can in turn be transformed into discrete timestamped events stored in a wheel crossing event database (such as the database 1308). In response to receiving at least two discrete timestamped events, the railcar detection system 1202 can determine a speed associated with the approaching railcar 1402. For example, given a known distance between two sensors 1208, the system can determine a speed associated with the approaching railcar 1402 based on the difference in time between the corresponding timestamped events. The system can continuously update a determined speed as new readings from the sensors 1208 are received. Moreover, the system can determine a speed trajectory, or an estimated future speed, based on a rate of change determined in a history of timestamped events. For example, if the difference in time between timestamped events for a pair of sensors 1208 is increasing as a train is traveling through the inspection portal, this increase in time is indicative of train deceleration. In response to determining an estimated future speed, the system can furthermore determine at what times to instruct a plurality of data capturing devices to become activated. For example, the system can instruct one or more cameras 1216A, one or more lights 1216B, and one or more scanners 1216C, to each become activated, and thereby collect data associated with the railcar 1402, at or around the same moment in time. The data captured by each of these devices can be subsequently aligned using metadata and timestamps corresponding to the data.

The railcar detection system 1202, via elements such the speed estimation module 1212, clock controller 1306, and trigger pulse generator 1316 (not shown in FIG. 14), can synchronize the activation of the plurality of data capturing devices 1216. For example, the system can leverage one or more Jetson Nano computers, manufactured by Nvidia, headquartered in Santa Clara, California, for performing speed estimation calculations (and other calculations and computing operations). The Jetson Nano computers can be operatively connected to one or more printed circuit boards (PCB's), which can be included in the railcar detection system 1202 architecture. In response to receiving wheel detection signals and calculating railcar speeds, the Jetson Nano can output camera trigger signals at specific times based on the type of camera, the medium over which the signal is to be transmitted, etc. For example, the Jetson Nano can be configured to transmit train speed, speed trajectory, or axle path trajectory information to a system microcontroller over USB-RS232 for high speed triggering and activating of line scan cameras, while also being configured to transmit lower speed triggering and activation signals via general purpose input/output (GPIO) lines on the Jetson Nano for triggering and activating area scan cameras. The camera triggering signals can be pulse width modulation (PWM) signals. The Jetson Nano computers can output signals to enable, disable, flash, or pulse lights, such as the light 1216B. The PCB can buffer all Jetson Nano GPIO's in order facilitate correct and timely operations.

The railcar detection system 1202 can implement protocols such as precision time protocol (PTP), network time protocol (NTP), or similar synchronization protocols, for ensuring that each of the plurality of devices (such as the data capturing devices 1216) that are connected to the railcar detection system 1202 can be triggered or activated at a specific point in time. For example, synchronizing each of the devices that are operatively connected to the railcar detection system 1202 can include determining a timing offset, or latency, corresponding to a time delay between when a particular instruction to activate a particular device is generated, and when the particular device is activated in response to receiving the instruction.

The railcar detection system 1202 can synchronize cameras by determining the offset from the time at which an axle passes through the inspection portal (or over the detection sensors 1208) and the point at which a camera burst commences. For example, the system can perform synchronization through measurements of the distance of cameras and their field of view to other parts of the system. Continuing this example, the system can vary the offset (e.g., 15.7 feet to 15.8 feet) manually to determine an effective offset. The system can determine the offset using particular algorithms. For example, the system can determine the location of known features of the train and their relationship to particular pixel coordinates in the captured images. The system can perform a binary search or other method to adjust the effective offset until the region of interest of the train/railcar is captured as desired, thereby achieving camera synchronization.

Figure 15:
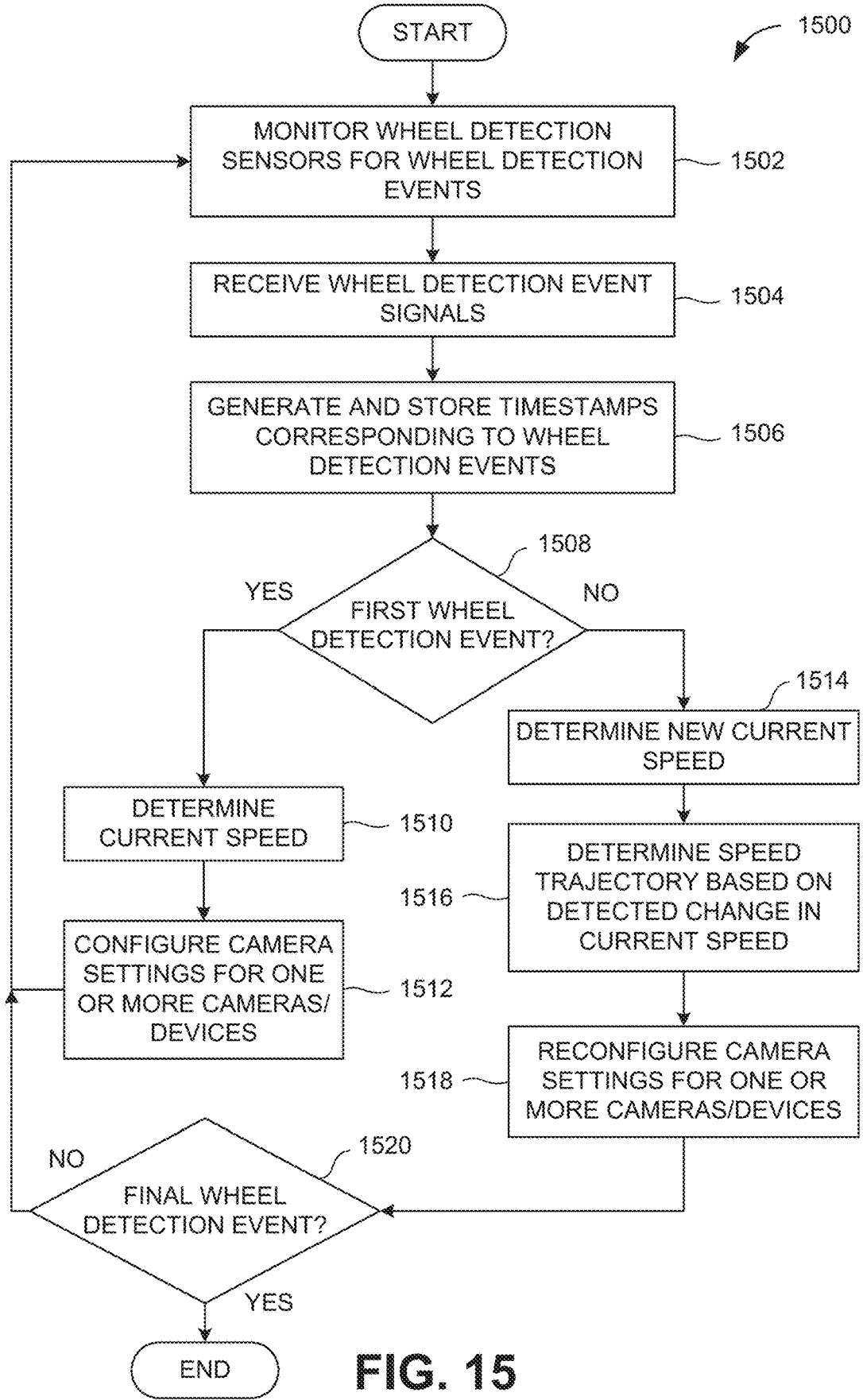
FIG. 15 is a flowchart illustrating a railcar speed detection process, in accordance with the disclosed technology.

FIG. 15 is a flowchart of an example railcar speed detection process 1500. As is discussed throughout the present disclosure, the inspection portal and railcar detection system can detect approaching railcars and configure a plurality of data capturing devices to trigger at predetermined times for capturing aspects of a railcar. For example, the system can be configured to trigger one or more types of cameras for capturing images of railcar components. The system can also be configured to trigger infrared cameras and sensors for detecting heat emanating from one or more railcar components. Moreover, triggering these devices at predetermined times includes synchronizing the devices based in part on a current and/or estimated railcar speed. The current speed and/or estimated railcar speed can be provided as parameters for determining camera configuration settings. For example, if the system determines that a train is approaching an inspection portal at about 5 miles per hour, but also that the train is accelerating and thus a particular railcar of the train is estimated to pass a particular camera at 8 miles per hour, the system can configure the camera settings appropriately to account for the increased predicted/estimated future speed. The railcar speed detection process 1500 discusses in greater detail how the system can determine a railcar speed.

At step 1502 of the railcar speed detection process 1500, the system can monitor wheel detection sensors (such as the wheel detection sensors 1208) for wheel detection events. As discussed above in connection with FIG. 12, the wheel detection sensors 1208 can include inductive sensors, such as the Frauscher RSR110. A wheel detection event can include a wheel detection sensor 1208 generating a signal indicative of a railcar passing over the sensor. The wheel detection event can be an analog signal, such as a particular voltage detected in a circuit, or another signal corresponding to the completion of a circuit. However, the wheel detection sensors 1208 can also include, or be operatively connected to, one or more analog-to-digital converters (such as the WSC-003 analog-to-digital signal converter) such that a wheel detection event can include reading a rising edge or "high" digital signal on a particular pin at a general-purpose input/output (GPIO) controller, printed circuit board (PCB), or another similar computing board. A wheel detection event can include a pair of signals received from separate wheel detection sensors. As will be discussed below, the system can estimate a railcar speed based on a difference in time between two rising edges detected at two separate wheel detection sensors that are separated by a known distance.

At step 1504, the system can be configured to receive wheel detection event signals from the sensors 1208. The system can be configured to include one or more controllers, such as a GPIO controller or a similar PCB, at which signals from the wheel detection sensors 1208 can be received. The system can also be configured to implement microcontrollers, such as the Nvidia Jetson Nano microcontroller, for receiving and/or reading signal pulses from the wheel detection sensors 1208 or from the controllers/boards at which they are received (such as the ADC 1304). The microcontrollers can receive the wheel detection event signals by reading pin outputs from a GPIO controller or PCB. For example, a rising edge detected on a GPIO or PCB pin can be indicative of a wheel detection event.

At step 1506, the system can generate and store timestamps corresponding to the wheel detection events. For example, and in response to detecting a rising edge indicative of a wheel detection event, the system can write the current UTC time (in nanoseconds) to a binary buffer corresponding to the particular pin at which the rising edge was detected. The timestamp and corresponding pin information can be stored in computer memory (such as the database 1308).

At step 1508, the system can be configured to determine whether a received wheel detection event is a first wheel detection event. As is discussed throughout the present disclosure, the system can be configured to capture images and readings corresponding to railcars approaching and passing through the inspection tunnel. Accordingly, the system can generate triggers for one or more cameras or data capturing devices (such as IR sensors) based in part on where a specific train carriage, cab, or car is located with respect to the cameras or data capturing devices. A wheel detection event can be a first wheel detection event if, for example, the wheel detection event is the first wheel detection event received within a predetermined amount of time (e.g., 30 seconds, 1 minute, 5 minutes, etc.). The system can include a stored average time duration between wheel detection events, and thus any wheel detection event that is more than two standard deviations greater than the average time can be determined to be a first wheel detection event.

If the system determines that a wheel detection event is a first wheel detection event, the process 1500 can proceed to step 1510. At step 1510, the system can be configured to determine a current speed based on the wheel detection event signals. The system can estimate a railcar speed based on a difference between the timestamps corresponding to the rising edges detected at two separate wheel detection sensors, and furthermore comparing the timestamp difference to a distance between the two separate wheel detection sensors. For example, dividing the distance between the detection sensors by the difference between the timestamps can result in the railcar speed. The system can also compare two timestamped events at a single sensor for determining a speed if a distance between car axles is known. The system can determine a current speed for the railcar based on other methods, such as analyzing for how long a "high" digital signal was present in response to detecting a rising edge for a particular wheel detection sensor. For example, a shorter signal is indicative of a fast speed, as compared to a longer signal which is indicative of a slower speed. The rising edge signal durations can be compared to historical data for matching the rising edge signal durations with speeds known to correspond with particular rising edge durations. For example, a signal duration of 1 second after detecting a rising edge can be known to correspond to a speed of 5 miles per hour, and a signal duration of 0.5 seconds after detecting a rising edge can be known to correspond to a speed of 10 miles per hour.

At step 1512, the system can configure settings for one or more cameras, sensors, or other appropriate devices (such as lights) for capturing images and/or readings from a railcar. The system can configure settings for one or more cameras, or other appropriate devices, based on the current speed as determined at step 1510. The system can configure a shutter speed, burst rate, lens aperture, field of view, general focus, etc., for one or more cameras that are to capture one or more images (or sensor readings) from a railcar. In response to configuring settings for one or more cameras, sensors, or other devices, the process 1500 can return to step 1502.

Referring back to step 1508, if the system determines that a wheel detection event is not a first wheel detection event, such that the wheel detection event is another wheel detection event in a series of recently occurring wheel detection events, the process 1500 can proceed to step 1514. At step 1514, the system can determine a new current speed. Determining a new current speed can include performing processing steps similar to those performed at step 1510. However, determining a new current speed at step 1514 can include storing the new current speed in connection with a timestamp, or the new current speed can be overwritten (in computer memory) onto the speed from step 1510.

At step 1516, the system can determine an estimated speed, or a speed trajectory, based on a detected change in the current speeds from steps 1510 and 1514. A change in the speeds from steps 1510 and 1514 can indicate whether a railcar is accelerating or decelerating. A detected or calculated speed can vary for individual cars as the train travels through an inspection portal, for example, based on power outputs by the train engine, braking patterns, turns in the railroad track, changes in elevation, etc. Accordingly, the system can determine a speed trajectory for a train based on a detected change in speed between successive cars, based on a detected change in speed between a predetermined number of cars (e.g., every other car, every third car, etc.), based on a predictive (machine learning) model that is operatively configured to predict a speed based on a plurality of baseline inputs, based on a change in speed over a predetermined amount of time (e.g., 5 seconds, 10 seconds, 30 seconds, etc.), or based on other appropriate measurements.

At step 1518, the system can reconfigure settings for one or more cameras (or other appropriate devices). Reconfiguring settings for one or more cameras or devices can include adjusting a burst rate, an aperture, a line scan capture duration, focus settings, etc. Reconfiguring settings for one or more cameras or devices is discussed in more detail below in connection with the description of FIG. 16.

The process 1500 can proceed to step 1520, where the system determines whether the wheel detection event was a final wheel detection event. The system can determine that a wheel detection event was a final wheel detection event if, for example, it is determined that the train has passed through the inspection portal. The system can determine that a wheel detection event was a final wheel detection event if a predetermined number of wheel detection events have occurred. The system can determine that a wheel detection event was a final wheel detection event if, for example, no additional wheel detection events occur within a predetermined amount of time (e.g., 30 seconds, 1 minute, 5 minutes, etc.). The system can determine that a wheel detection event was a final wheel detection event if a time duration since a prior wheel detection event is measured to be two deviations (or more) greater than an average time duration. If the system determines that a wheel detection event was not a final wheel detection event, the process 1500 can return to step 1502 (or another appropriate earlier step). If the system determines that a wheel detection event was a final wheel detection event, the process 1500 can end.

Example Camera and Image Capturing Device Configuration

Figure 16:
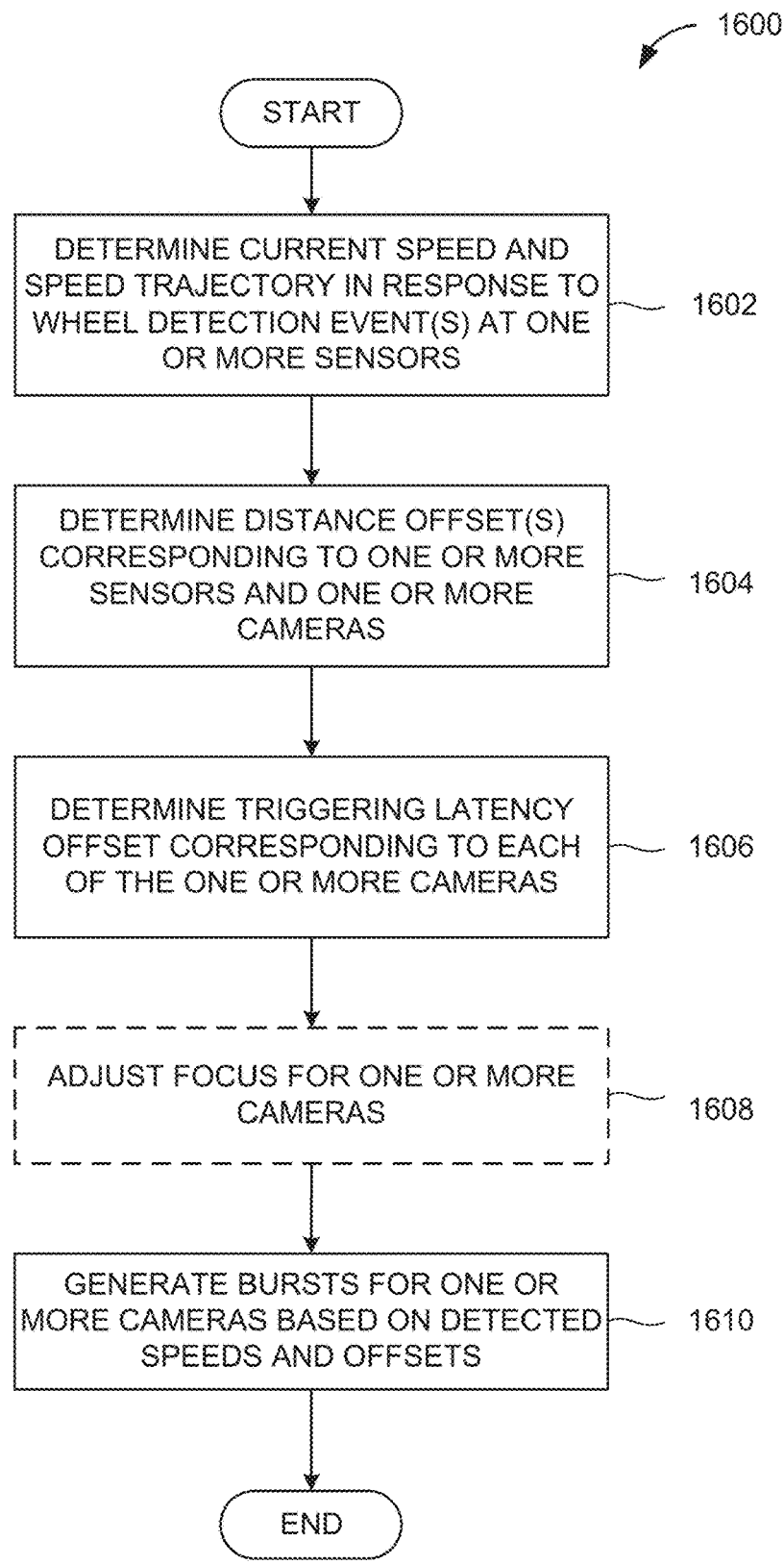
FIG. 16 is a flowchart illustrating a camera and sensor configuration process, in accordance with the disclosed technology.

FIG. 16 is a flowchart of an example camera and sensor configuration and synchronization process 1600. As is discussed throughout the present disclosure, the system can be operatively configured to control a plurality of cameras, sensors, or other appropriate data capturing devices, to become activated at a specific moment in time such that each camera, sensor, or device, captures a common railcar aspect regardless of where the camera, sensor, or device is positioned with respect to a railcar that is traveling through the disclosed inspection portal. Configuring the cameras, sensors, and devices, can include determining and accounting for changes in a railcar speed, as well as determining and accounting for physical offsets, latencies, transmission delays, clock discrepancies, and the like.

At step 1602, the system can determine a current speed, as well as a speed trajectory (or axle path trajectory), in response to receiving wheel detection event(s) at one or more wheel detection sensors. As discussed above in connection with the description of FIG. 15, the system can estimate a railcar speed based on a difference between the timestamps corresponding to the rising edges detected at two separate wheel detection sensors, and furthermore comparing the timestamp difference to a distance between the two separate wheel detection sensors. For example, dividing the distance between the detection sensors by the difference between the timestamps can result in the railcar speed. The system can determine a current speed for the railcar based on other methods, such as analyzing for how long a "high" signal was present for a particular wheel detection sensor after detecting a rising edge. In one example, analyzing for how long a "high" signal was present for a particular wheel detection sensor after detecting a rising edge can include determining for how long the electromagnetic currents within the wheel detection sensors were dampened in response to a wheel passing over the sensor. Further, the system can determine an estimated speed, or a speed trajectory, based on a detected change in the current speed calculations. A change in calculated speeds can indicate whether a railcar is accelerating or decelerating. A detected or calculated speed can vary for individual cars as the train is traveling through an inspection portal, for example, based on power outputs by the train engine, braking patterns, turns in the railroad track, changes in elevation, etc. Accordingly, the system can determine a speed trajectory for a train based on a detected change in speed between successive cars, based on a detected change in speed between a predetermined number of cars (e.g., every other car, every third car, etc.), based on a model that is operatively configured to predict a speed based on a plurality of baseline inputs, based on a change in speed over a predetermined amount of time (e.g., 5 seconds, 10 seconds, 30 seconds, etc.), or based on other measurements.

As is discussed throughout the present disclosure, the system can estimate a current and/or future train speed by processing a plurality of wheel detection events in connection with a plurality of railcar wheel detection sensors and sensor readings. For example, the system can determine a railcar speed based on a delta in time between two wheel detection events and a distance between the corresponding sensors. The system can further estimate a railcar speed, or a speed trajectory, using a Random Sample Consensus (RANSAC) algorithm.

As will be understood by one of ordinary skill in the art, a RANSAC algorithm can be configured to estimate model parameters in the presence of outliers in a dataset. For example, a RANSAC model can be configured to determine a line of best fit within a dataset, where the line of best fit represents a model parameter (for example, a train speed) despite the presence of outliers in the dataset. The line of best fit can represent a line that most closely aligns with the dataset, while disregarding the outliers.

As discussed throughout the present disclosure, the railcar detection sensors can malfunction, break, fail to recognize a passing train, etc., and thus a data point corresponding to a malfunctioning railcar detection sensor can be an outlier in a dataset processed via a RANSAC algorithm. Alternatively, properly functioning railcar detection sensors can generate signals which can correspond to inliers in the dataset provided to the RANSAC algorithm. In this way, a line of best fit in connection with a dataset of wheel detection events generated via a RANSAC algorithm can represent an estimated train speed and/or a train speed trajectory, notwithstanding outliers that may be present within the system. If the RANSAC algorithm cannot determine a line of best fit based on the data corresponding to wheel detection events, the system can continue to use a previously estimated speed.

The dataset provided to, and processed by, a RANSAC algorithm can include wheel detection events as identified at the railcar wheel detection sensors. Time, or X as represented in the example formulas below, can be an elapsed time since the first railcar wheel detection sensor reading. A time, X, for each railcar wheel detection sensor reading can be determined by subtracting a timestamp from a first sensor reading from a timestamp of a current sensor reading (or a sensor reading of interest). Distance, or Y as represented in the example formulas below, can be a physical distance between the wheel detection sensor corresponding to the first sensor reading and a current railcar detection sensor. The distance can be calculated, or updated, in response to each subsequent railcar detection sensor reading in a series of sensor readings. As is discussed throughout the present disclosure, the system can store distances between railcar detection sensors in the system configuration database 1312. Accordingly, Y can represent how far a train has traveled with respect to, and subsequent to the occurrence of, a first wheel crossing sensor event.

Time (X) and distance (Y) values corresponding to each railcar detection sensor reading can be modeled as (X, Y) data points or coordinates. The system can be configured to take two (X, Y) points in the dataset and furthermore calculate distances from other points to a line between the two points (a potential line of best fit). The system can be configured to determine a number of outliners and inliers corresponding to the line between the two points. The system can iterate through pairs of points within the dataset for determining whether a new line of best fit exists based on newly received data points. The system can calculate a final speed estimate based on determined line of best fit.

For determining a distance between an (X, Y) data point and a modeled line, the system can use the example formula (1) below:

$$\text{distance} = \frac{|(y_2 - y_1)x_0 - (x_2 - x_1)y_0 + (x_2 y_1 - x_2 y_0)|}{\sqrt{(y_2 - y_1)^2 + (x_2 - x_1)^2}} \quad (1)$$

For determining an average inlier distance with respect to a modeled line, the system can use the example formula (2) below:

$$averageInlierDistance = \frac{\text{sum of inlier distances}}{\text{number of inliers}} \quad (2)$$

For determining a slope between two (X, Y) data points in the dataset, the system can use the example formula (3) below:

$$\text{slope} = \frac{y_2 - y_1}{x_2 - x_1} \quad (3)$$

Moreover, the system can calculate an estimated railcar speed (in miles per hour) based on a slope, calculated in accordance with formula (3), and a scaling factor. In one example, the scaling factor can be 56818200; however, it should be understood that other scaling factors can be used based on specific system configurations. For determining the railcar speed based on a slope and a scaling factor, the system can use the example formula (4) below:

$$speedInMph = \text{slope} \times scalingFactor \quad (4)$$

The system can also be configured to use the following example formulas for calculating a railcar speed:

$$speedInMph = \qquad (5)$$
$$\frac{\text{distance between sensor } A \text{ and sensor } B}{B.timestamp - A.timestamp} \times scalingFactor$$

$$speedInInchesPerNanosecond = \frac{speedInMph + mostRecentSpeed}{2 \times \text{scaling factor}} \quad (6)$$

$$futureTimestamp = \qquad (7)$$
$$lastReading.timestamp + nanosecondsToTravelDistance$$

$$fourAxleSpan = lastDistanceInFeet - firstDistanceInFeet \quad (8)$$

The system can be configured to determine camera burst timing settings based on a railcar speed and speed-related determinations. For example, given the system can model a railcar speed trajectory using algorithms and models such as a RANSAC algorithm, the system can further determine an amount of time until a railcar travels a particular distance. In this way, the system can be configured to determine a "time to travel distance" measurement, which can further be used for determining a future point in time at which to initiate triggering (such as burst triggering) for one or more cameras for capturing a specific railcar component. The system can be configured to use the following example formulas for calculating a "time to travel distance" measurement:

$$speedInInchesPerNanosecond = \frac{speedInMph}{scalingFactor} \quad (9)$$

$$nanosecondsToTravelDistance = \frac{distanceInInches + sensorMalfunctionOffset}{speedInInchesPerNanosecond} \quad (10)$$

$$getTimeToTravelDistance = lastReading.timestamp + nanosecondsToTravelDistance \quad (11)$$

At step 1604, the system can determine one or more distance offsets corresponding to one or more sensors, cameras, or any device that is operatively configured to capture readings from a railcar approaching or passing through the disclosed inspection portal. As discussed above in connection with the description of FIG. 13, the system can store one or more known distance offsets, such as a distance 1314 between a particular railcar detection sensor and various cameras and data acquisition devices within the inspection portal, a distance 1302 between railcar detection sensors, etc. The railcar detection system 1202 can perform synchronization through measurements of the distance of cameras and their field of view to other parts of the system. Continuing this example, the system can vary the offset (e.g., 15.7 feet to 15.8 feet) manually to determine an effective offset. The system can determine the offset using particular algorithms. For example, the system can determine the location of known features of the train and their relationship to particular pixel coordinates in the captured images. The system can perform a binary search or other method to adjust the effective offset until the region of interest of the train/railcar is captured as desired, thereby achieving camera synchronization.

At step 1606, the system can determine a triggering latency or offset corresponding to each of the one or more cameras, sensors, devices, etc. As is discussed throughout the present disclosure, the railcar detection system 1202 can vary the capture rate and/or capture timing of each camera such that the inspection portal system can compensate for any differences in latency among different makes and/or models of camera, latencies in the mediums over which those devices can receive activation instructions, etc. Moreover, the system can, for example, synchronize the capture timing of cameras to within a microsecond of latency, such that all photos can be taken at the same time (i.e., within a microsecond). Determining a triggering latency or offset for a particular camera or data capturing device can include measuring an elapsed time between when an instruction for activating the device is executed and when the corresponding data is captured (e.g., when the picture is taken, when the infrared reading is received). Determining a triggering latency can also take into account timing aspects such as an elapsed time between when a wheel detection sensor is activated and when the signal is converted to a digital rising edge and furthermore processed for determining a current railcar speed.

At step 1608, the system can perform the optional step of adjusting a focus for one or more cameras. The system can include one or more motorized devices, such as stepper motors, that can be configured to focus camera lenses. For example, one or more cameras, or other data capturing devices, can be operatively connected to a stepper motor which can receive instructions to incrementally turn a focus ring or zoom ring on a camera lens. The system can be operatively configured to receive captured images from a camera, process the images to determine whether the subject of the image is properly focused, and furthermore instruct for the stepper motors to adjust the focus settings (if necessary). The system can include specific camera lenses with integrated stepper motors or stepper motor functionality, such as the C-M50IRlenses manufactured by FOCtek; however, other lenses and configurations can also be used. The system can include one or more stepper motor controllers for operatively connecting to the stepper motor lenses, such as the Tic T500 multi-interface controller manufactured by Pololu. A multi-port USB hub can allow for a plurality of stepper motor controllers and lenses to each individually receive activation instructions from the controller 1214 or trigger generator 1316. The system can be configured to dynamically perform the focusing step 1608 such that the focusing an occur in real-time; however, the focusing can also be performed in a non-dynamic and/or offline setting.

At step 1610, the system can generate bursts for one or more cameras or data capturing devices based on the detected speeds and offsets. For example, the inspection portal system, via the trigger generator 1316, can control the burst rate of one, some, or all of the cameras based on various inputs. For example, the system can cause one or more cameras to obtain images in a burst image capture mode (e.g., for certain regions of a car) and can cause the same camera(s) to obtain one or more images in a normal image capture mode (e.g., for certain other regions of a car). As a more specific example, the inspection portal system can trigger a burst image capture of the space between the trailing wheel of a first car and the leading wheel of a second, subsequent car. The inspection portal system can include a burst capture mode for area scan cameras to capture a specific piece of hardware or region of the railcar. For example, the inspection portal system can capture images or other data of the brakes, brake pads, or a particular nut, bolt, or pin. Continuing this example, there can be an optimal angle and/or vantage point from which to capture the image. Further continuing this example, it can be beneficial to capture an image right before that region passes (capture #1), capture an image at the time that region is approximately in the center of the camera's frame (capture #2), and capture an image soon after that region passes the center of the frame (capture #3), for a total of 3 "burst" captures. The computing system of the inspection portal system can time the beginning of the "burst" of three images based on an offset to the time at which the first axle of a railcar passes the speed sensing system, as well as incorporating timing factors for the desired time between consecutive captures and a number of captured images. In capturing multiple images from slightly different vantage points, the inspection portal system can process those images (e.g., using a consensus, aggregation, or voting scheme) to generate better measurements and/or alerts and estimate a confidence value in those measurements or alerts. The inspection portal system can also generate geometric measurements and better outlier detections for derived metrics based on the camera's reliable capture of specific regions of the railcars.

The inspection portal system can implement defect detection algorithms on all images captured by the cameras, thereby causing the system to generate detection measurements, detection alerts, detection notifications, etc. The detection algorithms can be specifically configured to detect railcar components and corresponding issues or defects, such as (but not limited to): low or peaked air hoses; broken angle cock and handle; anti-creep; displaced or missing bearing adapters; missing bearing end cap screws; displaced bearing liners; missing blind crosskeys; misaligned or angled bolsters; missing brake shoe keys; missing or worn brake shoes; missing coupler cotter keys; low or mismatched (high/low) couplers; missing crosskey retainers; missing draft cover bolts; broken follower block/draft stops; rise in friction wedges; low or offset gladhands; missing knuckle pins; broken lock lifts; retainer valve position; broken or chipped rims; misaligned or angled side frames; tread buildup; bound trolleys; broken, compressed, displaced, or missing truck springs; angularity in Y-47 bolts and brackets; broken yokes; anglecock handle position; axle wear; missing brake-beam cotter-keys; misaligned brake-beams; missing, broken, or bent brake wheels; cracked center-sills; coupler horn clearance or impacts; cracked couplers; broken, bent, or missing cut-levers; applied hand brakes; bent or broken horizontal handholds; knuckle face wear; missing ladder bolts or rungs; missing platform bolts; bent platforms; missing release rods; missing retainer valves; bents rungs; missing safety support bottom rods; side bearing rollers; off track side doors; bent or broken siderails; cracked side-sills; bent or broken sill steps; striker wear; missing U-bolt and anglecocks; and wheel sliding.

Figure 17:
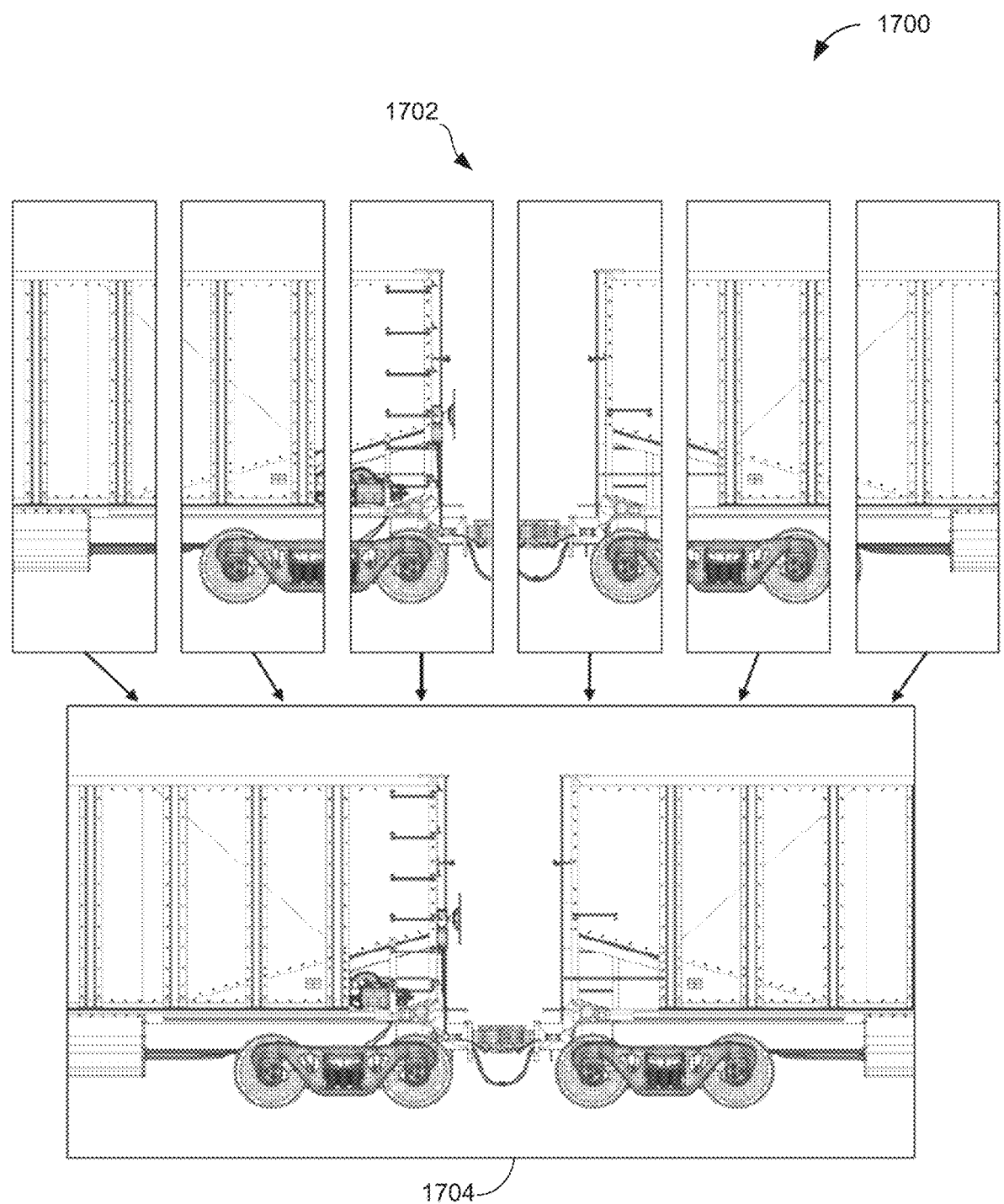
FIG. 17 illustrates an example line scan image capture via the inspection portal system, in accordance with the disclosed technology.

FIG. 17 illustrates an example line scan image capture from one or more cameras of the inspection portal system. The cameras of the inspection portal system can be configured to capture image slices of one or more cars, and furthermore generate one or more mosaic images by concatenating the image slices, as disclosed herein. The system can concatenate, or "stitch," the image slices together using metadata corresponding to the image slices. The system can obtain continuous captures of a railcar using one or more line scan cameras. For each of the line scan cameras, the system can configure or dictate a capture/trigger rate for each line of pixels and/or an exposure based on the speed of the train at a time of capture. Configuring the line camera capture settings in this way can minimize geometric distortion (e.g., "stretch" or "squeeze") of particular images, even while the speed of the passing train changes, such as during train acceleration or deceleration (braking) events.

As shown in FIG. 17, the system can arrange a plurality of individual line captures 1702 and/or exposures into various image components. The inspection portal system can combine the various image components into a concatenated image 1704, which is representative of one or more full railcars or portions of interest of railcars. The system can perform the continuous capture using one or more line scan cameras by employing the train speed estimation system to generate precise knowledge of the location and/or timing of a railcar's axles as they pass through the inspection portal system. For example, the system can identify a specific starting and ending line of interest to generate an image of the component/region/railcar of interest. The line scan cameras can adjust a capture rate based on a detected railcar speed, speed trajectory, axle trajectory, etc.

Figure 18:
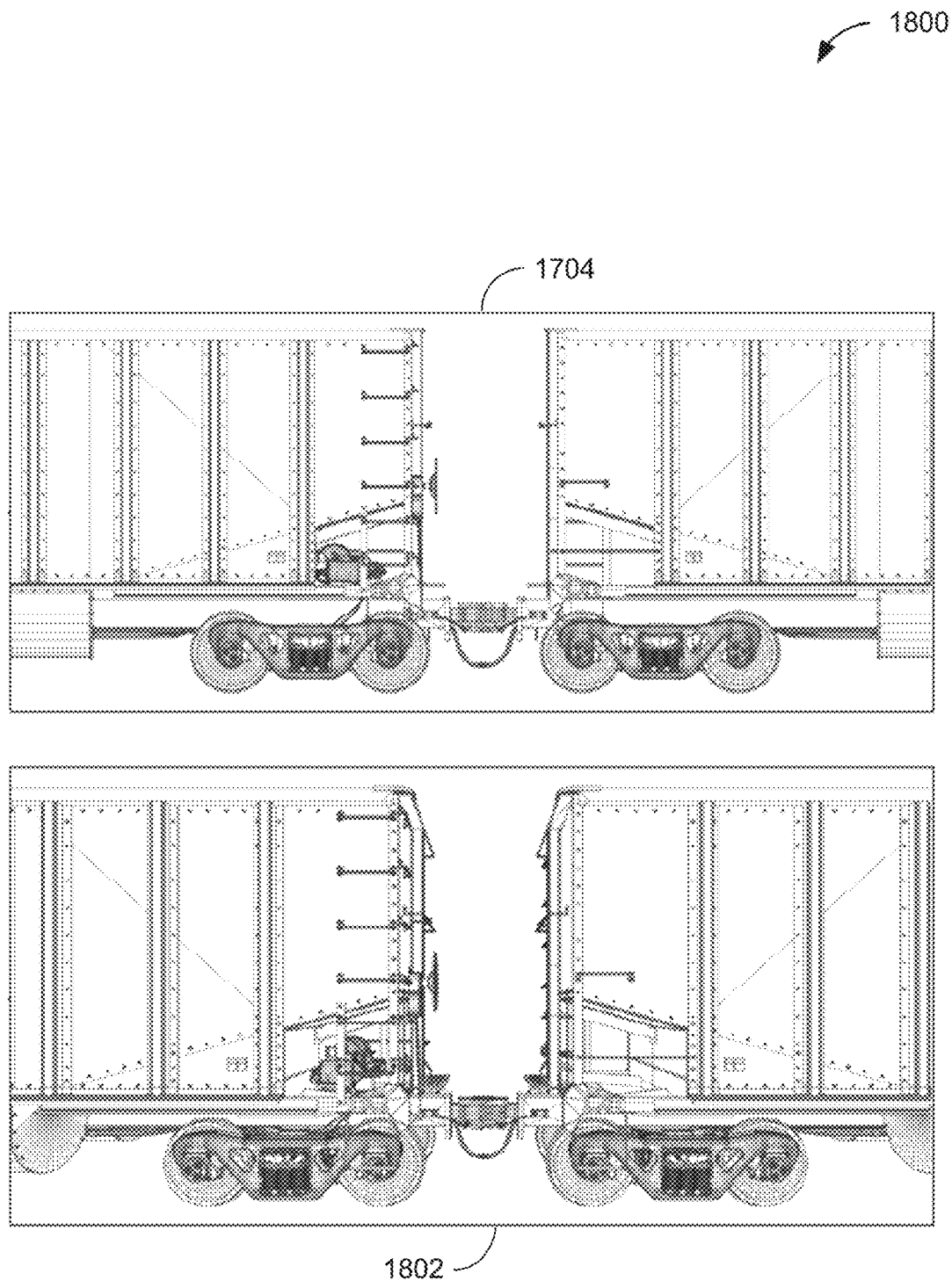
FIG. 18 illustrates a line scan and area scan image capture comparison, in accordance with the disclosed technology.

FIG. 18 illustrates side-by-side comparisons of a line scan image capture and an area scan image capture from one or more cameras of the inspection portal system. The system can be configured to capture both line scan images and area scan images for a particular railcar component, cabin/car, wheel, etc. As shown in FIG. 18, the line scan capture 1704, as discussed above in connection with the description of FIG. 17, is shown in comparison to an area scan image 1802 of the same train cars and components. The area scan image 1802 can allow for the system to identify certain railcar components, and/or issues corresponding to those components, based on the curved (or wide view) perspective of area scan images. In response to receiving and processing an area scan image, such as the image 1802, the system can identify an anomaly, defect, or issue corresponding to a particular train car and in turn configure a line scan camera to capture data corresponding to the particular train car and/or the identified issue.

Example Railcar Identification

Figure 19:
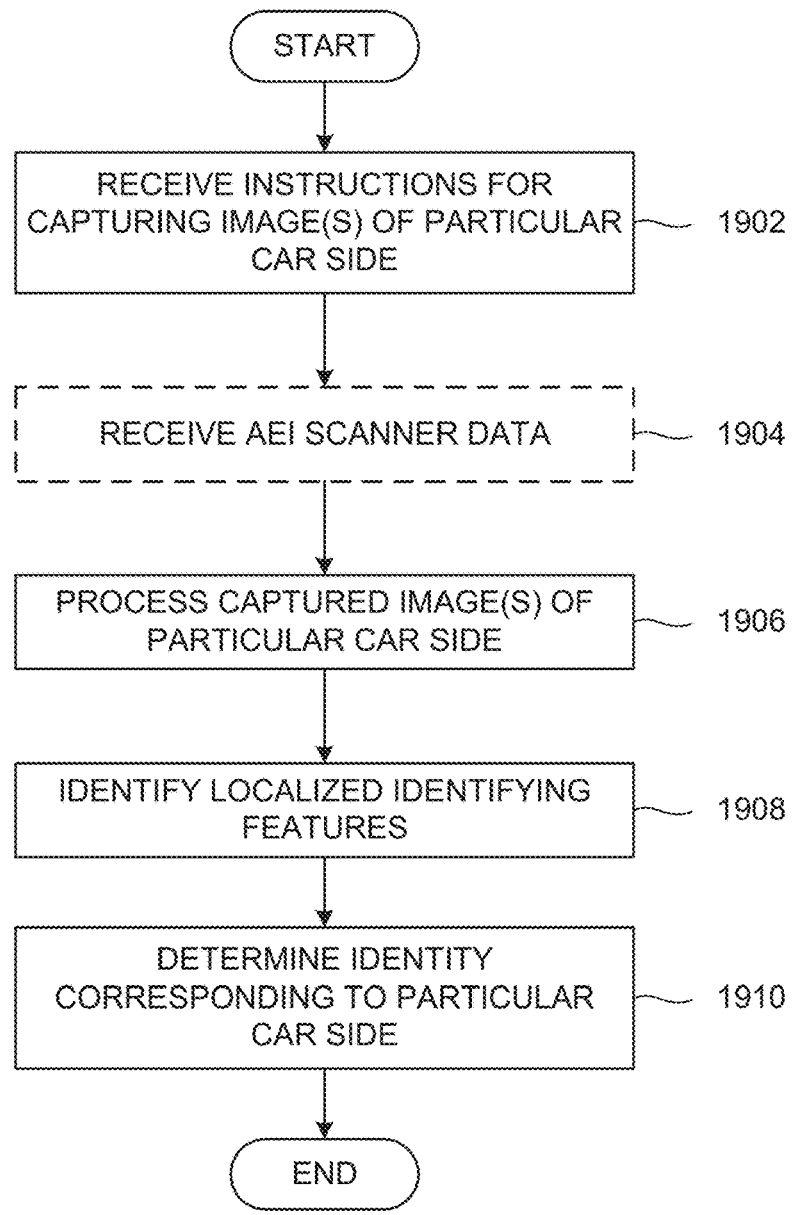
FIG. 19 is a flowchart of an example railcar identification process, in accordance with the disclosed technology.

FIG. 19 is a flowchart of an example railcar identification process 1900. At least one objective of the system as disclosed herein is to identify identification numbers (IDs) for entire railcars and/or individual cars. As is discussed below, railcars are generally equipped with RFID tags (or similar passive tags like) that include railcar information encoded thereon and can be scanned via AEI devices or other similar radio frequency scanners; however, AEI devices and scanners are prone to failure, can include outdated ownership information, etc. Accordingly, the inspection portal system can leverage one or more cameras for visually determining railcar IDs and/or individual car IDs without the need for AEI scanners. Identifying railcars is particularly important for tracking railcars as they travel throughout a railway system. Given many railcars transport materials such as high-value goods, toxic chemicals, etc., it is important to know where the railcars are in their respective journeys through the railway system for mitigating risk of loss and/or injury. Tracking railcars also allows for a generating and managing a predictable railway schedule, which not only promotes efficient use of the railway system, but also reduces the risk of railway collisions. Further, identifying individual cars on a train allows for the system to determine specifically which car exhibited an issue as detected by one or more sensors or cameras in the inspection portal discussed herein. In this way, the system can more effectively generate notifications or service alerts in connection with identified car issues or defects (for example, a faulty brake rigging) by including a specific car ID in the notification.

At step 1902, the system can receive instructions for capturing images of a railcar. The instructions for capturing images of a railcar can be generated by other system components (such as the controller 1214 or trigger generator 1316) in response to detecting a railcar via the wheel detection sensors 1208. The instructions for capturing images of a railcar can include instructions for capturing images (or readings) corresponding to a particular car or cabin of the railcar. The instructions can include, for example, a particular time at which a particular camera should be activated or triggered for capturing the railcar image. The instructions can be generated based on, for example, an estimated speed corresponding to a railcar as the railcar is approaching and passing through the inspection tunnel. The instructions to capture a particular car side can include which cameras, sensors, or devices, should be used for capturing the data. The instructions for capturing images of a particular train car side can be generated in response detecting, via one or more other data capturing devices, an issue or anomaly in connection with the particular train car. Accordingly, the system can instruct for one or more cameras within the inspection portal to capture images of the particular train car side, such that those images can be processed and stored in connection with the detected issue.

At step 1904, the system can (optionally) receive AEI scanner data. Railcars are generally equipped with RFID tags that include railcar information encoded thereon. Moreover, AEI scanners can be used to detect the RFID tags for obtaining the information encoded thereon. However, RFID tags can fail for particular cars (and sometimes for entire trains). Moreover, AEI scanners generally require for trains to be traveling at specific speeds for capturing readings from RFID tags equipped thereon. For example, if a train travels past an AEI scanner at a speed greater than 30 mph, 40 mph 50 mph, 60 mph, 70 mph, etc. or at any speed that is incompatible with the scanner, the AEI scanner may not successfully read the RFID tag(s) on the train. Given car IDs are generally painted or printed on the cars in at least four locations, the system can leverage cameras and computer vision technology for detecting visible car IDs and using the same for railcar verification. Implementing both AEI scanner data and visually identified railcar identification data can result in a more robust and reliable system overall.

At step 1906, the system can process the captured images of the particular train car side. Processing the captured images can include receiving the captured images at the processing system 1204 and furthermore providing the images to one or more image processing algorithms. Processing the captured images can include compressing the images into a particular format, performing computer vision algorithms on the captured images, passing the captured images through one or more filters, providing the images to machine learning models, etc. Processing the captured images can include scanning the images for one or more identifying features, where the identifying features are indicative of a specific train car. For example, an identifying feature can include identifying text in a particular location on a train car side, such as a unique identification number assigned to the train car. The system can be configured to scan railcar images for any identifying feature corresponding to particular cars, and the system can generate associations between unique identification numbers and other identifying features. For example, the system can be configured to associate a particular piece of graffiti, damage on a train car body, etc., with the identification number corresponding to that train car. The system can also be configured to generate unique car IDs for train cars on which the system detects graffiti, damage, or other identifying characteristics, even without identifying a visible car ID on the train car or detecting an RFID in connection with the train car. In this way, the system can create a database, registry, or tracking system that can provide or generate an identification number for a train car based on identifying features of the car. Accordingly, the system can identify train cars even if the car's unique identification number is obscured.

At step 1908, the system can identify localized identifying features within the processed images of the car side. As mentioned above, the system can be configured to perform text identification algorithms for identifying unique identifiers on train car sides. For example, the system can perform optical character recognition (OCR) algorithms for identifying text on a train car side.

At step 1910, the system can determine a train car identity corresponding to a particular train car side. Determining a train car identity can include determining a match between detected train car identifying features, such as a detected unique identification number, and known features stored in the system database(s). Determining a train car identity can include matching one or more identifying features, such as graffiti or other feature as detected on a train car side, to know features associated with a car identification number as stored in the system database(s). In response to detecting and localizing identifying features on a train car side, the system can compare the detected and localized features to a plurality of stored railcar features. If new identifying features are detected on a car side, those new features can be stored in connection with preexisting database entries for the train car side.

Figure 20:
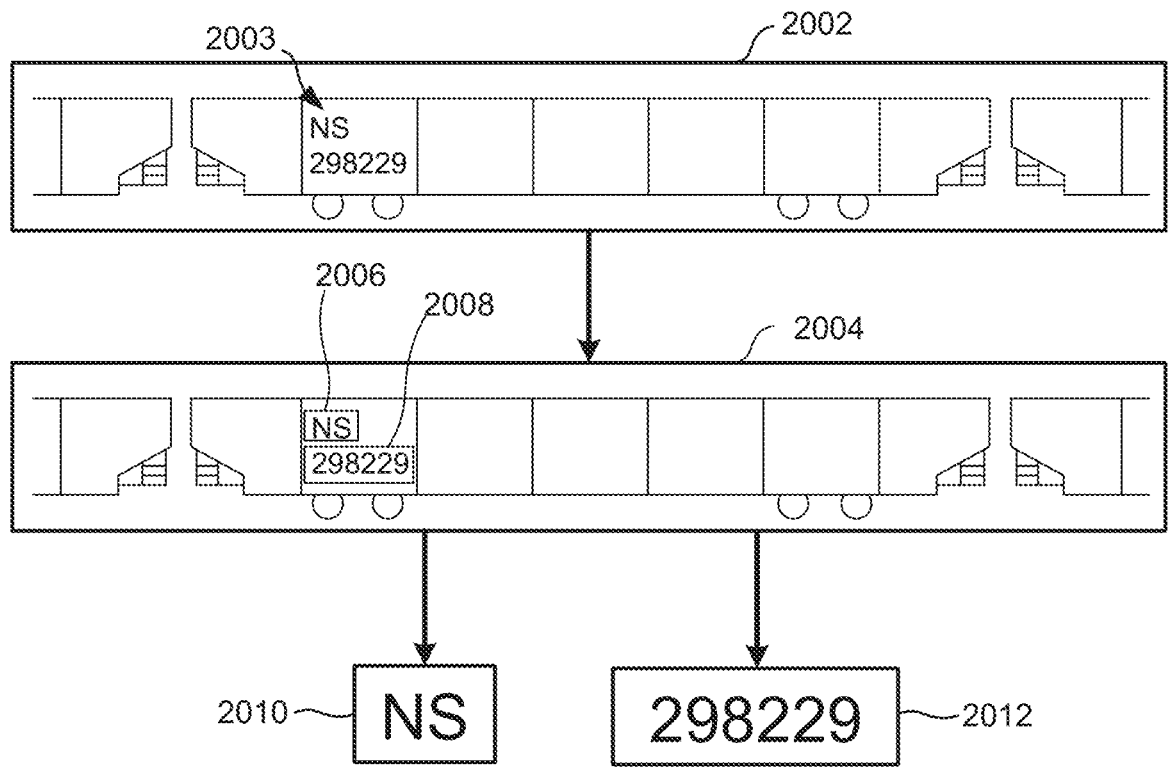
FIG. 20 is a visual depiction of aspects of the railcar identification process, in accordance with the disclosed technology.

FIG. 20 is a visual depiction of the railcar identification process 1900, as discussed above in connection with the description of FIG. 19. The system can be operatively configured to identify railcar identifiers (also referenced herein as "railcar IDs" or "car IDs") using text detection algorithms (such as OCR algorithms, or the like). The OCR algorithms can process various types of data captured by the cameras, sensors, and devices of the inspection portal system to determine the car IDs. For example, the car IDs are typically painted or printed on the cars in at least four locations (for example, both sides, the front, and the back). The system can verify the correct car ID through the OCR algorithm by reading and providing the car ID information when the AEI scanner fails. The system can also record line scan images of full cars, for example, in image storage 1320. The computing system can break up the line scan image of the railcars based on the number of axles identified from the AEI scanner and/or the wheel sensor data.

Car IDs typically include a car initial and car number. The car initial is typically a multi-letter code denoting a car owner, and the car number is the number associated with the specific car. As shown at image 2002 of FIG. 20, for example, the system can receive and process a full car line scan image. Referring back to the process 1900 as discussed in connection with FIG. 19, the full car line scan image can be received in connection with the step 1902 (receiving instructions for capturing image(s) of a particular car side). The system can be operatively configured to identify, from the full car line scan image, a region of text 2003 printed, painted, or otherwise appearing on the train car. For example, the region of text 2003 can include the car initials, "NS," and the car number, "298229."

Continuing this example, and referring now to the image 2004 of FIG. 20, the system can commence the identification process of the car by localizing text on an image of the car body and determining if that text represents a car ID. The image 2004 illustrates a scenario in which the computing system identifies text and highlights, or localizes, the text with bounding boxes. For example, the car initial "NS" is shown as being identified by the box 2006, and the car number "298229" is shown as being identified by the box 2008. The system can filter out text that is not identified as the car ID. For example, the system can localize and filter some or all text identified on the car body. Continuing this example, the system can filter the text based on the location and orientation of the particular text. The system can include a recognition model to determine the contents of the text, as well as for performing the text localization and filtering. For example, the images 2010 and 2012 can illustrate examples of the localized text (corresponding to the box 2006 and box 2008, respectively) which can be provided as inputs to a recognition algorithm which the system is operatively configured to execute. Further continuing the previous example, the computing system can match the text to a list of known car initials and numbers to find the text and number that most likely represents the car ID. The system can store images with corresponding identified car IDs for future reference. The system can compare the stored images with the AEI scanner data to match the railcars at the arrival and departure location of the train.

The system can use, or provide, any particular line scan image of a full (or partial) train car as an input into the processing for railcar identification. The processing for determining railcar identification based on railcar images can be performed at the image processing module 1322 within the processing system 1204. The image processing module 1322 can include executing a text location detector, a text recognition model, machine vision tools included in SDKs such as the Spinnaker SDK, and other similar processes to perform car ID identification.

The system can execute the text location detector to identify the location of text on the railcar. The text location detector can include, for example, a Character Region Awareness for Text Detection (CRAFT) model. The CRAFT model is a deep-learning model that can identify regions where text is likely present in the line scan images. The CRAFT model can generate boxes identifying locations which may include text. The CRAFT model can be replaced with any particular machine learning and/or deep-learning model which can generate character-level bounding boxes and corresponding affinity scores.

The system can be configured to execute a text recognition model to identify the context of the text recognized by the CRAFT model. The text recognition model can include, for example, Visual Geometry Group (VGG) for feature extraction, a Bidirectional Long Short-Term Memory (BiLSTM) layer for sequence modeling, and a Connectionist Temporal Classification (CTC) for sequence alignment. The system can use the VGG component to extract rich features from the input image patches. The system can use the BiLSTM component to model the sequential dependencies between the extracted features. The system can include the CTC layer to align the output sequences of the BiLSTM with the ground truth text labels, allowing the system to train the models in an end-to-end manner without requiring pre-segmentation of the characters.

The system can perform data preparation for training against one or more models. For example, to train the machine learning models effectively, the system can generate synthetic data using a variety of techniques to simulate the diverse conditions under which text appears on train cars. The system can employ the synthetic data used in conjunction with real-world labeled data to train the models. The synthetic data can include randomly generated text from a random text generator. The synthetic data can include font variations (e.g., different font types, weights (e.g., bold), and styles (e.g., italics)) to mimic the variability of text appearance on train cars. The system can generate synthetic data with different font colors. The system can generate synthetic data with different background conditions. The system can generate and store stenciling and spray-paint artifacts into the synthetic data to mimic real world vandalism of rail cars that might obstruct the view of the car IDs. In this way, the system can include one or more machine learning models that can be specifically trained to detected and associate a particular piece of graffiti, damage on a train car body, paint chipping, or other distinguishing characteristics in a train car image, with an identification number corresponding to a train car.

Example Focus Cart Camera Configuration Process

Figure 21:
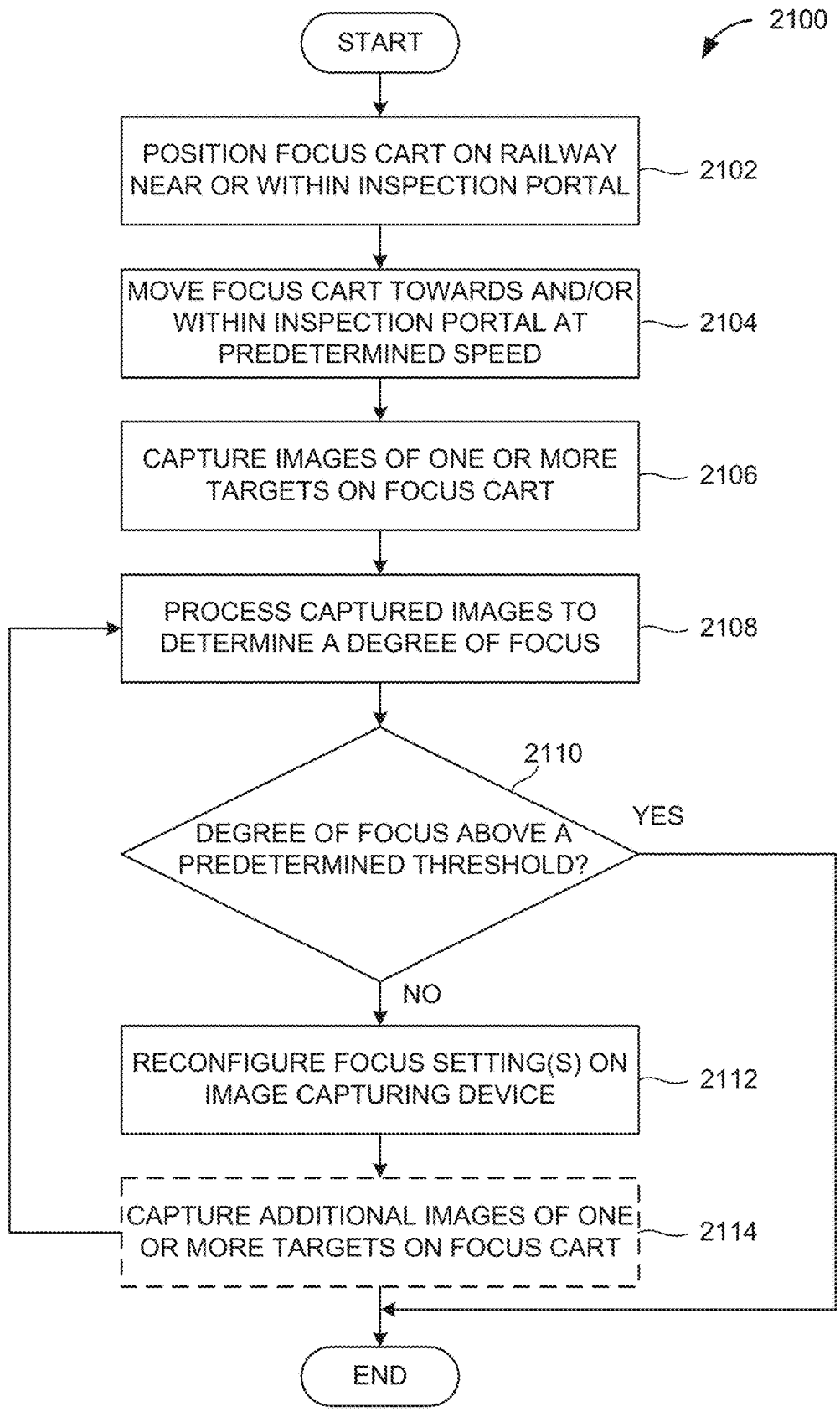
FIG. 21 is a flowchart of an example focus cart configuration process, in accordance with the disclosed technology.

FIG. 21 is a flowchart of an example focus cart configuration process 2100. As discussed below in connection with the description of FIG. 26, the inspection portal system can include a portal focus cart 2600 (also referred to herein as a focus cart). In accordance with the disclosure herein, the focus cart 2600 can include one or more surfaces on which targets 2601 are displayed. The focus cart 2600 can be positioned onto the train track and moved through the inspection portal. In response to the focus cart 2600 moving through the inspection portal, the one or more cameras can capture images of the targets 2601 on the focus cart 2600.

The focus cart 2600 can function as a calibration tool of the inspection portal system, as disclosed herein. For example, the one or more cameras, or data capturing devices, can capture images or readings from the focus cart 2600 as it passes through the inspection portal system. Continuing this example, the system can analyze the data gathered from the focus cart 2600 and can generate calibrations and adjustments for the one or more sensors based on the analyzed data. The focus cart 2600 can have various focus patterns, charts, and targets (such as the target 2601) placed at various locations on the focus cart 2600. In one example, the locations of the targets 2601, as placed on the focus cart 2600, generally correspond to locations of particular railcar components. Thus, focusing cameras on those regions can produce the desired results when actual trains, locomotive, or railcars pass through the inspection portal. As will be discussed in greater detail below in connection the description of FIG. 21, capturing images of the targets on the focus cart can result in the one or more cameras becoming focused for capturing images of a railcar.

The process 2100 can begin at step 2102, where the focus cart 2600 is positioned on a railway, or train track, near the inspection portal or within the inspection portal. The focus cart 2600 can be coupled to one or more railcars, such that the focus cart 2600 is pulled (or pushed) through the inspection portal by a railcar. In other examples, the focus cart can be positioned on the railway without a railcar. The focus cart 2600 be positioned on a railway via a Hi-Rail vehicle (or the like), such that the focus cart 2600 is pushed or pulled throughout the track by a vehicle that is not a train. The focus cart 2600 can be positioned onto a railway, and furthermore pushed through the inspection portal, by a human; however, the focus cart 2600 can include one or more motors and a drive system or propelling itself through the inspection portal at speeds similar to those of a passing railcar.

At step 2104, the focus cart 2600 is moved towards and/or within the inspection portal at a predetermined speed. The targets 2601 on the focus cart surface are specifically designed to be identified by one or more cameras for focusing those one or more cameras in preparation for capturing in-focus images of subsequently passing railcars. Accordingly, the focus cart 2600 can be moved towards, withing, and/or through the inspection portal at a predetermined speed. The predetermined speed can be a speed corresponding to an expected railcar speed (e.g., 5 mph, 10 mph, 15 mph, 25 mph, etc.). The inspection portal system can receive an indication corresponding to an approaching train's speed, thus allowing for the focus cart 2600 to be moved through the inspection portal in advance of the train's arrival. The focus cart 2600 can include one or more motors and a drive system for propelling itself through the inspection portal. The focus cart 2600 can also be pushed or pulled through the inspection portal by trains, Hi-Rail vehicles, pulley systems, people, etc.

At step 2106, one or more cameras at or within the inspection portal system can capture images of the one or more targets on the focus cart 2600. The targets 2601 on the focus cart 2600 can be line patterns, pictures, or generally any image. The targets on the focus cart 2600 can also include text, such as letters and/or numbers. The text on the focus cart 2600 patterns can be identifiers for the targets. For example, the system can configure one or more cameras to capture images of a particular focus cart target on which the letters "AA" are printed. The one or more cameras can first capture wide-view images in which each focus cart target is present, and then subsequently narrow the field of view to include only the target identified by "AA" in response to identifying the "AA" identifier within the first captured wide-view images. The focus cart targets can have fiducial markers such that their location and orientation may be automatically detected by image processing algorithms of the computing system applied to the image feeds from the cameras.

At step 2108, the captured images are processed to determine a degree of focus. A degree of focus can be measured or determined based on image processing and focusing techniques such as contrast detection and phase detection. A degree of focus can be a compressibility measurement or coefficient, where images that are more focused require more computing resources to compress due to higher contrast between lines and edges, as compared to unfocused images that are less cumbersome to compress due to less contrast between lines and edges. The nvJPEG library can generate a compression coefficient within the range of 0-100, where higher coefficients corresponding to higher image quality and focus, but also more data and thus are more cumbersome and computing intensive to compress. A low compression coefficient (e.g., 1, 2, 3, 4, 5, 10, 15, etc.) can be representative of an image that is generally blurry or out-of-focus. In one example, a degree of focus can be a contrast measurement, such as the standard deviation of the image pixel intensities, or an entropy value of a histogram.

At step 2110, the system determines whether the degree of focus is above a predetermined threshold. If the degree of focus is above a predetermined threshold, and thus the one or more cameras are capturing images that are sufficiently focused, the process 2100 can end. However, if the degree of focus is not above a predetermined threshold, the process 2100 can proceed to step 2112.

At step 2112, the system can reconfigure the focus settings on the one or more cameras (or image capturing devices). Reconfiguring the focus settings can include instructing a stepper motor operatively connected to a camera to rotate a focus ring on the camera lens. Reconfiguring a focus setting can also include repositioning the camera's aim, such that the camera lens is pointed in a different direction. The one or more cameras can be installed on a configurable and adjustable base that allows for the base orientation to be raised or tilted by one or more stepper motors, servo motors, or the like, which can be installed at various points around the base's perimeter.

Step 2114 of the process 2100 can be an optional step. At step 2114, the system can capture additional images of the one or more targets 2601 on the focus cart 2600. For example, focusing some camera types can include comparing the degree of focus between multiple images to determine which image has a greater degree of focus (higher contrast). The system can be configured to continue to capture additional photos, and to furthermore compare the contrast between the captured photos, until an upper contrast limit is reached where additional adjusting of a camera's focus settings no longer results in a higher degree of focus.

Example Infrared Imaging

Referring now to FIGS. 22A-22F, example infrared (IR) images for processing and abnormality detection are shown. The inspection portal system can include one or more infrared (IR) cameras or sensors, and the system can be configured to receive and process infrared images of the railcars. For example, the infrared cameras can be integrated into the portal structure and connected to the railcar detection system and processing system. The system can manage triggering, data acquisition, and other functionalities of the infrared cameras. The inspection portal can include enclosures with infrared transparent material for housing the infrared cameras. The system can timestamp the infrared images, associate the infrared images with metadata (such as data received from AEI scanner), combine the infrared images with (or compare the infrared images to) corresponding images obtained via one or more line scan cameras or area scan cameras, etc.

The infrared images can be used for initiating the configuration of one or more separate cameras. For example, infrared images of railcar wheels can be captured and processed as a railcar approaches or enters an inspection portal, and, if an anomaly or abnormality in the infrared images is detected, the system can subsequently trigger one or more cameras to capture additional pictures, readings, data, etc., corresponding to the detected anomaly or abnormality.

The computing system can replace the detected infrared reading values/temperature with high-contract colors for ease of readability. For example, the computing system can map detected temperatures to a range of colors to render them to end users to make it easy to view and appear more like a normal color photo. It should be understood from the discussion herein that the temperature ranges and heat profiles discussed and illustrated are for example purposes only, are intended to aide in understanding of the disclosed systems and methods, and are not to be construed as limiting.

Figure 22A:
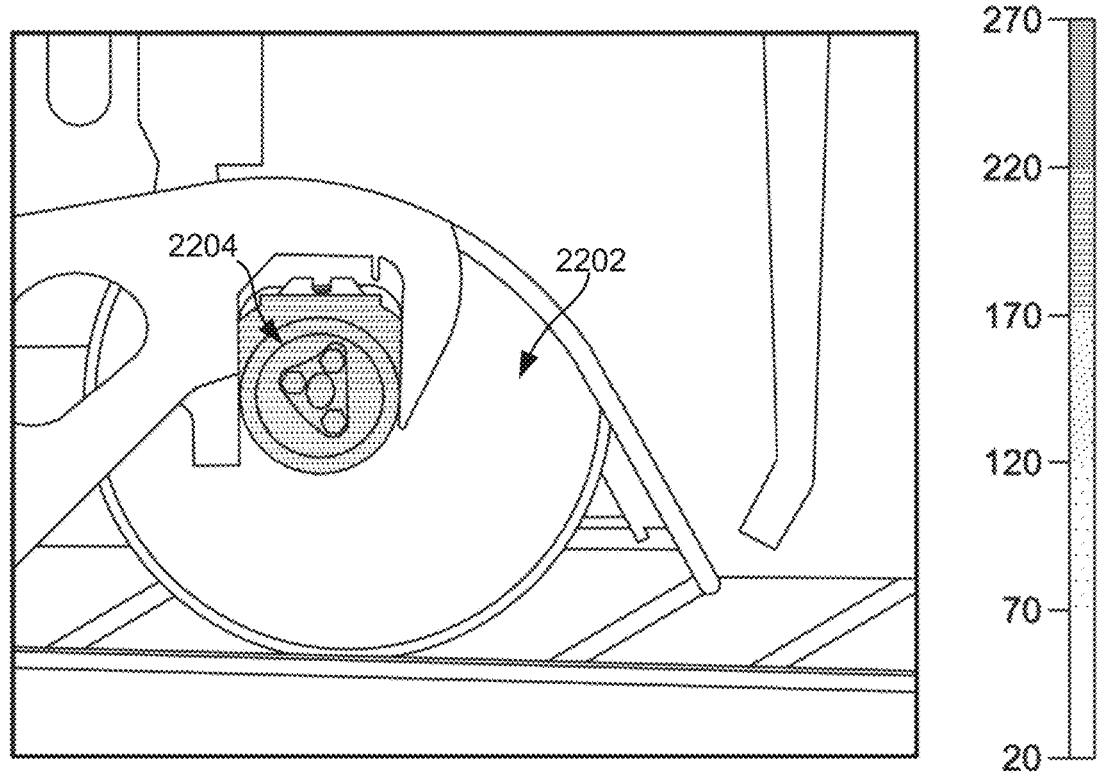
FIG. 22A-22F illustrate example infrared images for processing and abnormality detection, in accordance with the disclosed technology.

FIG. 22A illustrates an example infrared image of a wheel and bearing exhibiting a normal, or an expected, heat profile. In particular, FIG. 22A illustrates a wheel 2202 and a wheel bearing 2204 that is detected as being substantially hotter than its respective wheel 2202. For example, the bearing 2204 illustrated in FIG. 22A is shown as exhibiting a temperature in the range of 170-220 degrees (Fahrenheit), while the wheel 2202 and surrounding railcar components are shown as exhibiting a temperature in the range of 20-70 degrees. In this example, the infrared image can be indicated, by the system, as normal or expected because a wheel bearing typically exhibits a particular amount of heat due to friction from the railcar wheel and axles. However, if the system detects a temperature above 220 degrees, the system can indicate that infrared image as representing an anomaly or abnormality.

Figure 22B:
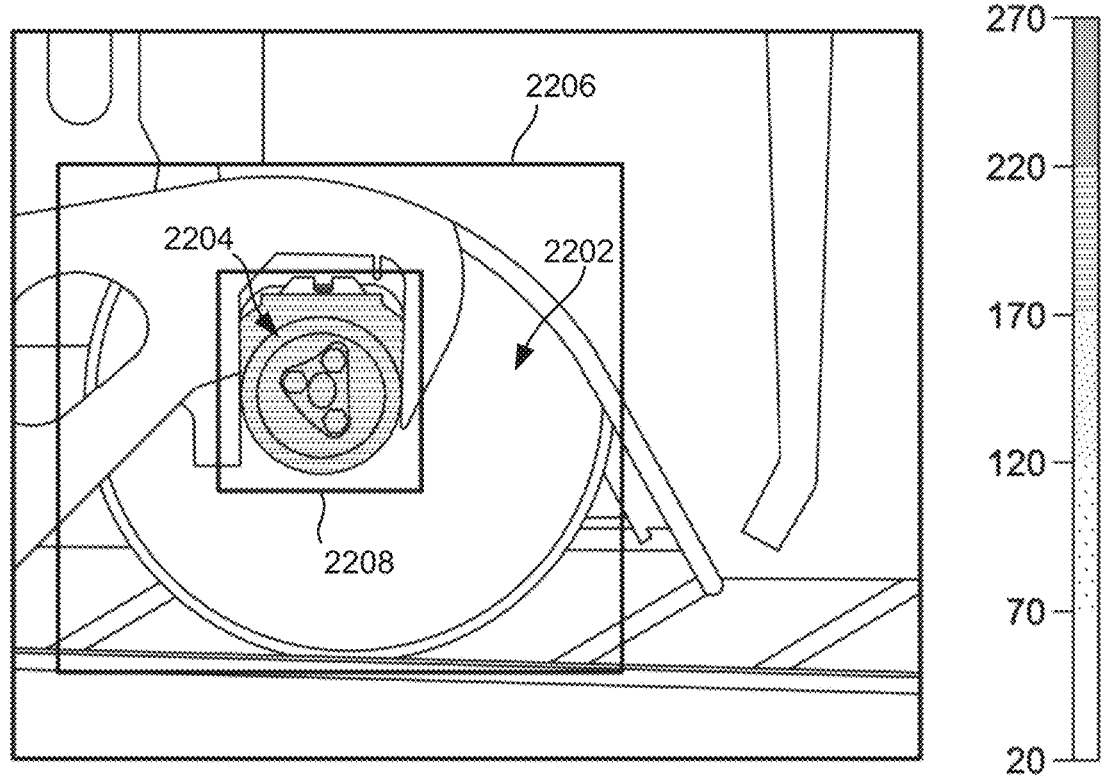

FIG. 22B illustrates a localized infrared image of the wheel 2202 and bearing 2204. In particular, FIG. 22B illustrates the infrared image from FIG. 22A in response to the system performing a localization process. For example, and in response to receiving infrared image captures, the computing and processing system of the inspection portal system can use a localization model to determine the locations of the bearings, wheels, and other railcar components, within the captured images. As shown in FIG. 22B, the localization model can identify the wheel 2202 within the infrared image in connection with the box 2206, and the localization model can further identify the wheel bearing within the infrared image in connection with the box 2208.

The computing system can include a first algorithm to determine if the heat detected in a particular region is higher than a critical value in either region. For example, the computing system can apply a threshold to the infrared images to identify areas that are hotter than the desired threshold. Continuing this example, the computing system can analyze each individual pixel in the infrared images to identify a hot wheel and/or hot bearings (or any other component) and generate alerts regarding the same.

In response to localizing particular railcar components within infrared images, the system can determine an average temperature value detected within the localized area of the infrared image. The system can be configured to compare average temperatures from multiple localized areas of an infrared image for determining whether an abnormality, anomaly, defect, etc., is present. For example, and referring particularly to FIG. 22B, the system can determine an average temperature (based on pixel values) within the box 2208, as well as an average temperature within the box 2206 (inclusive or exclusive of the average temperature corresponding to box 2208), and the system can determine whether the ratio of those two average temperatures is within a predetermined threshold. The predetermined threshold can be based on prior known average temperatures for the localized railcar components.

Figure 22C:
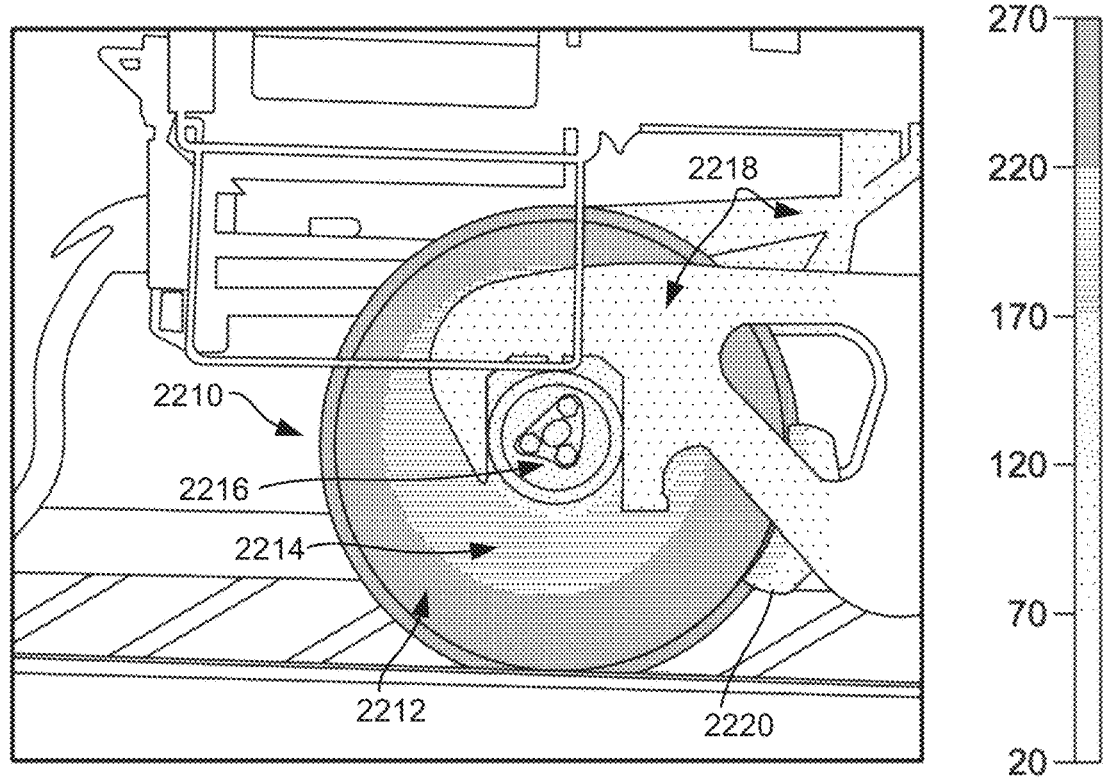

FIG. 22C can illustrate an example of an applied hand brake as detected in an infrared image. The system discussed herein can include a second algorithm configured to identify wheels and classify the wheels based on different issues. For example, based on heat profiles detected on the wheel itself, which can represent if and/or how a wheel is heating up, the location and extent of heat emanating from the wheel, etc., the system can be used to identify several issues (e.g., damaged wheel, damaged bearings, applied hand brake). As shown in FIG. 22C, a train wheel 2210 is shown exhibiting elevated heat levels across the entirety of the wheel 2210. A wide outer region 2212 of the wheel 2210 is shown exhibiting the highest temperature (shown as 220-270 degrees), an inner region 2214 is shown exhibiting a slightly cooler (yet still elevated) temperature (shown as 170-220 degrees), and the bearing 2216 is shown exhibiting a relatively normal temperature (shown as 120-170 degrees). Moreover, FIG. 22C illustrates how other railcar components that are physically proximate to, or physically connected to, the railcar wheel 2210 are also exhibiting elevated temperatures. For example, the railcar components 2218 are shown exhibiting temperatures in the range of 70-120 degrees, and these components typically exhibit temperatures in the range of 20-70 degrees. In response to detecting the abnormal heat pattern as shown in FIG. 22C, the system can determine that the railcar wheel 2210 is experiencing an issue. The system can further identify (for example, via the localization process/model discussed herein) that the wheel 2210 includes a brake 2220, and that the brake 2220 is exhibiting an elevated heat pattern. Accordingly, the system can determine that the likely cause of the detected elevated heat pattern is an applied handbrake.

The system can be configured to perform or execute various automatic tasks in response to identifying issues such as an applied handbrake. For example, the system can generate an alert regarding the applied handbrake to be transmitted to a railcar controller, conductor, etc. The system can automatically initiate an instruction for the handbrake to be disengaged (without requiring human intervention). The system can initiate a work order for the handbrake, or specific braking components such as brake pads or calipers, to be replaced.

In addition to infrared sensors, the system can implement audio sensors (or other sensors) for detecting an applied hand brake, such as the brake 2220. For example, the system can include one or more audio sensors that can be configured to capture audio readings in connection with a railcar as the railcar approaches or travels through the inspection portal. The audio sensors can be configured to capture audio samples from a railcar, and the system can process the audio samples to detect frequencies, amplitudes, or other audio signal characteristics indicative of abnormalities or anomalies (relative to baseline or known audio samples) in the audio samples. The system can be configured to detect signal characteristics (such as screeches at particular frequencies, rumbles, rattles, etc.) within audio samples that are indicative of railcar issues such as applied hand brakes. Accordingly, in response to detecting abnormalities in audio samples, the system can subsequently configure and trigger one or more cameras or sensors to capture additional images or readings of the particular railcar cabin/car in connection with the detected abnormality. The system can generate a timestamp corresponding to the audio sample (and the detected abnormality within the audio sample). Based on the audio sample timestamps, and furthermore based on the audio sensor location(s) with respect to other cameras and sensors, and also based on the detected railcar speed, the system can determine a moment in time at which the system should trigger for one or more additional cameras or sensors to capture additional images or readings, such that the additional images or readings correspond to the same railcar cabin from which the abnormal noise was detected.

Figure 22D:
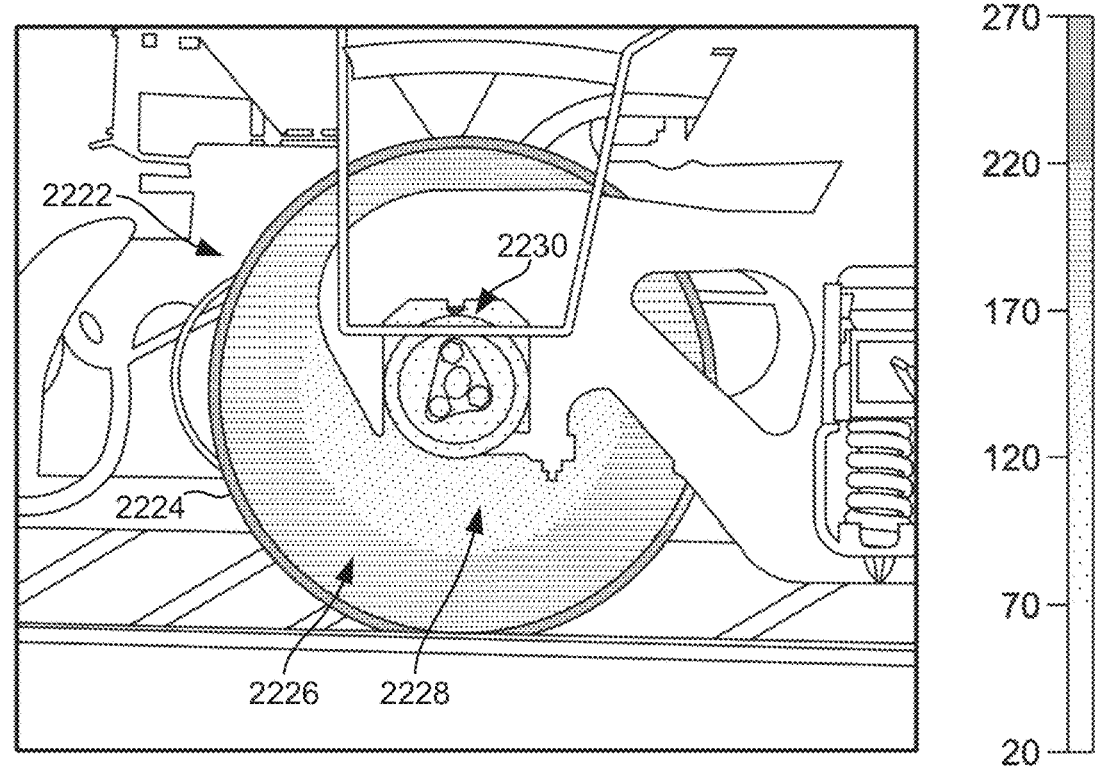

FIG. 22D illustrates an example of a wheel 2222 exhibiting flanging as detected in an infrared image. Flanges are lips, or protruding ridges, generally located at the edges of a railcar wheel, for securing the railcar wheel to the rail upon which it is traveling. For example, a railcar axle can be coupled with at least two wheels at opposite ends, where the wheels include outer (and/or inner) flanges. The flanges can create a fixed range of possible lateral movement for an axle and wheels that are in connection with a rail. Wheel flanges can resist forces (such as lateral forces) being exerted onto the wheel and/or axle. In general, flanged wheels ensure that railcar wheels rotate along a rail instead of shifting laterally across a rail.

Railcar axles including flanged wheels can be designed such that the flanges make periodic (or consistent) contact with a rail for securing the railcar wheel to the rail, while also minimizing friction between the wheel and the rail. Accordingly, there can be an expected and/or tolerable amount of friction between the rail and wheel flanges for safety and practical reasons (such as preventing train derailments); however, certain amounts of force or friction on any particular wheel flange can result in a wheel or axle failure. Flanging is generally a scenario in which a wheel rim (such as a flange) is contacting the rail for an extended period of time (e.g., for a time greater than a predetermined duration, or any extended period of time), which can result in excessive friction and heat. The system disclosed herein, for example, can be configured to process infrared images to detection flanging scenarios. Further, the computing system can be configured to generate alerts in response to detecting flanging.

As shown in FIG. 22D, the system can detect flanging in response to processing an infrared image and identifying, within the image, elevated heat levels at or around the wheel edge 2224. For example, in FIG. 22D, the wheel edge 2224 is shown exhibiting temperatures in the range of 220-270 degrees, and the inner regions 2226 and 2228 of the wheel, as well as the bearing 2230, are shown exhibiting less heat. In this example, the system can process the infrared image and determine that because only the railcar wheel edge 2224 is exhibiting the highest temperatures, and further because the heat is relatively isolated to the wheel edge 2224, that this heat pattern is indicative of flanging. The system can provide the infrared image to a machine learning model that is specifically trained to identify wheel abnormalities based on heat profiles.

Figure 22E:
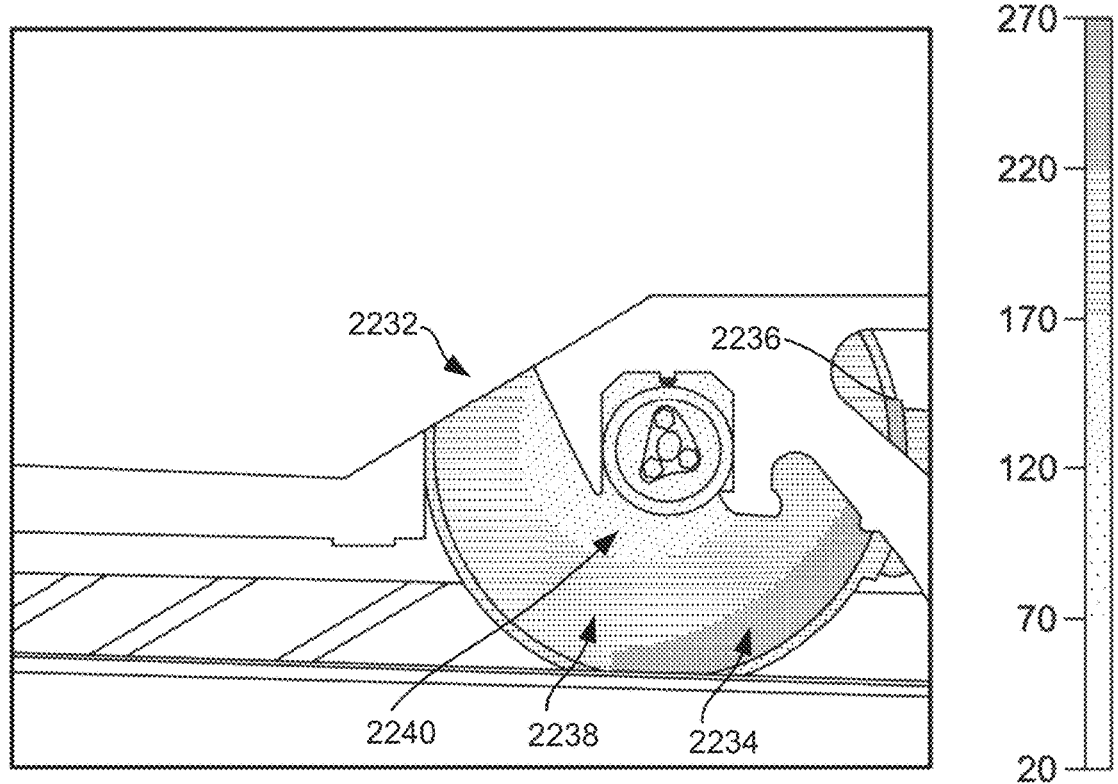

FIG. 22E can illustrate an example of a wheel 2232 exhibiting angularity as detected in an infrared image. In general, angularity can occur in scenarios in which a brake rigging is improperly mounted (or improperly calibrated), which causes parts of the brake rigging to unevenly apply a braking force. Accordingly, the uneven breaking force can result in an uneven and/or irregular heat pattern in a wheel. As shown in FIG. 22E, the half-moon-shaped region 2234 below a brake rigging 2236 which is shown exhibiting temperatures in the range of 220-270, as well as the inner regions 2238 and 2240 (which are shown exhibiting temperatures in the rages of 170-220, and 120-170, respectively) can be indicative of angularity.

Figure 22F:
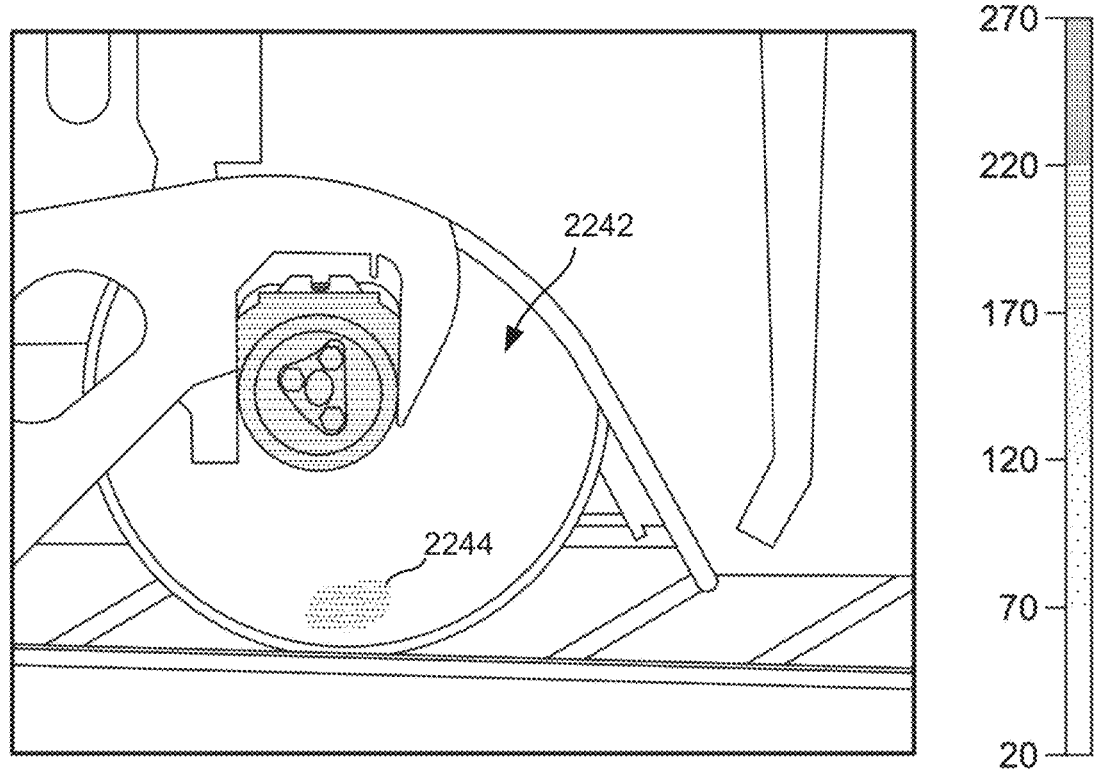

FIG. 22F can illustrate an example of a wheel 2242 exhibiting sliding. In general, sliding can occur when a relatively small area of the wheel (such as the area 2244) comes into direct contact with the rail and thus generates heat at that small area. Though not necessarily discussed in detail herein, the computing system can be configured to identify and classify other issues based at least in part on infrared images.

Figure 23:
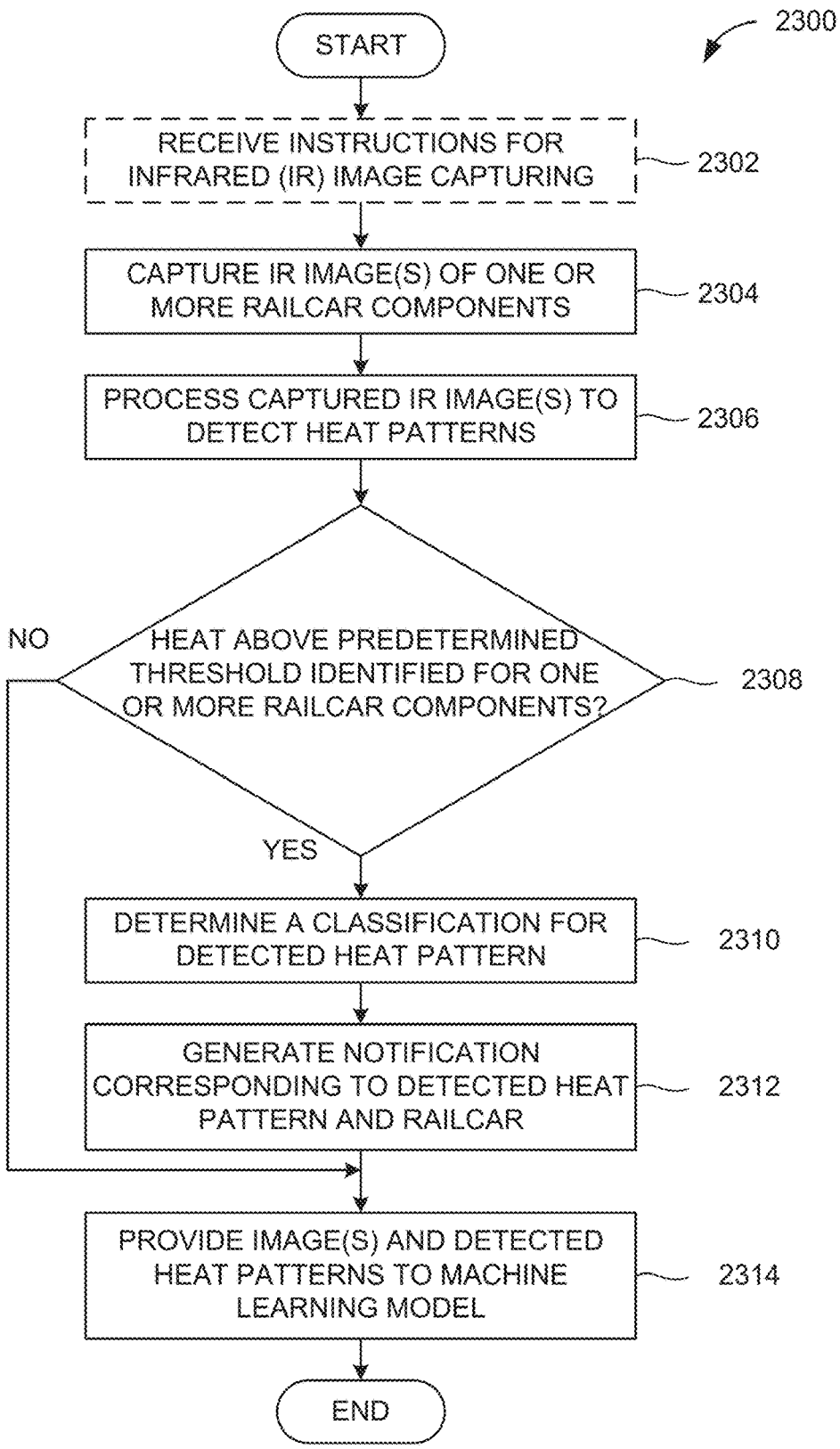
FIG. 23 is a flowchart of an example infrared image capturing and processing process, in accordance with the disclosed technology.

FIG. 23 is a flowchart of an example infrared image capturing and processing process 2300. As discussed above in connection with FIGS. 22A-22F, the system can be configured to capture and process infrared images, readings, etc., for detecting and identifying railcar issues, abnormalities, anomalies, etc.

The process 2300 can begin at step 2302, where the system receives instructions for infrared image capturing. The step 2302 is shown with dashed lines to indicate that the step 2302 can be optional. For example, the system can be configured to capture infrared images for the entire length of a train that is passing through an inspection portal. In this way, the system can be configured to continuously capture IR images of a train passing through the inspection portal, without receiving instructions for doing so. However, the system can also be configured to specifically instruct one or more infrared cameras, sensors, or devices, to target specific components on specific cars, and/or to capture images or readings at specific times. The system can receive instructions to capture both infrared images and as well as images from one or more cameras, and the images can be combined or layered (via aligning image/reading metadata, such as timestamps) for comparing detected heat profiles (based on the IR images) with specific railcar components (based on images from other cameras).

At step 2304, the system can capture infrared images of one or more railcar components. The captured infrared images can be timestamped and aligned to other data, such as data received from an AEI scanner, wheel detection sensors, other cameras, etc. Pixels from images taken by one or more cameras can be mapped to detected temperature values from the IR images/readings, and the mapped data can be stored in a vector format. The mapped data, as stored in the vector, can include RGB values that represent temperature values as detected by an infrared imaging device, which can further be mapped to pixels of an image captured from another camera (such as a DSLR camera).

At step 2306, the system can process the captured infrared images. The system can process the infrared images to detect one or more heat patterns. Processing the captured infrared images can include receiving the infrared images at the processing system 1204. Processing the infrared images can include parsing the infrared images, pixel by pixel, and analyzing the RGB value(s) (or another value) for each pixel. The pixel values can be stored in a vector format, and a pixel vector can be processed for determining if particular patterns in the pixel values are present within the vector. In one example, clusters of RGB values indicative of an abnormally high temperature can represent a railcar component abnormality.

At step 2308, the system can determine whether one or more aspects of the infrared image(s) include a temperature that is above a predetermined threshold. For example, the system can determine whether one or more railcar components are exhibiting heat at a temperature that is above what is typically exhibited for those components. As discussed above, the system can associate a detected temperature with corresponding pixel RGB values. If, at step 2308, the system determines that one or more aspects of the infrared image(s) include a temperature that is above a predetermined threshold (such as a cluster of pixels or vector values that are indicative of an abnormal temperature), the process 2300 can proceed to step 2310. However, if the system determines that one or more aspects of the infrared image do not include a temperature that is above a predetermined threshold, the process 2300 can proceed to step 2314.

At step 2310, the system can determine a classification for the heat pattern detected in the infrared image(s). Example classifications for detected heat patterns, in accordance with the discussion herein, can include classifications for applied hand brakes, flanging, angularity, sliding, no abnormality detected, etc. Classifications can be determined based on matching the captured IR images (or their vectorized representations) to one or more known IR images associated with a railcar classification (such as an applied handbrake).

At step 2312, the system can generate a notification corresponding to the detected heat pattern. In particular, the system can generate a notification corresponding to the railcar on which the abnormal heat pattern was detected, the specific car or cabin of the railcar corresponding to the detected abnormality, the component(s) identified as experiencing or exhibiting the abnormality, etc. The system can determine on which train car the abnormal heat pattern was detected based on metadata and timestamps corresponding to the captured images/readings.

At step 2314, the system can provide the infrared images, as well as any detected heat patterns, to a machine learning model. The system can leverage a machine learning model to identify abnormalities and anomalies within captured infrared images. Machine learning models can be specifically trained to identify abnormalities and anomalies within infrared images, and thus a machine learning model can identify an issue that was otherwise not detected. Providing the infrared images to a machine learning model, regardless of whether an anomaly is present within the image, can be used to further train and refine the machine learning model.

The computing system can leverage identified heat patterns, and any railcar issues in connection with the heat patterns, as classifications to train a classifier. For example, the computing system can use machine learning techniques to identify the heating issues from the input infrared images. In another example, the computing system can use a third algorithm to generate similar heat pattern classifications for the bearings. When the computing system identifies an infrared image that surpasses the temperature threshold or detects a heating issue classification, the computing system can use the camera system to identify the railcar. For example, the computing system can identify the proper railcar identifier (also referenced herein as "railcar ID" or "car ID") from the aligned metadata and can generate an alert identifying the issue.

Example Real-Time Health Monitoring

Figure 24:
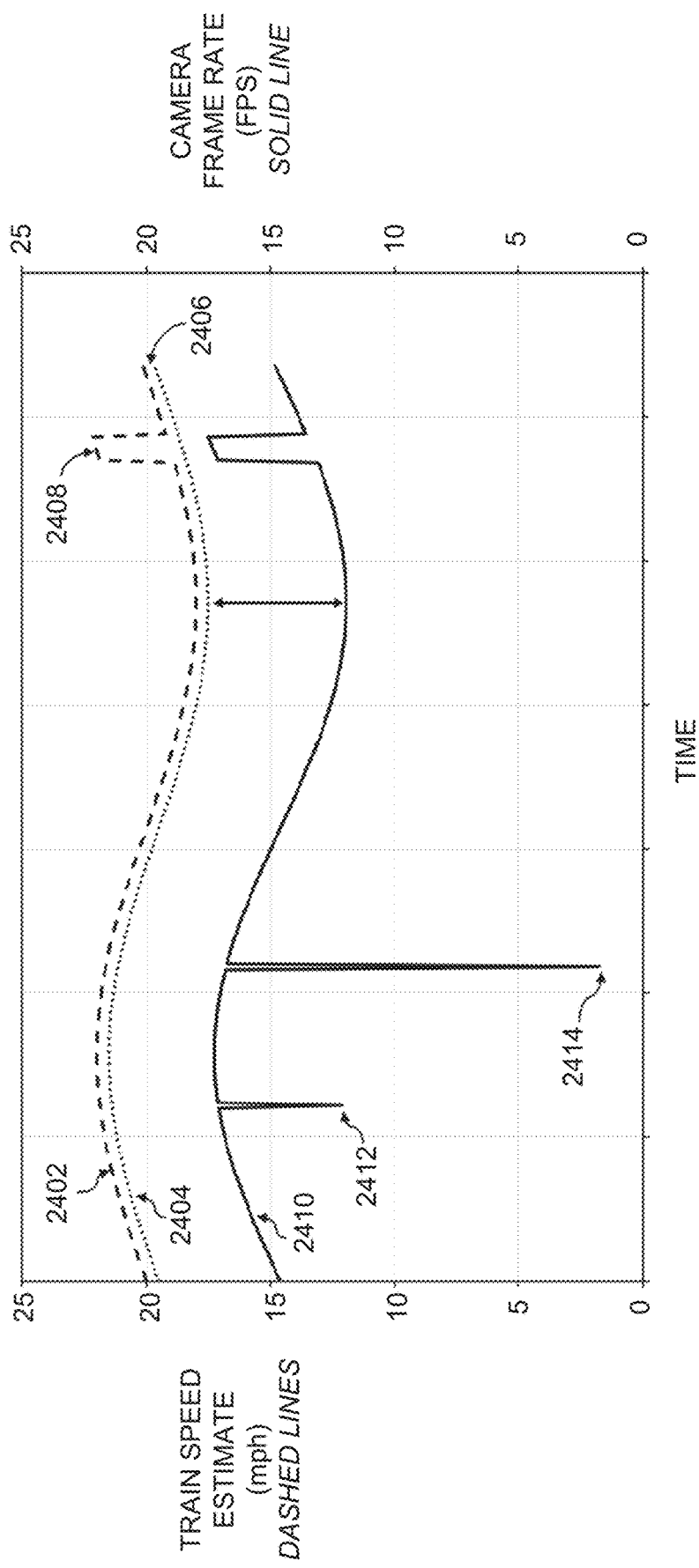
FIG. 24 is a graph illustrating a railcar speed and frame rate comparison with respect to time, in accordance with the disclosed technology.

FIG. 24 is a graph illustrating a comparison of an estimated train speed to a frame rate plotted over time for assessing the health and performance of the inspection portal system. The graph can depict how the system identifies performance issues in connection with the inspection portal system as a whole. For example, the graph can be used for quality assurance checks on the inspection portal system performance and data acquisition. The graph can be a visualization tool for depicting various quality and performance checks performed by the computing system. The system can perform any particular quality and performance check discussed herein.

The graph illustrates a dual-vertical axis plot for a time span during which a train is passing through the inspection portal system. For example, the horizontal axis can represent time. The graph includes two dashed lines to represent speed estimates, which should be read in relation to the left vertical axis of the plot and are in units of miles per hour (mph). The solid line can represent the frame rate of one particular continuously triggered camera within the inspection portal system, and the solid line can be analyzed with respect to the right vertical axis. The right vertical axis can represent frames per second (FPS).

When a train passes through the inspection portal, the system can use various sensors (e.g., such as the wheel detection sensors 1208) to estimate the speed of the passing train, railcar, or locomotive. The system can generate a primary speed estimate associated with the train, and the system can use the same for calculating and executing the triggering of various cameras within the inspection portal. The system can quantify and illustrate the primary speed estimate 2402 of the train as long-dashed lines. In a particular instance where the train accelerates or decelerates (brakes) during its passage through the inspection portal system, the long-dashed line can indicate those changes in speed. For example, the primary speed estimate 2402 starts at approximately 20 mph, then varies between 22 mph and 18 mph as this train passes through the inspection portal system.

The system can plot various secondary speed estimates 2404 (e.g., shown as a short-dashed line) alongside the primary speed estimate 2402. The system can compare the secondary speed estimate 2404 to the primary speed estimates 2402 to identify any speed measurement discrepancies 2406. For example, the system can identify scenarios where the primary speed estimate 2402 and the secondary speed estimates 2404 are not proportional. For example, the system can identify a scenario in which the inspection portal system has systematic (bias) or random errors in the speed estimates.

For example, discrepancies in the synchronization, phase, correlation, and/or offset of two different speed estimates (e.g. between the primary speed estimate 2402 and the secondary speed estimate 2404) can signify system clock synchronization issues within the inspection portal system (e.g., timing errors which may manifest themselves as horizontal discrepancies). The computing system can determine how similar the various speed estimates are between one another. For example, the computing system can include auto-correlation methods to determine the timing offset between the two signals. In another example, the computing system can use one or more dynamic time warpings (DTW) to determine the offsets between the two signals.

Discrepancies 2406 in the speed estimates themselves also become apparent in this visualization in the vertical direction. In the example illustrated in FIG. 24, the computing system can identify and illustrate that the primary speed estimate 2402 is greater than the secondary speed estimate 2404. The computing system can use the analysis to debug the various inputs and signal processing methods used to calculate the primary speed estimate 2402 (or secondary speed estimate 2404). The computing system can use the analysis to determine root causes of various errors, such as errors in the measurement of the distances between wheel crossing detection sensors. The computing system can use the analysis to determine the necessary corrections to accommodate for, or resolve, the identified errors.

While a train passes through the inspection portal, the system can monitor for any speed measurement discontinuities 2408 that are physically unlikely or impossible to occur (e.g., large sudden changes in speed (positive or negative)). Further, the computing system can illustrate the frame rate 2410 of a particular camera (e.g., the solid line shown in FIG. 24) as the train passes through the inspection portal. The frame rate can be understood as the reciprocal of the time between two successive frame captures (e.g., a smaller time duration results in a faster frame rate). For example, the computing system can measure the frame rate using the high-speed receiving and compression process and can measure the frame rate using the unit frames per second (FPS). The timestamp associated with the frame (image) received can be the time at which the frame was received by the high-speed receiving and compression process, or, more preferably, the time at which the image acquisition device was triggered by the computing system to produce the associated frame (image). The computing system can generate a timestamp of the frame in conjunction with a time synchronization protocol such as the precision time protocol (PTP), or the network time protocol (NTP).

The computing system can identify various exceptions to the frame rate data. The computing system can expect the frame rate 2410 to be proportional to the primary speed estimates 2402, change proportionally to changes in the primary speed estimates 2402, and to not "lag" or "lead" the primary speed estimate 2402 in time. The computing system can identify any discrepancies in the synchronization, phase, correlation, and/or offset between the primary speed estimate 2402 and the frame rate 2410 to identify system clock synchronization issues within the inspection portal system (e.g., timing errors that can manifest themselves as horizontal discrepancies as shown in FIG. 24).

The computing system can monitor discontinuities in the frame rate 2410. For example, the computing system can identify large changes in the time between successive frames. For example, FIG. 24 can illustrate the discontinuity resulting from the loss (or "drop") of a single frame ("single frame loss 2412"). The single frame loss 2412 can indicate that, somewhere in the signal processing pipeline or network of the inspection portal processing system, a frame (image) was dropped where one was expected. The computing system can identify the size of the frame loss based on the vertical change in the chart. Larger discontinuities can correspond to multi-frame loss 2414, as shown in FIG. 24. Multi-frame loss 2414 can be identified by a larger vertical change in the frame rate, as compared to the single frame loss 2412. Identifying a multi-frame loss 2414 can indicate that a plurality of data capturing devices are not triggering or activating as expected based at least on the primary speed estimate 2402 and/or the secondary speed estimate 2404.

Other examples of image acquisition performance checks performed by the system can include: A) reconciling the count of the number of triggered pulses sent to various cameras in the inspection portal system with the number of images actually received by the high-speed receiving and compression process; B) comparing the count of the number of images received by the high-speed receiving and compression process for two different cameras that should have been triggered an equal number, or some relative proportion, of times; and C) extracting visual features from successive images and tracking the movement of such visual features from one frame to the next to determine and validate the amount of "overlap" achieved in the triggering of such camera. Additionally, the computing system can determine if the overlap meets the desired overlap as configured for that particular camera in the inspection portal system. Overlap can be understood as how much of the same region of the train, railcar, or locomotive is captured between successive images. For example, the inspection portal system can include a particular camera with a field of view of 60 inches of the train. Continuing this example, when a high degree of overlap occurs (e.g., 6 inches of train movement), the particular camera can identify the high degree of overlap in a specific portion of the train between successive images.

Figure 25:
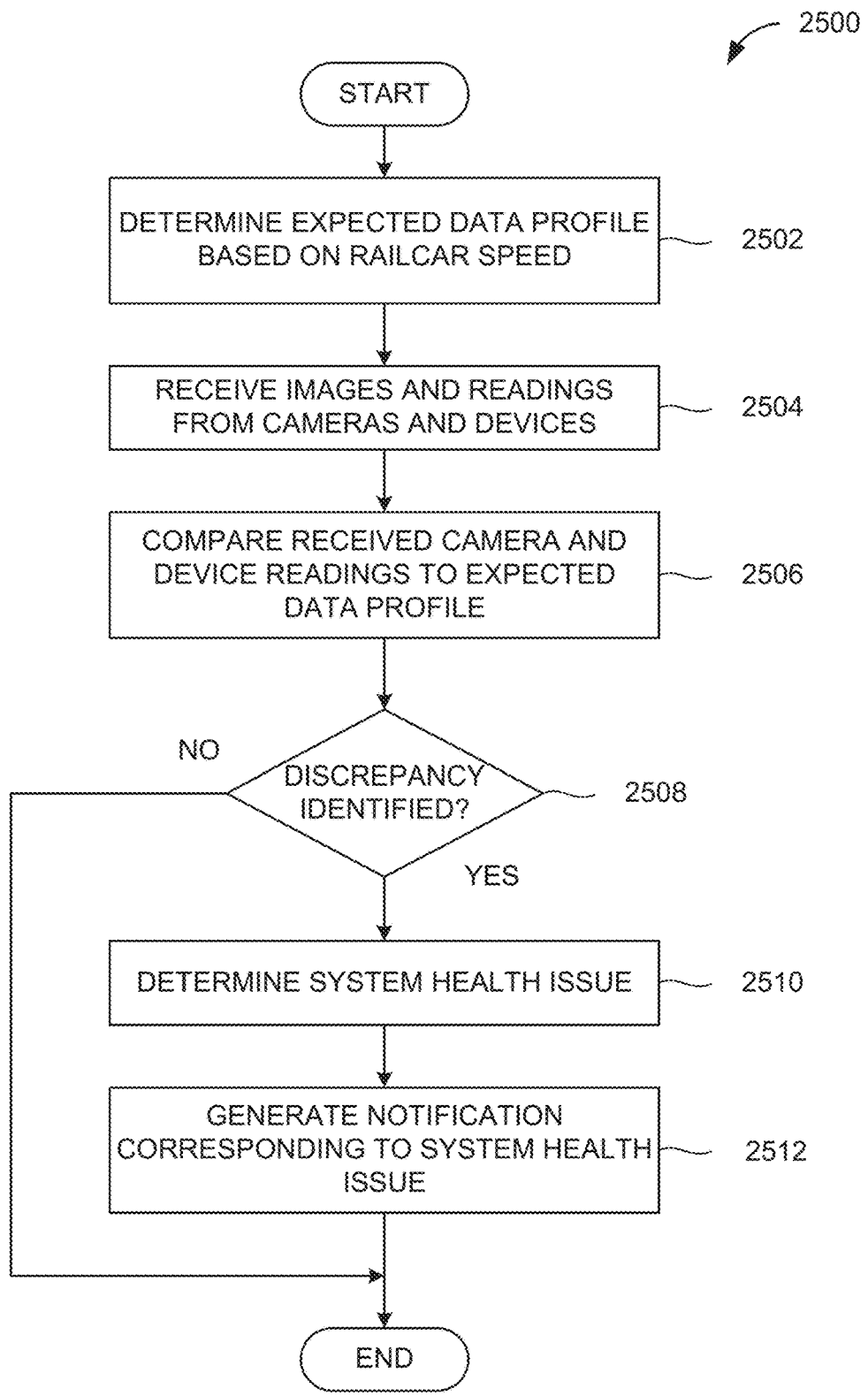
FIG. 25 is a flowchart illustrating a real-time system health monitoring process, in accordance with the disclosed technology.

FIG. 25 illustrates an example real-time system health monitoring process. As discussed above in connection with FIG. 24, the system can be configured to monitor its health, in real-time, based on a quantity, quality, etc., of images and sensor readings received as a train is traveling through the inspection portal. The real-time health monitoring process 2500 is discussed in greater detail below.

The real-time health monitoring process 2500 can begin at step 2502, where the system determines an expected data profile corresponding to a railcar based on the railcar speed. As is discussed throughout the present disclosure, the system can configure and trigger one or more cameras, sensors, or data capturing devices to obtain images, readings, etc., from railcars traveling through the disclosed inspection portal. Further, the system is operatively configured to determine current and/or estimated futures speeds for the railcar, and such speed(s) are used as parameters for determining configuration settings for the one or more cameras, sensors, devices, etc. For example, the system can configure cameras to capture multiple images of a passing train in bursts (such that a plurality of images are captured in rapid succession), or the system can configure cameras to capture a single image. Furthermore, the system can configure different types of cameras, such as line scan cameras and area scan cameras, to each capture images at specific points in time. Accordingly, because the system configures how images and readings should be captured (e.g., how many images or readings, from which cameras or devices they are captured, etc.) the system can also determine an expected data profile for the images and readings. An expected data profile can be the full catalog of images, readings, etc., that the system is expecting to receive from the cameras, sensors, devices, etc., in response to triggering the cameras, sensors, devices, to capture data corresponding to a railcar.

At step 2504, the system can receive one or more images and/or readings from cameras, sensors, or other data capturing devices included within the system. The system can receive the one or more images and/or readings at the processing system 1204. As discussed above in connection with the description of FIG. 12, the system can be configured to aggregate the captured images (for example, in response to determining that a train has finished passing through the inspection portal), and furthermore the system can compress the images into JPEG format via the nvJPEG library. The compressed images, as well as any other captured data, can be stored in the image storage 1320 or another appropriate system database.

At step 2506, the system can compare the received camera and device readings to the expected data profile (as determined at step 2502). As discussed throughout the present disclosure, the system can generate timestamps associated with captured images and readings. For example, the system can directly monitor the memory locations or I/O pins in the system at which rising edge signals (indicative of wheel crossing events) are received, and the system can record the time at which those signals are detected. Accordingly, based on generated timestamps, the system can verify a rate at which the images were captured. Based on a difference between generated timestamps, the system can determine an image capture rate indicative of the images actually received. The system can compare the image capture rate to, for example, a configured trigger rate, where a discrepancy between the image capture rate and the configured trigger rate can be indicative of a system health issue. In this example, the system health issue can include a broken camera, a transmission error between the camera and the railcar detection system 1202 and/or the processing system 1204, etc. The system can also determine, for example, that a system health issue may exist in response to identifying a discrepancy between a number of images received as compared to the number of image triggers generated and transmitted to the cameras.

At step 2508, the system can identify whether any discrepancies are present between the received camera and device readings, and the expected data profile. As discussed above in connection with the step 2506, the system can identify discrepancies in the received camera images and device readings in response to comparing the received images and readings to an expected data profile. If no discrepancies are present, the process 2500 can end. However, if discrepancies are identified at step 2508, the process 2500 can proceed to step 2510.

At step 2510, the system can determine one or more system health issues based on the one or more identified discrepancies. In response to identifying that only eight images were received, despite the system triggering for ten images to be captured, the system can determine that one or more cameras (or connections thereto) can be broken or faulty. If the system cannot identify any railcar components or known features within received images, the system can determine that one or more cameras can be out-of-focus. In another example, the system can determine that a health issue may exist in connection with the plurality of wheel detection sensors if the calculated current speed and speed trajectories (or axle path trajectories) are uncharacteristic of railcars. For example, a faulty wheel detection sensor may become stuck in a closed or activated position, debris may prevent the proper functioning of the sensor, etc., each of which can result in uncharacteristic rising edge patterns (and thus uncharacteristic speed estimation).

At step 2512, the system can generate one or more notifications corresponding to the health issue. In response to identifying one or more health issues corresponding to the inspection portal, the system can generate notifications in connection with the identified health issues. The system can generate notifications corresponding to the identified health issue, the particular component(s) exhibiting the problematic behavior, suggestions or recommendations for resolving the identified issue, etc. The notifications can be text messages, emails, pop-up messages on a computer screen, audio signals, changes to a light state corresponding to a particular train and error type, etc. The notification can be transmitted to a system administrator, or the like, for addressing the identified issue. In response to, for example, a system administrator receiving notification regarding a faulty camera, the system administrator can fix the camera or replace the camera entirely. The system administrator can replace the camera with the same make and model as the faulty camera or, because the system is modularly configurable, the system administrator can replace the faulty camera with a different camera (e.g., a newer version, a different make and model, a different camera type, etc.).

Figure 26:
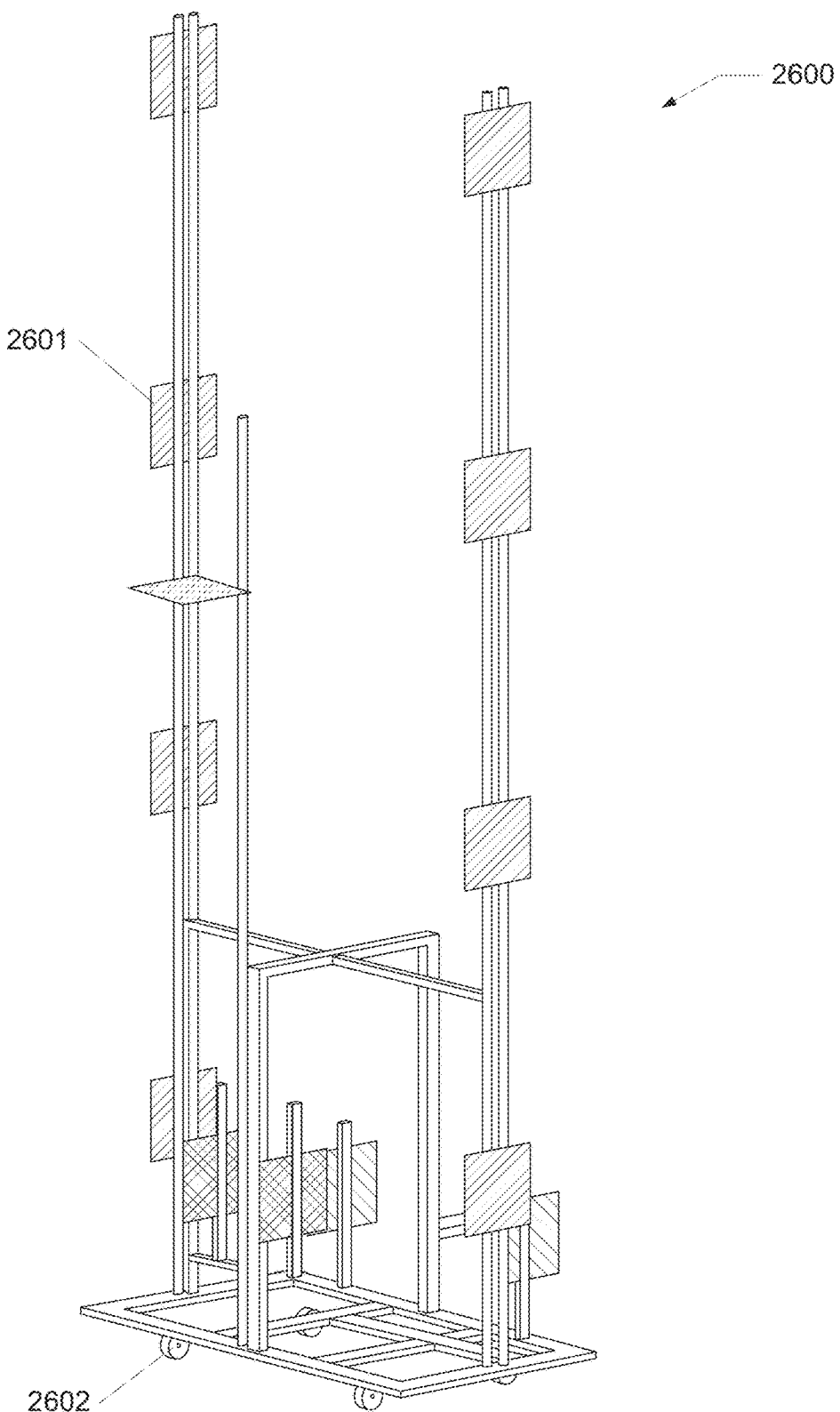
FIG. 26 illustrates a perspective view of an example portal focus cart, in accordance with the disclosed technology.

Referring now to FIG. 26, illustrated is a perspective view of a portal focus cart 2600, in accordance with the disclosed technology. The cameras of the inspection portal system 200 can focus to the components or regions of interest of the passing railcar 103. For example, during installation of the inspection portal system 200 (and/or periodically following the initial installation), the inspection portal system 200 can use the portal focus cart 2600 to calibrate one or more sensors and/or cameras of the inspection portal system 200. Such an apparatus can have various targets 2601 placed at various locations within the portal focus cart 2600 such that focusing cameras on those regions can produce the desired results when the passing railcar 103 travels through the inspection portal system 200. Such targets 2601 can have fiducial markers such that their location and orientation may be automatically detected by image processing algorithms of the computing system applied to the image feeds from the cameras. The portal focus cart 2600 may also have wheels 2602 and one or more motor(s) such that it can be placed on the train tracks 104 and moved within the inspection portal system 200. The portal focus cart can pass through the system at some speed so as to mimic a passing railcar 103. Various components of the portal focus cart 2600 can collapse or telescope such that the portal focus cart 2600 can be stored and transported more conveniently. The portal focus cart 2600 can also be configured so as to set the depth of field as desired, for example through the use of multiple focusing targets 2601.

CONCLUSION

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid-state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general-purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general-purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed innovations may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represents examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed innovation are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language, or other input devices (not shown), such as a microphone, etc. These and other input devices are often connected to the processing unit through known electrical, optical, or wireless connections.

The computer that affects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the innovations are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the innovation is connected to the local network through a network interface or adapter. When used in a WAN or WLAN networking environment, the computer may include a modem, a wireless link, or other mechanisms for establishing communications over the wide-area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed innovations will be readily discernible from the description herein, by those of ordinary skill in the art. Many embodiments and adaptations of the disclosure and claimed innovations other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed innovations. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed innovations. In addition, some steps may be carried out simultaneously, contemporaneously, or in synchronization with other steps.

The embodiments were chosen and described in order to explain the principles of the claimed innovations and their practical application so as to enable others skilled in the art to utilize the innovations and various embodiments and with various modifications as are suited to the particular use contemplated. Alternative embodiments will become apparent to those skilled in the art to which the claimed innovations pertain without departing from their spirit and scope. Accordingly, the scope of the claimed innovations is defined by the appended claims rather than the foregoing description and the exemplary embodiments described therein.

What is claimed:

1. A system comprising:
   one or more imaging devices, each of the one or more imaging devices being configured to capture images of a corresponding target region of a passing railcar traveling along a railway, each target region corresponding to one or more railcar components of the passing railcar;
   one or more wheel detection sensors configured to detect a presence and/or a non-presence of wheels traveling along a railway, the one or more wheel detection sensors being located upstream from the one or more imaging devices such that the passing railcar passes the one or more wheel detection sensors before passing the one or more imaging devices; and
   one or more computing devices in communication with the one or more wheel detection sensors and the one or more imaging devices, the one or more computing devices being configured to:
      determine a current estimated train speed of the passing railcar based at least in part on detection data received from the one or more wheel detection sensors;
      determine one or more trigger timings, each trigger timing corresponding to a particular imaging device of the one or more imaging devices, wherein each trigger timing is based at least in part on the current estimated train speed and, for each particular imaging device of the one or more imaging devices, a distance offset and a trigger latency; and
      output capture instructions for each of the one or more imaging devices to capture images of the passing railcar according to a corresponding trigger timing of the one or more trigger timings, wherein the capture instructions comprises, for each corresponding imaging device of the one or more imaging devices, burst instructions indicating a particular number of images to be captured and a particular capture rate for capturing the particular number of images.

2. The system of claim 1, wherein the distance offset is, for each particular imaging device of the one or more imaging devices, a distance between the one or more wheel detection sensors and the particular imaging device.

3. The system of claim 2, wherein the distance offset comprises a plurality of distances between the particular imaging device and each wheel detection sensor of the one or more wheel detection sensors.

4. The system of claim 1, wherein the trigger latency comprises, for each particular imaging device of the one or more imaging devices, a timing delay between a transmission time at which the capture instructions are outputted and a receipt time at which the particular imaging device receives the capture instructions.

5. The system of claim 1, wherein the trigger latency comprises, for each particular imaging device of the one or more imaging devices, a processing time required for the particular imaging device to capture a first image after receiving the capture instructions.

6. The system of claim 1, wherein the trigger latency comprises, for each particular imaging device of the one or more imaging devices, clock discrepancies between an imaging clock of the particular imaging device and a control clock of the one or more computing devices.

7. The system of claim 1, wherein the one or more imaging devices comprises a plurality of imaging devices and the capture instructions synchronize image capture timings among the plurality of imaging devices.

8. The system of claim 7, wherein the capture instructions cause all imaging devices of the plurality of imaging devices to capture images within a microsecond of one another.

9. A method comprising:
receiving detection data from one or more wheel detection sensors, the detection data indicating detection of a train;
determining, based at least in part on the detection data, a first estimated speed of a first railcar of the train;
determining a plurality of first trigger timings, each first trigger timing of the plurality of first trigger timings corresponding to a respective imaging device of a plurality of imaging devices, wherein each first trigger timing is based at least in part on, for each imaging device of the plurality of imaging devices:
a distance offset for the imaging device;
a trigger latency for the imaging device; and
the first estimated speed;
outputting first capture instructions for each of the plurality of imaging devices to capture images of the first railcar according to a first trigger timing specific to each of the plurality of imaging devices, the first capture instructions comprising, for each corresponding imaging device of the plurality of imaging devices, first burst instructions indicating a first particular number of images to be captured and a first particular capture rate for capturing the first particular number of images;
determining, based at least in part on the detection data, a second estimated speed of a second railcar of the train;
determining a plurality of second trigger timings, each second trigger timing of the plurality of second trigger timings corresponding to a respective imaging device of the plurality of imaging devices, wherein each second trigger timing is based at least in part on, for each imaging device of the plurality of imaging devices:
the distance offset for the imaging device;
the trigger latency for the imaging device; and
the second estimated speed; and
outputting second capture instructions for each of the plurality of imaging devices to capture images of the second railcar according to a second trigger timing specific to each of the plurality of imaging devices, the second capture instructions comprising, for each corresponding imaging device of the plurality of imaging devices, second burst instructions indicating a second particular number of images to be captured and a second particular capture rate for capturing the second particular number of images.

10. The method of claim 9, wherein the second estimated speed is different from the first estimated speed.

11. The method of claim 9, wherein the trigger latency comprises, for each imaging device of the plurality of imaging devices:
a timing delay between a transmission time at which capture instructions are outputted and a receipt time at which the imaging device receives the capture instructions; and
a processing time required for the imaging device to capture a first image after receiving the capture instructions.

12. The method of claim 9, wherein the first estimated speed or the second estimated speed, respectively, synchronize image capture timings among the plurality of imaging devices.

13. The method of claim 12, wherein the capture instructions cause all imaging devices of the plurality of imaging devices to capture images within a microsecond of one another.

14. A non-transitory, computer readable medium storing instructions that, when executed by one or processors, causes a computing system to:
receive detection data from one or more wheel detection sensors, the detection data indicating detection of a train;
determine, based at least in part on the detection data, a first estimated speed of a first passing railcar of the train;
determine a plurality of first trigger timings, each first trigger timing of the plurality of first trigger timings corresponding to a respective imaging device of a plurality of imaging devices, wherein each first trigger timing is based at least in part on, for each imaging device of the plurality of imaging devices:
a distance offset for the imaging device;
a trigger latency for the imaging device; and
the first estimated speed;
output first capture instructions for each of the plurality of imaging devices to capture three or more first images of the first passing railcar according to a first trigger timing specific to each of the plurality of imaging devices, the three or more first images comprising:
a first central image capture in which a target region of the first passing railcar is positioned in an inner portion of a field of view of the corresponding image device of the plurality of imaging devices;
a first leading image capture in which the target region of the first passing railcar is located between the inner portion and a leading edge of the field of view of the corresponding image device of the plurality of imaging devices; and
a first lagging image capture in which the target region of the first passing railcar is located between the inner portion and a trailing edge of the field of view of the corresponding image device of the plurality of imaging devices;
determine, based at least in part on the detection data, a second estimated speed of a second passing railcar of the train;
determine a plurality of second trigger timings, each second trigger timing of the plurality of second trigger timings corresponding to a respective imaging device of a plurality of imaging devices, wherein each second trigger timing is based at least in part on, for each imaging device of the plurality of imaging devices:
the distance offset for the imaging device;
the trigger latency for the imaging device; and
the second estimated speed; and
output second capture instructions for each of the plurality of imaging devices to capture three or more second images of the second passing railcar according to a second trigger timing specific to each of the plurality of imaging devices, the three or more second images comprising:
a second central image capture in which a target region of the second passing railcar is positioned in an inner portion of a field of view of the corresponding image device of the plurality of imaging devices;

a second leading image capture in which the target region of the second passing railcar is located between the inner portion and a leading edge of the field of view of the corresponding image device of the plurality of imaging devices; and a second lagging image capture in which the target region of the second passing railcar is located between the inner portion and a trailing edge of the field of view of the corresponding image device of the plurality of imaging devices.

15. The non-transitory, computer readable medium of claim 14, wherein the second estimated speed is different from the first estimated speed.

16. The non-transitory, computer readable medium of claim 14, wherein the trigger latency comprises, for each imaging device of the plurality of imaging devices:

a timing delay between a transmission time at which capture instructions are outputted and a receipt time at which the imaging device receives the capture instructions; and a processing time required for the imaging device to capture a first image after receiving the capture instructions.

17. The non-transitory, computer readable medium of claim 14, wherein each of the first capture instructions and the second capture instructions comprise instructions for each of the plurality of imaging devices to capture images according to a corresponding image capture rate, wherein the image capture rate is based at least in part on the first estimated speed or the second estimated speed, respectively.

18. The non-transitory, computer readable medium of claim 14, wherein the first estimated speed or the second estimated speed, respectively, synchronize image capture timings among the plurality of imaging devices.

19. The non-transitory, computer readable medium of claim 18, wherein the capture instructions cause all imaging devices of the plurality of imaging devices to capture images within a microsecond of one another.

20. The non-transitory, computer readable medium of claim 14, wherein:

the first capture instructions for each of the plurality of imaging devices are instructions for each of the plurality of imaging devices to capture a corresponding first image burst;

the second capture instructions for each of the plurality of imaging devices are instructions for each of the plurality of imaging devices to capture a corresponding second image burst; and the instructions, when executed by the one or processors, further cause the computing system to:

determine one or more first conditions of the first passing railcar based on one or more first image bursts;

determine one or more second conditions of the second passing railcar based on one or more second image bursts;

determine a first confidence value for each of the one or more first conditions based at least in part on an analysis of the corresponding first image bursts; and determine a second confidence value for each of the one or more second conditions based at least in part on an analysis of the corresponding second image bursts.

* * * * *